United States Patent
Young et al.

(10) Patent No.: US 11,459,409 B2
(45) Date of Patent: *Oct. 4, 2022

(54) CATALYST SYSTEM FOR MULTI-BLOCK COPOLYMER FORMATION

(71) Applicant: Dow Global Technologies LLC, Midland, MI (US)

(72) Inventors: Andrew J. Young, Houston, TX (US); Hien Q. Do, Sugar Land, TX (US); Brad C. Bailey, Midland, MI (US); Matthew D. Christianson, Midland, MI (US); Jeffrey C. Munro, Bellaire, TX (US); Edmund M. Carnahan, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 145 days.

This patent is subject to a terminal disclaimer.

(21) Appl. No.: 16/494,085

(22) PCT Filed: Mar. 14, 2018

(86) PCT No.: PCT/US2018/022454
§ 371 (c)(1),
(2) Date: Sep. 13, 2019

(87) PCT Pub. No.: WO2018/170138
PCT Pub. Date: Sep. 20, 2018

(65) Prior Publication Data
US 2020/0131283 A1 Apr. 30, 2020

Related U.S. Application Data

(60) Provisional application No. 62/471,534, filed on Mar. 15, 2017.

(51) Int. Cl.
*C08F 297/08* (2006.01)
*C08F 4/64* (2006.01)

(52) U.S. Cl.
CPC ...... *C08F 4/64172* (2013.01); *C08F 297/086* (2013.01)

(58) Field of Classification Search
CPC .. C08F 210/16; C08F 210/241; C08F 210/01; C08F 4/64172; C08F 297/086; C07C 7/00
See application file for complete search history.

(56) References Cited

U.S. PATENT DOCUMENTS 10,919,995 B2 * 2/2021 Bailey .................. C07F 7/00
10,968,289 B2 * 4/2021 Bailey .................. C08F 210/16
(Continued)

FOREIGN PATENT DOCUMENTS

WO 9745434 A1 12/1997
WO 2005/090425 A1 9/2005
(Continued)

OTHER PUBLICATIONS

Crust et al., Dalton Trans., 2004, p. 2257-2266.
(Continued)

*Primary Examiner* — Mark S Kaucher

(57) ABSTRACT

The present disclosure relates to a catalyst system for use in forming a multi-block copolymer, said copolymer containing therein two or more segments or blocks differing in chemical or physical properties, a polymerization process using the same, and the resulting polymers, wherein the composition comprises the admixture or reaction product resulting from combining: (A) a first olefin polymerization procatalyst, (B) a second olefin polymerization procatalyst capable of preparing polymers differing in chemical or physical properties from the polymer prepared by procatalyst (A) under equivalent polymerization conditions, (C) an activator, and (D) a chain shuttling agent.

20 Claims, 5 Drawing Sheets

(56) References Cited

U.S. PATENT DOCUMENTS

| | | | | |
|---|---|---|---|---|
| 10,975,172 B2* | 4/2021 | Bailey | .................. | C08F 210/02 |
| 2012/0083575 A1* | 4/2012 | Hustad | .................. | C08F 210/16 |
| | | | | 525/245 |

FOREIGN PATENT DOCUMENTS

| | | |
|---|---|---|
| WO | 2005/090426 A1 | 9/2005 |
| WO | 2005/090427 | 9/2005 |
| WO | 2017/173074 | 10/2017 |
| WO | 2017173080 | 10/2017 |

OTHER PUBLICATIONS

Crust et al., Dalton Trans., 2004, p. 4050-4058.
Fuhrmann et al., Inorganic Chemistry, 1996, vol. 35, p. 6742-6745.
Kretschmer et al., Journal of Organometallic Chemistry, 2007, vol. 692, p. 4569-4579.
Kretschmer et al., Journal of Organometallic Chemistry, 2007, vol. 692, p. 4569-5479.
Morton et al., Chem. Commun., 2000, p. 2099-2100.
PCT/US2018/022454, International Preliminary Report on Patentability dated Sep. 17, 2019.
PCT/US2018/022454, International Search Report and Written Opinion dated Jun. 27, 2018.
Talja et al., Journal of Molecular CatalysisA: Chemical, 2008, vol. 280, p. 102-105.
Westmoreland et al., Organometallics, 2003, vol. 22, p. 2972-2976.

* cited by examiner

[i] Williams, T. and Ward, I.M. "The Construction of a Polyethylene Calibration Curve for Gel Permeation Chromatography using Polystyrene Fractions," *J. Polym. Sci., Polym. Let.* 1968, *6*, 621 – 624.

CATALYST SYSTEM FOR MULTI-BLOCK COPOLYMER FORMATION

FIELD

Embodiments relate to olefin polymerization catalysts, their manufacture, and the production of polyolefins using specific catalyst compositions, including the use of chain shuttling agents in the olefin polymerization process.

INTRODUCTION

The properties and applications of polyolefins depend to varying degrees upon the specific features of the catalysts used in their preparation. Specific catalyst compositions, activation conditions, steric and electronic features, and the like all can factor into the characteristics of the resulting polymer product. Indeed, a multitude of polymer features, such as co-monomer incorporation, molecular weight, polydispersity, long-chain branching, and the related physical properties (e.g., density, modulus, melt properties, tensile features, and optical properties), can all be affected by catalyst design.

In recent years, the use of well-defined molecular procatalysts generally has allowed enhanced control over polymer properties, including branching architecture, stereochemistry, and block copolymer construction. This latter aspect of polymer design, in which both "hard" (semicrystalline or high glass transition temperature) blocks and "soft" (low crystallinity or amorphous with low glass transition temperature) blocks are assembled in a polymer chain, has been especially challenging. Advances in block copolymer formation have been seen with the use of chain-shuttling agents (CSAs), which can exchange a growing polymer chain between different catalytic sites, such that portions of a single polymer molecule are synthesized by at least two different catalysts. In this manner, block copolymers can be prepared from a common monomer environment by using a mixture of catalysts of different selectivities, such as different stereoselectivities or monomer selectivities. Under the right conditions, efficient chain shuttling can produce a multi-block copolymer that features a random distribution of hard and soft blocks of random length.

Even with the advent of CSA and dual catalyst combinations in multi-block copolymer preparation processes, further improvements to said processes can be made. One improvement to said processes would be to elevate reactor temperatures, which would increase production rate and decrease energy consumption while still producing desirable olefin block copolymer architecture with commercially acceptable catalyst efficiency and process control. Such an improvement has not been demonstrated in the state of the art.

SUMMARY

In certain embodiments, the present disclosure relates to a composition comprising an admixture or reaction product resulting from combining:
(A) a first olefin polymerization procatalyst,
(B) a second olefin polymerization procatalyst, and
(C) a chain shuttling agent,
wherein the second olefin polymerization procatalyst comprises a metal-ligand complex of Formula (I):

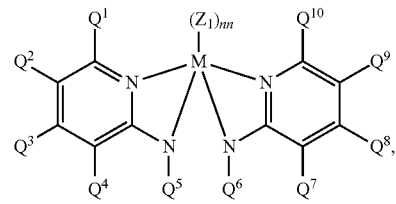

(I)

wherein M is titanium, zirconium, or hafnium;
wherein each Z1 is independently a monodentate or polydentate ligand that is neutral, monoanionic, or dianionic, wherein nn is an integer, and wherein Z1 and nn are chosen in such a way that the metal-ligand complex of Formula (I) is overall neutral;
wherein each $Q^1$ and $Q^{10}$ independently is selected from the group consisting of $(C_6-C_{40})$aryl, substituted $(C_6-C_{40})$aryl, $(C_3-C_{40})$heteroaryl, and substituted $(C_3-C_{40})$heteroaryl;
wherein each $Q^2$, $Q^3$, $Q^4$, $Q^7$, $Q^8$, and $Q^9$ independently is selected from a group consisting of hydrogen, $(C_1-C_{40})$hydrocarbyl, substituted $(C_1-C_{40})$hydrocarbyl, $(C_1-C_{40})$heterohydrocarbyl, substituted $(C_1-C_{40})$heterohydrocarbyl, halogen, and nitro $(NO_2)$;
wherein each $Q^5$ and $Q^6$ independently is selected from the group consisting of a $(C_1-C_{40})$alkyl, substituted $(C_1-C_{40})$alkyl, and $[(Si)_1-(C+Si)_{40}]$ substituted organosilyl;
wherein each N independently is nitrogen;
optionally, two or more of the $Q^{1-5}$ groups can combine together to form a ring structure, with such ring structure having from 5 to 16 atoms in the ring excluding any hydrogen atoms; and
optionally, two or more of the $Q^{6-10}$ groups can combine together to form a ring structure, with such ring structure having from 5 to 16 atoms in the ring excluding any hydrogen atoms.

In certain embodiments, the present disclosure relates to a composition for use in the polymerization of at least one addition polymerizable monomer to form a multi-block (segmented) copolymer, said copolymer containing therein two or more blocks or segments differing in one or more chemical or physical properties, the composition comprising an admixture or reaction product resulting from combining:
(A) a first olefin polymerization procatalyst,
(B) a second olefin polymerization procatalyst, and
(C) a chain shuttling agent,
wherein the second olefin polymerization procatalyst comprises a metal-ligand complex of Formula (I).

In certain embodiments, the present disclosure relates to a composition for use in the polymerization of ethylene and at least one copolymerizable comonomer other than ethylene to form a multi-block (segmented) copolymer, said copolymer containing therein two or more blocks or segments differing in one or more chemical or physical properties, the composition comprising an admixture or reaction product resulting from combining:
(A) a first olefin polymerization procatalyst,
(B) a second olefin polymerization procatalyst, and
(C) a chain shuttling agent,
wherein the second olefin polymerization procatalyst comprises a metal-ligand complex of Formula (I).

In certain embodiments, the present disclosure relates to an olefin polymerization catalyst system comprising:
(A) a first olefin polymerization procatalyst,
(B) a second olefin polymerization procatalyst, and
(C) a chain shuttling agent, wherein the second olefin polymerization procatalyst comprises a metal-ligand complex of Formula (I).

In further embodiments, the present disclosure relates to a process for preparing a multi-block (segmented) copolymer, said process comprising contacting one or more addition polymerizable monomers under addition polymerizable conditions with a composition comprising an admixture or reaction product resulting from combining:

(A) a first olefin polymerization procatalyst,
(B) a second olefin polymerization procatalyst, and
(C) a chain shuttling agent, wherein the second olefin polymerization procatalyst comprises a metal-ligand complex of Formula (I).

In further embodiments, the present disclosure relates to a process for preparing a multi-block (segmented) copolymer comprising ethylene and at least one copolymerizable comonomer other than ethylene, said process comprising contacting ethylene and one or more addition polymerizable monomers other than ethylene under addition polymerizable conditions with a composition comprising an admixture or reaction product resulting from combining:

(A) a first olefin polymerization procatalyst,
(B) a second olefin polymerization procatalyst, and
(C) a chain shuttling agent, wherein the second olefin polymerization procatalyst comprises a metal-ligand complex of Formula (I).

In further embodiments, the present disclosure relates to a process for preparing a multi-block (segmented) copolymer, said process comprising contacting one or more addition polymerizable monomers under addition polymerizable conditions with an olefin polymerization catalyst system comprising:

(A) a first olefin polymerization procatalyst,
(B) a second olefin polymerization procatalyst, and
(C) a chain shuttling agent, wherein the second olefin polymerization procatalyst comprises a metal-ligand complex of Formula (I).

In further embodiments, the present disclosure relates to a process for preparing a multi-block (segmented) copolymer comprising ethylene and at least one copolymerizable comonomer other than ethylene, said process comprising contacting ethylene and one or more addition polymerizable monomers other than ethylene under addition polymerizable conditions with an olefin polymerization catalyst system comprising:

(A) a first olefin polymerization procatalyst,
(B) a second olefin polymerization procatalyst, and
(C) a chain shuttling agent, wherein the second olefin polymerization procatalyst comprises a metal-ligand complex of Formula (I).

In certain embodiments, the foregoing processes take the form of continuous solution processes for forming block copolymers, such as multi-block copolymers (preferably linear multi-block copolymers of two or more monomers, especially ethylene and a $C_{3-20}$ olefin or cycloolefin, and most especially ethylene and a $C_{3-20}$ α-olefin), using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers according to the present disclosure, are formed in high efficiency.

In another embodiment of the present disclosure, there is provided a segmented copolymer (multi-block copolymer), especially a copolymer comprising ethylene in polymerized form, said copolymer containing therein two or more (preferably three or more) segments differing in comonomer content or density or other chemical or physical properties. The copolymer preferably possesses a molecular weight distribution, Mw/Mn, of equal to or less than 10.0 (e.g., equal to or less than 9.0, equal to or less than 8.0, equal to or less than 7.0, equal to or less than 6.0, equal to or less than 5.0, equal to or less than 4.0, equal to or less than 3.0, equal to or less than 2.8, etc.). Most preferably, the polymers of the present disclosure are ethylene multi-block copolymers.

In yet another embodiment of the present disclosure, there are provided functionalized derivatives of the foregoing segmented or multi-block copolymers.

DETAILED DESCRIPTION

Definitions

Figure 1:
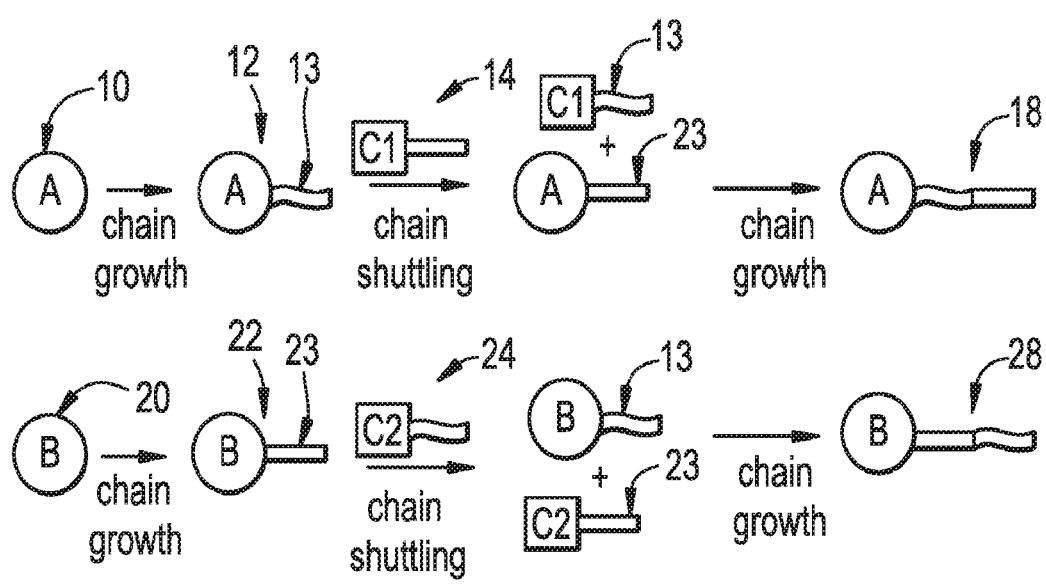
FIG. 1 exemplifies the chain shuttling process that occurs in the polymerization processes of the present disclosure.

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent U.S. version is so incorporated by reference in its entirety), especially with respect to the disclosure of synthetic techniques, product and processing designs, polymers, catalysts, definitions (to the extent not inconsistent with any definitions specifically provided in this disclosure), and general knowledge in the art.

Number ranges in this disclosure and as they relate to the compositions disclosed herein are approximate, and thus may include values outside of the range unless otherwise indicated. Number ranges include all values from and including the lower and the upper values and include fractional numbers or decimals.

The terms "chain shuttling agent" and "chain transfer agent" refer to those known to one of ordinary skill in the art. Specifically, the term "shuttling agent" or "chain shuttling agent" refers to a compound or mixture of compounds that is capable of causing polymeryl transfer between various active catalyst sites under conditions of polymerization. That is, transfer of a polymer fragment occurs both to and from an active catalyst site in a facile and reversible manner. In contrast to a shuttling agent or chain shuttling agent, an agent that acts merely as a "chain transfer agent," such as some main-group alkyl compounds, may exchange, for example, an alkyl group on the chain transfer agent with the growing polymer chain on the catalyst, which generally results in termination of the polymer chain growth. In this event, the main-group center may act as a repository for a dead polymer chain, rather than engaging in reversible transfer with a catalyst site in the manner in which a chain shuttling agent does. Desirably, the intermediate formed between the chain shuttling agent and the polymeryl chain is not sufficiently stable relative to exchange between this intermediate and any other growing polymeryl chain, such that chain termination is relatively rare.

The term "procatalyst" or "catalyst precursor" used herein refers to a transition metal species that, once combined with an activator co-catalyst, is capable of polymerization of unsaturated monomers. For example, $Cp_2Zr(CH_3)_2$ is a catalyst precursor, which, when combined with an activating cocatalyst, becomes the active catalyst species "$Cp_2Zr(CH_3)^+$" which is capable of polymerization of unsaturated monomers. For the sake of simplicity, the terms "procatalysts," "transition metal catalysts," "transition metal catalyst precursors," "catalysts," "catalyst precursors," "polymerization catalysts or catalyst precursors," "metal complexes," "complexes," "metal-ligand complexes" and like terms are meant to be interchangeable in the present disclosure. Catalysts or procatalysts include those known in the art and those disclosed in WO 2005/090426, WO 2005/090427, WO 2007/035485, WO 2009/012215, WO 2014/105411, U.S. Patent Publication Nos. 2006/0199930, 2007/0167578, 2008/0311812, and U.S. Pat. Nos. 7,355,089 B2, 8,058,373 B2, and 8,785,554 B2, all of which are incorporated herein by reference in their entirety.

"Co-catalyst" or "activator" refer to those known in the art, e.g., those disclosed in WO 2005/090427 and U.S. Pat. No. 8,501,885 B2, that can activate a procatalyst by combining with or contacting the procatalyst to form an active catalyst composition.

Common abbreviations used herein are listed below:

Me: methyl; Ph: phenyl; Bn: benzyl; i-Pr: iso-propyl; t-Bu: tert-butyl; n-Oct: 1-octyl; Cy: cyclohexyl; Mesityl: 2,4,6-trimethylphenyl; DI water: deionized water; THF: tetrahydrofuran; DME: dimethoxyethane; $CH_2Cl_2$: dichloromethane; $CBr_4$: carbon tetrabromide; TCB: trichlorobenzene; EtOAc: ethyl acetate; $C_6D_6$: deuterated benzene; Benzene-$d_6$: deuterated benzene; $C_7D_8$: deuterated toluene; $CDCl_3$: deuterated chloroform; dba: dibenzylideneacetone; $PCy_3$: tricyclohexylphosphine; CyPF-t-Bu (Josiphos), having the structure:

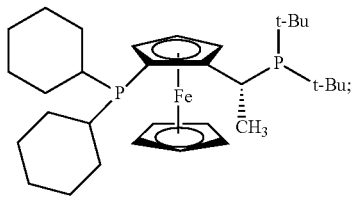

BINAP: 2,2'-bis(diphenylphosphino)-1,1'-binaphthyl; Acac: acetylacetonate; $Mg(OH)_2$: magnesium hydroxide; NaO$^t$Bu: sodium tert-butoxide; $K_3PO_4$: potassium phosphate tribasic; brine: saturated aqueous sodium chloride; n-BuLi: n-butyllithium; McMgBr: methylmagnesium bromide; $HfCl_4$: hafnium (IV) chloride; $HfBn_4$: hafnium (IV) tetrabenzyl; $ZrCl_4$: zirconium (IV) chloride; $ZrBn_4$: zirconium (IV) tetrabenzyl; $Pd(OAc)_2$: palladium (II) acetate; $Pd_2dba_3$: Tris(dibenzylideneacetone)dipalladium(0); $Ni(Acac)_2$: nickel (II) acetylacetonate; $NiBr_2(DME)$: nickel (II) bromide ethylene glycol dimethyl ether complex; DEZ: diethylzinc; MMAO, MMAO-3A: modified methylaluminoxane; BHT: butylated hydroxytoluene; GPC: gel permeation chromatography; HT-GPC: high-temperature gel permeation chromatography; PDI: polydispersity index; GC/MS: gas chromatography mass spectrometry; NMR: nuclear magnetic resonance; MHz: megahertz; g: grams; mg: milligrams; mmol: millimoles; mL: milliliters; min: minutes; h: hours; d: days; RT: room temperature.

The terms "addition polymerizable conditions," "polymerization conditions," and like terms refer to conditions known to one of ordinary skill in the art for polymerization of unsaturated monomers.

"Polymer" refers to a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc. "Interpolymer" and "copolymer" refer to a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc. The term "polyethylene" includes homopolymers of ethylene and copolymers of ethylene and one or more C3-8 α-olefins in which ethylene comprises at least 50 mole percent. The term "crystalline," if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The terms "olefin block copolymer (OBC)," "block copolymer," "multi-block copolymer," and "segmented copolymer" refer to a polymer comprising two or more chemically distinct regions or segments (referred to as "blocks") preferably joined in a linear manner, that is, a polymer comprising chemically differentiated units which are joined (covalently bonded) end-to-end with respect to polymerized functionality, rather than in pendent or grafted fashion. The blocks may differ in the amount or type of comonomer incorporated therein, the density, the amount of crystallinity, the type of crystallinity (e.g., polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, and/or any other chemical or physical property. For example, the olefin block copolymer may contain "hard blocks" (semicrystalline or high glass transition temperature) having lower comonomer content and "soft blocks" (low crystallinity or amorphous with low glass transition temperature) having higher comonomer content. Compared to block copolymers of the prior art, including copolymers produced by sequential monomer addition, fluxional catalysts, or anionic polymerization techniques, the block copolymers of the present disclosure are characterized by unique distributions of polymer polydispersity (PDI or Mw/Mn), block length distribution, and/or block number distribution, due, in a preferred embodiment, to the effect of the shuttling agent(s) in combination with catalysts. More specifically, when produced in a continuous process, the block copolymers desirably possess PDI from 1.0 to 10.0 (e.g., from 1.0 to 9.0, from 1.0 to 8.0, from 1.0 to 7.0, from 1.0 to 6.0, from 1.0 to 5.0, from 1.0 to 4.0, from 1.0 to 3.5, from 1.0 to 3.0, from 1.7 to 2.9, from 1.8 to 2.5, from 1.8 to 2.2, and/or from 1.8 to 2.1). When produced in a batch or semi-batch process, the block polymers desirably possess PDI from 1.0 to 10.0 (e.g., from 1.0 to 9.0, from 1.0 to 8.0, from 1.0 to 7.0, from 1.0 to 6.0, from 1.0 to 5.0, from 1.0 to 4.0, from 1.0 to 3.5, from 1.0 to 3.0, from 1.7 to 2.9, from 1.8 to 2.5, from 1.8 to 2.2, and/or from 1.8 to 2.1).

The term "ethylene multi-block copolymer" means a multi-block copolymer comprising ethylene and one or more copolymerizable comonomers, wherein ethylene comprises a plurality of the polymerized monomer units of at least one block or segment in the polymer, preferably at least 90 mole percent, more preferably at least 95 mole percent, and most preferably at least 98 mole percent of said block. Based on total polymer weight, the ethylene multi-block copolymers of the present disclosure preferably have an ethylene content from 25 to 97 weight percent, more preferably from 40 to 96 weight percent, even more preferably from 55 to 95 percent weight, and most preferably from 65 to 85 weight percent.

Because the respective distinguishable segments or blocks formed from two of more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In a preferred embodiment, the quantity of extractable polymer using either a dialkyl ether- or an alkane-solvent is less than 10 percent, preferably less than 7 percent, more preferably less than 5 percent and most preferably less than 2 percent of the total polymer weight.

In addition, the multi-block copolymers of the present disclosure desirably possess a PDI fitting a Schulz-Flory distribution rather than a Poisson distribution. The use of the present polymerization process results in a product having both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57(6), pp. 6902-6912, and Dobrynin, *J. Chem. Phys.* (1997) 107(21), pp. 9234-9238.

In a further embodiment, the polymers of the present disclosure, especially those made in a continuous, solution polymerization reactor, possess a most probable distribution of block lengths. Exemplary copolymers according to the present disclosure are multi-block copolymers containing 4 or more blocks or segments including terminal blocks.

The following mathematical treatment of the resulting polymers is based on theoretically derived parameters that are believed to apply to the presently disclosed polymers and demonstrate that, especially in a steady-state, continuous, well-mixed reactor, the block lengths of the resulting polymer prepared using 2 or more catalysts will each conform to a most probable distribution, derived in the following manner, wherein $p_i$ is the probability of propagation with respect to block sequences from catalyst i. The theoretical treatment is based on standard assumptions and methods known in the art and used in predicting the effects of polymerization kinetics on molecular architecture, including the use of mass action reaction rate expressions that are not affected by chain or block lengths. Such methods have been previously disclosed in W. H. Ray, *J. Macromol. Sci., Rev. Macromol. Chem.*, C8, 1 (1972) and A. E. Hamielec and J. F. MacGregor, "Polymer Reaction Engineering", K. H. Reichert and W. Geisler, Eds., Hanser, Munich, 1983. In addition, it is assumed that adjacent sequences formed by the same catalyst form a single block. For catalyst i, the fraction of sequences of length n is given by $X_i[n]$, where n is an integer from 1 to infinity representing the number of monomer units in the block.

$X_i[n]=(1-p_i)p_i^{(n-1)}$ most probable distribution of block lengths $$N_i = \frac{1}{1-p_i}$$

number average block length

Each catalyst has a probability of propagation ($p_i$) and forms a polymer segment having a unique average block length and distribution. In a most preferred embodiment, the probability of propagation is defined as:

$$p_i = \frac{Rp[i]}{Rp[i]+Rt[i]+Rs[i]+[C_i]}$$

for each catalyst i={1,2 . . . }, where,
Rp[i]=Rate of monomer consumption by catalyst i, (moles/L),
Rt[i]=Total rate of chain transfer and termination for catalyst i, (moles/L),
Rs[i]=Rate of chain shuttling with dormant polymer to other catalysts, (moles/L), and
[$C_i$]=Concentration of catalyst i (moles/L).

Dormant polymer chains refers to polymer chains that are attached to a CSA. The overall monomer consumption or polymer propagation rate, Rp[i], is defined using an apparent rate constant, $\overline{k_{pi}}$, multiplied by a total monomer concentration, [M], as follows:

$Rp[i]=\theta\overline{k_{pi}}[M][C_i]$.

The total chain transfer rate is given below including values for chain transfer to hydrogen ($H_2$), beta hydride elimination, and chain transfer to chain shuttling agent (CSA). The reactor residence time is given by θ and each subscripted k value is a rate constant.

$Rt[i]=\theta k_{H2i}[H_2][C_i]+\theta k_{\beta i}[C_i]+\theta k_{ai}[CSA][C_i]$ For a dual catalyst system, the rate of chain shuttling of polymer between catalysts 1 and 2 is given as follows:

$Rs[1]=Rs[2]=\theta k_{a1}[CSA]\theta k_{a2}[C_1][C_2]$.

If more than 2 catalysts are employed, then added terms and complexity in the theoretical relation for Rs[i] result, but the ultimate conclusion that the resulting block length distributions are most probable is unaffected.

As used herein with respect to a chemical compound, unless specifically indicated otherwise, the singular includes all isomeric forms and vice versa (for example, "hexane," includes all isomers of hexane individually or collectively). The terms "compound" and "complex" are used interchangeably herein to refer to organic-, inorganic- and organometal compounds. The term "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge.

The term "hydrocarbyl" refers to univalent substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" refers to a hydrocarbyl group that is substituted with one or more nonhydrocarbyl substituent groups. The terms "heteroatom containing hydrocarbyl" or "heterohydrocarbyl" refer to univalent groups in which at least one atom other than hydrogen or carbon is present along with one or more carbon atom and one or more hydrogen atoms. The term "heterocarbyl" refers to groups containing one or more carbon atoms and one or more heteroatoms and no hydrogen atoms. The bond between the carbon atom and any heteroatom, as well as the bonds between any two heteroatoms, may be a single or multiple covalent bond or a coordinating or other donative bond. Thus, an alkyl group substituted with a heterocycloalkyl-, aryl-substituted heterocycloalkyl-, heteroaryl-, alkyl-substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylseleno-group is within the scope of the term heteroalkyl. Examples of suitable heteroalkyl groups include cyanomethyl-, benzoylmethyl-, (2-pyridyl)methyl-, and trifluoromethyl-groups.

As used herein, the term "aromatic" refers to a polyatomic, cyclic, conjugated ring system containing (4δ+2) π-electrons, wherein δ is an integer greater than or equal to 1. The term "fused" as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms bound to any carbon is replaced by one or more functional groups such as alkyl, substituted alkyl, cycloalkyl, substituted cycloalkyl, heterocycloalkyl, substituted heterocycloalkyl, halogen, alkylhalos (e.g., $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone or oxygen as in diphenylether or nitrogen in diphenylamine.

For copolymers produced by a given catalyst, the relative amounts of comonomer and monomer in the copolymer and hence the copolymer composition is determined by relative rates of reaction of comonomer and monomer. Mathematically the molar ratio of comonomer to monomer is given by $$\frac{F_2}{F_1} = \left(\frac{[\text{comonomer}]}{[\text{monomer}]}\right)_{polymer} = \frac{R_{p2}}{R_{p1}} \quad (1)$$

Here $R_{p2}$ and $R_{p1}$ are the rates of polymerization of comonomer and monomer respectively and $F_2$ and $F_1$ are the mole fractions of each in the copolymer. Because $F_2+F_1=1$ we can rearrange this equation to $$F_2 = \frac{R_{p2}}{R_{p1} + R_{p2}} \quad (2)$$

The individual rates of polymerization of comonomer and monomer are typically complex functions of temperature, catalyst, and monomer/comonomer concentrations. In the limit as comonomer concentration in the reaction media drops to zero, $R_{p2}$ drops to zero, $F_2$ becomes zero and the polymer consists of pure monomer. In the limiting case of no monomer in the reactor, $R_{p1}$ becomes zero and $F_2$ is one (provided the comonomer can polymerize alone).

For most homogeneous catalysts, the ratio of comonomer to monomer in the reactor largely determines polymer composition as determined according to either the Terminal Copolymerization Model or the Penultimate Copolymerization Model.

For random copolymers in which the identity of the last monomer inserted dictates the rate at which subsequent monomers insert, the terminal copolymerization model is employed. In this model, insertion reactions of the type

$$\ldots M_iC^* + M_j \xrightarrow{k_{ij}} \ldots M_iM_jC^* \quad (3)$$

where $C^*$ represents the catalyst, $M_i$ represents monomer i, and $k_{ij}$ is the rate constant having the rate equation $$R_{pij} = k_{ij}[\ldots M_iC^*][M_j] \quad (4)$$

The comonomer mole fraction (i=2) in the reaction media is defined by the equation:

$$f_2 = \frac{[M_2]}{[M_1] + [M_2]} \quad (5)$$

A simplified equation for comonomer composition can be derived as disclosed in George Odian, *Principles of Polymerization*, Second Edition, John Wiley and Sons, 1970, as follows:

$$F_2 = \frac{r_1(1-f_2)^2 + (1-f_2)f_2}{r_1(1-f_2)^2 + 2(1-f_2)f_2 + r_2f_2^2}. \quad (6)$$

From this equation, the mole fraction of comonomer in the polymer is solely dependent on the mole fraction of comonomer in the reaction media and two temperature dependent reactivity ratios defined in terms of the insertion rate constants as:

$$r_1 = \frac{k_{11}}{k_{12}} \quad (7)$$

$$r_2 = \frac{k_{22}}{k_{21}}.$$

Alternatively, in the penultimate copolymerization model, the identities of the last two monomers inserted in the growing polymer chain dictate the rate of subsequent monomer insertion. The polymerization reactions are of the form $$\ldots M_i M_j C^* + M_k \xrightarrow{k_{ijk}} \ldots M_i M_j M_k C^* \qquad (8)$$

and the individual rate equations are:

$$R_{p_{ijk}} = k_{ijk}[\ldots M_i M_j = C^*][M_k] \qquad (9).$$

The comonomer content can be calculated (again as disclosed in George Odian, Supra.) as:

$$\frac{(1-F_2)}{F_2} = \frac{1 + \frac{r'_1 X(r_1 X + 1)}{(r'_1 X + 1)}}{1 + \frac{r'_2 (r_2 + X)}{X(r'_2 + X)}} \qquad (10)$$

where X is defined as:

$$X = \frac{(1-f_2)}{f_2} \qquad (11)$$

and the reactivity ratios are defined as:

$$r_1 = \frac{k_{111}}{k_{112}} \qquad (12)$$

$$r'_1 = \frac{k_{211}}{k_{212}}$$

$$r_2 = \frac{k_{222}}{k_{221}}$$

$$r'_2 = \frac{k_{122}}{k_{121}}.$$

For this model as well, the polymer composition is a function only of temperature dependent reactivity ratios and comonomer mole fraction in the reactor. The same is also true when reverse comonomer or monomer insertion may occur or in the case of the interpolymerization of more than two monomers.

Reactivity ratios for use in the foregoing models may be predicted using well known theoretical techniques or empirically derived from actual polymerization data. Suitable theoretical techniques are disclosed, for example, in B. G. Kyle, *Chemical and Process Thermodynamics*, Third Addition, Prentice-Hall, 1999 and in Redlich-Kwong-Soave (RKS) Equation of State, *Chemical Engineering Science*, 1972, pp. 1197-1203. Commercially available software programs may be used to assist in deriving reactivity ratios from experimentally derived data. One example of such software is Aspen Plus from Aspen Technology, Inc., Ten Canal Park, Cambridge, Mass. 02141-2201 USA.

Based on the foregoing theoretical considerations, the present disclosure may alternatively be related to a composition or catalyst system for use in the polymerization of two or more addition polymerizable monomers, especially ethylene and at least one copolymerizable comonomer, to form a high molecular weight, segmented copolymer (multi-block copolymer), said copolymer containing therein two or more (preferably three or more) segments or blocks differing in one or more chemical or physical properties as further disclosed herein, the catalyst system or composition comprising the admixture or reaction product resulting from combining:

(A) a first olefin polymerization procatalyst, (B) a second olefin polymerization procatalyst capable of preparing polymers differing in chemical or physical properties from the polymer prepared by the first olefin polymerization procatalyst (A) under equivalent polymerization conditions, and (C) a chain shuttling agent;

wherein the:

$r_1$ of the first olefin polymerization procatalyst ($r_{1A}$), and $r_1$ of the second olefin polymerization procatalyst ($r_{1B}$), are selected such that the ratio of the reactivity ratios ($r_{1A}/r_{1B}$) under the polymerization conditions is 0.5 or less (e.g., 0.25 or less, 0.125 or less, 0.08 or less, 0.04 or less).

Additionally, there is now provided a process, preferably a solution process (and most preferably a continuous solution process), for use in the polymerization of two or more addition polymerizable monomers (especially ethylene and at least one copolymerizable comonomer) to form a high molecular weight, segmented copolymer (multi-block copolymer), said copolymer containing therein two or more (preferably three or more) segments or blocks differing in one or more chemical or physical properties as further disclosed herein, the process comprising the steps of combining two or more addition polymerizable monomers (especially ethylene and at least one copolymerizable comonomer) under polymerization conditions with the catalyst system or composition comprising the admixture or reaction product resulting from combining:

(A) a first olefin polymerization procatalyst, (B) a second olefin polymerization procatalyst capable of preparing polymers differing in chemical or physical properties from the polymer prepared by the first olefin polymerization procatalyst (A) under equivalent polymerization conditions, and (C) a chain shuttling agent;

wherein the:

$r_1$ of the first olefin polymerization procatalyst ($r_{1A}$), and $r_1$ of the second olefin polymerization procatalyst ($r_{1B}$), are selected such that the ratio of the reactivity ratios ($r_{1A}/r_{1B}$) under the polymerization conditions is 0.5 or less (e.g., 0.25 or less, 0.125 or less, 0.08 or less, 0.04 or less).

Further, there is now provided a composition or catalyst system for use in the polymerization of two or more addition polymerizable monomers (referred to as monomer and comonomer(s) respectively), especially ethylene and at least one copolymerizable comonomer, to form a high molecular weight, segmented copolymer (multi-block copolymer), said copolymer containing therein two or more (preferably three or more) segments or blocks differing in one or more chemical or physical properties as further disclosed herein, the catalyst system or composition comprising the admixture or reaction product resulting from combining:

(A) a first olefin polymerization procatalyst, (B) a second olefin polymerization procatalyst capable of preparing polymers differing in chemical or physical properties from the polymer prepared by the first olefin polymerization procatalyst (A) under equivalent polymerization conditions, and (C) a chain shuttling agent; wherein:

the comonomer content in mole percent of the copolymer resulting from the first olefin polymerization procatalyst ($F_1$), and the comonomer content in mole percent of the copolymer resulting from the second olefin polymerization procatalyst ($F_2$), are selected such that the ratio ($F_1/F_2$) under the polymerization conditions is 2 or more (e.g., 4 or more, 10 or more, 15 or more, and 20 or more).

Additionally, there is now provided a process, preferably a solution process (more preferably a continuous solution process), for use in the polymerization of two or more addition polymerizable monomers (referred to as monomer and comonomer(s) respectively), especially ethylene and at least one copolymerizable comonomer, to form a high molecular weight, segmented copolymer (multi-block copolymer), said copolymer containing therein two or more (preferably three or more) segments or blocks differing in one or more chemical or physical properties as further disclosed herein, the process comprising the steps of combining under polymerization conditions:

(A) a first olefin polymerization procatalyst, (B) a second olefin polymerization procatalyst capable of preparing polymers differing in chemical or physical properties from the polymer prepared by the first olefin polymerization procatalyst (A) under equivalent polymerization conditions, and (C) a chain shuttling agent; wherein:

the comonomer content in mole percent of the copolymer resulting from the first olefin polymerization procatalyst ($F_1$), and the comonomer content in mole percent of the copolymer resulting from the second olefin polymerization procatalyst ($F_2$), are selected such that the ratio ($F_1/F_2$) under the polymerization conditions is 2 or more (e.g., 4 or more, 10 or more, 15 or more, and 20 or more, and recovering the polymer product.

Monomers

Suitable monomers for use in preparing the olefin block copolymers or multi-block copolymers of the present disclosure include ethylene and one or more addition polymerizable monomers (i.e., comonomers) other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20 carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl,4,8-decatriene; aromatic vinyl compounds such as mono or poly alkylstyrenes (including styrene, o-methylstyrene, m-methylstyrene, p-methylstyrene, o,p-dimethylstyrene, o-ethylstyrene, m-ethylstyrene and p-ethylstyrene), and functional group-containing derivatives, such as methoxystyrene, ethoxystyrene, vinylbenzoic acid, methyl vinylbenzoate, vinylbenzyl acetate, hydroxystyrene, o-chlorostyrene, p-chlorostyrene, divinylbenzene, 3-phenylpropene, 4-phenylpropene, α-methylstyrene, vinylchloride, 1,2-difluoroethylene, 1,2-dichloroethylene, tetrafluoroethylene, and 3,3,3-trifluoro-1-propene.

Chain Shuttling Agents (CSA's)

The term "shuttling agent" refers to a compound or mixture of compounds employed in the composition/catalyst system/process of the present disclosure that is capable of causing polymeryl exchange between at least two active catalyst sites of the catalysts included in the composition/catalyst system/process under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. Preferably, the shuttling agent has an activity ratio $R_{A-B}/R_{B-A}$ of from 0.01 and 100, more preferably from 0.1 to 10, most preferably from 0.5 to 2.0, and most highly preferably from 0.8 to 1.2, wherein $R_{A-B}$ is the rate of polymeryl transfer from catalyst A active site to catalyst B active site via the shuttling agent, and $R_{B-A}$ is the rate of reverse polymeryl transfer, i.e., the rate of exchange starting from the catalyst B active site to catalyst A active site via the shuttling agent. Desirably, the intermediate formed between the shuttling agent and the polymeryl chain is sufficiently stable such that chain termination is relatively rare. Desirably, less than 90 percent, preferably less than 75 percent, more preferably less than 50 percent and most desirably less than 10 percent of shuttle-polymeryl products are terminated prior to attaining 3 distinguishable polymer segments or blocks. Ideally, the rate of chain shuttling (defined by the time required to transfer a polymer chain from a catalyst site to the chain shuttling agent and then back to a catalyst site) is similar to or faster than the rate of polymer termination, even up to 10 or even 100 times faster than the rate of polymer termination. This permits polymer block formation on the same time scale as polymer propagation.

Suitable chain shuttling agents for use herein include Group 1, 2, 12 or 13 metal compounds or complexes containing at least one $C_{1-20}$ hydrocarbyl group, preferably hydrocarbyl substituted magnesium, aluminum, gallium or zinc compounds containing from 1 to 12 carbons in each hydrocarbyl group, and reaction products thereof with a proton source. Preferred hydrocarbyl groups are alkyl groups, preferably linear or branched, $C_{2-8}$ alkyl groups. Most preferred shuttling agents for use in the present invention are trialkyl aluminum and dialkyl zinc compounds, especially triethylaluminum, tri(i-propyl) aluminum, tri(i-butyl)aluminum, tri(n-hexyl)aluminum, tri(n-octyl)aluminum, triethylgallium, or diethylzinc. Additional suitable shuttling agents include the reaction product or mixture formed by combining the foregoing organometal compounds, preferably a tri($C_{1-8}$) alkyl aluminum or di($C_{1-8}$) alkyl zinc compound, especially triethylaluminum, tri(i-propyl) aluminum, tri(i-butyl)aluminum, tri(n-hexyl)aluminum, tri(n-octyl)aluminum, or diethylzinc, with less than a stoichiometric quantity (relative to the number of hydrocarbyl groups) of a secondary amine or a hydroxyl compound, especially bis(trimethylsilyl)amine, t-butyl(dimethyl)siloxane, 2-hydroxymethylpyridine, di(n-pentyl)amine, 2,6-di(t-butyl)phenol, ethyl(1-naphthyl)amine, bis(2,3,6,7-dibenzo-1-azacycloheptaneamine), or 2,6-diphenylphenol. Sufficient amine or hydroxyl reagent is used such that one hydrocarbyl group remains per metal atom. The primary reaction products of the foregoing combinations most useful in the present disclosure as shuttling agents are n-octylaluminum di(bis(trimethylsilyl)amide), i-propylaluminum bis(dimethyl(t-butyl)siloxide), and n-octylaluminum di(pyridinyl-2-methoxide), i-butylaluminum bis(dimethyl(t-butyl)

siloxane), i-butylaluminum bis(di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyl) amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octyaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

In further embodiments of the present disclosure, suitable chain shuttling agents include metal alkyls containing a divalent metal (e.g., Zn), a trivalent metal (e.g., Al), or a mixture of divalent metal and trivalent metal. In certain embodiments, the chain shuttling agent is a divalent metal alkyl, such as dialkylzinc. In certain embodiments, the chain shuttling agent is a trivalent metal alkyl, such as trialkylaluminum. In certain embodiments, the organometallic compound is a mixture of divalent metal alkyl (e.g., dialkylzinc) and trivalent metal alkyl (e.g., trialkylaluminum). In certain embodiments, the chain shuttling agent is a mixture of trivalent metal and divalent metal at a trivalent/divalent metal ratio from 99:1 to 1:99 (e.g., from 95:5 to 50:50, from 90:10 to 80:20, from 90:10 to 70:30, etc.). In certain embodiments, the chain shuttling agent is a metal alkyl containing a mixture of aluminum and zinc metals at an aluminum/zinc ratio from 99:1 to 1:99 (e.g., from 95:5 to 50:50, from 90:10 to 80:20, from 90:10 to 70:30, etc.).

It will be appreciated by the skilled artisan that a suitable shuttling agent for one catalyst or catalyst combination may not necessarily be as good or even satisfactory for use with a different catalyst or catalyst combination. Some potential shuttling agents may adversely affect the performance of one or more catalysts and may be undesirable for use for that reason as well. Accordingly, the activity of the chain shuttling agent desirably is balanced with the catalytic activity of the catalysts to achieve the desired polymer properties. In some embodiments of the present disclosure, best results may be obtained by use of shuttling agents having a chain shuttling activity (as measured by a rate of chain transfer) that is less than the maximum possible rate.

Generally however, preferred shuttling agents possess the highest rates of polymer transfer as well as the highest transfer efficiencies (reduced incidences of chain termination). Such shuttling agents may be used in reduced concentrations and still achieve the desired degree of shuttling. In addition, such shuttling agents result in production of the shortest possible polymer block lengths. Highly desirably, chain shuttling agents with a single exchange site are employed due to the fact that the effective molecular weight of the polymer in the reactor is lowered, thereby reducing viscosity of the reaction mixture and consequently reducing operating costs.

First Olefin Polymerization Procatalyst (A)

Suitable procatalysts that would fall within the scope of the first olefin polymerization procatalyst (A) of the present disclosure include the catalysts/complexes discussed below that are adapted for preparing polymers of the desired composition or type and capable of reversible chain transfer with a chain shuttling agent. As noted above, the terms "procatalysts," "catalysts." "metal complexes," and "complexes" used herein are to be interchangeable. In certain embodiments, the first olefin polymerization procatalyst (A) is the soft block/segment catalyst (i.e., high comonomer incorporator) of the olefin block copolymers of the present disclosure.

Both heterogeneous and homogeneous catalysts may be employed. Examples of heterogeneous catalysts include the well known Ziegler-Natta compositions, especially Group 4 metal halides supported on Group 2 metal halides or mixed halides and alkoxides and the well known chromium or vanadium based catalysts. Preferably, the catalysts for use herein are homogeneous catalysts comprising a relatively pure organometallic compound or metal complex, especially compounds or complexes based on metals selected from Groups 3-15 or the Lanthanide series of the Periodic Table of the Elements.

Metal complexes for use herein may be selected from Groups 3 to 15 of the Periodic Table of the Elements containing one or more delocalized, π-bonded ligands or polyvalent Lewis base ligands. Examples include metallocene, half-metallocene, constrained geometry, and polyvalent pyridylamine, or other polychelating base complexes. The complexes are generically depicted by the formula: $MK_kX_xZ_z$, or a dimer thereof, wherein M is a metal selected from Groups 3-15, preferably 3-10, more preferably 4-10, and most preferably Group 4 of the Periodic Table of the Elements;

K independently at each occurrence is a group containing delocalized π-electrons or one or more electron pairs through which K is bound to M, said K group containing up to 50 atoms not counting hydrogen atoms, optionally two or more K groups may be joined together forming a bridged structure, and further optionally one or more K groups may be bound to Z, to X or to both Z and X;

X independently at each occurrence is a monovalent, anionic moiety having up to 40 non-hydrogen atoms, optionally one or more X groups may be bonded together thereby forming a divalent or polyvalent anionic group, and, further optionally, one or more X groups and one or more Z groups may be bonded together thereby forming a moiety that is both covalently bound to M and coordinated thereto; or two X groups together form a divalent anionic ligand group of up to 40 non-hydrogen atoms or together are a conjugated diene having from 4 to 30 non-hydrogen atoms bound by means of delocalized π-electrons to M, whereupon M is in the +2 formal oxidation state, and Z independently at each occurrence is a neutral, Lewis base donor ligand of up to 50 non-hydrogen atoms containing at least one unshared electron pair through which Z is coordinated to M;

k is an integer from 0 to 3; x is an integer from 1 to 4; z is a number from 0 to 3; and the sum, k+x, is equal to the formal oxidation state of M.

Suitable metal complexes include those containing from 1 to 3 π-bonded anionic or neutral ligand groups, which may be cyclic or non-cyclic delocalized π-bonded anionic ligand groups. Exemplary of such π-bonded groups are conjugated or nonconjugated, cyclic or non-cyclic diene and dienyl groups, allyl groups, boratabenzene groups, phosphole, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted heteroatoms wherein the heteroatom is selected from Group 14-16 of the Periodic Table of the Elements, and such hydrocarbyl-substituted heteroatom radicals further substituted with a Group 15 or 16 hetero atom containing moiety. In addition two or more such radicals may together form a fused ring system, including partially or fully hydrogenated fused ring systems, or they may form a metallocycle with the metal. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. Suitable hydrocarbyl-substituted heteroatom radicals include mono-, di- and tri-substituted radicals of boron, silicon, germanium, nitrogen, phosphorus or oxygen wherein each of the hydrocarbyl groups contains from 1 to 20 carbon atoms. Examples include N,N-dimethylamino, pyrrolidinyl, trimethylsilyl, triethylsilyl, t-butyldimethylsilyl, methyldi(t-butyl)silyl, triphenylgermyl, and trimethylgermyl groups. Examples of Group 15 or 16 hetero atom containing moieties include amino, phosphino, alkoxy, or alkylthio moieties or divalent derivatives thereof, for example, amide, phosphide, alkyleneoxy or alkylenethio groups bonded to the transition metal or Lanthanide metal, and bonded to the hydrocarbyl group, π-bonded group, or hydrocarbyl-substituted heteroatom.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, phosphole, and boratabenzyl groups, as well as inertly substituted derivatives thereof, especially $C_{1-10}$ hydrocarbyl-substituted or tris($C_{1-10}$ hydrocarbyl)silyl-substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, 1-indacenyl, 3-pyrrolidinoinden-1-yl, 3,4-(cyclopenta(l)phenanthren-1-yl, and tetrahydroindenyl.

The boratabenzenyl ligands are anionic ligands which are boron containing analogues to benzene. They are previously known in the art having been described by G. Herberich, et al., in *Organometallics*, 14, 1, 471-480 (1995). Preferred boratabenzenyl ligands correspond to the formula:

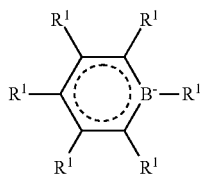

wherein $R^1$ is an inert substituent, preferably selected from the group consisting of hydrogen, hydrocarbyl, silyl, halo or germyl, said $R^1$ having up to 20 atoms not counting hydrogen, and optionally two adjacent $R^1$ groups may be joined together. In complexes involving divalent derivatives of such delocalized π-bonded groups one atom thereof is bonded by means of a covalent bond or a covalently bonded divalent group to another atom of the complex thereby forming a bridged system.

Phospholes are anionic ligands that are phosphorus containing analogues to a cyclopentadienyl group. They are previously known in the art having been described by WO 98/50392, and elsewhere. Preferred phosphole ligands correspond to the formula:

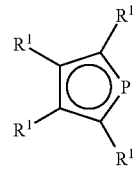

wherein $R^1$ is as previously defined.

Suitable transition metal complexes for use herein correspond to the formula: $MK_kX_xZ_z$, or a dimer thereof, wherein:

M is a Group 4 metal;

K is a group containing delocalized π-electrons through which K is bound to M, said K group containing up to 50 atoms not counting hydrogen atoms, optionally two K groups may be joined together forming a bridged structure, and further optionally one K may be bound to X or Z;

X at each occurrence is a monovalent, anionic moiety having up to 40 non-hydrogen atoms, optionally one or more X and one or more K groups are bonded together to form a metallocycle, and further optionally one or more X and one or more Z groups are bonded together thereby forming a moiety that is both covalently bound to M and coordinated thereto;

Z independently at each occurrence is a neutral, Lewis base donor ligand of up to 50 non-hydrogen atoms containing at least one unshared electron pair through which Z is coordinated to M;

k is an integer from 0 to 3; x is an integer from 1 to 4; z is a number from 0 to 3; and the sum, k+x, is equal to the formal oxidation state of M.

Suitable complexes include those containing either one or two K groups. The latter complexes include those containing a bridging group linking the two K groups. Suitable bridging groups are those corresponding to the formula $(ER'_2)_e$ wherein E is silicon, germanium, tin, or carbon, R' independently at each occurrence is hydrogen or a group selected from silyl, hydrocarbyl, hydrocarbyloxy and combinations thereof, said R' having up to 30 carbon or silicon atoms, and e is 1 to 8. Illustratively, R' independently at each occurrence is methyl, ethyl, propyl, benzyl, tert-butyl, phenyl, methoxy, ethoxy or phenoxy.

Examples of the complexes containing two K groups are compounds corresponding to the formula:

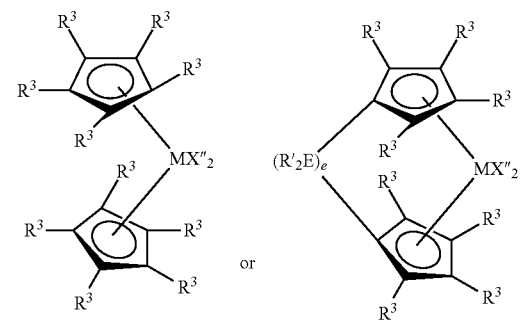

wherein:

M is titanium, zirconium or hafnium, preferably zirconium or hafnium, in the +2 or +4 formal oxidation state; $R^3$ at each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently at each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms bound by means of delocalized π-electrons to M, whereupon M is in the +2 formal oxidation state, and R', E and e are as previously defined.

Exemplary bridged ligands containing two π-bonded groups are: dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl) propane, dimethylbis(inden-1-yl)silane, dimethylbis(tetrahydroinden-1-yl)silane, dimethylbis(fluoren-1-yl) silane, dimethylbis(tetrahydrofluoren-1-yl)silane, dimethylbis(2-methyl-4-phenylinden-1-yl)-silane, dimethylbis(2-methylinden-1-yl)silane, dimethyl(cyclopentadienyl)(fluoren-1-yl)silane, dimethyl(cyclopentadienyl)(octahydrofluoren-1-yl)silane, dimethyl(cyclopentadienyl) (tetrahydrofluoren-1-yl)silane, (1, 1, 2, 2-tetramethy)-1,2-bis(cyclopentadienyl)disilane, (1, 2-bis(cyclopentadienyl) ethane, and dimethyl(cyclopentadienyl)-1-(fluoren-1-yl) methane.

Suitable X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Exemplary X" groups are C1-20 hydrocarbyl groups.

Examples of metal complexes of the foregoing formula suitable for use in the present disclosure include:
bis(cyclopentadienyl)zirconiumdimethyl,
bis(cyclopentadienyl)zirconium dibenzyl,
bis(cyclopentadienyl)zirconium methyl benzyl,
bis(cyclopentadienyl)zirconium methyl phenyl,
bis(cyclopentadienyl)zirconiumdiphenyl,
bis(cyclopentadienyl)titanium-allyl,
bis(cyclopentadienyl)zirconiummethylmethoxide,
bis(cyclopentadienyl)zirconiummethylchloride,
bis(pentamethylcyclopentadienyl)zirconiumdimethyl,
bis(pentamethylcyclopentadienyl)titaniumdimethyl,
bis(indenyl)zirconiumdimethyl,
indenylfluorenylzirconiumdimethyl,
bis(indenyl)zirconiummethyl(2-(dimethylamino)benzyl),
bis(indenyl)zirconiummethyltrimethylsilyl,
bis(tetrahydroindenyl)zirconiummethyltrimethylsilyl,
bis(pentamethylcyclopentadienyl)zirconiummethylbenzyl,
bis(pentamethylcyclopentadienyl)zirconiumdibenzyl,
bis(pentamethylcyclopentadienyl)zirconiummethylmethoxide,
bis(pentamethylcyclopentadienyl)zirconiummethylchloride,
bis(methylethylcyclopentadienyl)zirconiumdimethyl,
bis(butylcyclopentadienyl)zirconiumdibenzyl,
bis(t-butylcyclopentadienyl)zirconiumdimethyl,
bis(ethyletramethylcyclopentadienyl)zirconiumdimethyl,
bis(methylpropylcyclopentadienyl)zirconiumdibenzyl,
bis(trimethylsilylcyclopentadienyl)zirconiumdibenzyl,
dimethylsilylbis(cyclopentadienyl)zirconiumdichloride,
dimethylsilylbis(cyclopentadienyl)zirconiumdimethyl,
dimethylsilylbis(tetramethylcyclopentadienyl)titanium (III) allyl dimethylsilylbis(t-butylcyclopentadienyl)zirconiumdichloride,
dimethylsilylbis(n-butylcyclopentadienyl)zirconiumdichloride,
(dimethylsilylbis(tetramethylcyclopentadienyl)titanium(III) 2-(dimethylamino)benzyl,
(dimethylsilylbis(n-butylcyclopentadienyl)titanium(III) 2-(dimethylamino)benzyl, dimethylsilylbis(indenyl)zirconiumdichloride,
dimethylsilylbis(indenyl)zirconiumdimethyl,
dimethylsilylbis(2-methylindenyl)zirconiumdimethyl,
dimethylsilylbis(2-methyl-4-phenylindenyl)zirconiumdimethyl,
dimethylsilylbis(2-methylindenyl)zirconium-1,4-diphenyl-1,3-butadiene,
dimethylsilylbis(2-methyl-4-phenylindenyl)zirconium (II) 1,4-diphenyl-1,3-butadiene, dimethylsilylbis(4,5,6,7-tetrahydroinden-1-yl)zirconiumdichloride,
dimethylsilylbis(4,5,6,7-tetrahydroinden-1-yl)zirconiumdimethyl,
dimethylsilylbis(tetrahydroindenyl)zirconium (II) 1,4-diphenyl-1,3-butadiene,
dimethylsilylbis(tetamethylcyclopentadienyl)zirconium dimethyl,
dimethylsilylbis(fluorenyl)zirconiumdimethyl,
dimethylsilylbis(tetrahydrofluorenyl)zirconium bis(trimethylsilyl),
ethylenebis(indbnyl)zirconiumdichloride,
ethylenebis(indenyl)zirconiumdimethyl,
ethylenebis(4,5,6,7-tetrahydroindenyl)zirconiumdichloride,
ethylenebis(4,5,6,7-tetrahydroindenyl)zirconiumdimethyl,
(isopropylidenexcyclopentadienyl)(fluorenyl)zirconiumdibenzyl, and
dimethylsilyl(tetramethylcyclopentadienyl)(fluorenyl)zirconium dimethyl.

A further class of metal complexes utilized in the present disclosure corresponds to the preceding formula: $MKZ_zX_x$, or a dimer thereof, wherein M, K, X, x and z are as previously defined, and Z is a substituent of up to 50 non-hydrogen atoms that together with K forms a metallocycle with M.

Suitable Z substituents include groups containing up to 30 non-hydrogen atoms comprising at least one atom that is oxygen, sulfur, boron or a member of Group 14 of the Periodic Table of the Elements directly attached to K, and a different atom, selected from the group consisting of nitrogen, phosphorus, oxygen or sulfur that is covalently bonded to M.

More specifically this class of Group 4 metal complexes used according to the present invention includes "constrained geometry catalysts" corresponding to the formula:

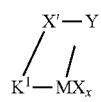

wherein: M is titanium or zirconium, preferably titanium in the +2, +3, or +4 formal oxidation state;

$K^1$ is a delocalized, π-bonded ligand group optionally substituted with from 1 to 5 $R^2$ groups, $R^2$ at each occurrence independently is selected from the group consisting of hydrogen, hydrocarbyl, silyl, germyl, cyano, halo and combinations thereof, said $R^2$ having up to 20 non-hydrogen atoms, or adjacent $R^2$ groups together form a divalent derivative (that is, a hydrocarbadiyl, siladiyl or germadiyl group) thereby forming a fused ring system, each X is a halo, hydrocarbyl, heterohydrocarbyl, hydrocarbyloxy or silyl group, said group having up to 20 non-hydrogen atoms, or two X groups together form a neutral C5-30 conjugated diene or a divalent derivative thereof;
x is 1 or 2;
Y is —O—, —S—, —NR'—, —PR'—;
and X' is SiR'$_2$, CR'$_2$, SiR'$_2$SiR'$_2$, CR'$_2$CR'$_2$, CR'=CR', CR'$_2$SiR'$_2$, or GeR'$_2$,
wherein
R$^1$ independently at each occurrence is hydrogen or a group selected from silyl, hydrocarbyl, hydrocarbyloxy and combinations thereof, said R$^1$ having up to 30 carbon or silicon atoms.

Specific examples of the foregoing constrained geometry metal complexes include compounds corresponding to the formula:

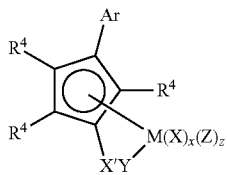

wherein,

Ar is an aryl group of from 6 to 30 atoms not counting hydrogen;

R$^4$ independently at each occurrence is hydrogen, Ar, or a group other than Ar selected from hydrocarbyl, trihydrocarbylsilyl, trihydrocarbylgermyl, halide, hydrocarbyloxy, trihydrocarbylsiloxy, bis(trihydrocarbylsilyl)amino, di(hydrocarbyl)amino, hydrocarbadiylamino, hydrocarbylimino, di(hydrocarbyl)phosphino, hydrocarbadiylphosphino, hydrocarbylsulfido, halo-substituted hydrocarbyl, hydrocarbyloxy-substituted hydrocarbyl, trihydrocarbylsilyl-substituted hydrocarbyl, trihydrocarbylsiloxy-substituted hydrocarbyl, bis(trihydrocarbylsilyl)amino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said R group having up to 40 atoms not counting hydrogen atoms, and optionally two adjacent R$^4$ groups may be joined together forming a polycyclic fused ring group;

M is titanium;

X' is SiR$^6_2$, CR$^6_2$, SiR$^6_2$SiR$^6_2$, CR$^6_2$CR$^6_2$, CR$^6$=CR$^6$, CR$^6_2$SiR$^6_2$, BR$^6$, BR$^6$L", or GeR$^6_2$;

Y is —O—, —S—, —NR$^5$—, —PR$^5$—; —NR$^5_2$, or —PR$^5_2$;

R$^5$, independently at each occurrence is hydrocarbyl, trihydrocarbylsilyl, or trihydrocarbylsilylhydrocarbyl, said R$^5$ having up to 20 atoms other than hydrogen, and optionally two R$^5$ groups or R$^5$ together with Y or Z form a ring system;

R$^6$, independently at each occurrence, is hydrogen, or a member selected from hydrocarbyl, hydrocarbyloxy, silyl, halogenated alkyl, halogenated aryl, —NR$^5_2$, and combinations thereof, said R$^6$ having up to 20 non-hydrogen atoms, and optionally, two R$^6$ groups or R$^6$ together with Z forms a ring system;

Z is a neutral diene or a monodentate or polydentate Lewis base optionally bonded to R$^5$, R$^6$, or X;

X is hydrogen, a monovalent anionic ligand group having up to 60 atoms not counting hydrogen, or two X groups are joined together thereby forming a divalent ligand group;
x is 1 or 2; and
z is 0, 1 or 2.

Suitable examples of the foregoing metal complexes are substituted at both the 3- and 4-positions of a cyclopentadienyl or indenyl group with an Ar group. Examples of the foregoing metal complexes include:

(3-phenylcyclopentadien-1-yl)dimethyl(t-butylamido)silanetitanium dichloride, (3-phenylcyclopentadien-1-yl)dimethyl(t-butylamido)silanetitanium dimethyl, (3-phenylcyclopentadien-1-yl)dimethyl(t-butylamido)silanetitanium (II) 1,3-diphenyl-1,3-butadiene;

(3-(pyrrol-1-yl)cyclopentadien-1-yl)dimethyl(t-butylamido)silanetitanium dichloride, (3-(pyrrol-1-yl)cyclopentadien-1-yl)dimethyl(t-butylamido)silanetitanium dimethyl, (3-(pyrrol-1-yl)cyclopentadien-1-yl))dimethyl(t-butylamido)silanetitanium (II) 1,4-diphenyl-1,3-butadiene;

(3-(1-methylpyrrol-3-yl)cyclopentadien-1-yl)dimethyl(t-butylamido)silanetitanium dichloride, (3-(1-methylpyrrol-3-yl)cyclopentadien-1-yl)dimethyl(t-butylamido)silanetitanium dimethyl, (3-(1-methylpyrrol-3-yl)cyclopentadien-1-yl)dimethyl(t-butylamido)silanetitanium (II) 1,4-diphenyl-1,3-butadiene;

(3,4-diphenylcyclopentadien-1-yl)dimethyl(t-butylamido)silanetitanium dichloride, (3,4-diphenylcyclopentadien-1-yl)dimethyl(t-butylamido)silanetitanium dimethyl, (3,4-diphenylcyclopentadien-1-yl)dimethyl(t-butylamido)silanetitanium (II) 1,3-pentadiene;

(3-(3-N,N-dimethylamino)phenyl)cyclopentadien-1-yl)dimethyl(t-butylamido)silanetitanium dichloride, (3-(3-N,N-dimethylamino)phenylcyclopentadien-1-yl)dimethyl(t-butylamido)silanetitanium dimethyl, (3-(3-N,N-dimethylamino)phenylcyclopentadien-1-yl)dimethyl(t-butylamido)silanetitanium (II) 1,4-diphenyl-1,3-butadiene;

(3-(4-methoxyphenyl)-4-methylcyclopentadienl-1-yl)dimethyl(t-butylamido)silanetitanium dichloride, (3-(4-methoxyphenyl)-4-phenylcyclopentadien-1-yl)dimethyl(t-butylamido)silanetitanium dimethyl, (3-4-methoxyphenyl)-4-phenylcyclopentadien-1-yl)dimethyl(t-butylamido)silanetitanium (II) 1,4-diphenyl-1,3-butadiene;

(3-phenyl-4-methoxycyclopentadien-1-yl)dimethyl(t-butylamido)silanetitanium dichloride, (3-phenyl-4-methoxycyclopentadien-1-yl)dimethyl(t-butylamido)silanetitanium dimethyl, (3-phenyl-4-methoxycyclopentadien-1-yl)dimethyl(t-butylamido)silanetitanium (II) 1,4-diphenyl-1,3-butadiene;

(3-phenyl-4-(N,N-dimethylamino)cyclopentadien-1-yl)dimethyl(t-butylamido)silanetitanium dichloride, (3-phenyl-4-(N,N-dimethylamino)cyclopentadien-1-yl)dimethyl(t-butylamido)silanetitanium dimethyl, (3-phenyl-4-(N,N-dimethylamino)cyclopentadien-1-yl)dimethyl(t-butylamido)silanetitanium (II) 1,4-diphenyl-1,3-butadiene;

2-methyl-(3,4-di(4-methylphenyl)cyclopentadien-1-yl)dimethyl(t-butylamido)silanetitanium dichloride, 2-methyl-(3,4-di(4-methylphenyl)cyclopentadien-1-yl)dimethyl(t-butylamido)silanetitanium dimethyl, 2-methyl-(3,4-di(4-methylphenyl)cyclopentadien-1-yl)dimethyl(t-butylamido)silanetitanium (II) 1,4-diphenyl-1,3-butadiene;

((2,3-diphenyl)-4-(N,N-dimethylamino)cyclopentadien-1-yl)dimethyl(t-butylamido)silane titanium dichloride, ((2,3-diphenyl)-4-(N,N-dimethylamino)cyclopentadien-1-yl)dimethyl(t-butylamido)silane titanium dimethyl,
((2,3-diphenyl)-4-(N,N-dimethylamino)cyclopentadien-1-yl)dimethyl(t-butylamido)silanetitanium (II) 1,4-diphenyl-1,3-butadiene;
(2,3,4-triphenyl-5-methylcyclopentadien-1-yl)dimethyl(t-butylamido)silanetitanium dichloride,
(2,3,4-triphenyl-5-methylcyclopentadien-1-yl)dimethyl(t-butylamido)silanetitanium dimethyl,
(2,3,4-triphenyl-5-methylcyclopentadien-1-yl)dimethyl(t-butylamido)silanetitanium (II) 1,4-diphenyl-1,3-butadiene;
(3-phenyl-4-methoxycyclopentadien-1-yl)dimethyl(t-butylamido)silanetitanium dichloride,
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium (II) 1,4-diphenyl-1,3-butadiene;
(2,3-diphenyl-4-(n-butyl)cyclopentadien-1-yl)dimethyl(t-butylamido)silanetitanium dichloride,
(2,3-diphenyl-4-(n-butyl)cyclopentadien-1-yl)dimethyl(t-butylamido)silanetitanium dimethyl,
(2,3-diphenyl-4-(n-butyl)cyclopentadien-1-yl)dimethyl(t-butylamido)silanetitanium (II) 1,4-diphenyl-1,3-butadiene;
(2,3,4,5-tetraphenylcyclopentadien-1-yl)dimethyl(t-butylamido)silanetitanium dichloride,
(2,3,4,5-tetraphenylcyclopentadien-1-yl)dimethyl(t-butylamido)silanetitanium dimethyl, and (2,3,4,5-tetraphenylcyclopentadien-1-yl)dimethyl(t-butylamido)silanetitanium (II) 1,4-diphenyl-1,3-butadiene.

Additional examples of suitable metal complexes herein are polycyclic complexes corresponding to the formula:

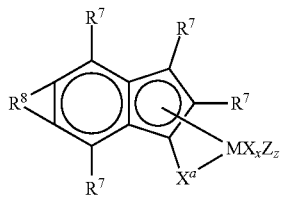

where M is titanium in the +2, +3 or +4 formal oxidation state;

$R^7$ independently at each occurrence is hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylene-phosphino-substituted hydrocarbyl, or hydrocarbylsulfido-substituted hydrocarbyl, said $R^7$ group having up to 40 atoms not counting hydrogen, and optionally two or more of the foregoing groups may together form a divalent derivative;

$R^8$ is a divalent hydrocarbylene- or substituted hydrocarbylene group forming a fused system with the remainder of the metal complex, said $R^8$ containing from 1 to 30 atoms not counting hydrogen;

$X^a$ is a divalent moiety, or a moiety comprising one σ-bond and a neutral two electron pair able to form a coordinate-covalent bond to M, said $X^a$ comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic, delocalized, π-bound ligand groups and optionally two X groups together form a divalent ligand group;

Z independently at each occurrence is a neutral ligating compound having up to 20 atoms;

x is 0, 1 or 2; and z is zero or 1.

Suitable examples of such complexes are 3-phenyl-substituted s-indecenyl complexes corresponding to the formula:

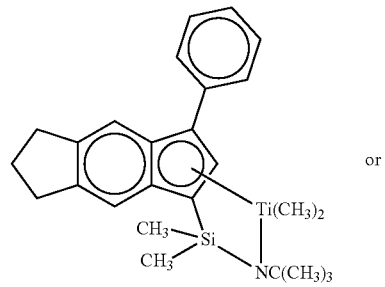

or

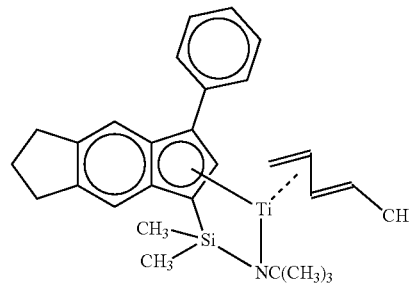

2,3-dimethyl-substituted s-indecenyl complexes corresponding to the formulas:

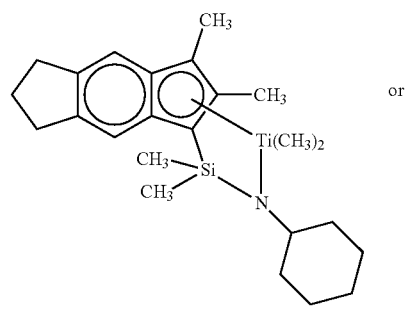

or

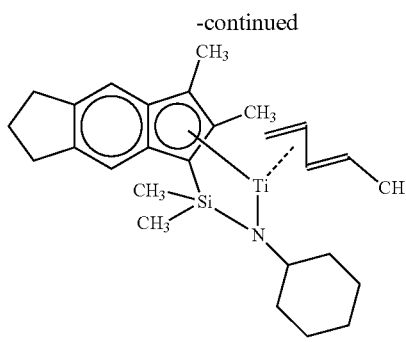

or 2-methyl-substituted s-indecenyl complexes corresponding to the formula:

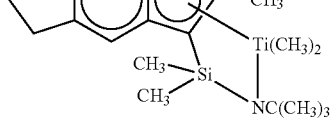 or

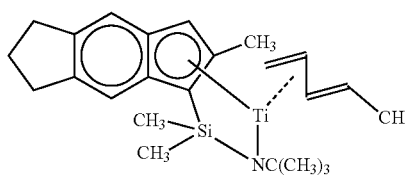

Additional examples of metal complexes that are usefully employed as catalysts according to the present invention include those of the formula:

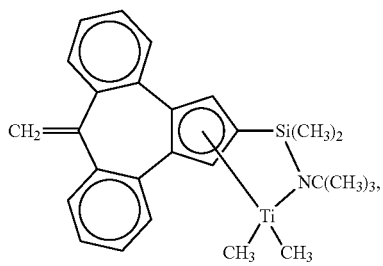

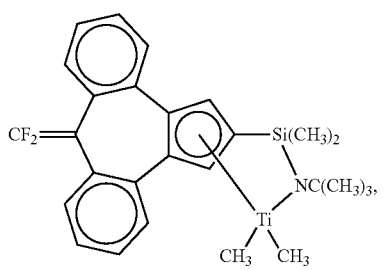

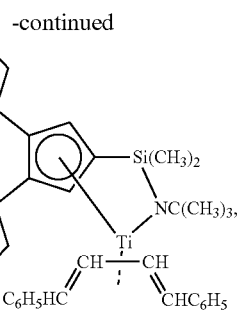

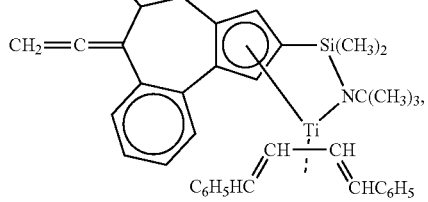

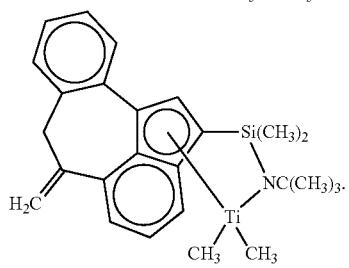

Specific metal complexes include:
(8-methylene-1,8-dihydrodibenzo[e,h]azulen-1-yl)-N-(1,1-dimethylethyl)dimethylsilanamide titanium (II) 1,4-diphenyl-1,3-butadiene,
(8-methylene-1,8-dihydrodibenzo[e,h]azulen-1-yl)-N-(1,1-dimethylethyl)dimethylsilanamide titanium (II) 1,3-pentadiene,
(8-methylene-1,8-dihydrodibenzo[e,h]azulen-1-yl)-N-(1,1-dimethylethyl)dimethylsilanamide titanium (III) 2-(N,N-dimethylamino)benzyl,
(8-methylene-1,8-dihydrodibenzo[e,h]azulen-1-yl)-N-(1,1-dimethylethyl)dimethylsilanamide titanium (IV) dichloride,
(8-methylene-1,8-dihydrodibenzo[e,h]azulen-1-yl)-N-(1,1-dimethylethyl)dimethylsilanamide titanium (IV) dimethyl,
(8-methylene-1,8-dihydrodibenzo[e,h]azulen-1-yl)-N-(1,1-dimethylethyl)dimethylsilanamide titanium (IV) dibenzyl,
(8-difluoromethylene-1,8-dihydrodibenzo[e,h]azulen-1-yl)-N-(1,1-dimethylethyl)dimethylsilanamide titanium (II) 1,4-diphenyl-1,3-butadiene, (8-difluoromethylene-1,8-dihydrodibenzo[e,h]azulen-1-yl)-N-(1,1-dimethylethyl)dimethylsilanamide titanium (II) 1,3-pentadiene,
(8-difluoromethylene-1,8-dihydrodibenzo[e,h]azulen-1-yl)-N-(1,1-dimethylethyl)dimethylsilanamide titanium (III) 2-(N,N-dimethylamino)benzyl,
(8-difluoromethylene-1,8-dihydrodibenzo[e,h]azulen-1-yl)-N-(1,1-dimethylethyl)dimethylsilanamide titanium (IV) dichloride,
(8-difluoromethylene-1,8-dihydrodibenzo[e,h]azulen-1-yl)-N-(1,1-dimethylethyl)dimethylsilanamide titanium (IV) dimethyl,
(8-difluoromethylene-1,8-dihydrodibenzo[e,h]azulen-1-yl)-N-(1,1-dimethylethyl)dimethylsilanamide titanium (IV) dibenzyl,
(8-methylene-1,8-dihydrodibenzo[e,h]azulen-2-yl)-N-(1,1-dimethylethyl)dimethylsilanamide titanium (II) 1,4-diphenyl-1,3-butadiene,
(8-methylene-1,8-dihydrodibenzo[e,h]azulen-2-yl)-N-(1,1-dimethylethyl)dimethylsilanamide titanium (II) 1,3-pentadiene,
(8-methylene-1,8-dihydrodibenzo[e,h]azulen-2-yl)-N-(1,1-dimethylethyl)dimethylsilanamide titanium (III) 2-(N,N-dimethylamino)benzyl,
(8-methylene-1,8-dihydrodibenzo[e,h]azulen-2-yl)-N-(1,1-dimethylethyl)dimethylsilanamide titanium (IV) dichloride,
(8-methylene-1,8-dihydrodibenzo[e,h]azulen-2-yl)-N-(1,1-dimethylethyl)dimethylsilanamide titanium (IV) dimethyl,
(8-methylene-1,8-dihydrodibenzo[e,h]azulen-2-yl)-N-(1,1-dimethylethyl)dimethylsilanamide titanium (IV) dibenzyl,
(8-difluoromethylene-1,8-dihydrodibenzo[e,h]azulen-2-yl)-N-(1,1-dimethylethyl)dimethylsilanamide titanium (II) 1,4-diphenyl-1,3-butadiene,
(8-difluoromethylene-1,8-dihydrodibenzo[e,h]azulen-2-yl)-N-(1,1-dimethylethyl)dimethylsilanamide titanium (II) 1,3-pentadiene,
(8-difluoromethylene-1,8-dihydrodibenzo[e,h]azulen-2-yl)-N-(1,1-dimethylethyl)dimethylsilanamide titanium (III) 2-(N,N-dimethylamino)benzyl,
(8-difluoromethylene-1,8-dihydrodibenzo[e,h]azulen-2-yl)-N-(1,1-dimethylethyl)dimethylsilanamide titanium (IV) dichloride,
(8-difluoromethylene-1,8-dihydrodibenzo[e,h]azulen-2-yl)-N-(1,1-dimethylethyl)dimethylsilanamide titanium (IV) dimethyl,
(8-difluoromethylene-1,8-dihydrodibenzo[e,h]azulen-2-yl)-N-(1,1-dimethylethyl)dimethylsilanamide titanium (IV) dibenzyl, and mixtures thereof,
especially mixtures of positional isomers.

Further illustrative examples of metal complexes for use according to the present invention correspond to the formula:

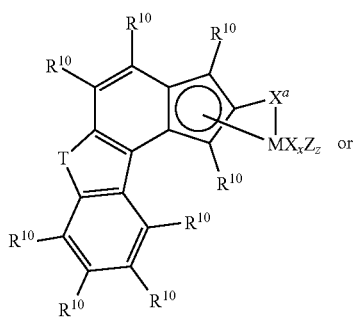

or

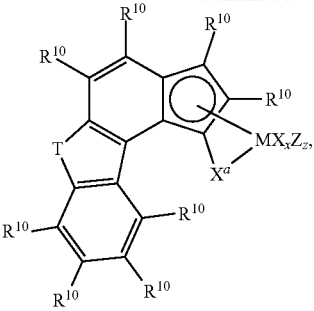

where M is titanium in the +2, +3 or +4 formal oxidation state;

T is —NR$^9$— or —O—;

R$^9$ is hydrocarbyl, silyl, germyl, dihydrocarbylboryl, or halohydrocarbyl or up to 10 atoms not counting hydrogen;

R$^{10}$ independently at each occurrence is hydrogen, hydrocarbyl, trihydrocarbylsilyl, trihydrocarbylsilylhydrocarbyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said R$^{10}$ group having up to 40 atoms not counting hydrogen atoms, and optionally two or more of the foregoing adjacent R$^{10}$ groups may together form a divalent derivative thereby forming a saturated or unsaturated fused ring;

X$^a$ is a divalent moiety lacking in delocalized π-electrons, or such a moiety comprising one σ-bond and a neutral two electron pair able to form a coordinate-covalent bond to M, said X$^a$ comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic ligand groups bound to M through delocalized π-electrons or two X groups together are a divalent anionic ligand group;

Z independently at each occurrence is a neutral ligating compound having up to 20 atoms;

x is 0, 1, 2, or 3;

and z is 0 or 1.

Illustratively, T is =N(CH$_3$), X is halo or hydrocarbyl, x is 2, X$^a$ is dimethylsilane, z is 0, and R$^{10}$ at each occurrence is hydrogen, a hydrocarbyl, hydrocarbyloxy, dihydrocarbylamino, hydrocarbyleneamino, dihydrocarbylamino-substituted hydrocarbyl group, or hydrocarbyleneamino-substituted hydrocarbyl group of up to 20 atoms not counting hydrogen, and optionally two R$^{10}$ groups may be joined together.

Illustrative metal complexes of the foregoing formula that may be employed in the practice of the present invention further include the following compounds:
(t-butylamido)dimethyl-[6,7]benzo-[4,5:2', 3'](1-methylisoindol)-(3H)-indene-2-yl)silanetitanium (II) 1,4-diphenyl-1,3-butadiene, (t-butylamido)dimethyl-[6,7]benzo-[4,5:2', 3' ](1-methylisoindol)-(3H)-indene-2-yl)silanetitanium (II) 1,3-pentadiene,
(t-butylamido)dimethyl-[6,7]benzo-[4,5:2', 3'](1-methylisoindol)-(3H)-indene-2-yl)silanetitanium (III) 2-(N,N-dimethylamino)benzyl,
(t-butylamido)dimethyl-[6,7]benzo-[4,5:2', 3'](1-methylisoindol)-(3H)-indene-2-yl)silanetitanium (IV) dichloride,
(t-butylamido)dimethyl-[6,7]benzo-[4,5:2', 3'](1-methylisoindol)-(3H)-indene-2-yl)silanetitanium (IV) dimethyl,
(t-butylamido)dimethyl-[6J]benzo-[4,5:2', 3'](1-methylisoindol)-(3H)-indene-2-yl)silanetitanium (IV) dibenzyl,
(t-butylamido)dimethyl-[6,7]benzo-[4,5:2', 3'](1-methylisoindol)-(3H)-indene-2-yl)silanetitanium (IV) bis(trimethylsilyl),
(cyclohexylamido)dimethyl-[6,7]benzo-[4,5:2', 3' ](1-methylisoindol)-(3H)-indene-2-yl)silanetitanium (II) 1,4-diphenyl-1,3-butadiene,
(cyclohexylamido)dimethyl-[6,7]benzo-[4,5:2', 3'](1-methylisoindol)-(3H)-indene-2-yl)silanetitanium (II) 1,3-pentadiene,
(cyclohexylamido)dimethyl-[6,7]benzo-[4,5:2', 3'](1-methylisoindol)-(3H)-indene-2-yl)silanetitanium (III) 2-(N,N-dimethylamino)benzyl,
(cyclohexylamido)dimethyl-[6,7]benzo-[4,5:2', 3' ](1-methylisoindol)-(3H)-indene-2-yl)silanetitanium (IV) dichloride,
(cyclohexylamido)dimethyl-[6,7]benzo-[4,5:2', 3'](1-methylisoindol)-(3H)-indene-2-yl)silanetitanium (IV) dimethyl,
(cyclohexylamido)dimethyl-[6,7]benzo-[4,5:2', 3'](l-methylisoindol)-(3H)-indene-2-yl)silanetitanium (IV) dibenzyl,
(cyclohexylamido)dimethyl-[6,7]benzo-[4,5:2', 3'](1-methylisoindol)-(3H)-indene-2-yl)silanetitanium (IV) bis(trimethylsilyl),
(t-butylamido)di(p-methylphenyl)-[6,7]benzo-[4,5:2', 3'](1-methylisoindol)-(3H)-indene-2-yl)silanetitanium (II) 1,4-diphenyl-1,3-butadiene,
(t-butylamido)di(p-methylphenyl)-[6,7]benzo-[4,5:2', 3'](1-methylisoindol)-(3H)-indene-2-yl)silanetitanium (II) 1,3-pentadiene,
(t-butylamido)di(p-methylphenyl)-[6,7]benzo-[4,5:2', 3'](1-methylisoindol)-(3H)-indene-2-yl)silanetitanium (III) 2-(N,N-dimethylamino)benzyl,
(t-butylamido)di(p-methylphenyl)-[6,7]benzo-[4,5:2', 3'](1-methylisoindol)-(3H)-indene-2-yl)silanetitanium (IV) dichloride,
(t-butylamido)di(p-methylphenyl)-[6,7]benzo-[4,5:2', 3'](1-methylisoindol)-(3H)-indene-2-yl)silanetitanium (IV) dimethyl,
(t-butylamido)di(p-methylphenyl)-[6,7]benzo-[4,5:2', 3'](1-methylisoindol)-(3H)-indene-2-yl)silanetitanium (IV) dibenzyl,
(t-butylamido)di(p-methylphenyl)-[6,7]benzo-[4,5:2', 3'](1-methylisoindol)-(3H)-indene-2-yl)silanetitanium (IV) bis(trimethylsilyl),
(cyclohexylamido)di(p-methylphenyl)-[6,7]benzo-[4,5:2', 3'](1-methylisoindol)-(3H)-indene-2-yl)silanetitanium (II) 1,4-diphenyl-1,3-butadiene,
(cyclohexylamido)di(p-methylphenyl)-[6,7]benzo-[4,5:2', 3'](1-methylisoindol)-(3H)-indene-2-yl)silanetitanium (II) 1,3-pentadiene,
(cyclohexylamido)di(p-methylphenyl)-[6,7]benzo-[4,5:2', 3'](1-methylisoindol)-(3H)-indene-2-yl)silanetitanium (III) 2-(N,N-dimethylamino)benzyl,
(cyclohexylamido)di(p-methylphenyl)-[6,7]benzo-[4,5:2', 3'](1-methylisoindol)-(3H)-indene-2-yl)silanetitanium (IV) dichloride,
(cyclohexylamido)di(p-methylphenyl)-[6,7]benzo-[4,5:2', 3'](1-methylisoindol)-(3H)-indene-2-yl)silanetitanium (IV) dimethyl,
(cyclohexylamido)di(p-methylphenyl)-[6,7]benzo-[4,5:2', 3'](1-methylisoindol)-(3H)-indene-2-yl)silanetitanium (IV) dibenzyl; and
(cyclohexylamido)di(p-methylphenyl)-[6,7]benzo-[4,5:2', 3'](1-methylisoindol)-(3H)-indene-2-yl)silanetitanium (IV) bis(trimethylsilyl).

Illustrative Group 4 metal complexes that may be employed in the practice of the present disclosure further include:
(tert-butylamido)(1,1-dimethyl-2,3,4,9,10-η-1,4,5,6,7,8-hexahydronaphthalenyl)dimethylsilanetitaniumdimethyl
(tert-butylamido)(1,1,2,3-tetramethyl-2,3,4,9,10-η-1,4,5,6,7,8-hexahydronaphthalenyl)dimethylsilanetitaniumdimethyl,
(tert-butylamido)(tetramethyl-$\eta^5$-cyclopentadienyl) dimethylsilanetitanium dibenzyl,
(tert-butylamido)(tetramethyl-$\eta^5$-cyclopentadienyl)dimethylsilanetitanium dimethyl,
(tert-butylamido)(tetramethyl-$\eta^5$-cyclopentadienyl)-1,2-ethanediyltitanium dimethyl,
(tert-butylamido)(tetramethyl-$\eta^5$-indenyl)dimethylsilanetitanium dimethyl,
(tert-butylamido)(tetramethyl-$\eta^5$-cyclopentadienyl)dimethylsilane titanium (III) 2-(dimethylamino)benzyl;
(tert-butylamido)(tetramethyl-$\eta^5$-cyclopentadienyl)dimethylsilanetitanium (III) allyl,
(tert-butylamido)(tetramethyl-$\eta^5$-cyclopentadienyl)dimethylsilanetitanium (III) 2,4-dimethylpentadienyl,
(tert-butylamido)(tetramethyl-$\eta^5$-cyclopentadienyl)dimethylsilanetitanium (II) 1,4-diphenyl-1,3-butadiene,
(tert-butylamido)(tetramethyl-$\eta^5$-cyclopentadienyl)dimethylsilanetitanium (II) 1,3-pentadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (II) 2,4-hexadiene,
(tert-butylamido)(2-methylindenyl)dimethylsilanetitanium (IV) 2,3-dimethyl-1,3-butadiene,
(tert-butylamido)(2-methylindenyl)dimethylsilanetitanium (IV) isoprene,
(tert-butylamido)(2-methylindenyl)dimethylsilanetitanium (IV) 1,3-butadiene,
(tert-butylamido)(2,3-dimethylindenyl)dimethylsilanetitanium (IV) 2,3-dimethyl-1,3-butadiene,
(tert-butylamido)(2,3-dimethylindenyl)dimethylsilanetitanium (IV) isoprene,
(tert-butylamido)(2,3-dimethylindenyl)dimethylsilanetitanium (IV) dimethyl,
(tert-butylamido)(2,3-dimethylindenyl)dimethylsilanetitanium (IV) dibenzyl,
(tert-butylamido)(2,3-dimethylindenyl)dimethylsilanetitanium (IV) 1,3-butadiene,
(tert-butylamido)(2,3-dimethylindenyl)dimethylsilanetitanium (II) 1,3-pentadiene,
(tert-butylamido)(2,3-dimethylindenyl)dimethylsilanetitanium (II) 1,4-diphenyl-1,3-butadiene,
(tert-butylamido)(2-methylindenyl)dimethylsilanetitanium (II) 1,3-pentadiene,
(tert-butylamido)(2-methylindenyl)dimethylsilanetitanium (IV) dimethyl,
(tert-butylamido)(2-methylindenyl)dimethylsilanetitanium (IV) dibenzyl, (tert-butylamido)(2-methyl-4-phenylindenyl)dimethylsilanetitanium (II) 1,4-diphenyl-1,3-butadiene,
(tert-butylamido)(2-methyl-4-phenylindenyl)dimethylsilanetitanium (II) 1,3-pentadiene,
(tert-butylamido)(2-methyl-4-phenylindenyl)dimethylsilanetitanium (II) 2,4-hexadiene,
(tert-butylamido)(tetramethyl-$\eta^5$-cyclopentadienyl)dimethyl-silanetitanium (IV) 1,3-butadiene,
(tert-butylamido)(tetramethyl-$\eta^5$-cyclopentadienyl)dimethylsilanetitanium (IV) 2,3-dimethyl-1,3-butadiene,
(tert-butylamido)(tetramethyl-$\eta^5$-cyclopentadienyl)dimethylsilanetitanium (IV) isoprene,
(tert-butylamido)(tetramethyl-$\eta^5$-cyclopentadienyl)dimethyl-silanetitanium (II) 1,4-dibenzyl-1,3-butadiene,
(tert-butylamido)(tetramethyl-$\eta^5$-cyclopentadienyl)dimethylsilanetitanium (II) 2,4-hexadiene,
(tert-butylamido)(tetramethyl-$\eta^5$-cyclopentadienyl)dimethyl-silanetitanium (II) 3-methyl-1,3-pentadiene,
(tert-butylamido)(2,4-dimethylpentadien-3-yl)dimethylsilanetitaniumdimethyl,
(tert-butylamido)(6,6-dimethylcyclohexadienyl)dimethylsilanetitaniumdimethyl,
(tert-butylamido)(1,1-dimethyl-2,3,4,9,10-$\eta$-1,4,5,6,7,8-hexahydronaphthalen-4-yl)dimethylsilanetitaniumdimethyl,
(tert-butylamido)(1,1,2,3-tetramethyl-2,3,4,9,10-$\eta$-1,4,5,6,7,8-hexahydronaphthalen-4-yl)dimethylsilanetitaniumdimethyl,
(tert-butylamido)(tetramethyl-$\eta^5$-cyclopentadienyl methylphenylsilanetitanium (IV) dimethyl,
(tert-butylamido)(tetramethyl-$\eta^5$-cyclopentadienyl methylphenylsilanetitanium (II) 1,4-diphenyl-1,3-butadiene,
1-(tert-butylamido)-2-(tetramethyl-$\eta^5$-cyclopentadienyl) ethanediyltitanium (IV) dimethyl, and
1-(tert-butylamido)-2-(tetramethyl-$\eta^5$-cyclopentadienyl) ethanediyl-titanium (II) 1,4-diphenyl-1,3-butadiene.

Other delocalized, $\pi$-bonded complexes, especially those containing other Group 4 metals, will, of course, be apparent to those skilled in the art, and are disclosed among other places in: WO 03/78480, WO 03/78483, WO 02/92610. WO 02/02577, US 2003/0004286 and U.S. Pat. Nos. 6,515,155, 6,555,634, 6,150,297, 6,034,022, 6,268,444, 6,015,868, 5,866,704, and 5,470,993.

Additional examples of metal complexes that are usefully employed as catalysts are complexes of polyvalent Lewis bases, such as compounds corresponding to the formula:

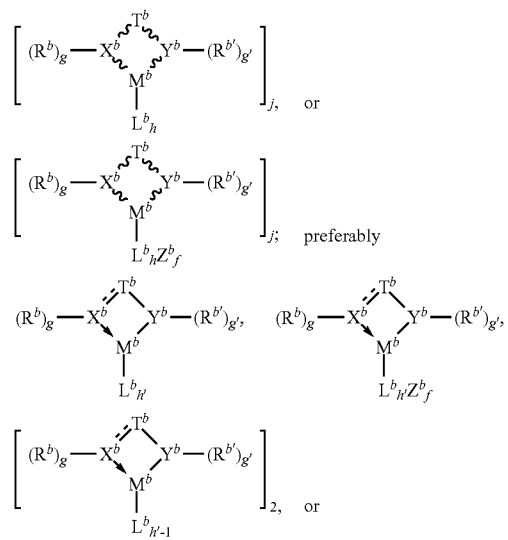

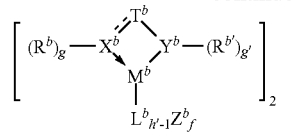

wherein $T^b$ is a bridging group, preferably containing 2 or more atoms other than hydrogen, $X^b$ and $Y^b$ are each independently selected from the group consisting of nitrogen, sulfur, oxygen and phosphorus; more preferably both $X^b$ and $Y^b$ are nitrogen, $R^b$ and $R^{b'}$ independently each occurrence are hydrogen or $C_{1-50}$ hydrocarbyl groups optionally containing one or more heteroatoms or inertly substituted derivative thereof. Non-limiting examples of suitable $R^b$ and $R^{b'}$ groups include alkyl, alkenyl, aryl, aralkyl, (poly)alkylaryl and cycloalkyl groups, as well as nitrogen, phosphorus, oxygen and halogen substituted derivatives thereof. Specific examples of suitable Rb and Rb' groups include methyl, ethyl, isopropyl, octyl, phenyl, 2,6-dimethylphenyl, 2,6-di(isopropyl)phenyl, 2,4,6-trimethylphenyl, pentafluorophenyl, 3,5-trifluoromethylphenyl, and benzyl;

g and g' are each independently 0 or 1;

$M^b$ is a metallic element selected from Groups 3 to 15, or the Lanthanide series of the Periodic Table of the Elements. Preferably, $M^b$ is a Group 3-13 metal, more preferably $M^b$ is a Group 4-10 metal;

$L^b$ is a monovalent, divalent, or trivalent anionic ligand containing from 1 to 50 atoms, not counting hydrogen. Examples of suitable $L^b$ groups include halide; hydride; hydrocarbyl, hydrocarbyloxy; di(hydrocarbyl)amido, hydrocarbyleneamido, di(hydrocarbyl)phosphido; hydrocarbylsulfido; hydrocarbyloxy, tri(hydrocarbylsilyl)alkyl; and carboxylates. More preferred $L^b$ groups are C1-20 alkyl, $C_{7-20}$ aralkyl, and chloride;

h and h' are each independently an integer from 1 to 6, preferably from 1 to 4, more preferably from 1 to 3, and j is 1 or 2, with the value h×j selected to provide charge balance;

$Z^b$ is a neutral ligand group coordinated to $M^b$, and containing up to 50 atoms not counting hydrogen. Preferred $Z^b$ groups include aliphatic and aromatic amines, phosphines, and ethers, alkenes, alkadienes, and inertly substituted derivatives thereof. Suitable inert substituents include halogen, alkoxy, aryloxy, alkoxycarbonyl, aryloxycarbonyl, di(hydrocarbyl)amine, tri(hydrocarbyl)silyl, and nitrile groups. Preferred $Z^b$ groups include triphenylphosphine, tetrahydrofuran, pyridine, and 1,4-diphenylbutadiene;

f is an integer from 1 to 3;

two or three of $T^b$, $R^b$ and $R^{b'}$ may be joined together to form a single or multiple ring structure;

h is an integer from 1 to 6, preferably from 1 to 4, more preferably from 1 to 3;

〰〰 indicates any form of electronic interaction, especially coordinate or covalent bonds, including multiple bonds, arrows signify coordinate bonds, and dotted lines indicate optional double bonds.

In one embodiment, it is preferred that $R^b$ have relatively low steric hindrance with respect to $X^b$. In this embodiment, most preferred $R^b$ groups are straight chain alkyl groups, straight chain alkenyl groups, branched chain alkyl groups wherein the closest branching point is at least 3 atoms removed from $X^b$, and halo, dihydrocarbylamino, alkoxy or trihydrocarbylsilyl substituted derivatives thereof. Highly preferred $R^b$ groups in this embodiment are C1-8 straight chain alkyl groups.

At the same time, in this embodiment $R^{b'}$ preferably has relatively high steric hindrance with respect to $Y^b$. Non-limiting examples of suitable $R^{b'}$ groups for this embodiment include alkyl or alkenyl groups containing one or more secondary or tertiary carbon centers, cycloalkyl, aryl, alkaryl, aliphatic or aromatic heterocyclic groups, organic or inorganic oligomeric, polymeric or cyclic groups, and halo, dihydrocarbylamino, alkoxy or trihydrocarbylsilyl substituted derivatives thereof. Preferred $R^{b'}$ groups in this embodiment contain from 3 to 40, more preferably from 3 to 30, and most preferably from 4 to 20 atoms not counting hydrogen and are branched or cyclic. Examples of preferred $T^b$ groups are structures corresponding to the following formulas:

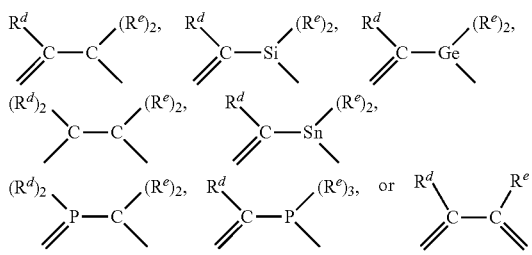

wherein

Each $R^d$ is C1-10 hydrocarbyl group, preferably methyl, ethyl, n-propyl, i-propyl, t-butyl, phenyl, 2,6-dimethylphenyl, benzyl, or tolyl. Each $R^e$ is C1-10 hydrocarbyl, preferably methyl, ethyl, n-propyl, i-propyl, t-butyl, phenyl, 2,6-dimethylphenyl, benzyl, or tolyl. In addition, two or more $R^d$ or $R^e$ groups, or mixtures of Rd and Re groups may together form a polyvalent derivative of a hydrocarbyl group, such as, 1,4-butylene, 1,5-pentylene, or a multicyclic, fused ring, polyvalent hydrocarbyl- or heterohydrocarbyl-group, such as naphthalene-1,8-diyl.

Suitable examples of the foregoing polyvalent Lewis base complexes include:

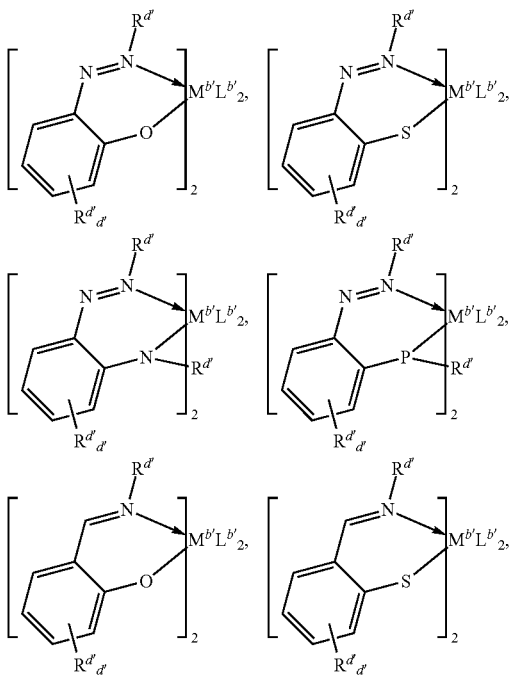

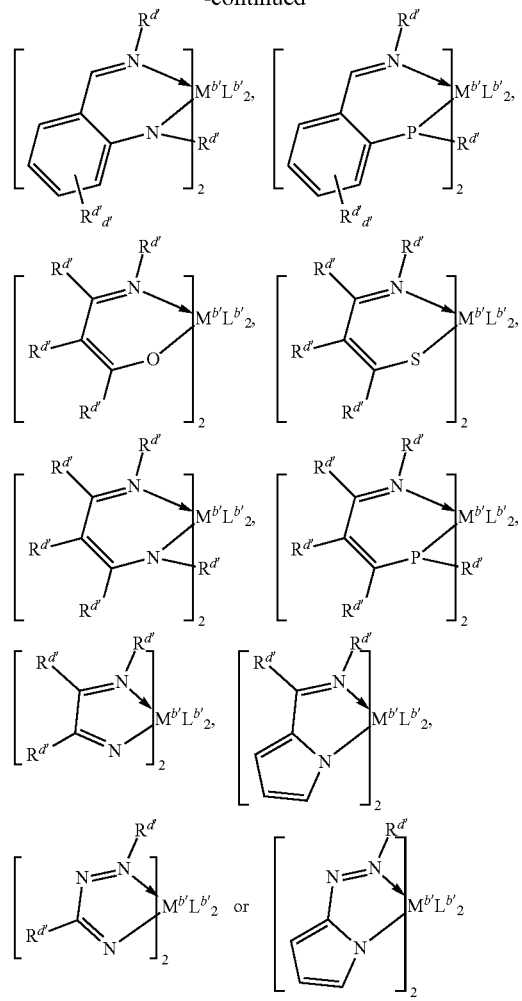

wherein $R^{d'}$ at each occurrence is independently selected from the group consisting of hydrogen and C1-50 hydrocarbyl groups optionally containing one or more heteroatoms, or inertly substituted derivative thereof, or further optionally, two adjacent $R^{d'}$ groups may together form a divalent bridging group;

d' is 4;

$M^{b'}$ is a Group 4 metal, preferably titanium or hafnium, or a Group 10 metal, preferably Ni or Pd;

$L^{b'}$ is a monovalent ligand of up to 50 atoms not counting hydrogen, preferably halide or hydrocarbyl, or two $L^{b'}$ groups together are a divalent or neutral ligand group, preferably a $C_{2-50}$ hydrocarbylene, hydrocarbadiyl or diene group.

The polyvalent Lewis base complexes for use in the present invention especially include Group 4 metal derivatives, especially hafnium derivatives of hydrocarbylamine substituted heteroaryl compounds corresponding to the formula:

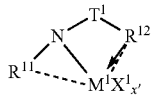

wherein:

$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;

$T^1$ is a divalent bridging group of from 1 to 41 atoms other than hydrogen, preferably 1 to 20 atoms other than hydrogen, and most preferably a mono- or di-C1-20 hydrocarbyl substituted methylene or silane group; and $R^{12}$ is a $C_{5-20}$ heteroaryl group containing Lewis base functionality, especially a pyridin-2-yl- or substituted pyridin-2-yl group or a divalent derivative thereof;

$M^1$ is a Group 4 metal, preferably hafnium;

$X^1$ is an anionic, neutral or dianionic ligand group;

x' is a number from 0 to 5 indicating the number of such $X^1$ groups; and bonds, optional bonds and electron donative interactions are represented by lines, dotted lines and arrows respectively.

Suitable complexes are those wherein ligand formation results from hydrogen elimination from the amine group and optionally from the loss of one or more additional groups, especially from $R^{12}$. In addition, electron donation from the Lewis base functionality, preferably an electron pair, provides additional stability to the metal center. Suitable metal complexes correspond to the formula:

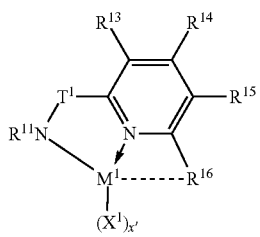

wherein $M^1$, $X^1$, x', $R^{11}$ and $T^1$ are as previously defined, $R^{13}$, $R^{14}$, $R^{15}$ and $R^{16}$ are hydrogen, halo, or an alkyl, cycloalkyl, heteroalkyl, heterocycloalkyl, aryl, or silyl group of up to 20 atoms not counting hydrogen, or adjacent $R^{13}$, $R^{14}$, $R^{15}$ or $R^{16}$ groups may be joined together thereby forming fused ring derivatives, and bonds, optional bonds and electron pair donative interactions are represented by lines, dotted lines and arrows respectively. Suitable examples of the foregoing metal complexes correspond to the formula:

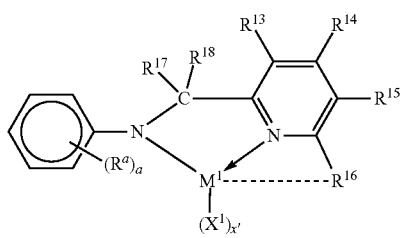

wherein $M^1$, $X^1$, and x' are as previously defined, $R^{13}$, $R^{14}$, $R^{15}$ and $R^{16}$ are as previously defined, preferably $R^{13}$, $R^{14}$, and $R^{15}$ are hydrogen, or $C_{1-4}$ alkyl, and $R^{1'}$ is $C_6$-2o aryl, most preferably naphthalenyl;

$R^a$ independently at each occurrence is $C_{1-4}$ alkyl, and a is 1-5, most preferably $R^a$ in two ortho-positions to the nitrogen is isopropyl or t-butyl;

$R^{17}$ and $R^{18}$ independently at each occurrence are hydrogen, halogen, or a $C_{1-20}$ alkyl or aryl group, most preferably one of $R^{17}$ and $R^{18}$ is hydrogen and the other is a C6-20 aryl group, especially 2-isopropyl, phenyl or a fused polycyclic aryl group, most preferably an anthracenyl group, and bonds, optional bonds and electron pair donative interactions are represented by lines, dotted lines and arrows respectively.

Exemplary metal complexes for use herein as catalysts correspond to the formula:

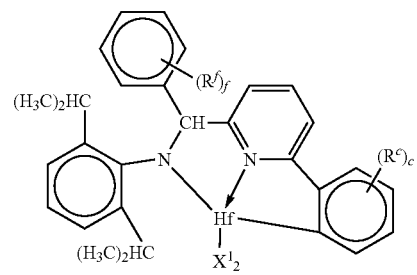

wherein $X^1$ at each occurrence is halide, N,N-dimethylamido, or $C_{1-4}$ alkyl, and preferably at each occurrence $X^1$ is methyl;

$R^f$ independently at each occurrence is hydrogen, halogen, C1-20 alkyl, or C6-20 aryl, or two adjacent $R^f$ groups are joined together thereby forming a ring, and f is 1-5; and $R^c$ independently at each occurrence is hydrogen, halogen, $C_{1-20}$ alkyl, or $C_{6-20}$ aryl, or two adjacent $R^c$ groups are joined together thereby forming a ring, and c is 1-5.

Suitable examples of metal complexes for use as catalysts according to the present invention are complexes of the following formulas:

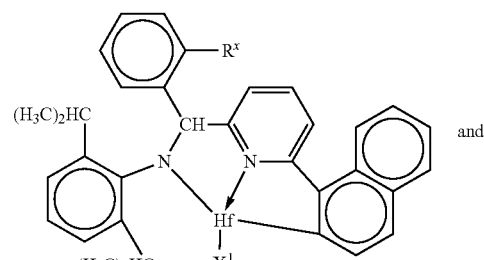

and

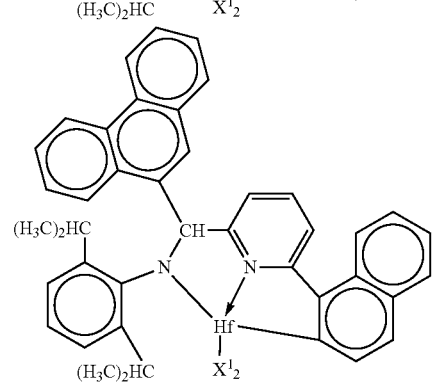

wherein $R^x$ is C1-4 alkyl or cycloalkyl, preferably methyl, isopropyl, t-butyl or cyclohexyl; and $X^1$ at each occurrence is halide, N,N-dimethylamido, or C1-4 alkyl, preferably methyl.

Examples of metal complexes usefully employed as catalysts according to the present invention include:

[N-(2,6-di(1-methylethyl)phenyl)amido) (o-tolyl)(α-naphthalen-2-diyl(6-pyridin-2-diyl)methane)]hafnium dimethyl;

[N-(2,6-di(1-methylethyl)phenyl)amido)(o-tolyl)(α-naphthalen-2-diyl(6-pyridin-2-diyl)methane)]hafnium di(N,N-dimethylamido);

[N-(2,6-di(1-methylethyl)phenyl)amido)(o-tolyl)(α-naphthalen-2-diyl(6-pyridin-2-diyl)methane)]hafnium dichloride;

[N-(2,6-di(1-methylethyl)phenyl)amido)(2-isopropylphenyl)(α-naphthalen-2-diyl(6-pyridin-2-diyl)methane)]hafnium dimethyl;

[N-(2,6-di(1-methylethyl)phenyl)amido)(2-isopropylphenyl)(α-naphthalen-2-diyl(6-pyridin-2-diyl)methane)]hafnium di(N,N-dimethylamido);

[N-(2,6-di(1-methylethyl)phenyl)amido)(2-isopropylphenyl)(α-naphthalen-2-diyl(6-pyridin-2-diyl)methane)]hafnium dichloride;

[N-(2,6-di(1-methylethyl)phenyl)amido)(phenanthren-5-yl)(α-naphthalen-2-diyl(6-pyridin-2-diyl)methane)]hafnium dimethyl;

[N-(2,6-di(1-methylethyl)phenyl)amido)(phenanthren-5-yl)(α-naphthalen-2-diyl(6-pyridin-2-diyl)methane)]hafnium di(N,N-dimethylamido); and

[N-(2,6-di(1-methylethyl)phenyl)amido)(phenanthren-5-yl)(α-naphthalen-2-diyl(6-pyridin-2-diyl)methane)]hafnium dichloride.

Under the reaction conditions used to prepare the metal complexes used in the present disclosure, the hydrogen of the 2-position of the α-naphthalene group substituted at the 6-position of the pyridin-2-yl group is subject to elimination, thereby uniquely forming metal complexes wherein the metal is covalently bonded to both the resulting amide group and to the 2-position of the α-naphthalenyl group, as well as stabilized by coordination to the pyridinyl nitrogen atom through the electron pair of the nitrogen atom.

Additional suitable metal complexes of polyvalent Lewis bases for use herein include compounds corresponding to the formula:

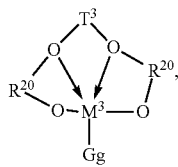

wherein:

$R^{20}$ is an aromatic or inertly substituted aromatic group containing from 5 to 20 atoms not counting hydrogen, or a polyvalent derivative thereof;

$T^3$ is a hydrocarbylene or hydrocarbyl silane group having from 1 to 20 atoms not counting hydrogen, or an inertly substituted derivative thereof;

$M^3$ is a Group 4 metal, preferably zirconium or hafnium;

G is an anionic, neutral or dianionic ligand group; preferably a halide, hydrocarbyl, silane, trihydrocarbylsilylhydrocarbyl, trihydrocarbylsilyl, or dihydrocarbylamide group having up to 20 atoms not counting hydrogen;

g is a number from 1 to 5 indicating the number of such G groups; and bonds and electron donative interactions are represented by lines and arrows respectively.

Illustratively, such complexes correspond to the formula:

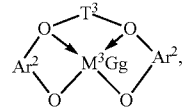

wherein:

$T^3$ is a divalent bridging group of from 2 to 20 atoms not counting hydrogen, preferably a substituted or unsubstituted, C3-6 alkylene group;

and $Ar^2$ independently at each occurrence is an arylene or an alkyl- or aryl-substituted arylene group of from 6 to 20 atoms not counting hydrogen;

$M^3$ is a Group 4 metal, preferably hafnium or zirconium;

G independently at each occurrence is an anionic, neutral or dianionic ligand group;

g is a number from 1 to 5 indicating the number of such X groups; and electron donative interactions are represented by arrows.

Suitable examples of metal complexes of foregoing formula include the following compounds

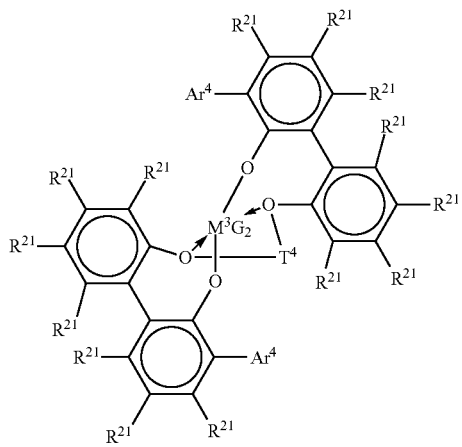

where $M^3$ is Hf or Zr;

$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and $T^4$ independently at each occurrence comprises a Cm alkylene group, a $C_3$ cycloalkylene group, or an inertly substituted derivative thereof;

$R^{21}$ independently at each occurrence is hydrogen, halo, hydrocarbyl, trihydrocarbylsilyl, or trihydrocarbylsilylhydrocarbyl of up to 50 atoms not counting hydrogen; and G, independently at each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Suitable compounds are compounds of the formulas:

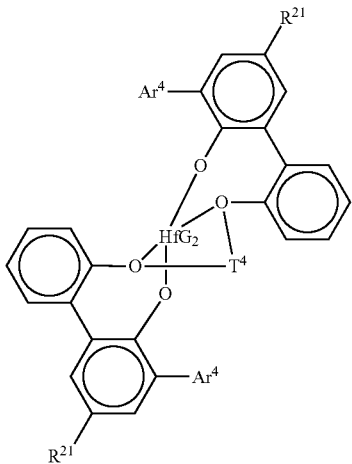

wherein Ar$^4$ is 3,5-di(isopropyl)phenyl, 3,5-di(isobutyl)phenyl, dibenzo-1H-pyrrole-1-yl, or anthracen-5-yl,
R$^{21}$ is hydrogen, halo, or C1-4 alkyl, especially methyl
T$^4$ is propan-1,3-diyl or butan-1,4-diyl, and
G is chloro, methyl or benzyl.
An exemplary metal complex of the foregoing formula is:

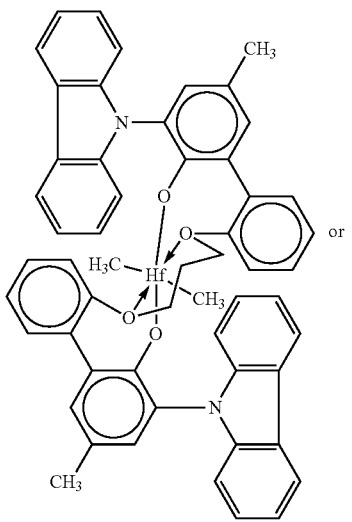

Suitable metal complexes for use according to the present disclosure further include compounds corresponding to the formula:

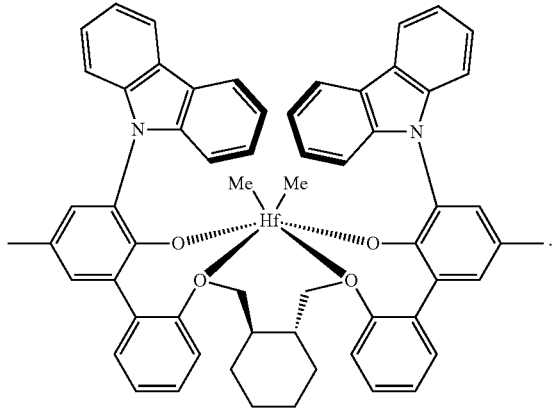

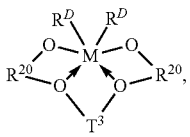

where:
M is zirconium or hafnium;
R$^{20}$ independently at each occurrence is a divalent aromatic or inertly substituted aromatic group containing from 5 to 20 atoms not counting hydrogen;
T$^3$ is a divalent hydrocarbon or silane group having from 3 to 20 atoms not counting hydrogen, or an inertly substituted derivative thereof; and
R$^D$ independently at each occurrence is a monovalent ligand group of from 1 to 20 atoms, not counting hydrogen, or two R$^D$ groups together are a divalent ligand group of from 1 to 20 atoms, not counting hydrogen.
Such complexes may correspond to the formula:

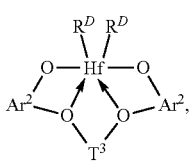

wherein:
Ar$^2$ independently at each occurrence is an arylene or an alkyl-, aryl-, alkoxy- or amino-substituted arylene group of from 6 to 20 atoms not counting hydrogen or any atoms of any substituent;
T$^3$ is a divalent hydrocarbon bridging group of from 3 to 20 atoms not counting hydrogen, preferably a divalent substituted or unsubstituted C$_3$ aliphatic, cycloaliphatic, or bis(alkylene)-substituted cycloaliphatic group having at least 3 carbon atoms separating oxygen atoms; and
R$^D$ independently at each occurrence is a monovalent ligand group of from 1 to 20 atoms, not counting hydrogen, or two R$^D$ groups together are a divalent ligand group of from 1 to 40 atoms, not counting hydrogen.
Further examples of metal complexes suitable for use herein include compounds of the formula:

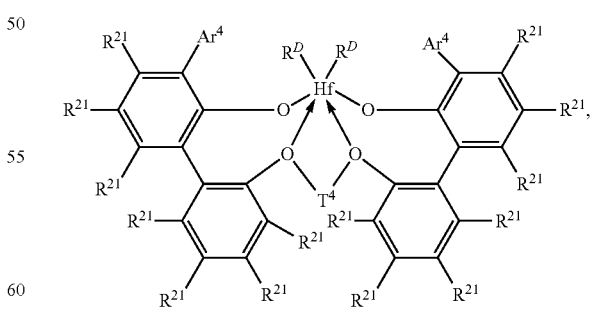

Ar$^4$ independently at each occurrence is C$_{6-20}$ aryl or inertly substituted derivatives thereof, especially 3,5-di(isopropyl)phenyl, 3,5-di(isobutyl)phenyl, dibenzo-1H-pyrrole-1-yl, naphthyl, anthracen-5-yl, 1,2,3,4,6,7,8,9-octahydroanthracen-5-yl;

$T^4$ independently at each occurrence is a propylene-1,3-diyl group, a bis(alkylene)cyclohexan-1,2-diyl group, or an inertly substituted derivative thereof substituted with from 1 to 5 alkyl, aryl or aralkyl substituents having up to 20 carbons each;

$R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen; and $R^D$, independently at each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

Exemplary metal complexes are compounds of the formula:

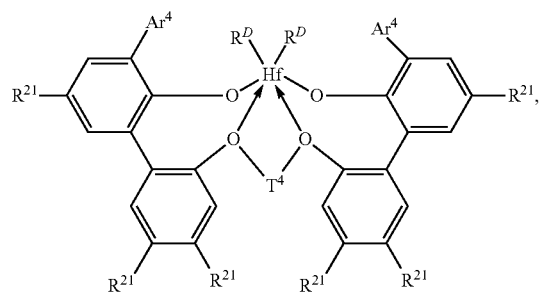

where, $Ar^4$, independently at each occurrence, is 3,5-di(isopropyl)phenyl, 3,5-di(isobutyl)phenyl, dibenzo-1H-pyrrole-1-yl, or anthracen-5-yl, $R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen;

$T^4$ is propan-1,3-diyl or bis(methylene)cyclohexan-1,2-diyl; and $R^D$, independently at each occurrence is halo or a hydrocarbyl or trihydrocarbylsilyl group of up to 20 atoms not counting hydrogen, or 2 $R^D$ groups together are a hydrocarbylene, hydrocarbadiyl or hydrocarbylsilanediyl group of up to 40 atoms not counting hydrogen.

Suitable metal complexes according to the present disclosure correspond to the formulas:

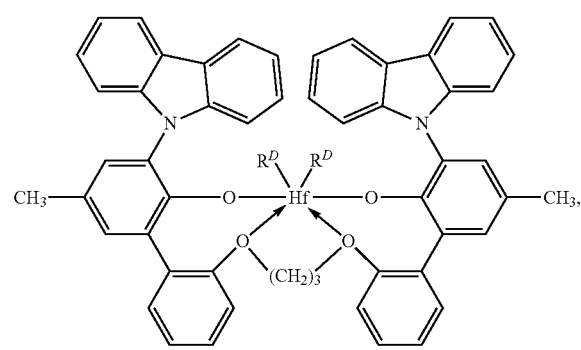

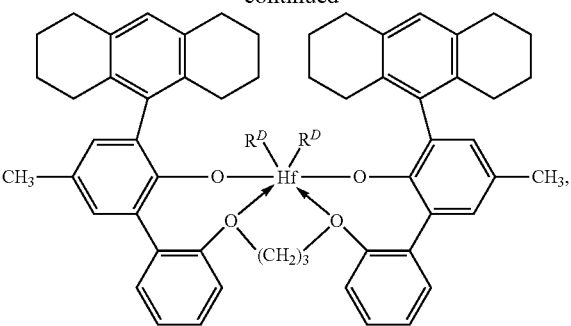

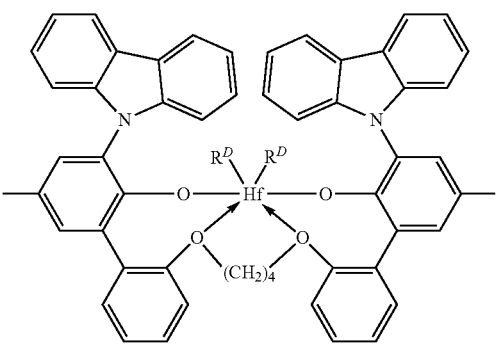

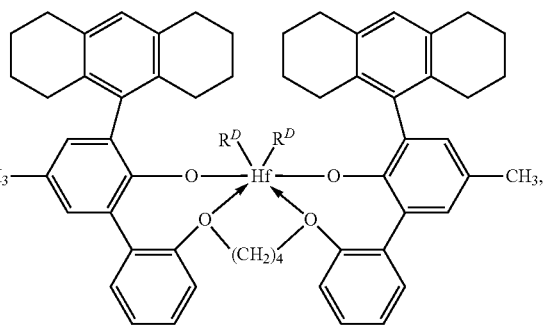

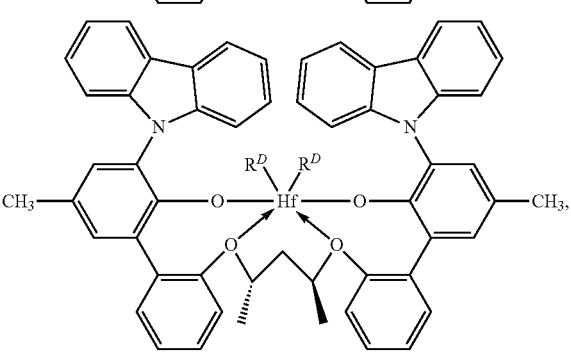

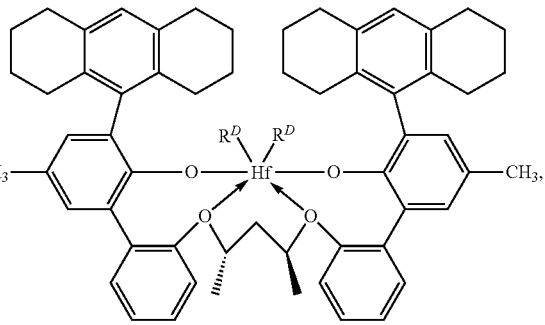

-continued

[chemical structure diagrams showing two hafnium complexes with carbazole and octahydroanthracenyl substituents, with $R^D$ groups]

wherein $R^D$ independently at each occurrence is chloro, methyl or benzyl.

Specific examples of suitable metal complexes are the following compounds:

A) bis((2-oxoyl-3-(1,2,3,4,6,7,8,9-octahydroanthracen-5-yl)-5-(methyl)phenyl)-2-phenoxy)-1,3-propanediylhafnium (IV) dimethyl,
bis((2-oxoyl-3-(1,2,3,4,6,7,8,9-octahydroanthracen-5-yl)-5-(methyl)phenyl)-2-phenoxy)-1,3-propanediylhafnium (IV) dichloride,
bis((2-oxoyl-3-(1,2,3,4,6,7,8,9-octahydroanthracen-5-yl)-5-(methyl)phenyl)-2-phenoxy)-1,3-propanediylhafnium (IV) dibenzyl,
bis((2-oxoyl-3-(dibenzo-1H-pyrrole-1-yl)-5-(methyl)phenyl)-2-phenoxy)-1,3-propanediylhafnium (IV) dimethyl,
bis((2-oxoyl-3-(dibenzo-1H-pyrrole-1-yl)-5-(methyl)phenyl)-2-phenoxy)-1,3-propanediylhafnium (IV) dichloride,
bis((2-oxoyl-3-(dibenzo-1H-pyrrole-1-yl)-5-(methyl)phenyl)-2-phenoxy)-1,3-propanediylhafnium (IV) dibenzyl, B) bis((2-oxoyl-3-(1,2,3,4,6,7,8,9-octahydroanthracen-5-yl)-5-(methyl)phenyl)-2-phenoxymethyl)-1,4-butanediylhafnium (IV) dimethyl,
bis((2-oxoyl-3-(1,2,3,4,6,7,8,9-octahydroanthracen-5-yl)-5-(methyl)phenyl)-2-phenoxymethyl)-1,4-butanediylhafnium (IV) dichloride,
bis((2-oxoyl-3-(1,2,3,4,6,7,8,9-octahydroanthracen-5-yl)-5-(methyl)phenyl)-2-phenoxymethyl)-1,4-butanediylhafnium (IV) dibenzyl,
bis((2-oxoyl-3-(dibenzo-1H-pyrrole-1-yl)-5-(methyl)phenyl)-2-phenoxymethyl)-1,4-butanediylhafnium (IV) dimethyl,
bis((2-oxoyl-3-(dibenzo-1H-pyrrole-1-yl)-5-(methyl)phenyl)-2-phenoxymethyl)-1,4-butanediylhafnium (IV) dichloride,
bis((2-oxoyl-3-(dibenzo-1H-pyrrole-1-yl)-5-(methyl)phenyl)-2-phenoxymethyl)-1,4-butanediylhafnium (IV) dibenzyl, C) bis((2-oxoyl-3-(1,2,3,4,6,7,8,9-octahydroanthracen-5-yl)-5-(methyl)phenyl)-2-phenoxy)-2,4-pentanediylhafnium (IV) dimethyl,
bis((2-oxoyl-3-(1,2,3,4,6,7,8,9-octahydroanthracen-5-yl)-5-(methyl)phenyl)-2-phenoxy)-2,4-pentanediylhafnium (IV) dichloride,
bis((2-oxoyl-3-(1,2,3,4,6,7,8,9-octahydroanthracen-5-yl)-5-(methyl)phenyl)-2-phenoxy)-2,4-pentanediylhafnium (IV) dibenzyl,
bis((2-oxoyl-3-(dibenzo-1H-pyrrole-1-yl)-5-(methyl)phenyl)-2-phenoxy)-2,4-pentanediylhafnium (IV) dimethyl,
bis((2-oxoyl-3-(dibenzo-1H-pyrrole-1-yl)-5-(methyl)phenyl)-2-phenoxy)-2,4-pentanediylhafnium (IV) dichloride,
bis((2-oxoyl-3-(dibenzo-1H-pyrrole-1-yl)-5-(methyl)phenyl)-2-phenoxy)-2,4-pentanediylhafnium (IV) dibenzyl, D) bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dimethyl,
bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dichloride,
bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dibenzyl,
bis((2-oxoyl-3-(dibenzo-1H-pyrrole-1-yl)-5-(methyl)phenyl)-2-phenoxymethyl)-methylenetrans-1,2-cyclohexanediylhafnium (IV) dimethyl,
bis((2-oxoyl-3-(dibenzo-1H-pyrrole-1-yl)-5-(methyl)phenyl)-2-phenoxymethyl)-methylenetrans-1,2-cyclohexanediylhafnium (IV) dichloride, and
bis((2-oxoyl-3-(dibenzo-1H-pyrrole-1-yl)-5-(methyl)phenyl)-2-phenoxymethyl)-methylenetrans-1,2-cyclohexanediylhafnium (IV) dibenzyl.

The foregoing metal complexes may be conveniently prepared by standard metallation and ligand exchange procedures involving a source of the transition metal and a neutral polyfunctional ligand source. The techniques employed are the same as or analogous to those disclosed in U.S. Pat. No. 6,827,976 and US2004/0010103, and elsewhere.

The metal complex is activated to form the active catalyst composition by combination with the cocatalyst. The activation may occur prior to addition of the catalyst composition to the reactor with or without the presence of other components of the reaction mixture, or in situ through separate addition of the metal complex and activating cocatalyst to the reactor.

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, WO 02/38628, WO 03/40195, and U.S. 04/0220050.

Catalysts having high comonomer incorporation properties are also known to reincorporate in situ prepared long chain olefins resulting incidentally during the polymerization through β-hydride elimination and chain termination of growing polymer, or other process. The concentration of such long chain olefins is particularly enhanced by use of continuous solution polymerization conditions at high conversions, especially ethylene conversions of 95 percent or greater, more preferably at ethylene conversions of 97 percent or greater. Under such conditions a small but detectable quantity of olefin terminated polymer may be reincorporated into a growing polymer chain, resulting in the formation of long chain branches, that is, branches of a carbon length greater than would result from other deliberately added comonomer. Moreover, such chains reflect the presence of other comonomers present in the reaction mixture. That is, the chains may include short chain or long chain branching as well, depending on the comonomer composition of the reaction mixture. Long chain branching of olefin polymers is further described in U.S. Pat. Nos. 5,272,236, 5,278,272, and 5,665,800.

Alternatively, branching, including hyper-branching, may be induced in a particular segment of the present multi-block copolymers by the use of specific catalysts known to result in "chain-walking" in the resulting polymer. For example, certain homogeneous bridged bis indenyl- or partially hydrogenated bis indenyl-zirconium catalysts, disclosed by Kaminski, et al., *J. Mol. Catal. A: Chemical,* 102 (1995) 59-65; Zambelli, et al., *Macromolecules,* 1988, 21, 617-622; or Dias, et al., *J. Mol. Catal. A: Chemical.* 185 (2002) 57-64 may be used to prepare branched copolymers from single monomers, including ethylene. Higher transition metal catalysts, especially nickel and palladium catalysts are also known to lead to hyper-branched polymers (the branches of which are also branched) as disclosed in Brookhart, et al., *J. Am. Chem. Soc.,* 1995, 117, 64145-6415.

In one embodiment of the invention, the presence of such branching (long chain branching, 1,3-addition, or hyper-branching) in the polymers of the invention can be confined to only the blocks or segments resulting from activity of the first olefin polymerization procatalyst (A). Accordingly, in one embodiment of the disclosure a multi-block copolymer containing blocks or segments differing in the presence of such branching in combination with other segments or blocks substantially lacking such branching (especially high density or highly crystalline polymer blocks), can be produced from a single monomer containing reaction mixture, that is, without the addition of a deliberately added comonomer. Highly preferably, in a specific embodiment of the disclosure, a multi-block copolymer comprising alternating unbranched, ethylene homopolymer segments and branched polyethylene segments, especially ethylene/propylene copolymer segments, may be prepared from an initial reaction mixture consisting essentially of ethylene as the addition polymerizable monomer. The presence of such branching in the multi-block copolymers of the invention can be detected by certain physical properties of the resulting copolymers, such as reduced surface imperfections during melt extrusion (reduced melt fracture), reduced glass transition temperature, Tg, for the amorphous segments compared to a non-branched polymer segment, and/or the presence of 1,3-addition sequences or hyper-branching as detected by NMR techniques. The quantity of the foregoing types of branching present in the polymers of the invention (as a portion of the blocks or segments containing the same), is normally in the range from 0.01 to 10 branches per 1,000 carbons.

Exemplary procatalysts that fall within the scope of the first olefin polymerization procatalyst (A) of the present disclosure include but are not limited to Procatalysts (A1)-(A7), as listed below.

Procatalyst (A1): [N-(2,6-di(1-methylethyl)phenyl) amido)(2-isopropylphenyl) (α-naphthalen-2-diyl(6-pyridin-2-diyl)methane)]hafnium dimethyl] prepared according to the teachings of WO 03/40195 and WO 04/24740 as well as methods known in the art.

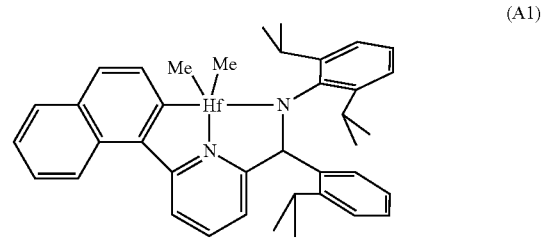

(A1)

Procatalyst (A2): (E)-((2,6-diisopropylphenyl) (2-methyl-3-(octylimino)butan-2-yl)amino)trimethyl hafnium prepared according to methods known in the art.

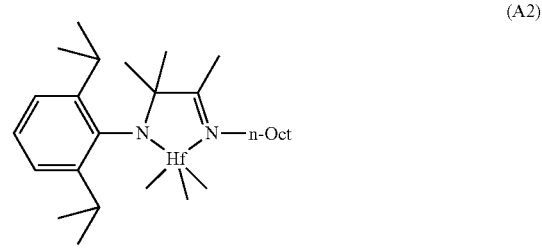

(A2)

Procatalyst (A3): [[2',2'''-[1,2-cyclohexanediylbis(methyleneoxy-κO)]bis[3-(9H-carbazol-9-yl)-5-methyl[1,1'-biphenyl]-2-olato-κO]](2-)]dimethyl hafnium prepared according to methods known in the art.

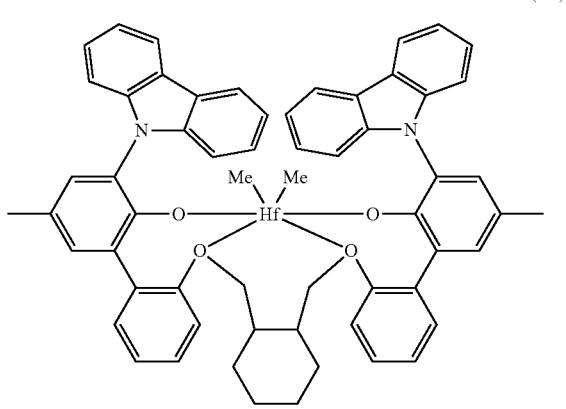

(A3)

Procatalyst (A4): [[6',6'''-[1,4-butanediylbis(oxy-κO)]bis [3-(9H-carbazol-9-yl)-3'-fluoro-5-methyl-[1,1'-biphenyl]-2-olato-κO]](2-)]-dimethyl hafnium prepared according to methods known in the art.

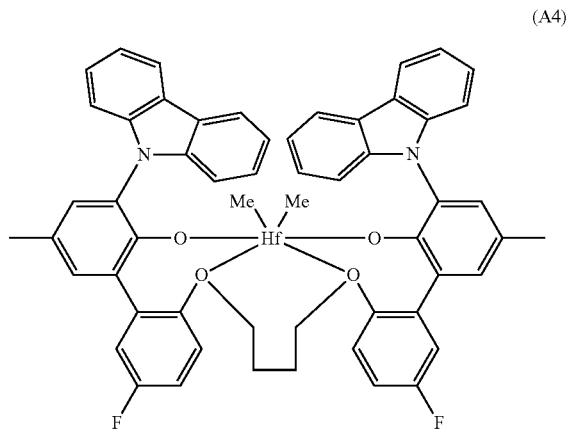

Procatalyst (A5): [[6',6'''-[1,4-butanediylbis(oxy-κO)]bis[3-(9H-carbazol-9-yl)-3'-fluoro-5-octyl-[1,1'-biphenyl]-2-olato-κO]](2-)]-dimethyl hafnium prepared according to methods known in the art.

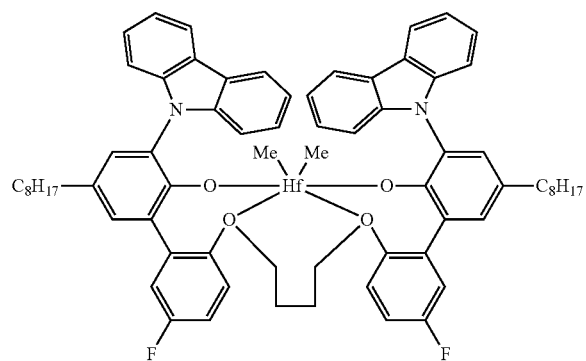

Procatalyst (A6): [[6',6'''-[1,4-butanediylbis(oxy-κO)]bis[3-(9H-carbazol-9-yl)-3'-fluoro-5-(butyldimethylsilyl)-[1,1'-biphenyl]-2-olato-κO]](2-)]-dimethyl hafnium prepared according to methods known in the art.

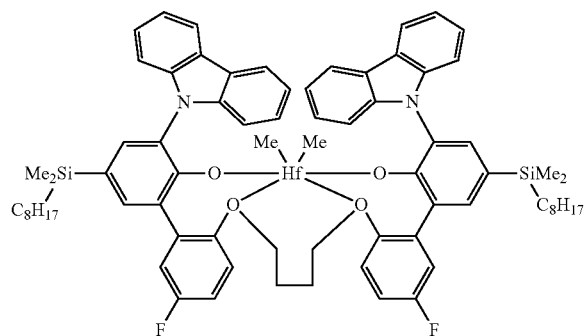

Procatalyst (A7): (N-((6E)-6-(Butylimino-κN)-1-cyclohexen-1-yl)-2,6-bis(1-methylethyl)benzenaminato-κN)trimethyl-hafnium prepared according to the disclosures of WO2010/022228 as well as methods known in the art.

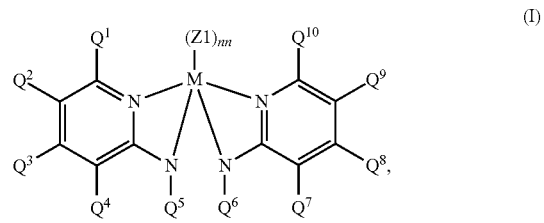

Second Olefin Polymerization Procatalyst (B)

The second olefin polymerization procatalyst (B) of the present disclosure comprises a metal-ligand complex of Formula (I):

wherein M is titanium, zirconium, or hafnium;
wherein each Z1 is independently a monodentate or polydentate ligand that is neutral, monoanionic, or dianionic, wherein nn is an integer, and wherein Z1 and nn are chosen in such a way that the metal-ligand complex of Formula (I) is overall neutral; wherein each $Q^1$ and $Q^{10}$ independently is selected from the group consisting of $(C_6-C_{40})$aryl, substituted $(C_6-C_{40})$aryl, $(C_3-C_{40})$heteroaryl, and substituted $(C_3-C_{40})$heteroaryl;
wherein each $Q^2$, $Q^3$, $Q^4$, $Q^7$, $Q^8$, and $Q^9$ independently is selected from a group consisting of hydrogen, $(C_1-C_{40})$hydrocarbyl, substituted $(C_1-C_{40})$hydrocarbyl, $(C_1-C_{40})$heterohydrocarbyl, substituted $(C_1-C_{40})$heterohydrocarbyl, halogen, and nitro ($NO_2$);
wherein each $Q^1$ and $Q^6$ independently is selected from the group consisting of a $(C_1-C_{40})$alkyl, substituted $(C_1-C_{40})$alkyl, and $[(Si)_1—(C+Si)_{40}]$ substituted organosilyl;
wherein each N independently is nitrogen;
optionally, two or more of the $Q^{1-5}$ groups can combine together to form a ring structure, with such ring structure having from 5 to 16 atoms in the ring excluding any hydrogen atoms; and
optionally, two or more of the $Q^{6-10}$ groups can combine together to form a ring structure, with such ring structure having from 5 to 16 atoms in the ring excluding any hydrogen atoms.

In certain embodiments, the second olefin polymerization procatalyst (B) is the hard block/segment catalyst (i.e., low comonomer incorporator) of the olefin block copolymers of the present disclosure.

The metal ligand complex of Formula (I) above, and all specific embodiments thereof herein, is intended to include every possible stereoisomer, including coordination isomers, thereof.

The metal ligand complex of Formula (I) above provides for homoleptic as well as heteroleptic procatalyst components.

In an alternative embodiment, each of the $(C_1-C_{40})$ hydrocarbyl and $(C_1-C_{40})$ heterohydrocarbyl of any one or more of $Q^1$, $Q^2$, $Q^3$, $Q^4$, $Q^5$, $Q^6$, $Q^7$, $Q^8$, $Q^9$ and $Q^{10}$ each independently is unsubstituted or substituted with one or more $R^S$ substituents, and wherein each $R^S$ independently is a halogen atom, polyfluoro substitution, perfluoro substitution, unsubstituted $(C_1-C_{18})$alkyl, $(C_6-C_{18})$aryl, $F_3C$, $FCH_2O$, $F_2HCO$, $F_3CO$, $(R^{C1})_3Si$, $(R^{C1})_3Ge$, $(R^{C1})O$, $(R^{C1})S$, $(R^{C1})S(O)$, $(R^{C1})S(O)_2$, $(R^{C1})_2P$, $(R^{C1})_2N$, $(R^{C1})_2C=N$, $NC$, $NO_2$, $(R^{C1})C(O)O$, $(R^{C1})OC(O)$, $(R^{C1})C(O)N(R^{C1})$, or $(R^{C1})_2NC(O)$, or two of the $R^S$ are taken together to form an unsubstituted $(C_1-C_{18})$alkylene where each $R^S$ independently is an unsubstituted $(C_1-C_{18})$alkyl, and wherein independently each $R^{C1}$ is hydrogen, unsubstituted $(C_1-C_{18})$ hydrocarbyl or an unsubstituted $(C_1-C_{18})$heterohydrocarbyl, or absent (e.g., absent when N comprises —N=). In particular embodiments, $Q^5$ and $Q^6$ are each independently $(C_1-C_{40})$ primary or secondary alkyl groups with respect to their connection to the amine nitrogen of the parent ligand structure. The terms primary and secondary alkyl groups are given their usual and customary meaning herein; i.e., primary indicating that the carbon atom directly linked to the ligand nitrogen bears at least two hydrogen atoms and secondary indicates that the carbon atom directly linked to the ligand nitrogen bears only one hydrogen atom.

Optionally, two or more $Q^{1-5}$ groups or two or more $Q^{6-10}$ groups each independently can combine together to form ring structures, with such ring structures having from 5 to 16 atoms in the ring excluding any hydrogen atoms.

In preferred embodiments, $Q^5$ and $Q^6$ are each independently $(C_1-C_{40})$ primary or secondary alkyl groups and most preferably, $Q^5$ and $Q^6$ are each independently propyl, isopropyl, neopentyl, hexyl, isobutyl and benzyl.

In particular embodiments, $Q^1$ and $Q^{10}$ of the olefin polymerization procatalyst of Formula (I) are substituted phenyl groups; as shown in Formula (II),

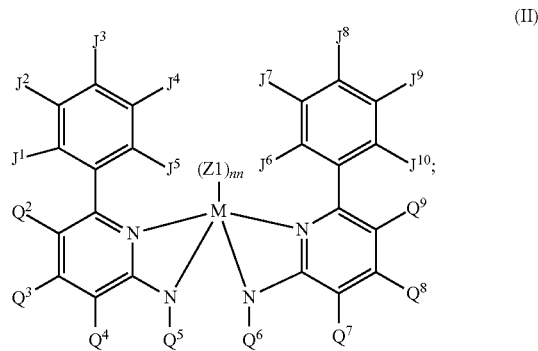

(II)

wherein $J^1-J^{10}$ are each independently selected from the group consisting of $R^S$ substituents and hydrogen; and wherein each $R^S$ independently is a halogen atom, polyfluoro substitution, perfluoro substitution, unsubstituted $(C_1-C_{18})$alkyl, $(C_6-C_{18})$aryl, $F_3C$, $FCH_2O$, $F_2HCO$, $F_3CO$, $(R^{C1})_3Si$, $(R^{C1})_3Ge$, $(R^{C1})O$, $(R^{C1})S$, $(R^{C1})S(O)$, $(R^{C1})S(O)_2$, $(R^{C1})_2P$, $(R^{C1})_2N$, $(R^{C1})_2C=N$, $NC$, $NO_2$, $(R^{C1})C(O)O$, $(R^{C1})OC(O)$, $(R^{C1})C(O)N(R^{C1})$, or $(R^{C1})_2NC(O)$, or two of the $R^S$ are taken together to form an unsubstituted $(C_1-C_{18})$alkylene where each $R^S$ independently is an unsubstituted $(C_1-C_{18})$alkyl, and wherein independently each $R^{C1}$ is hydrogen, unsubstituted $(C_1-C_{18})$hydrocarbyl or an unsubstituted $(C_1-C_{18})$heterohydrocarbyl, or absent (e.g., absent when N comprises —N=). More preferably, $J^1$, $J^5$, $J^6$ and $J^{10}$ of Formula (II) are each independently selected from the group consisting of halogen atoms, $(C_1-C_8)$ alkyl groups, and $(C_1-C_8)$ alkoxyl groups. Most preferably, $J^1$, $J^5$, $J^6$ and $J^{10}$ of Formula (II) are each independently methyl; ethyl or isopropyl.

When used to describe certain carbon atom-containing chemical groups (e.g., $(C_1-C_{40})$alkyl), the parenthetical expression $(C_1-C_{40})$ can be represented by the form "$(C_x-C_y)$," which means that the unsubstituted version of the chemical group comprises from a number x carbon atoms to a number y carbon atoms, wherein each x and y independently is an integer as described for the chemical group. The $R^S$ substituted version of the chemical group can contain more than y carbon atoms depending on nature of $R^S$. Thus, for example, an unsubstituted $(C_1-C_{40})$alkyl contains from 1 to 40 carbon atoms (x=1 and y=40). When the chemical group is substituted by one or more carbon atom-containing $R^S$ substituents, the substituted $(C_x-C_y)$ chemical group may comprise more than y total carbon atoms; i.e., the total number of carbon atoms of the carbon atom-containing substituent(s)-substituted $(C_x-C_y)$ chemical group is equal to y plus the sum of the number of carbon atoms of each of the carbon atom-containing substituent(s). Any atom of a chemical group that is not specified herein is understood to be a hydrogen atom.

In some embodiments, each of the chemical groups (e.g., $Q^{1-10}$) of the metal-ligand complex of Formula (I) may be unsubstituted, that is, can be defined without use of a substituent $R^S$, provided the above-mentioned conditions are satisfied. In other embodiments, at least one of the chemical groups of the metal-ligand complex of Formula (I) independently contain one or more of the substituents $R^S$. Where the compound contains two or more substituents $R^S$, each $R^S$ independently is bonded to a same or different substituted chemical group. When two or more $R^S$ are bonded to a same chemical group, they independently are bonded to a same or different carbon atom or heteroatom, as the case may be, in the same chemical group up to and including persubstitution of the chemical group.

The term "persubstitution" means each hydrogen atom (H) bonded to a carbon atom or heteroatom of a corresponding unsubstituted compound or functional group, as the case may be, is replaced by a substituent (e.g., $R^S$). The term "polysubstitution" means each of at least two, but not all, hydrogen atoms (H) bonded to carbon atoms or heteroatoms of a corresponding unsubstituted compound or functional group, as the case may be, is replaced by a substituent (e.g., $R^S$). The term "monosubstitution" means that only one hydrogen atom (H) bonded to a carbon atom or heteroatom of a corresponding unsubstituted compound or functional group, as the case may be, is replaced by a substituent (e.g., $R^S$).

As used herein, the definitions of the terms hydrocarbyl, heterohydrocarbyl, hydrocarbylene, heterohydrocarbylene, alkyl, alkylene, heteroalkyl, heteroalkylene, aryl, arylene, heteroaryl, heteroarylene, cycloalkyl, cycloalkylene, heterocycloalkyl, and heterocycloalkylene are intended to include every possible stereoisomer.

As used herein, the term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, wherein each hydrocarbon radical and diradical independently is aromatic (6 carbon atoms or more) or non-aromatic, saturated or unsaturated, straight chain or branched chain, cyclic (including mono- and polycyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

Preferably, a $(C_1-C_{40})$hydrocarbyl independently is an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. All individual values and subranges from 1 to 40 carbons in the $(C_1-C_{40})$hydrocarbyl are included and disclosed herein; for example, the number of carbon atoms in the $(C_1-C_{40})$hydrocarbyl may range from an upper limit of 40 carbon atoms, preferably 30 carbon atoms, more preferably 20 carbon atoms, more preferably 15 carbon atoms, more preferably 12 carbon atoms and most preferably 10 carbon atoms. For example, the $(C_1-C_{40})$hydrocarbyl includes $(C_1-C_{40})$hydrocarbyl groups, $(C_1-C_{30})$hydrocarbyl) groups, $(C_1-C_{20})$hydrocarbyl) groups, $(C_1-C_{15})$hydrocarbyl) groups, $(C_1-C_{12})$hydrocarbyl) groups, $(C_1-C_{10})$hydrocarbyl) groups. $(C_{10}-C_{30})$hydrocarbyl) groups, $(C_{15}-C_{40})$hydrocarbyl) groups, $(C_5-C_{25})$hydrocarbyl) groups, or $(C_{15}-C_{25})$hydrocarbyl) groups.

The term "$(C_1-C_{40})$alkyl" means a saturated straight or branched hydrocarbon radical of from 1 to 40 carbon atoms, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 2,2-dimethylpropyl, 1-butyl; 2-butyl; 2-methylpropyl; 1,1-dimethylethyl; 1-pentyl; 1-hexyl; 2-ethylhexyl, 1-heptyl; 1-nonyl; and 1-decyl; 2,2,4-trimethylpentyl. Examples of substituted $(C_1-C_{40})$alkyl are substituted $(C_1-C_{20})$alkyl; substituted $(C_1-C_{10})$alkyl; trifluoromethyl; trimethylsilylmethyl; methoxymethyl; dimethylaminomethyl; trimethylgermylmethyl; phenylmethyl (benzyl); 2-phenyl-2,2-methylethyl; 2-(dimethylphenylsilyl)ethyl; and dimethyl(t-butyl)silylmethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein one ring is aromatic and the optional second and third rings independently are fused or non-fused and the second and third rings are each independently optionally aromatic. Examples of unsubstituted $(C_6-C_{40})$aryl are unsubstituted $(C_6-C_{20})$aryl; unsubstituted $(C_6-C_{18})$aryl; phenyl; biphenyl; ortho-terphenyl; meta-terphenyl; fluorenyl; tetrahydrofluorenyl; indacenyl; hexahydroindacenyl; indenyl; dihydroindenyl; naphthyl; tetrahydronaphthyl; phenanthrenyl and triptycenyl. Examples of substituted $(C_6-C_{40})$aryl are substituted $(C_6-C_{20})$aryl; substituted $(C_6-C_{18})$aryl; 2,6-bis[$(C_1-C_{20})$alkyl]-phenyl; 2-$(C_1-C_5)$alkyl-phenyl; 2,6-bis$(C_1-C_5)$alkyl-phenyl; 2,4,6-tris$(C_1-C_5)$alkyl-phenyl; polyfluorophenyl; pentafluorophenyl; 2,6-dimethylphenyl; 2,6-diisopropylphenyl; 2,4,6-triisopropylphenyl; 2,4,6-trimethylphenyl; 2-methyl-6-trimethylsilylphenyl; 2-methyl-4,6-diisopropylphenyl; 4-methoxyphenyl; and 4-methoxy-2,6-dimethylphenyl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_3-C_{12})$alkyl)) are defined in an analogous manner. Examples of unsubstituted $(C_3-C_{40})$cycloalkyl are unsubstituted $(C_3-C_{20})$cycloalkyl; unsubstituted $(C_3-C_{10})$cycloalkyl; cyclopropyl; cyclobutyl; cyclopentyl; cyclohexyl; cycloheptyl; cyclooctyl; cyclononyl; cyclodecyl; cyclopentyl; cyclohexyl; octahydroindenyl; bicyclo[4.4.0]decyl; bicyclo[2.2.1]heptyl; and tricyclo[3.3.1.1]decyl. Examples of substituted $(C_3-C_{40})$cycloalkyl are substituted $(C_3-C_{20})$cycloalkyl; substituted $(C_3-C_{10})$cycloalkyl; 2-methylcyclohexyl; and perfluorocyclohexyl.

Examples of $(C_1-C_{40})$hydrocarbylene are unsubstituted or substituted $(C_3-C_{40})$hydrocarbylene; $(C_6-C_{40})$arylene, $(C_3-C_{40})$cycloalkylene, and $(C_3-C_{40})$alkylene (e.g., (C3-C20) alkylene). In some embodiments, the diradicals are on the terminal atoms of the hydrocarbylene as in a 1,3-alpha, omega diradical (e.g., —CH$_2$CH$_2$CH$_2$—) or a 1,5-alpha, omega diradical with internal substitution (e.g., —CH$_2$CH$_2$CH(CH$_3$)CH$_2$CH$_2$—). In other embodiments, the diradicals are on the non-terminal atoms of the hydrocarbylene as in a C$_7$ 2,6-diradical (e.g.,

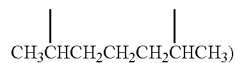

or a C$_7$ 2,6-diradical with internal substitution (e.g.,

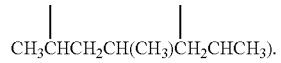

The terms "$(C_1-C_{40})$heterohydrocarbyl" and "$(C_1-C_{40})$heterohydrocarbylene" mean a heterohydrocarbon radical or diradical, respectively, of from 1 to 40 carbon atoms, and each heterohydrocarbon independently has one or more heteroatoms or heteroatomic groups O; S; N; S(O); S(O)$_2$; S(O)$_2$N; Si(R$^{C1}$)$_2$; Ge(R$^{C1}$)$_2$; P(R$^{C1}$); P(O)(R$^{C1}$); and N(R$^{C1}$), wherein independently each R$^{C1}$ is hydrogen, unsubstituted $(C_1-C_{18})$hydrocarbyl or an unsubstituted $(C_1-C_{18})$heterohydrocarbyl, or absent (e.g., absent when N comprises —N=). Each $(C_1-C_{40})$heterohydrocarbyl and $(C_1-C_{40})$heterohydrocarbylene independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

The term "$(C_1-C_{40})$alkylene" means a saturated or unsaturated straight chain or branched chain diradical of from 1 to 40 carbon atoms that is unsubstituted or substituted by one or more $R^S$. Examples of unsubstituted $(C_1-C_{40})$alkylene are unsubstituted $(C_3-C_{20})$alkylene, including unsubstituted 1,3-$(C_3-C_{10})$alkylene; 1,4-$(C_4-C_{10})$alkylene; —(CH$_2$)$_3$—; —(CH$_2$)$_4$—; —(CH$_2$)$_5$—; —(CH$_2$)$_6$—; —(CH$_2$)$_7$—; —(CH$_2$)$_8$—; and —(CH$_2$)$_4$CH(CH$_3$)—. Examples of substituted $(C_1-C_{40})$alkylene are substituted $(C_3-C_{20})$alkylene; —CF$_2$CF$_2$CF$_2$—; and —(CH$_2$)$_{14}$C(CH$_3$)$_2$(CH$_2$)$_5$— (i.e., a 6,6-dimethyl substituted normal-1,20-eicosylene). Since as mentioned previously two R$^S$ may be taken together to form a $(C_1-C_{40})$alkylene, examples of substituted $(C_1-C_{40})$alkylene also include 1,2-bis(methylene)cyclopentane; 1,2-bis(methylene)cyclohexane; 2,3-bis(methylene)-7,7-dimethylbicyclo[2.2.1]heptane; and 2,3-bis(methylene)bicyclo[2.2.2]octane.

The term "$(C_3-C_{40})$cycloalkylene" means a cyclic diradical (i.e., the radicals are on ring atoms) of from 3 to 40 carbon atoms that is unsubstituted or substituted by one or more $R^S$. Connection of the chelating substituents to a cycloalkylene $Q^3$ group of Formula (I) must also satisfy the requirement that there be at least three atoms in the shortest chain connecting the bridged N atoms of Formula (I).

Examples of unsubstituted $(C_3-C_{40})$cycloalkylene are 1,3-cyclobutylene, 1,3-cyclopentylene, and 1,4-cyclohexylene. Examples of substituted $(C_3-C_{40})$cycloalkylene are 2-trimethylsilyl-1,4-cyclohexylene and 1,2-dimethyl-1,3-cyclohexylene.

Preferably, the $(C_1-C_{40})$heterohydrocarbyl independently is unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si$(R^{C1})_2$—, $(C_1-C_{40})$hydrocarbyl-Ge$(R^{C1})_2$—, $(C_1-C_{40})$hydrocarbyl-N$(R^{C1})$—, $(C_1-C_{40})$hydrocarbyl-P$(R^{C1})$—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene, wherein independently each $R^{C1}$ is hydrogen, unsubstituted $(C_1-C_{18})$hydrocarbyl or an unsubstituted $(C_1-C_{18})$heterohydrocarbyl, or absent (e.g., absent when N comprises —N=). The term "$(C_1-C_{40})$heteroaryl" means an unsubstituted or substituted (by one or more $R^S$) mono-, bi- or tricyclic heteroaromatic hydrocarbon radical of from 1 to 40 total carbon atoms and from 1 to 6 heteroatoms, and the mono-, bi- or tricyclic radical comprises 1, 2 or 3 rings, respectively, wherein one ring is heteroaromatic and the optional second and third rings independently are fused or non-fused; and the second or third rings are each independently optionally heteroaromatic. Other heteroaryl groups (e.g., $(C_3-C_{12})$heteroaryl)) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P, and preferably O, S, or N. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 3 to 5 carbon atoms and 1 to 3 heteroatoms, the heteroatoms being N or P, and preferably N. Examples of 6-membered ring heteroaromatic hydrocarbon radical are pyridine-2-yl; pyrimidin-2-yl; and pyrazin-2-yl, triazinyl. The bicyclic heteroaromatic hydrocarbon radical preferably is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical preferably is a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$[(Si)_1$—$(C+Si)_{40}]$ substituted organosilyl" means a substituted silyl radical with 1 to 40 silicon atoms and 0 to 39 carbon atoms such that the total number of carbon plus silicon atoms is between 1 and 40. Examples of $[(Si)_1$—$(C+Si)_{40}]$ substituted organosilyl include trimethylsilyl, triisopropylsilyl, dimethylphenylsilyl, diphenylmethylsilyl, triphenylsilyl, and triethylsilyl.

In some embodiments the $(C_3-C_{40})$heteroaryl is 2,7-disubstituted carbazolyl or 3,6-disubstituted carbazolyl, more preferably wherein each $R^S$ independently is phenyl, methyl, ethyl, isopropyl, or tertiary-butyl, still more preferably 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

As used herein, "heteroalkyl" and "heteroalkylene" groups are saturated straight or branched chain radicals or diradicals, respectively, containing $(C_1-C_{40})$carbon atoms, and one or more of the heteroatoms or heteroatomic groups O; S; N; S(O); S(O)$_2$; S(O)$_2$N; Si$(R^{C1})_2$; Ge$(R^{C1})_2$; P$(R^{C1})$; P(O)$(R^{C1})$; and N$(R^{C1})$, as defined above, wherein each of the heteroalkyl and heteroalkylene groups independently are unsubstituted or substituted by one or more $R^S$, and wherein independently each $R^{C1}$ is hydrogen, unsubstituted $(C_1-C_{18})$hydrocarbyl or an unsubstituted $(C_1-C_{18})$heterohydrocarbyl, or absent (e.g., absent when N comprises —N=). Examples of substituted and unsubstituted heteroalkyl groups are methoxyl; ethoxyl; trimethylsilyl; dimethylphenylsilyl; tert-butyldimethylsilyl; and dimethylamino.

A heteroalkyl group may optionally be cyclic, i.e. a heterocycloalkyl group. Examples of unsubstituted $(C_3-C_{40})$heterocycloalkyl are unsubstituted $(C_3-C_{20})$heterocycloalkyl, unsubstituted $(C_3-C_{10})$heterocycloalkyl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" means fluorine atom (F), chlorine atom (Cl), bromine atom (Br), or iodine atom (I) radical. Preferably each halogen atom independently is the Br, F, or Cl radical, and more preferably the F or Cl radical. The term "halide" means fluoride (F$^-$), chloride (Cl$^-$), bromide (Br$^-$), or iodide (I$^-$) anion.

Preferably, there are no O—O, S—S, or O—S bonds, other than O—S bonds in an S(O) or S(O)$_2$ diradical functional group, in the metal-ligand complex of Formula (I). More preferably, there are no O—O, P—P, S—S, or O—S bonds, other than O—S bonds in an S(O) or S(O)$_2$ diradical functional group, in the metal-ligand complex of Formula (I).

The term "saturated" means lacking carbon-carbon double bonds, carbon-carbon triple bonds, and (in heteroatom-containing groups) carbon-nitrogen, carbon-phosphorous, and carbon-silicon double bonds and carbon-nitrogen triple bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, and carbon nitrogen triple bonds, not including any such double or triple bonds that may be present in substituents $R^S$, if any, or in (hetero)aromatic rings, if any.

M is titanium, zirconium, or hafnium. In one embodiment, M is titanium. In another embodiment, M is zirconium. In another embodiment, M is hafnium. In some embodiments, M is in a formal oxidation state of +2, +3, or +4. Each Z1 independently is a monodentate or polydentate ligand that is neutral, monoanionic, or dianionic. Z1 and nn are chosen in such a way that the metal-ligand complex of Formula (I) is, overall, neutral. In some embodiments each Z1 independently is the monodentate ligand. In one embodiment when there are two or more Z1 monodentate ligands, each Z1 is the same. In some embodiments the monodentate ligand is the monoanionic ligand. The monoanionic ligand has a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, borate, borohydride, sulfate, HC(O)O—, alkoxide or aryloxide (RO⁻), $(C_1-C_{40})$hydrocarbylC(O)O—, HC(O)N(H)—, $(C_1-C_{40})$hydrocarbylC(O)N(H)—, $(C_1-C_{40})$hydrocarbylC(O)N($(C_1-C_{20})$hydrocarbyl)—, $R^KR^LB^-$, $R^KR^LN^-$, $R^KO^-$, $R^KS^-$, $R^KR^LP^-$, or $R^MR^KR^LSi^-$, wherein each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{40})$heterohydrocarbylene and $R^M$ is as defined above.

In some embodiments at least one monodentate ligand of Z1 independently is the neutral ligand. In one embodiment, the neutral ligand is a neutral Lewis base group that is $R^{X1}NR^KR^L$, $R^KOR^L$, $R^KSR^L$, or $R^{X1}PR^KR^L$, wherein each $R^{X1}$ independently is hydrogen, $(C_1-C_{40})$hydrocarbyl, $[(C_1-C_{10})$hydrocarbyl$]_3$Si, $[(C_1-C_{10})$hydrocarbyl$]_3$Si$(C_1-C_{10})$hydrocarbyl, or $(C_1-C_{40})$heterohydrocarbyl and each $R^K$ and $R^L$ independently is as defined above.

In some embodiments, each Z1 is a monodentate ligand that independently is a halogen atom, unsubstituted $(C_1-C_{20})$hydrocarbyl, unsubstituted $(C_1-C_{20})$hydrocarbylC(O)O—, or $R^KR^LN$— wherein each of $R^K$ and $R^L$ independently is an unsubstituted $(C_1-C_{20})$hydrocarbyl. In some embodiments each monodentate ligand Z1 is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^KR^LN$— wherein each of $R^K$ and $R^L$ independently is an unsubstituted $(C_1-C_{10})$hydrocarbyl.

In some embodiments there are at least two Z1s and the two Z1s are taken together to form the bidentate ligand. In some embodiments the bidentate ligand is a neutral bidentate ligand. In one embodiment, the neutral bidentate ligand is a diene of Formula $(R^{D1})_2C=C(R^{D1})-C(R^{D1})=C(R^{D1})_2$, wherein each $R^{D1}$ independently is H, unsubstituted $(C_1-C_6)$alkyl, phenyl, or naphthyl. In some embodiments the bidentate ligand is a monoanionic-mono(Lewis base) ligand. The monoanionic-mono(Lewis base) ligand may be a 1,3-dionate of Formula (D): $R^{E1}-C(O^-)=CH-C(=O)-R^{E1}$ (D), wherein each $R^{E1}$ independently is H, unsubstituted $(C_1-C_6)$alkyl, phenyl, or naphthyl. In some embodiments the bidentate ligand is a dianionic ligand. The dianionic ligand has a net formal oxidation state of −2. In one embodiment, each dianionic ligand independently is carbonate, oxalate (i.e., $^-O_2CC(O)O^-$), $(C_2-C_{40})$hydrocarbylene dicarbanion, $(C_1-C_4)$heterohydrocarbylene dicarbanion, phosphate, or sulfate.

As previously mentioned, number and charge (neutral, monoanionic, dianionic) of Z1 are selected depending on the formal oxidation state of M such that the metal-ligand complex of Formula (I) is, overall, neutral.

In some embodiments each Z1 is the same, wherein each Z1 is methyl; isobutyl; neopentyl; neophyl; trimethylsilylmethyl; phenyl; benzyl; or chloro. In some embodiments nn is 2 and each Z1 is the same.

In some embodiments at least two Z1 are different. In some embodiments, each Z1 is a different one of methyl; isobutyl; neopentyl; neophyl; trimethylsilylmethyl; phenyl; benzyl; and chloro.

In one embodiment, the metal-ligand complex of Formula (I) is a mononuclear metal complex. In another embodiment, olefin polymerization catalyst systems of the present invention demonstrate reversible chain transfer indicative of chain shuttling behavior in the presence of appropriate chain shuttling agents. Such combination of attributes is particularly of interest in the preparation of olefin block copolymers. In general, the ability to tune alpha-olefin incorporation and thus short-chain branching distribution is critical to accessing materials with performance differentiation.

In some embodiments the metal-ligand complex of Formula (I) is a metal-ligand complex of Formula (II):

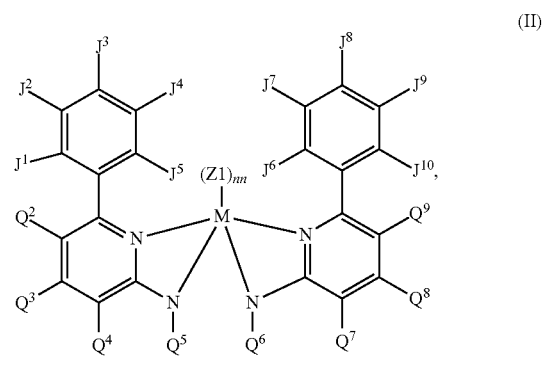

(II)

wherein $J^1$-$J^{10}$ are each independently selected from the group consisting of $R^S$ substituents (as defined above) and hydrogen.

In a particular embodiment, $J^1$, $J^5$, $J^6$ and $J^{10}$ of Formula (II) are each independently selected from the group consisting of halogen atoms, $(C_1-C_8)$ alkyl groups, and $(C_1-C_8)$ alkoxyl groups.

Structures exemplifying metal-ligand complexes described by Formula (I) are shown below:

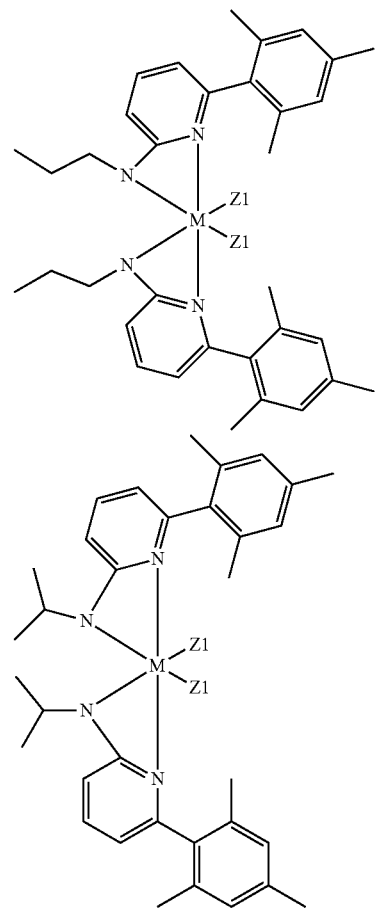

57
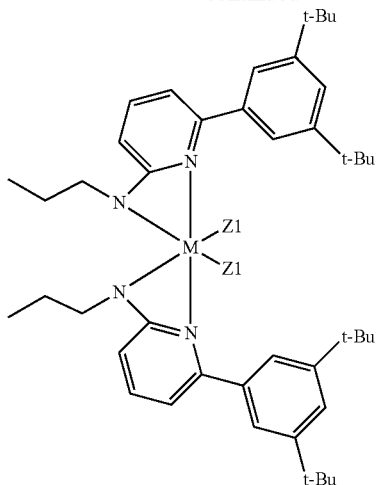
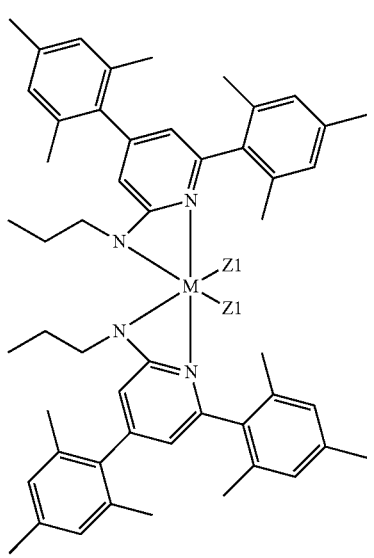
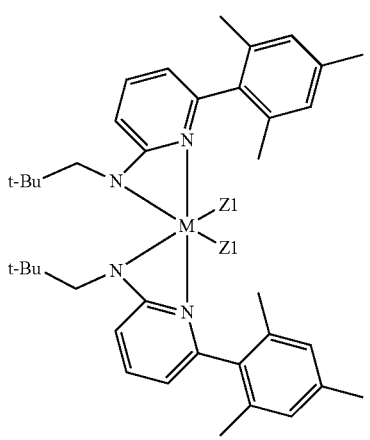
58
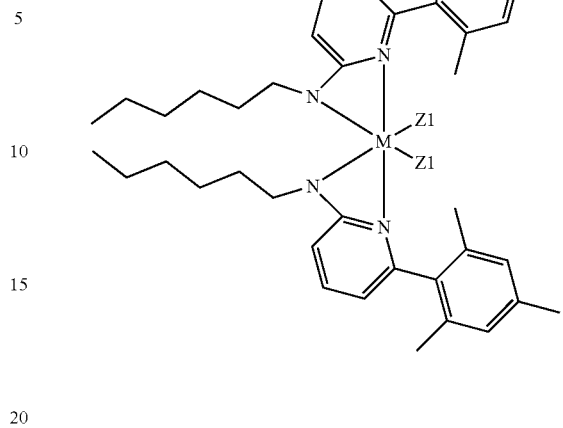
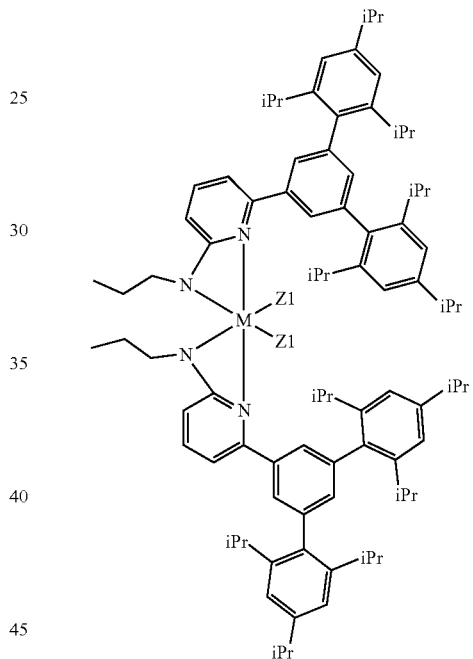
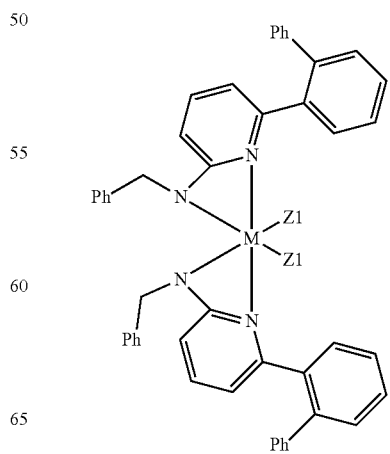

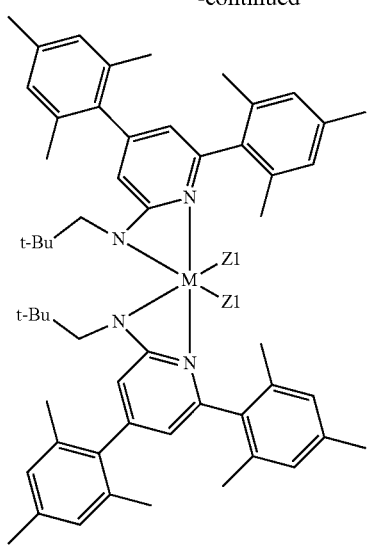
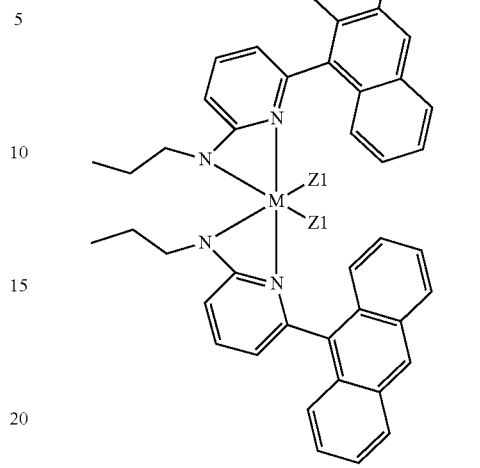
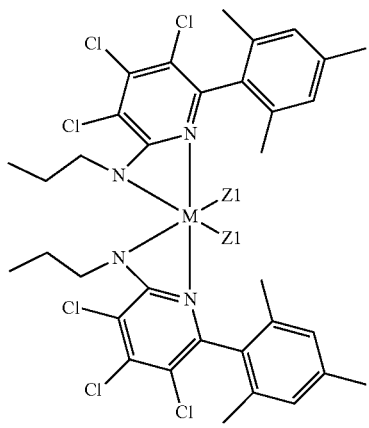
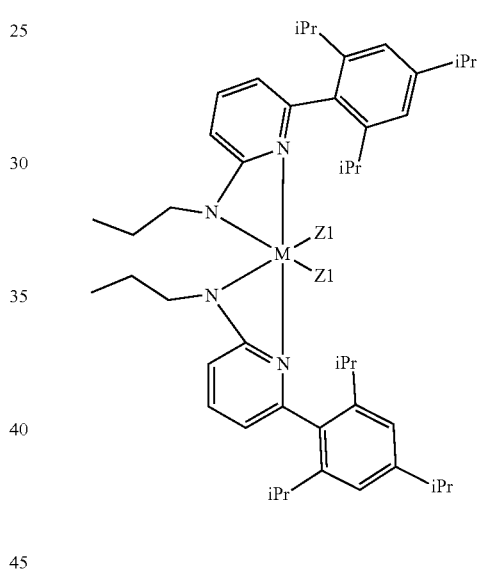
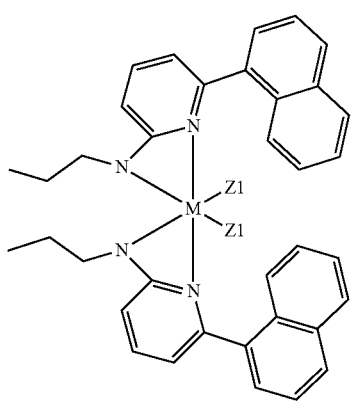
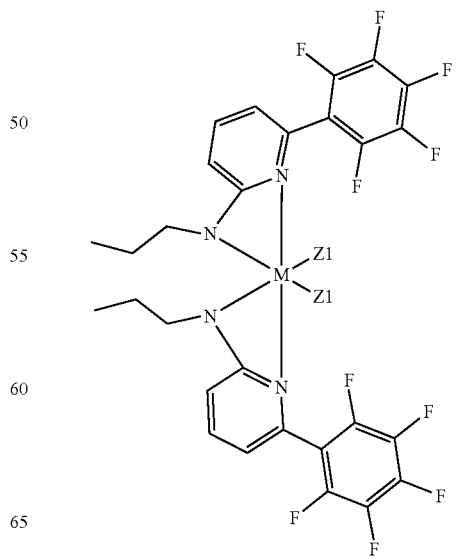

-continued
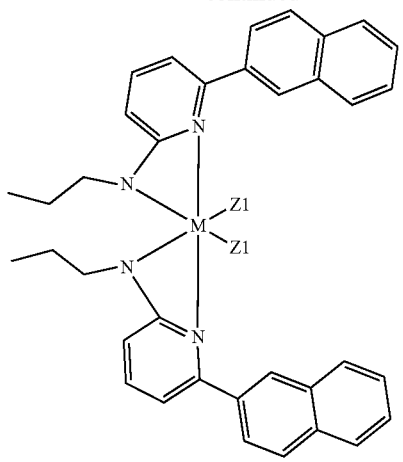
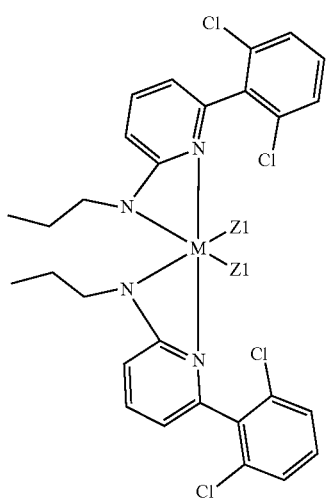
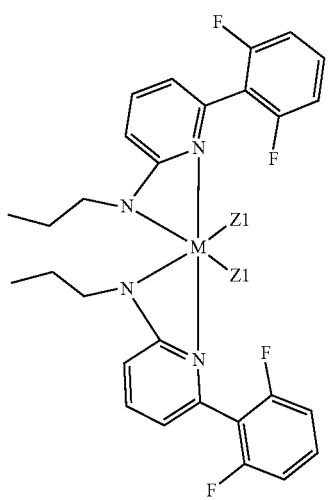
-continued
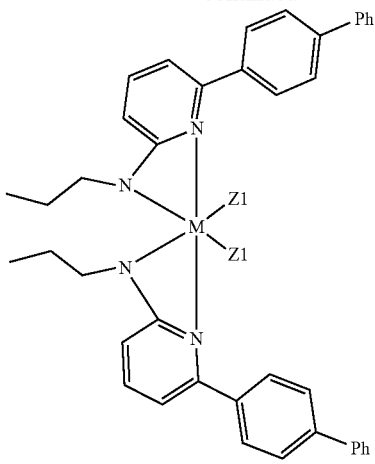
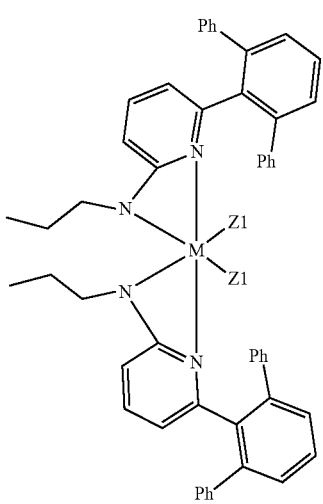
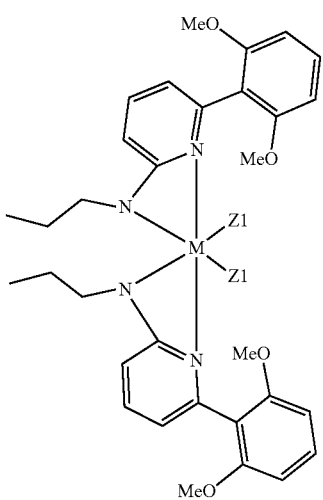

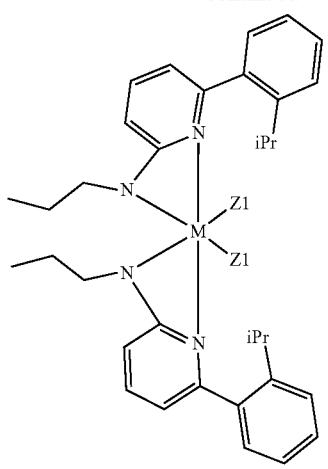
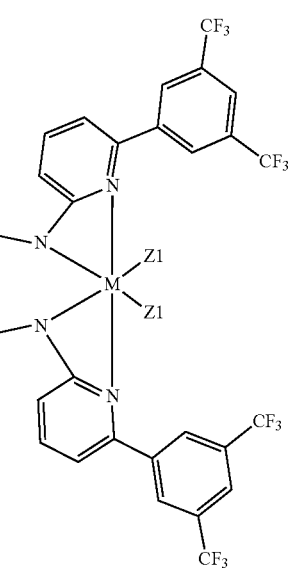
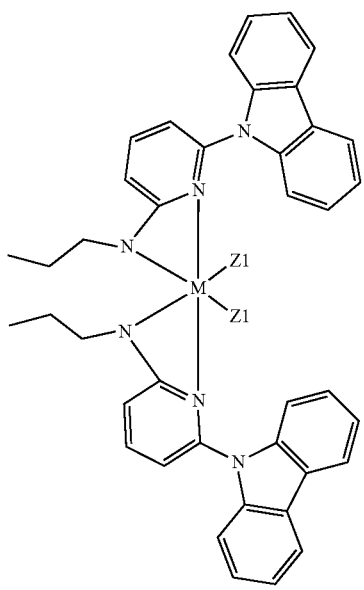
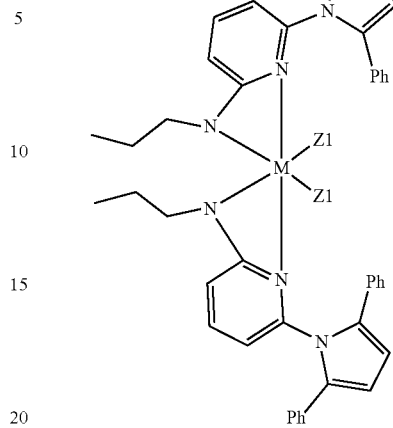
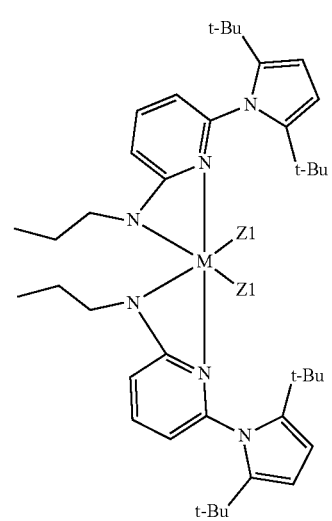
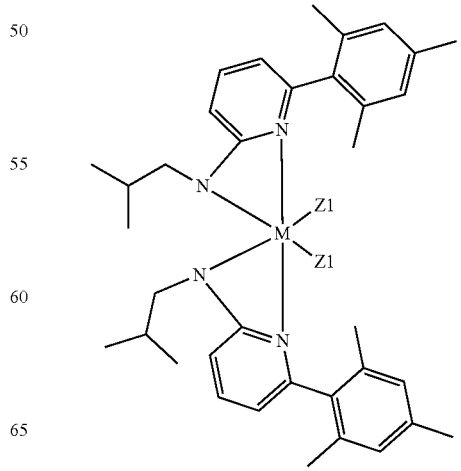

65
-continued
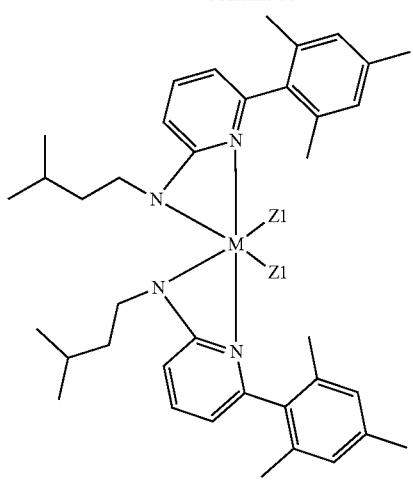
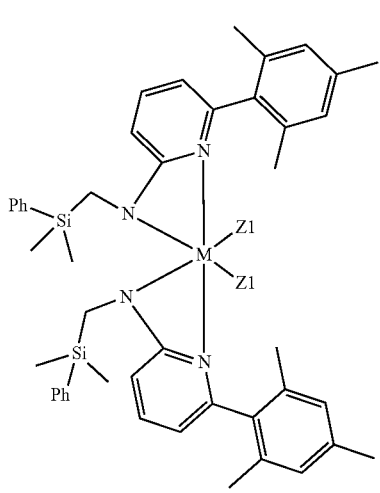
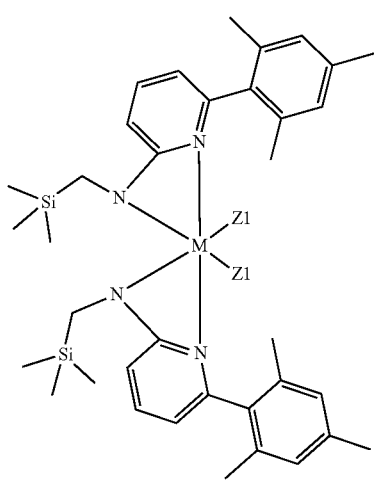
66
-continued
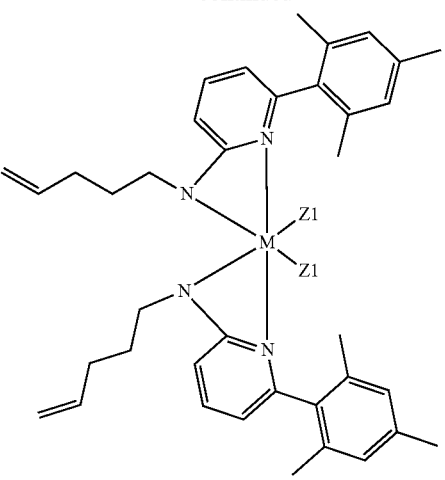
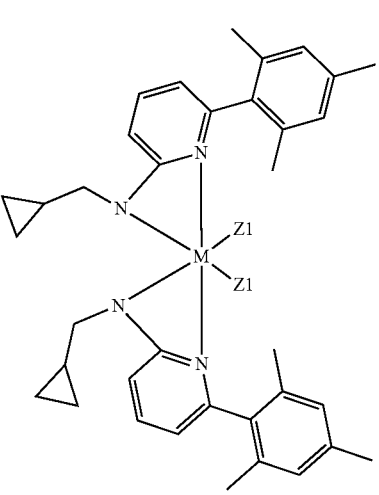
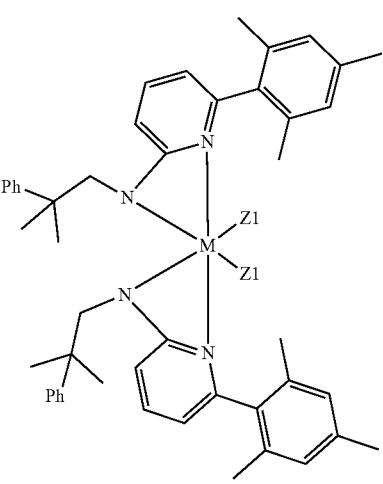

67
-continued
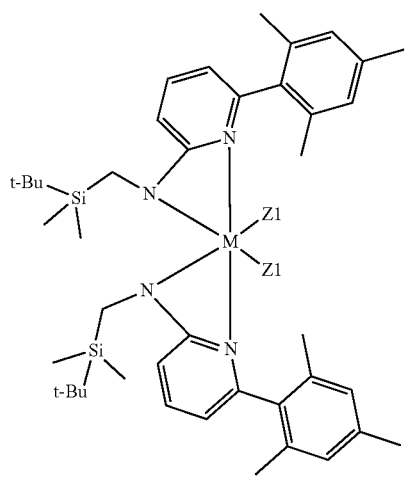
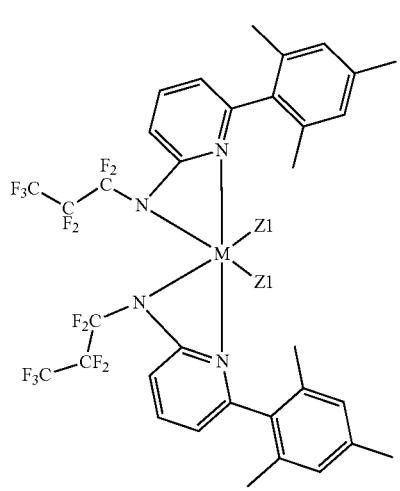
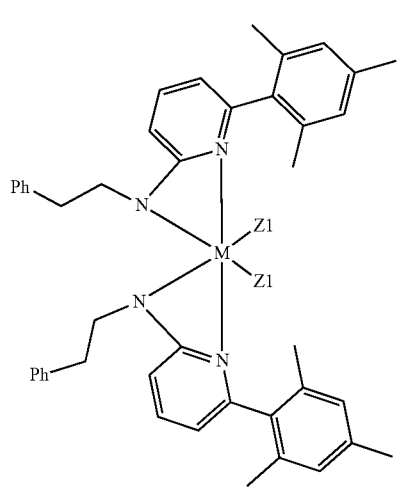
68
-continued
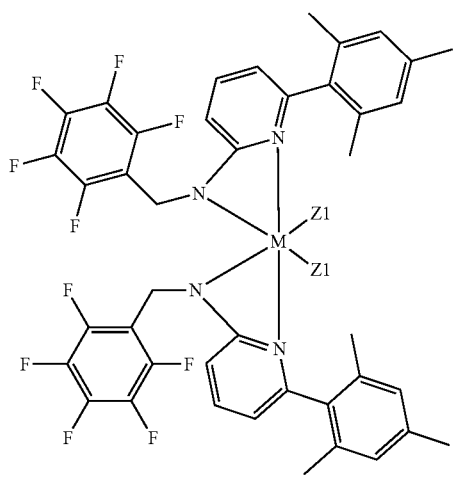
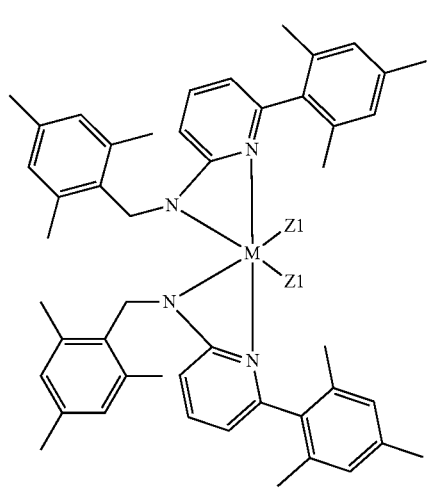
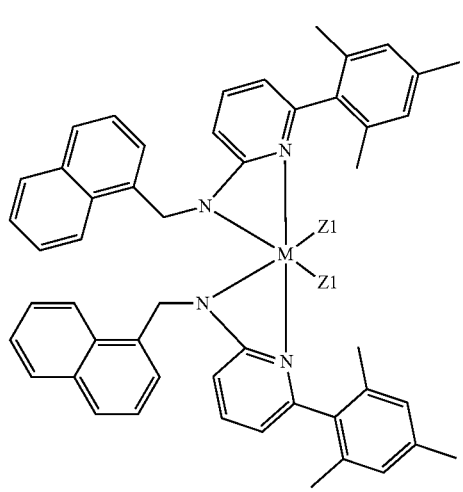

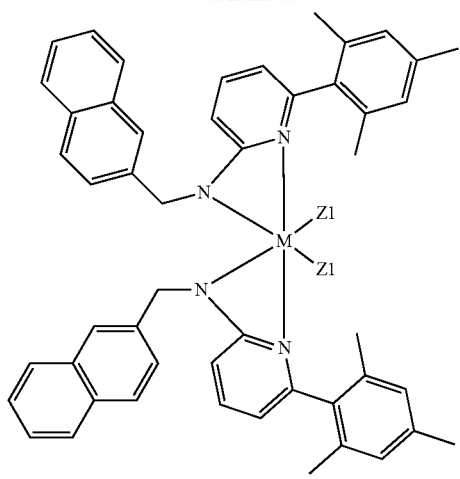
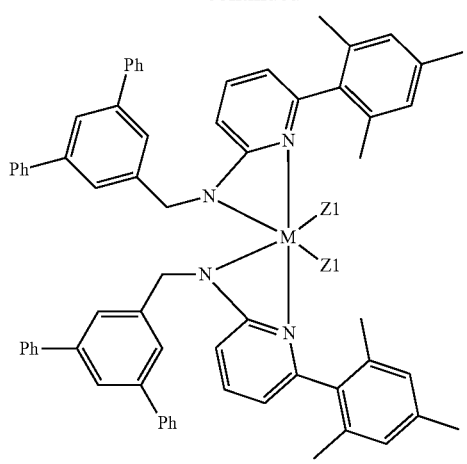
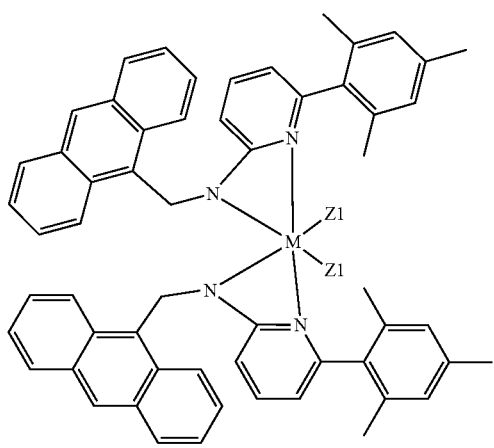
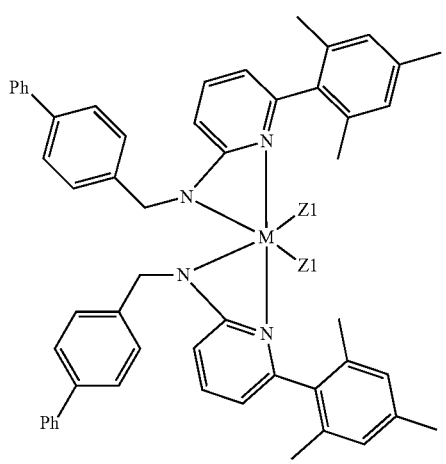
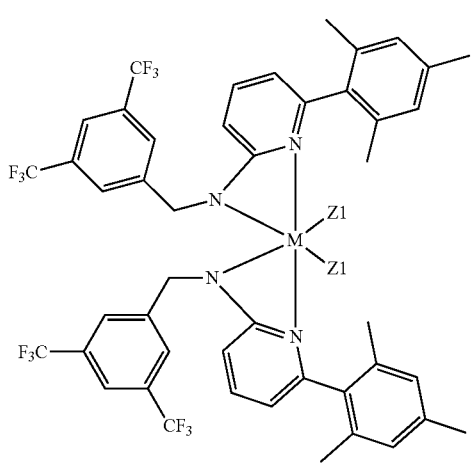
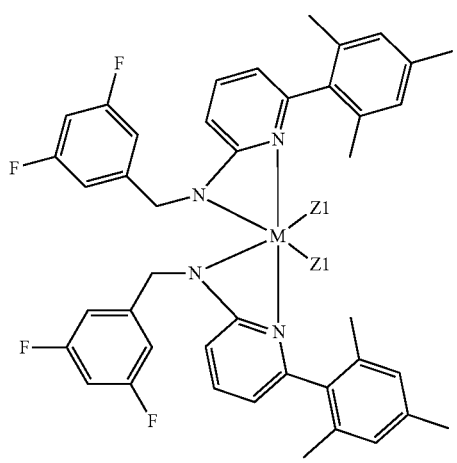

71
-continued
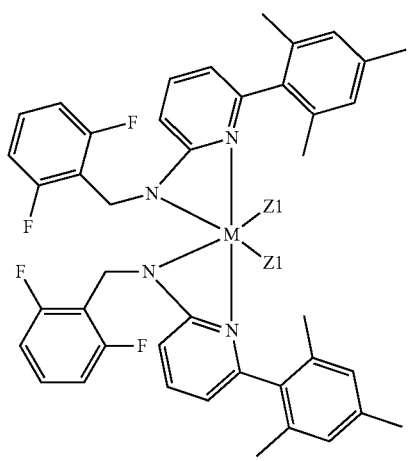
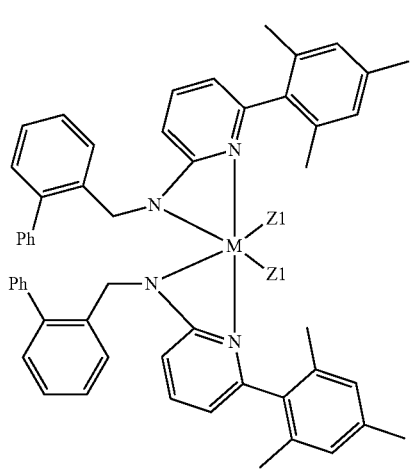
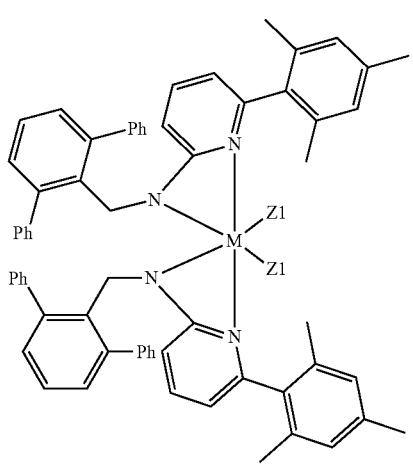
72
-continued
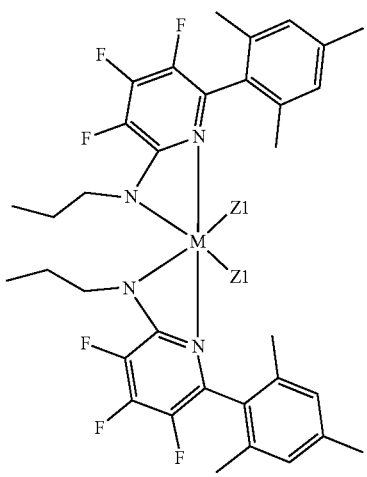
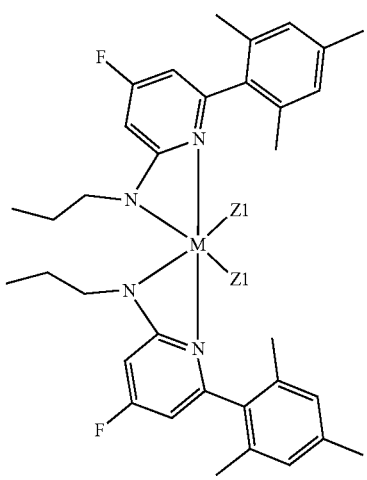
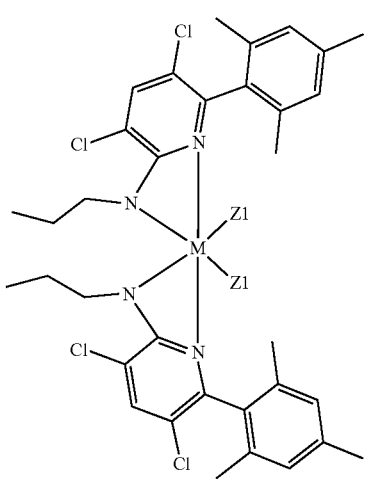

73
-continued
74
-continued
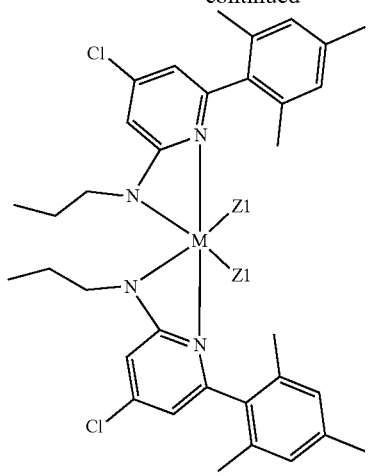
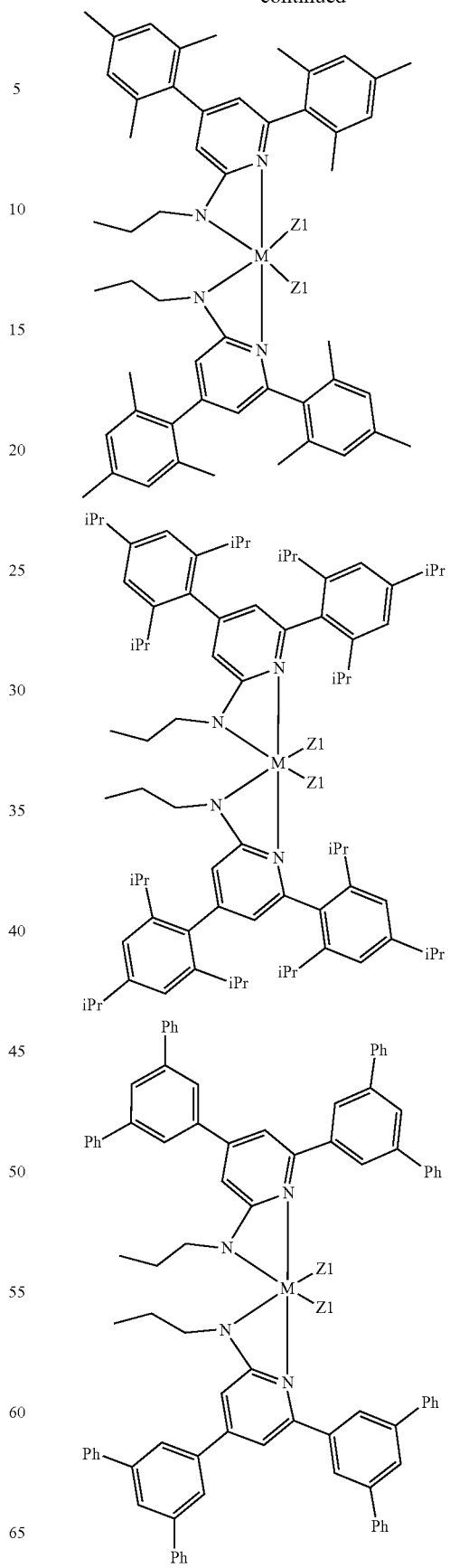

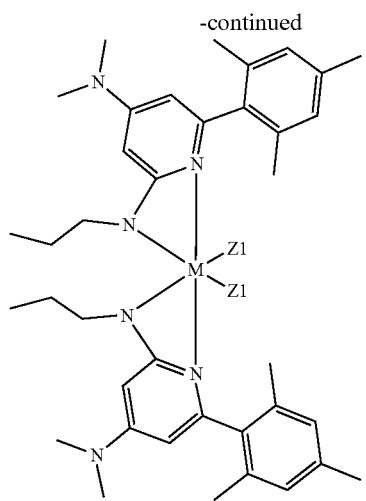
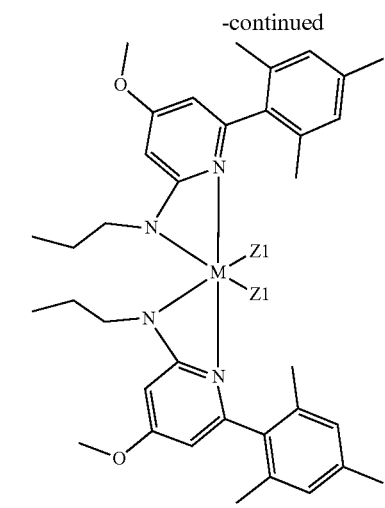
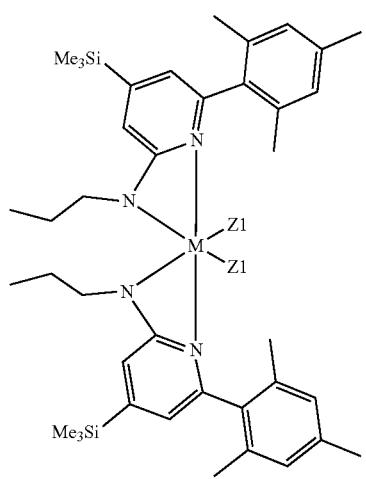
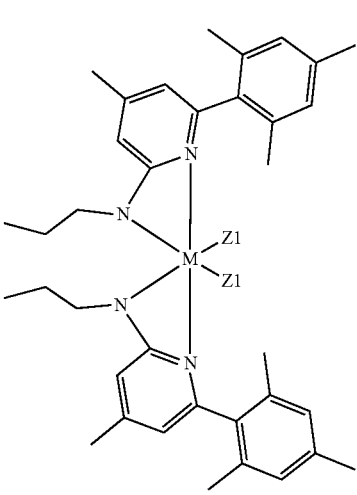
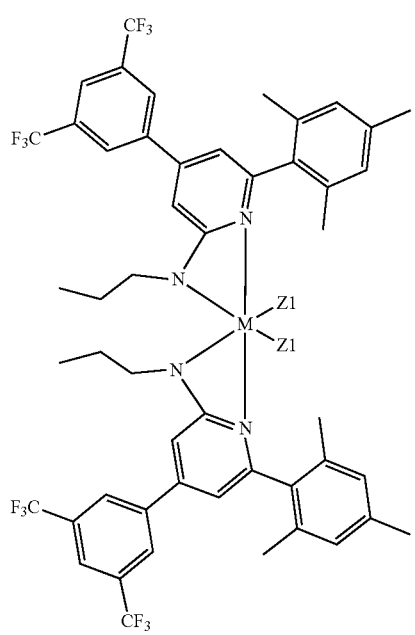
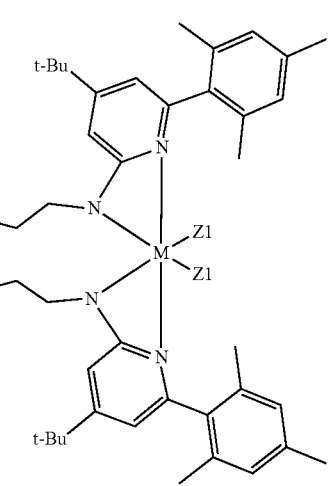

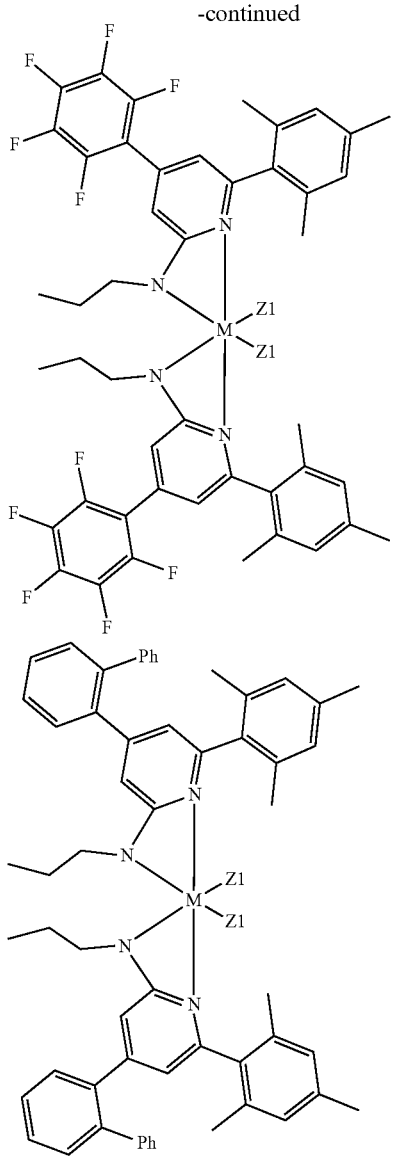

Co-Catalyst/Activator

An activator is an additive which renders a procatalyst active with respect to olefin polymerization by contacting it to, or combining it with, the procatalyst. Commonly used activators abstract a monoanionic ligand, typically an alkyl group, in some cases a benzyl or methyl group, to form a cationic metal-ligand complex of the procatalyst, which has a weakly coordinating or noncoordinating anion derived or present as a portion of the activating agent. For example, activators of this type include: Brønsted acids, such as $[R_3NH]^+$ (ammonium) based activators, e.g. N,N-dimethylanilinium tetrakis(pentafluorophenyl)borate); and Lewis acids, such as alkyl aluminums, polymeric or oligomeric alumoxanes (also known as aluminoxanes), boranes (such as tris(pentafluorophenyl)borane), or carbocationic species (such as trityl tetrakis(pentafluorophenyl)borate). When an alumoxane alone is used as the activator, preferably the number of moles of the alumoxane that are employed is at least 100 times the number of moles of the metal-ligand complex. Lower loading of alumoxanes do not act as activators, rather they serve as scavenging agent. A scavenging agent sequesters impurities in the reactor prior to addition of the catalyst, and as such, does not constitute an activator.

Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, United States patent Number (USPN) U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(($C_1$-$C_{10}$)alkyl)aluminum or tri(($C_6$-$C_{18}$)aryl)boron compounds and halogenated (including perhalogenated) derivatives thereof. In some other embodiments, exemplary Group 13 metal compounds are tris (fluoro-substituted phenyl)boranes, in other embodiments, tris(pentafluorophenyl)borane. In some embodiments, the activating co-catalyst is a tris(($C_1$-$C_{20}$)hydrocarbyl)methane borate (e.g., trityl tetrakis(pentafluorophenyl)borate) or a tri(($C_1$-$C_{20}$)hydrocarbyl)ammonium tetra(($C_1$-$C_{20}$)hydrocarbyl)borate (e.g., bis(octadecyl)methylammonium tetrakis (pentafluorophenyl)borate). As used herein, the term "ammonium" means a nitrogen cation that is a (($C_1$-$C_{20}$) hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl may be the same or different.

Exemplary combinations of neutral Lewis acid activating co-catalysts include mixtures comprising a combination of a tri(($C_1$-$C_4$)alkyl)aluminum and a halogenated tri(($C_6$-$C_{18}$) aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluoro-phenylborane):(alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques have been previously taught with respect to different metal-ligand complexes in the following USPNs: U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalysts of the present disclosure may be activated to form an active catalyst composition by combination with one or more cocatalyst such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO); bis(hydrogenated tallow alkyl)methylammonium tetrakis(pentafluorophenyl)borate; triethyl aluminum (TEA); and any combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. In exemplary embodiments of the present disclosure, the co-catalyst is [($C_{16-18}$ $H_{33-37}$)—$_2$$CH_3$NH] tetrakis(pentafluorophenyl)borate salt.

The ratio of total number of moles of one or more catalysts to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the catalysts. When tris (pentafluorophenyl)borane alone is used as the activating co-catalyst, in some other embodiments, the number of moles of the tris(pentafluorophenyl)borane that are employed to the total number of moles of one or more catalysts form 1:0.5 to 1:10, in some other embodiments, from 1:1 to 1:6, in some other embodiments, from 1:1 to 1:5. The remaining activating co-catalysts are generally employed in approximately mole quantities equal to the total mole quantities of one or more catalysts.

Polymerization Processes

Any conventional polymerization processes may be employed to produce the block copolymers of the present disclosure. Such conventional polymerization processes include, but are not limited to, solution polymerization processes, gas phase polymerization processes, slurry, or particle forming polymerization processes, and combinations thereof using one or more conventional reactors, e.g., loop reactors, isothermal reactors, fluidized bed reactors, stirred tank reactors, batch reactors in parallel, series, and/or any combinations thereof.

In certain embodiments of the present disclosure, multi-block copolymers are prepared via a solution polymerization process employing a first olefin polymerization procatalyst (A), a second olefin polymerization procatalyst (B), one or more cocatalysts, and a chain shuttling agent (C).

The polymerization processes of the disclosure employing a first olefin polymerization procatalyst A, a second olefin polymerization procatalyst B, one or more cocatalysts, and chain shuttling agent C may be further elucidated by reference to FIG. 1, where there are illustrated activated catalyst site A, 10, which under polymerization conditions forms a polymer chain, 13, attached to the active catalyst site, 12. Similarly, active catalyst site B, 20, produces a differentiated polymer chain, 23, attached to the active catalyst site, 22. A chain shuttling agent C1, attached to a polymer chain produced by active catalyst B, 14, exchanges its polymer chain, 23, for the polymer chain, 13, attached to catalyst site A. Additional chain growth under polymerization conditions causes formation of a multi-block copolymer, 18, attached to active catalyst site A. Similarly, chain shuttling agent C2, attached to a polymer chain produced by active catalyst site A, 24, exchanges its polymer chain, 13, for the polymer chain, 23, attached to catalyst site B. Additional chain growth under polymerization conditions causes formation of a multi-block copolymer, 28, attached to active catalyst site B. The growing multi-block copolymers are repeatedly exchanged between active catalyst A and active catalyst B by means of shuttling agent C resulting in formation of a block or segment of differing properties whenever exchange to the opposite active catalyst site occurs. The growing polymer chains may be recovered while attached to a chain shuttling agent and functionalized if desired. Alternatively, the resulting polymer may be recovered by scission from the active catalyst site or the shuttling agent, through use of a proton source or other killing agent.

It is believed (without wishing to be bound by such belief), that the composition of the respective segments or blocks, and especially of the end segments of the polymer chains, may be influenced through selection of process conditions or other process variables. In the polymers of the invention, the nature of the end segments is determined by the relative rates of chain transfer or termination for the respective catalysts as well as by the relative rates of chain shuttling. Possible chain termination mechanisms include, but are not limited to, β-hydrogen elimination, β-hydrogen transfer to monomer, β-methyl elimination, and chain transfer to hydrogen or other chain-terminating reagent such as an organosilane or chain functionalizing agent. Accordingly, when a low concentration of chain shuttling agent is used, the majority of polymer chain ends will be generated in the polymerization reactor by one of the foregoing chain termination mechanisms and the relative rates of chain termination for catalyst (A) and (B) will determine the predominant chain terminating moiety. That is, the catalyst having the fastest rate of chain termination will produce relatively more chain end segments in the finished polymer.

In contrast, when a high concentration of chain shuttling agent is employed, the majority of the polymer chains within the reactor and upon exiting the polymerization zone are attached or bound to the chain shuttling agent. Under these reaction conditions, the relative rates of chain transfer of the polymerization catalysts and the relative rate of chain shuttling of the two catalysts primarily determines the identity of the chain terminating moiety. If catalyst (A) has a faster chain transfer and/or chain shuttling rate than catalyst (B), then the majority of the chain end segments will be those produced by catalyst (A).

At intermediate concentrations of chain shuttling agent, all three of the aforementioned factors are instrumental in determining the identity of the final polymer block. The foregoing methodology may be expanded to the analysis of multi-block polymers having more than two block types and for controlling the average block lengths and block sequences for these polymers. For example, using a mixture of catalysts 1, 2, and 3 with a chain shuttling agent, for which each catalyst type makes a different type of polymer block, produces a linear block copolymer with three different block types. Furthermore, if the ratio of the shuttling rate to the propagation rate for the three catalysts follows the order 1>2>3, then the average block length for the three block types will follow the order 3>2>1, and there will be fewer instances of 2-type blocks adjacent to 3-type blocks than 1-type blocks adjacent to 2-type blocks.

It follows that a method exists for controlling the block length distribution of the various block types. For example, by selecting catalysts 1, 2, and 3 (wherein 2 and 3 produce substantially the same polymer block type), and a chain shuttling agent, and the shuttling rate follows the order 1>2>3, the resulting polymer will have a bimodal distribution of block lengths made from the 2 and 3 catalysts.

During the polymerization, the reaction mixture comprising one or more monomers is contacted with the activated catalyst composition according to any suitable polymerization conditions. The process is characterized by use of elevated temperatures and pressures. Hydrogen may be employed as a chain transfer agent for molecular weight control according to known techniques if desired. As in other similar polymerizations, it is highly desirable that the monomers and solvents employed be of sufficiently high purity that catalyst deactivation does not occur. Any suitable technique for monomer purification such as devolatilization at reduced pressure, contacting with molecular sieves or high surface area alumina, or a combination of the foregoing processes may be employed. The skilled artisan will appreciate that the ratio of chain shuttling agent to one or more catalysts and or monomers in the process of the present invention may be varied in order to produce polymers differing in one or more chemical or physical properties. Supports may be employed in the present invention, especially in slurry or gas-phase polymerizations. Suitable supports include solid, particulated, high surface area, metal oxides, metalloid oxides, or mixtures thereof (interchangeably referred to herein as an inorganic oxide). Examples include: talc, silica, alumina, magnesia, titania, zirconia, $Sn_2O_3$, aluminosilicates, borosilicates, clays, and mixtures thereof. Suitable supports preferably have a surface area as determined by nitrogen porosimetry using the B.E.T. method from 10 to 1000 m/g, and preferably from 100 to 600 m$^2$/g. The average particle size typically is from 0.1 to 500 m, preferably from 1 to 200 μm, more preferably 10 to 100 μm.

In one embodiment of the invention the present catalyst composition and optional support may be spray dried or otherwise recovered in solid, particulated form to provide a composition that is readily transported and handled. Suitable methods for spray dying a liquid containing slurry are well known in the art and usefully employed herein. Preferred techniques for spray drying catalyst compositions for use herein are described in U.S. Pat. Nos. 5,648,310 and 5,672,669.

The polymerization is desirably carried out as a continuous polymerization, preferably a continuous, solution polymerization, in which catalyst components, shuttling agent(s), monomers, and optionally solvent, adjuvants, scavengers, and polymerization aids are continuously supplied to the reaction zone and polymer product continuously removed there from. Within the scope of the terms "continuous" and "continuously" as used in this context are those processes in which there are intermittent additions of reactants and removal of products at small regular or irregular intervals, so that, over time, the overall process is substantially continuous. The catalyst compositions can be advantageously employed in a high pressure, solution, slurry, or gas phase polymerization process. For a solution polymerization process it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion where either the metal complex or the cocatalyst is only poorly soluble is disclosed in U.S. Pat. No. 5,783,512. A solution process to prepare the novel polymers of the present invention, especially a continuous solution process is preferably carried out at a temperature between 80° C. and 250° C., more preferably between 100° C. and 210° C., and most preferably between 110° C. and 210° C. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. Preferred temperatures in a slurry polymerization are from 30° C., preferably from 60° C. up to 115° C., preferably up to 100° C. Pressures typically range from atmospheric (100 kPa) to 500 psi (3.4 MPa). In all of the foregoing processes, continuous or substantially continuous polymerization conditions are preferably employed. The use of such polymerization conditions, especially continuous, solution polymerization processes employing two or more active polymerization catalyst species, allows the use of elevated reactor temperatures which results in the economical production of multi-block or segmented copolymers in high yields and efficiencies. Both homogeneous and plug-flow type reaction conditions may be employed. The latter conditions are preferred where tapering of the block composition is desired.

Both catalyst compositions (A) and (B) may be prepared as a homogeneous composition by addition of the requisite metal complexes to a solvent in which the polymerization will be conducted or in a diluent compatible with the ultimate reaction mixture. The desired cocatalyst or activator and the shuttling agent may be combined with the catalyst composition either prior to, simultaneously with, or after combination with the monomers to be polymerized and any additional reaction diluent.

At all times, the individual ingredients as well as any active catalyst composition must be protected from oxygen and moisture. Therefore, the catalyst components, shuttling agent and activated catalysts must be prepared and stored in an oxygen and moisture free atmosphere, preferably a dry, inert gas such as nitrogen.

Without limiting in any way the scope of the invention, one means for carrying out such a polymerization process is as follows. In a stirred-tank reactor, the monomers to be polymerized are introduced continuously together with any solvent or diluent. The reactor contains a liquid phase composed substantially of monomers together with any solvent or diluent and dissolved polymer. Preferred solvents include $C_{4-10}$ hydrocarbons or mixtures thereof, especially alkanes such as hexane or mixtures of alkanes, as well as one or more of the monomers employed in the polymerization. Procatalysts along with cocatalyst and chain shuttling agent are continuously or intermittently introduced in the reactor liquid phase or any recycled portion thereof. The reactor temperature and pressure may be controlled by adjusting the solvent/monomer ratio, the catalyst addition rate, as well as by cooling or heating coils, jackets or both. The polymerization rate is controlled by the rate of catalyst addition. The ethylene content of the polymer product is determined by the ratio of ethylene to comonomer in the reactor, which is controlled by manipulating the respective feed rates of these components to the reactor. The polymer product molecular weight is controlled, optionally, by controlling other polymerization variables such as the temperature, monomer concentration, or by the previously mentioned chain transfer agent, as is well known in the art. Upon exiting the reactor, the effluent is contacted with a catalyst kill agent such as water, steam or an alcohol. The polymer solution is optionally heated, and the polymer product is recovered by flashing off gaseous monomers as well as residual solvent or diluent at reduced pressure, and, if necessary, conducting further devolatilization in equipment such as a devolatilizing extruder. In a continuous process the mean residence time of the catalyst and polymer in the reactor generally is from 5 minutes to 8 hours, and preferably from 10 minutes to 6 hours.

Alternatively, the foregoing polymerization may be carried out in a continuous loop reactor with or without a monomer, catalyst or shuttling agent gradient established between differing regions thereof, optionally accompanied by separated addition of catalysts and/or chain transfer agent, and operating under adiabatic or non-adiabatic solution polymerization conditions or combinations of the foregoing reactor conditions. Examples of suitable loop reactors and a variety of suitable operating conditions for use therewith are found in U.S. Pat. Nos. 5,977,251, 6,319,989 and 6,683,149.

Although not as desired, the catalyst composition may also be prepared and employed as a heterogeneous catalyst by adsorbing the requisite components on an inert inorganic or organic particulated solid, as previously disclosed. In an preferred embodiment, a heterogeneous catalyst is prepared by co-precipitating the metal complex and the reaction product of an inert inorganic compound and an active hydrogen containing activator, especially the reaction product of a tri (C1.4 alkyl) aluminum compound and an ammonium salt of a hydroxyaryltris(pentafluorophenyl)borate, such as an ammonium salt of (4-hydroxy-3,5-ditertiarybutylphenyl)tris(pentafluorophenyl)borate. When prepared in heterogeneous or supported form, the catalyst composition may be employed in a slurry or a gas phase polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. As with a solution polymerization, the $\alpha$-olefin comonomer or a mixture of different $\alpha$-olefin monomers may be used in whole or part as the diluent. Most preferably at least a major part of the diluent comprises the $\alpha$-olefin monomer or monomers to be polymerized.

Preferably for use in gas phase polymerization processes, the support material and resulting catalyst has a median particle diameter from 20 to 200 µm, more preferably from 30 µm to 150 µm, and most preferably from 50 µm to 100 µm. Preferably for use in slurry polymerization processes, the support has a median particle diameter from 1 µm to 200 µm, more preferably from 5 µm to 100 µm, and most preferably from 10 µm to 80 µm.

Suitable gas phase polymerization process for use herein are substantially similar to known processes used commercially on a large scale for the manufacture of polypropylene, ethylene/$\alpha$-olefin copolymers, and other olefin polymers. The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported or suspended above a perforated plate or fluidization grid, by a flow of fluidization gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and one or more heat exchangers to strip the gas of the heat of polymerization.

A preferred method of cooling of the bed, in addition to the cooling provided by the cooled recycle gas, is to feed a volatile liquid to the bed to provide an evaporative cooling effect, often referred to as operation in the condensing mode. The volatile liquid employed in this case can be, for example, a volatile inert liquid, for example, a saturated hydrocarbon having 3 to 8, preferably 4 to 6, carbon atoms. In the case that the monomer or comonomer itself is a volatile liquid, or can be condensed to provide such a liquid, this can suitably be fed to the bed to provide an evaporative cooling effect. The volatile liquid evaporates in the hot fluidized bed to form gas which mixes with the fluidizing gas. If the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream. This type of process is described, for example in EP-89691; U.S. Pat. No. 4,543,399; WO-94/25495 and U.S. Pat. No. 5,352,749. A particularly preferred method of recycling the liquid to the bed is to separate the liquid from the recycle gas stream and to reinject this liquid directly into the bed, preferably using a method which generates fine droplets of the liquid within the bed. This type of process is described in WO-94/28032. The polymerization reaction occurring in the gas fluidized bed is catalyzed by the continuous or semi-continuous addition of catalyst composition according to the invention. The catalyst composition may be subjected to a prepolymerization step, for example, by polymerizing a small quantity of olefin monomer in a liquid inert diluent, to provide a catalyst composite comprising supported catalyst particles embedded in olefin polymer particles as well. The polymer is produced directly in the fluidized bed by polymerization of the monomer or mixture of monomers on the fluidized particles of catalyst composition, supported catalyst composition or prepolymerized catalyst composition within the bed. Start-up of the polymerization reaction is achieved using a bed of preformed polymer particles, which are preferably similar to the desired polymer, and conditioning the bed by drying with inert gas or nitrogen prior to introducing the catalyst composition, the monomers and any other gases which it is desired to have in the recycle gas stream, such as a diluent gas, hydrogen chain transfer agent, or an inert condensable gas when operating in gas phase condensing mode. The produced polymer is discharged continuously or semi-continuously from the fluidized bed as desired.

The gas phase processes most suitable for the practice of this invention are continuous processes which provide for the continuous supply of reactants to the reaction zone of the reactor and the removal of products from the reaction zone of the reactor, thereby providing a steady-state environment on the macro scale in the reaction zone of the reactor. Products are readily recovered by exposure to reduced pressure and optionally elevated temperatures (devolatilization) according to known techniques. Typically, the fluidized bed of the gas phase process is operated at temperatures greater than 50° C., preferably from 60° C. to 110° C., more preferably from 70° C. to 110° C.

Examples of gas phase processes which are adaptable for use in the process of this invention are disclosed in U.S. Pat. Nos. 4,588,790; 4,543,399; 5,352,749; 5,436,304; 5,405,922; 5,462,999; 5,461,123; 5,453,471; 5,032,562; 5,028,670; 5,473,028; 5,106,804; 5,556,238; 5,541,270; 5,608,019; and 5,616,661.

As previously mentioned, functionalized derivatives of multi-block copolymers are also included within the present invention. Examples include metallated polymers wherein the metal is the remnant of the catalyst or chain shuttling agent employed, as well as further derivatives thereof, for example, the reaction product of a metallated polymer with an oxygen source and then with water to form a hydroxyl terminated polymer. In another embodiment, sufficient air or other quench agent is added to cleave some or all of the shuttling agent-polymer bonds thereby converting at least a portion of the polymer to a hydroxyl terminated polymer. Additional examples include olefin terminated polymers formed by β-hydride elimination and ethylenic unsaturation in the resulting polymer.

In one embodiment of the invention the multi-block copolymer may be functionalized by maleation (reaction with maleic anhydride or its equivalent), metallation (such as with an alkyl lithium reagent, optionally in the presence of a Lewis base, especially an amine, such as tetramethyl-ethylenediamine), or by incorporation of a diene or masked olefin in a copolymerization process. After polymerization involving a masked olefin, the masking group, for example a trihydrocarbylsilane, may be removed thereby exposing a more readily functionalized remnant. Techniques for functionalization of polymers are well known, and disclosed for example in U.S. Pat. No. 5,543,458, and elsewhere.

Because a substantial fraction of the polymeric product exiting the reactor is terminated with the chain shuttling agent, further functionalization is relatively easy. The metallated polymer species can be utilized in well known chemical reactions such as those suitable for other alkyl-aluminum, alkyl-gallium, alkyl-zinc, or alkyl-Group 1 compounds to form amine-, hydroxy-, epoxy-, ketone, ester, nitrile, and other functionalized terminated polymer products. Examples of suitable reaction techniques that are adaptable for use here in are described in Negishi, "Organometallics in Organic Synthesis", Vol. 1 and 2, (1980), and other standard texts in organometallic and organic synthesis.

Polymer Products

In certain embodiments, multi-block copolymers (i.e., olefin block copolymers or OBCs) prepared by the compositions/catalyst systems/processes of the present disclosure are defined as having:

(A) Mw/Mn from 1.0 to 10.0 (e.g., from 1.0 to 9.0, from 1.0 to 8.0, from 1.0 to 7.0, from 1.0 to 6.0, from 1.0 to 5.0, from 1.5 to 5.0, from 1.5 to 4.0, from 1.7 to 3.5, etc.), at least one melting point. Tm, in degrees Celsius, and a density, d, in grams/cubic centimeter, where in the numerical values of Tm and d correspond to the relationship:

$$T_m \geq -2002.9 + 4538.5(d) - 2422.2(d)^2; \text{ and/or}$$

(B) $M_w/M_n$ from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

ΔT>−0.1299(ΔH)+62.81 for ΔH greater than zero and up to 130 J/g,

ΔT≥48° C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; and/or (C) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

Re>1481−1629(d); and/or (D) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; and/or (E) a storage modulus at 25° C., G'(25° C.), and a storage modulus at 100° C., G'(100° C.), wherein the ratio of G'(25° C.) to G'(100° C.) is in the range of about 1:1 to about 9:1; and/or (F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) an average block index greater than zero and up to 1.0 and a molecular weight distribution, Mw/Mn greater than 1.3. It is understood that the olefin block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

In certain embodiments, the olefin block copolymers prepared by the compositions/catalyst systems/processes of the present disclosure have a density of from 0.820 g/cc to 0.925 g/cc (e.g., from 0.860 g/cc to 0.890 g/cc). In some embodiments, the olefin block copolymers prepared by the compositions/catalyst systems/processes of the present disclosure have a melt index (MI) from 0.1 g/10 min to 1000 g/10 min (e.g., from 0.1 g/10 min to 500 g/10 min, from 0.1 g/10 min to 100 g/10 min, from 0.1 g/10 min to 50 g/10 min, from 0.1 g/10 min to 35 g/10 min, from 0.1 g/10 min to 30 g/10, from 0.1 g/10 min to 20 g/10 min, and/or from 0.1 g/10 min to 15 g/10 min), as measured by ASTM D 1238 (190° C./2.16 kg). In certain embodiments, the olefin block copolymers prepared by the compositions/catalyst systems/processes of the present disclosure have a molecular weight of 10,000 to 250,000 g/mole (e.g., from 10,000 to 200,000 g/mole and/or from 20,000 to 175,000 g/mole). In certain embodiments, the olefin block copolymers prepared by the compositions/catalyst systems/processes of the present disclosure have a residual zinc content from 50 ppm to 1000 ppm (e.g., from 50 ppm to 750 ppm, from 50 ppm to 500 ppm, and/or from 75 ppm to 400 ppm). In certain embodiments, the olefin block copolymers of the present disclosure have a molecular weight distribution (MWD or PDI) of less than 5.0 (e.g., less than 4.0, less than 3.5, less than 3.0, less than 2.9, less than 2.8, etc.). In certain embodiments, the olefin block copolymers of the present disclosure have a thermo-mechanical resistance (TMA) of greater than 100° C.

EXAMPLES

Methodologies

Combined Catalyst Efficiency: The combined catalyst efficiency is calculated by dividing the mass (e.g., the number of kilograms ($kg_{polymer}$)) of the olefin block copolymer prepared by the mass (e.g., the total number of milligrams or grams ($g_{metal}$)) of metal from both procatalysts.

3D-GPC: A high temperature Triple Detector Gel Permeation Chromatography (3D-GPC) system equipped with Robotic Assistant Delivery (RAD) system for sample preparation and sample injection was used to measure molecular weight. The concentration detector is an Infra-red concentration detector (IR4 from Polymer Char, Valencia, Spain), which was used to determine the molecular weight and molecular weight distribution. The other two detectors are a Precision Detectors (Agilent) 2-angle laser light scattering detector, Model 2040, and a 4-capillary differential viscometer detector, Model 150R, from Malvern (Houston, Tex.). The 15° angle of the light scattering detector was used for calculation purposes.

Data collection was performed using a Polymer Char DM 100 Data acquisition box. The carrier solvent was 1,2,4-trichlorobenzene (TCB). The system was equipped with an on-line solvent degas device from Agilent. The column compartment was operated at 150° C. The columns were four Mixed A-LS 30 cm, 20 micron columns. The samples were prepared at 2.0 mg/mL using RAD system. The chromatographic solvent (TCB) and the sample preparation solvent contained 200 ppm of butylated hydroxytoluene (BHT) and both solvent sources were nitrogen sparged. Polyethylene samples were stirred gently at 150° C. for 3 hours. The injection volume was 200 μl, and the flow rate was 1.0 mL/minute. A flow rate marker, a drop of decane added into the sample bottle, was used to linearly correct the flow rate for all samples by alignment of the decane peaks.

Data was processed using in-house software. Calibration of the GPC columns was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights.

The polystyrene standard peak molecular weights were converted to polyethylene molecular weights using the following equation (*J. Polym. Sci., Polym. Let.* 1968, 6, 621-624):

$$M_{polyethylene} = A(M_{polystyrene})^B \qquad (1)$$

Here B has a value of 1.0, and the experimentally determined value of A is around 0.39.

A fifth order polynomial was used to fit the respective polyethylene-equivalent calibration points obtained from equation (1) to their observed elution volumes. The actual polynomial fit was obtained so as to relate the logarithm of polyethylene equivalent molecular weights to the observed elution volumes (and associated powers) for each polystyrene standard.

Number, weight, and z-average molecular weights were calculated according to the following equations:

$$\overline{Mn} = \frac{\sum_i Wf_i}{\sum_i (Wf_i / M_i)} \qquad (2)$$

$$\overline{Mw} = \frac{\sum_i (Wf_i * M_i)}{\sum_i Wf_i} \qquad (3)$$

$$\overline{Mz} = \frac{\sum_i (Wf_i * M_i^2)}{\sum_i (Wf_i * M_i)} \qquad (4)$$

Where, $Wf_i$ is the weight fraction of the i-th component and $M_i$ is the molecular weight of the i-th component.

The MWD was expressed as the ratio of the weight average molecular weight (Mw) to the number average molecular weight (Mn).

The A value was determined by adjusting A value in equation (1) until Mw, the weight average molecular weight calculated using equation (3) and the corresponding retention volume polynomial, agreed with the independently determined value of Mw obtained in accordance with the linear homopolymer reference with known weight average molecular weight of 115,000 g/mol.

The absolute molecular weight was calculated use the 15° laser light scattering signal and the IR concentration detector, $M_{PE,I,abs} = K_{LS}*(LS_i)(IR_i)$, using the same $K_{LS}$ calibration constant as in equation (5). The paired data set of the $i^{th}$ slice of the IR response and LS response was adjusted using the determined off-set obtained by a Systematic Approach practice:

$$\overline{Mw}(abs) = K_{LS} * \frac{\sum_i (LS_i)}{\sum_i (IR_i)} \qquad (5)$$

where, $K_{LS}$=LS–MW calibration constant. As explained before, the response factor, $K_{LS}$, of the laser detector was determined using the certificated value for the weight average molecular weight of NIST 1475 (52,000 g/mol).

Differential Scanning Calorimetry (DSC) analysis: Melt temperature (Tm), glass transition temperature (Tg), crystallization temperature (Tc) and Heat of Melt may be measured by differential scanning calorimetry (DSC Q2000, TA Instruments, Inc.) using a Heat-Cool-Heat temperature profile. Open-pan DSC samples of 3-6 mg of polymer are first heated from room temperature to setpoint at 10° C. per min. Traces are analyzed individually using TA Universal Analysis software or TA Instruments TRIOS software.

Density: Density measurements are conducted according to ASTM $D_{792}$.

Melt index: $I_2$ and $I_{10}$ are measured in accordance with ASTM D-1238 (190° C.; 2.16 kg and 10 kg).

CEF: Comonomer distribution analysis is performed with Crystallization Elution Fractionation (CEF) (PolymerChar, Spain) (Monrabal et al, Macromol. Symp. 257, 71-79 (2007)) equipped with IR-4 detector (PolymerChar, Spain) and two angle light scattering detector Model 2040 (Precision Detectors, currently Agilent Technologies). IR-4 or IR-5 detector is used. A 10 or 20 micron guard column of 50×4.6 mm (PolymerLab, currently Agilent Technologies) is installed just before the IR-4 detector or IR-5 detector in the detector oven. Ortho-dichlorobenzene (ODCB, 99% anhydrous grade) and 2,5-di-tert-butyl-4-methylphenol ("BHT", catalogue number B1378-500G, batch number 098K0686) from Sigma-Aldrich are obtained. ODCB is distilled before use. Silica gel 40 (particle size 0.2~0.5 mm, catalogue number 10181-3) from EMD Chemicals is also obtained. The silica gel is dried in a vacuum oven at 160° C. for about two hours before use. Eight hundred milligrams of BHT and five grams of the silica gel are added to two liters of ODCB. ODCB can be also dried by passing through a column or columns packed with silica gel. For the CEF instrument equipped with an autosampler with N2 purging capability, Silica gel 40 is packed into two 300×7.5 mm GPC size stainless steel columns and the Silica gel 40 columns are installed at the inlet of the pump of the CEF instrument to dry ODCB; and no BHT is added to the mobile phase. This "ODCB containing BHT and silica gel" or ODCB dried with silica gel 40 is now referred to as "ODCB." This ODBC is sparged with dried nitrogen (N2) for one hour before use. Dried nitrogen is such that is obtained by passing nitrogen at <90 psig over $CaCO_3$ and 5 Å molecular sieves. The resulting nitrogen should have a dew point of approximately −73° C. Sample preparation is done with autosampler at 4 mg/ml (unless otherwise specified) under shaking at 160° C. for 2 hours. The injection volume is 300 μl. The temperature profile of CEF is: crystallization at 3° C./min from 110° C. to 30° C., the thermal equilibrium at 30° C. for 5 minutes (including Soluble Fraction Elution Time being set as 2 minutes), elution at 3° C./min from 30° C. to 140° C. The flow rate during crystallization is 0.052 ml/min. The flow rate during cooling step is 0.052 mL/min. The flow rate during elution is 0.50 ml/min. The data is collected at one data point/second. The CEF column is packed with glass beads at 125 μm±6% (MO-SCI Specialty Products) with ⅛ inch stainless tubing according to U.S. Pat. No. 8,372,931. The column outside diameter (OD) is ⅛ inch. The critical parameters needed to duplicate the method include the column internal diameter (ID), and column length (L). The choice of ID and L must be such that when packed with the 125 μm diameter glass beads, the liquid internal volume is 2.1 to 2.3 mL. If L is 152 cm, then ID must be 0.206 cm and the wall thickness must be 0.056 cm. Different values for L and ID can be used, as long as the glass bead diameter is 125 μm and the internal liquid volume is between 2.1 and 2.3 mL. Column temperature calibration is performed by using a mixture of NIST Standard Reference Material Linear polyethylene 1475a (1.0 mg/ml) and Eicosane (2 mg/ml) in ODCB. CEF temperature calibration consists of four steps: (1) Calculating the delay volume defined as the temperature offset between the measured peak elution temperature of Eicosane minus 30.00° C.; (2) Subtracting the temperature offset of the elution temperature from CEF raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that NIST linear polyethylene 1475a has a peak temperature at 101.0° C., and Eicosane has a peak temperature of 30.0° C.; (4) For the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

Residual zinc content (ppm) may be measured by standard industry procedure, such as mass balance or an x-ray fluorescence (XRF) method.

TMA: The temperature resistance of the OBC resins was evaluated using Thermomechanical Analysis. TMA was conducted on a TA Instruments Q400. A small puck about 8 mm in diameter was cut from a 3.2 mm thick compression molded plaque. The probe was 1.1 mm in diameter with a rounded tip. Samples were tested under ambient conditions with a temperature ramp rate of 5° C./min. The temperature at which the probe indented 1 mm into the surface under a constant force of 1 N was recorded.

Reactivity Ratios: Reactivity ratios of the olefin polymerization procatalysts may be determined by the discussion and mathematical formulas above.

Working Examples

The following examples illustrate embodiments of the present disclosure but are not intended to be limiting in any way. More specifically, the following, non-limiting examples demonstrate inventive CSA and dual catalyst combinations capable of producing olefin block copolymers having desirable properties with commercially acceptable catalyst efficiency and process control at elevated reactor temperatures (e.g., equal to or greater than 150° C.). As seen below, a comparative CSA and dual catalyst combination representative of the state of the art is unable to produce olefin block copolymers meeting desirable product specifications and efficiency at elevated reactor temperatures (e.g., equal to or greater than 150° C.).

Procatalyst Components

Exemplary, non-limiting procatalysts falling within the scope of the first olefin polymerization procatalyst (A) of the present disclosure (Procatalysts (A4), (AB), and (AA1)) have the structures shown below:

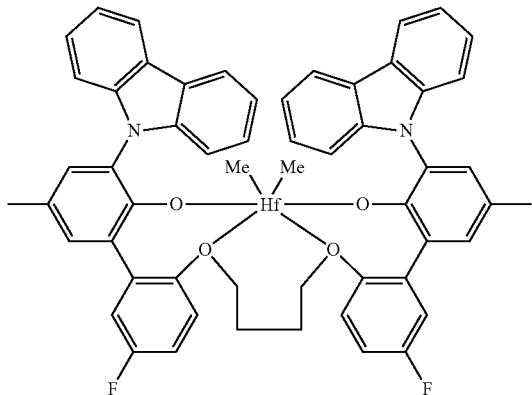
(A4)
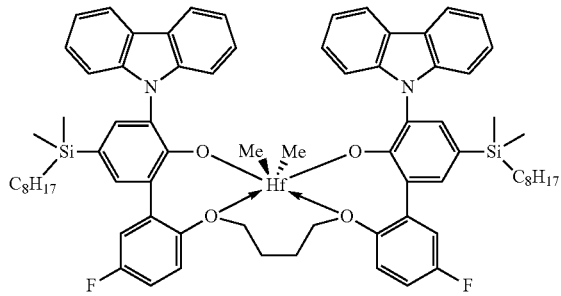
(AB)
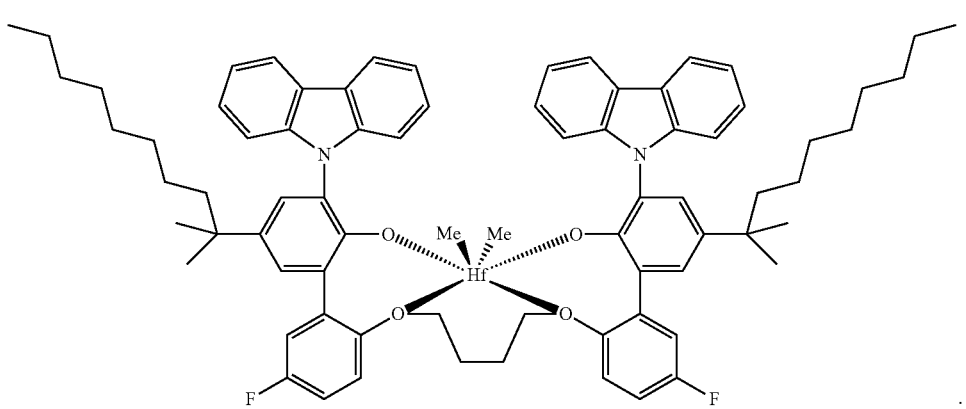
(AA1)
Exemplary, non-limiting procatalysts falling within the scope of the second olefin polymerization procatalyst (B) of the present disclosure (Procatalysts (B10), (B14), and (BB)) have the following structures:
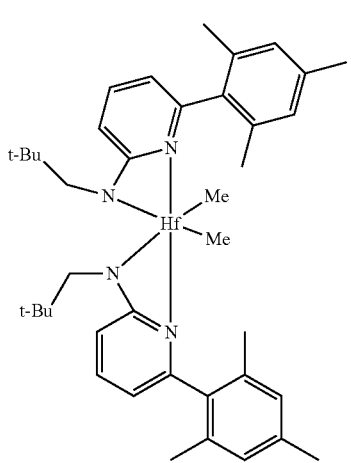
(B10)
-continued
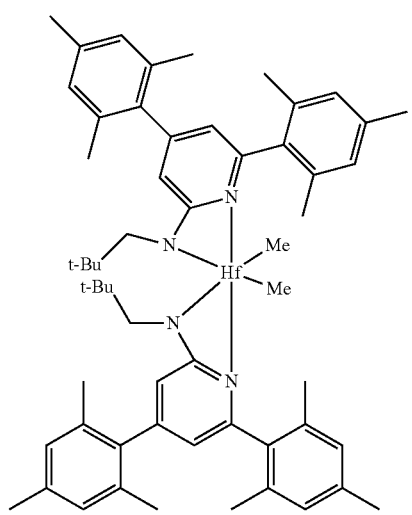
(B14)

(BB)

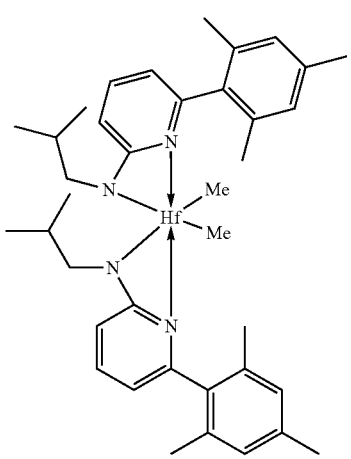

Procatalysts of the comparative CSA and dual catalyst combination representative of the state of the art (Procatalysts (A1) and (R)) have the following structures:

(A1)

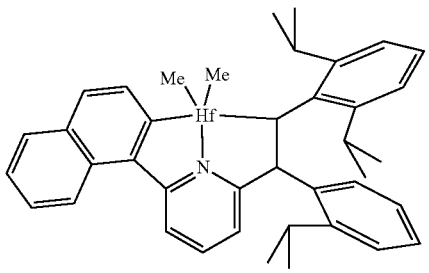

(R)

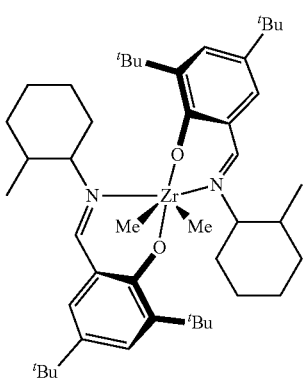

Synthesis of Procatalyst (A4)

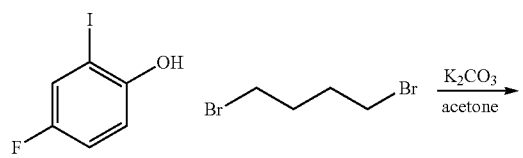

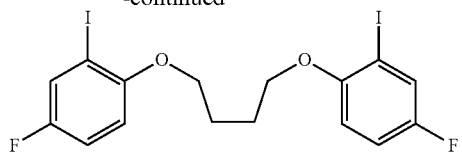

2-iodo-4-fluorophenol (14.2 g, 59.6 mmol) and 1,4-dibromobutane (3.6 mL 30 mmol) are combined in acetone (200 mL) and stirred at reflux over 3 days. The mixture is cooled, filtered and concentrated under vacuum. The residue is dissolved in dichloromethane (150 mL) and washed with KOH (50 mL, 3 N) and saturated $K_2CO_3$ (2×50 mL). The organic fraction is then dried over $MgSO_4$ and concentrated to yield a white powder. The white powder is rinsed and sonicated in hexanes, cooled, filtered, and dried under vacuum to yield the desired product (12.22 g, 77.3%). $^1$H NMR (400 MHz, CDCl$_3$) δ 7.49 (dd, J=7.7, 3.1 Hz, 2H), 7.01 (td, J=8.4, 3.1 Hz, 2H), 6.74 (dd, J=9.0, 4.6 Hz, 2H), 4.08 (d, J=5.3 Hz, 4H), 2.16-2.01 (m, 4H).

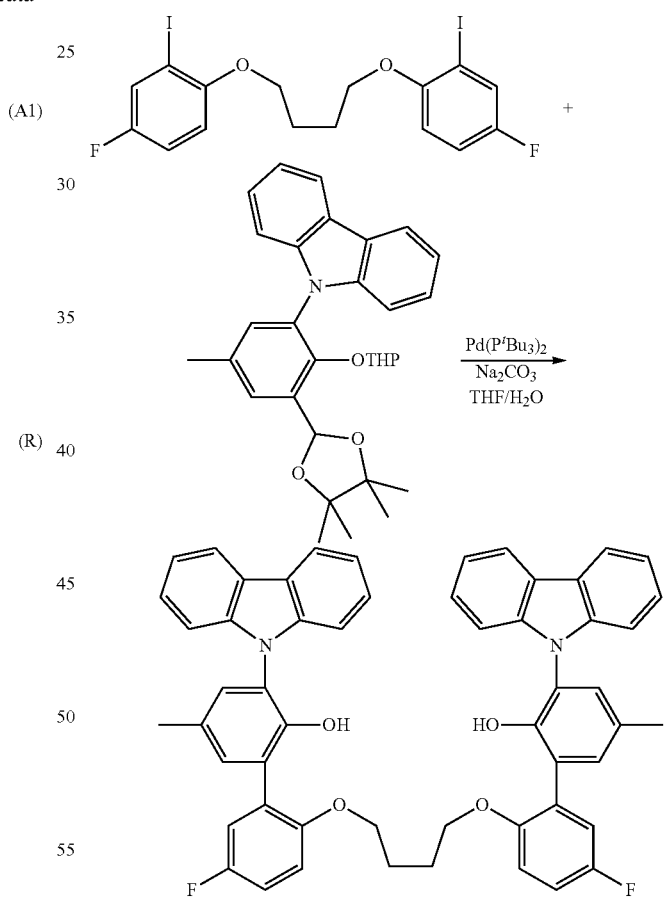

The bis(aryl iodide) (10.0 g, 18.9 mmol), boronate ester (18.2 g, 37.7 mmol), THF (200 mL), and a solution of $Na_2CO_3$ (12.0 g, 113 mmol) in water (50 mL) are placed in a 500 mL 2-neck flask and are purged with nitrogen for 15 minutes. The palladium catalyst is added to a solution in THF. The reaction is heated to 65° C. and stirred overnight. The desired protected product precipitates as a white solid formation over the course of the reaction. The mixture is then cooled, filtered and the white solid is washed with water. The solid is then transferred into a clean flask and suspended in a MeOH/THF mixture. Hydrochloric acid (5 drops) is added to the solution, and the solution is heated to reflux overnight over which time the suspension fully dissolves. The solution is cooled, filtered, and concentrated to yield a brownish oil. The remaining free-flowing liquid is decanted and discarded. The viscous brown oil remaining slowly crystallizes as a brownish solid upon standing in methanol for several days. This solid is collected by filtration, dissolved in dichloromethane and passed through a silica plug (Rf~1 in dichloromethane). The light red solution resulting from elution with dichloromethane is collected and concentrated to yield a red solid which is sonicated with diethyl ether, filtered, and dried to yield the target compound as an off white pinkish solid (14.98 g, 96%). $^1$H NMR (400 MHz, CDCl$_3$) δ 8.25-7.99 (m, 4H), 7.29 (ddd, J=8.2, 7.1, 1.3 Hz, 4H), 7.25-7.19 (m, 6H), 7.19-7.12 (m, 8H), 7.00 (ddd, J=9.0, 7.7, 3.1 Hz, 2H), 6.72 (dd, J=9.0, 4.5 Hz, 2H), 6.10 (s, 2H), 3.88-3.64 (m, 4H), 2.33 (s, 6H), 1.63 (t, J=3.2 Hz, 4H).

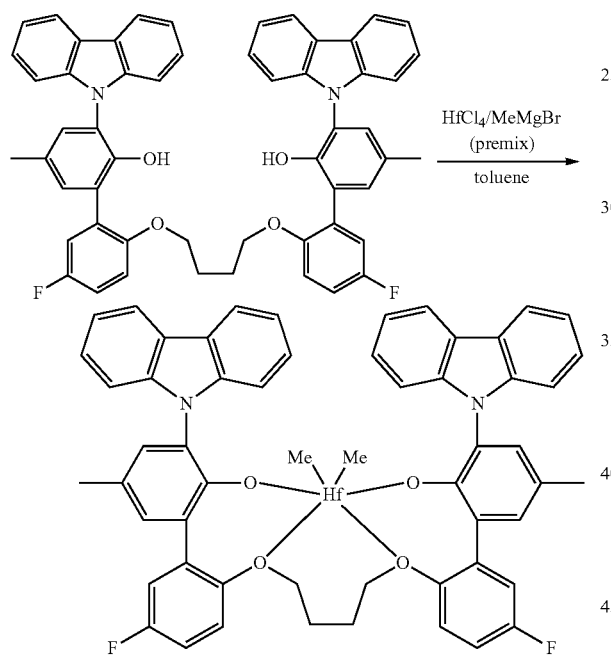

Addition of methyl magnesium bromide (0.812 mL, 3 M, 2.4 mmol) to hafnium tetrachloride (0.195 g, 0.609 mmol) is performed in a toluene (20 mL) suspension at −35° C. The reaction is stirred warming slightly over 20 minutes. This solution is then transferred to a solution of the ligand in toluene (10 mL). The solution is stirred overnight after which time the solvent is removed under high vacuum. The residue is extracted with dichloromethane (15 mL) and filtered. The dichloromethane is then removed under high vacuum to yield the product as an off white solid (0.325 g, 52%). $^1$H NMR (400 MHz, Benzene-d$_6$) δ 8.19-8.11 (m, 2H), 8.05 (dt, J=7.6, 1.0 Hz, 2H), 7.44 (tt, J=8.9, 0.9 Hz, 4H), 7.32 (ddd, J=8.2, 7.1, 1.3 Hz, 2H), 7.28-7.20 (m, 4H), 7.21-7.09 (m, 5H), 7.09 (dd, J=2.3, 0.8 Hz, 2H), 7.02 (ddt, J=7.9, 1.4, 0.7 Hz, 1H), 6.92 (dd, J=2.3, 0.8 Hz, 2H), 6.82 (dd, J=9.2, 3.2 Hz, 2H), 6.57 (ddd, J=9.1, 7.2, 3.2 Hz, 2H), 4.60 (dd, J=9.1, 4.9 Hz, 2H), 3.89-3.68 (m, 2H), 3.21 (dd, J=11.6, 4.4 Hz, 2H), 2.11 (d, J=1.4 Hz, 8H), 0.68-0.48 (m, 2H), 0.40 (d, J=13.3 Hz, 2H), −1.17 (s, 6H).

Preparation for Synthesis of Procatalysts (B10)

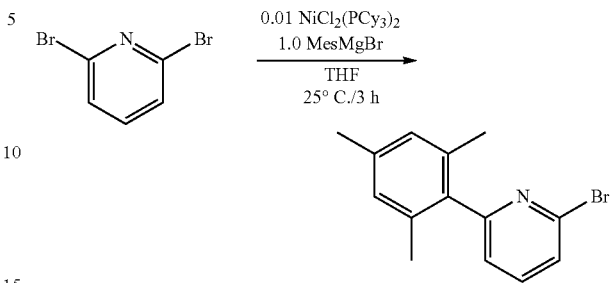

Step 1: Synthesis of 2-mesityl-6-bromopyridine. Inside the glove box, a 200 mL jar is charged with 2,6-dibromopyridine (8.00 g, 33.77 mmol), 2,6-diisopropylphenylimidazolium chloride (0.287 g, 0.68 mmol), nickel bis(acetylacetonate) (0.174 g, 0.68 mmol), and THF (70 mL). To the solution is added MesMgBr (33.8 mL, 1 M, 33.77 mmol) slowly and the reaction is stirred at room temperature over 2.5 h. The solution is removed from the glove box and all volatiles are removed. The crude product is taken up in CH$_2$Cl$_2$ and washed with 1 N HCl. The organic layer os collected and all volatiles are removed. The crude product is used in the next reaction without further purification. $^1$H NMR (400 MHz, CDCl$_3$) δ 7.58 (ddd, J=7.9, 7.5, 1.0 Hz, 1H), 7.46-7.40 (m, 1H), 7.17 (dt, J=7.4, 1.0 Hz, 1H), 6.91-6.87 (m, 2H), 2.29 (s, 3H), 2.02 (s, 6H). $^{13}$C NMR (101 MHz, CDCl$_3$) δ 161.14, 138.42, 137.89, 135.60, 128.32, 127.01, 126.86, 125.91, 123.67, 21.05, 20.13.

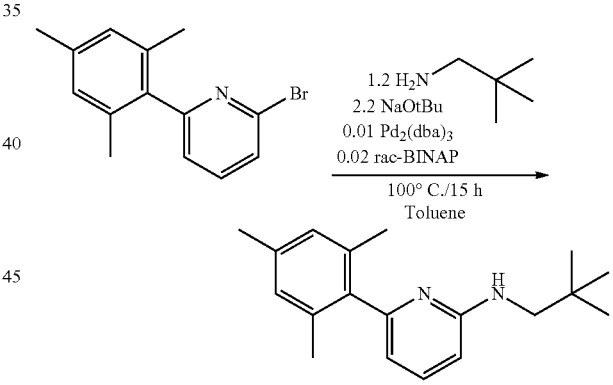

Step 2: Synthesis of 2-mesityl-6-neopentylaminopyridine. The crude product from the previous reaction is added to a 250 mL round bottom flask. Neopentylamine (4.42 g, 50.66 mmol), NaOtBu (7.14 g, 74.30 mmol), Pd$_2$dba$_3$ (0.309 g, 0.34 mmol), and BINAP (0.420 g, 0.68 mmol) are all added to the flask, followed by anhydrous toluene (120 mL). The reaction is heated overnight at 100° C. under a nitrogen purge. The reaction is cooled to room temperature, then all volatiles are removed. Water and EtOAc are added and the organic layer is collected. Silica gel is added to the crude dark solution and all volatiles are removed. The product is purified by column chromatography using a solid load (90:10 hexanes:EtOAc) to give the pure product (64% yield, 6.1 g). $^1$H NMR (400 MHz, CDCl$_3$) δ 7.46 (t, J=7.8 Hz, 1H), 6.89 (s, 2H), 6.50-6.42 (m, 1H), 6.32 (d, J=8.4 Hz, 1H), 4.66 (s, 1H), 3.04 (d, J=6.2 Hz, 2H), 2.29 (s, 3H), 2.07 (s, 6H), 0.97 (d, J=1.5 Hz, 9H). $^{13}$C NMR (101 MHz, CDCl$_3$) δ

159.31, 158.37, 137.64, 136.86, 135.57, 128.13, 128.07, 113.24, 102.95, 54.16, 32.03, 27.51, 21.03, 20.03.

General Procedure for Metallation of 2-aminopyridine Ligands

Inside the glovebox a vial is charged with HfCl₄ or ZrCl₄ (0.23 mmol) and toluene (5 mL). The solution is cooled to −30° C., then McMgBr (0.35 mL, 3 M, 1.04 mmol) is added. The solution is allowed to stir for 2 min, then a cold toluene (5 mL) suspension of the ligand (0.23 mmol) is added. The solution quickly changes to a yellow color and is allowed to stir at room temperature for 2 h. All volatiles are removed, and the residue is triturated with hexanes. The residue is taken up in hexanes and filtered through a disposable frit. The yellow solution is evacuated to dryness, then dissolved in ether. The yellow solution is concentrated and cooled to −30° C. to give yellow crystals of the product.

Synthesis of Procatalyst (B10)

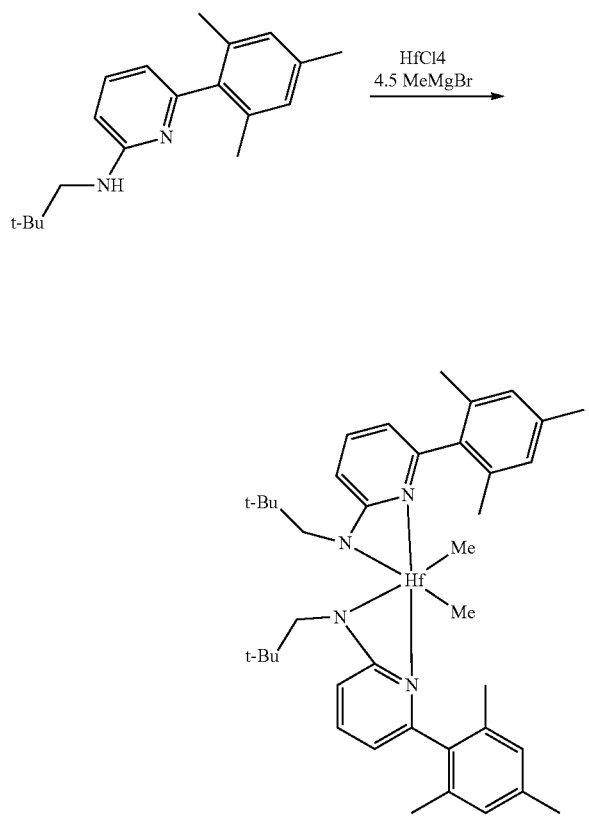

Procatalyst (B10) is prepared following the General Procedure for metallation of 2-aminopyridine ligands using HfCl₄. Yield: 86%. ¹H NMR (400 MHz, C₆D₆) δ 6.96-6.86 (m, 2H), 6.70 (s, 4H), 5.88 (d, J=8.7 Hz, 2H), 5.85-5.81 (m, 2H), 2.41 (s, 4H), 2.18 (s, 6H), 2.10-1.94 (m, 6H), 1.71-1.51 (m, 6H), 0.95 (s, 18H), 0.47 (s, 6H). ¹³C NMR (101 MHz, C₆D₆) δ 171.86, 155.31, 140.05, 136.79, 136.39, 135.94, 134.97, 127.96, 109.27, 103.49, 57.80, 54.81, 34.23, 28.39, 20.69, 20.31, 19.79.

Synthesis of Procatalyst (B14)

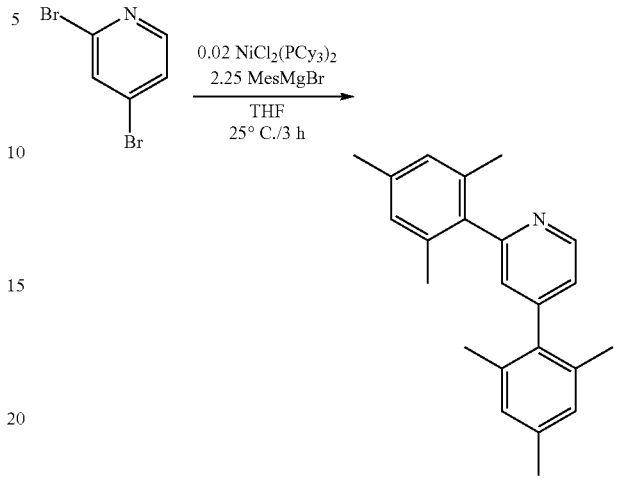

Preparation of 2,4-dimesitylpyridine: Inside a glove box, a 1 L round bottom flask is charged with 2,4-dibromopyridine (25.0 g, 105.5 mmol), NiCl₂(PCy₃)₂ (1.45 g, 2.11 mmol), and THF (500 mL). To the solution is added MesMgBr (1 M in THF, 237.5 mL, 237.5 mmol) slowly by addition funnel and the reaction is stirred at room temperature for 1 h (the reaction warms to reflux, so slow addition is needed). The solution is removed from the glove box and quenched with water (100 mL). THF is removed by rotary evaporation then 1N HCl (200 mL) and CH₂Cl₂ (200 mL) are added to the crude product and the organic layer is collected. The dark red CH₂Cl₂ solution is passed through a silica gel plug and eluted with CH₂Cl₂ to give the product. All volatiles are removed and the product is collected for the next step (80%, 26.5 g). ¹H NMR (400 MHz, CDCl₃) δ 8.79 (dd, J=5.0, 0.9 Hz, 1H), 7.08 (dd, J=5.0, 1.7 Hz, 1H), 7.06 (dd, J=1.6, 0.9 Hz, 1H), 7.02-6.98 (m, 2H), 6.98-6.94 (m, 2H), 2.37 (s, 3H), 2.36 (s, 3H), 2.12 (s, 6H), 2.09 (s, 6H). ¹³C NMR (101 MHz, CDCl₃) δ 160.31, 149.83, 149.72, 137.80, 137.42, 137.31, 136.44, 135.55, 134.99, 128.38, 128.31, 125.68, 122.61, 21.13, 21.07, 20.59, 20.18.

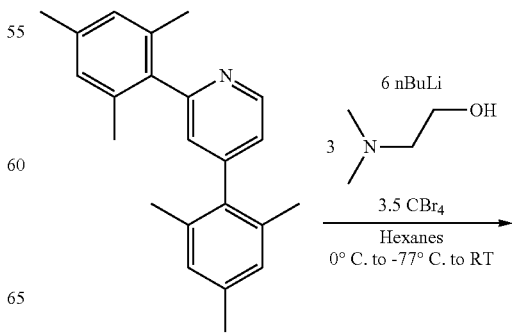

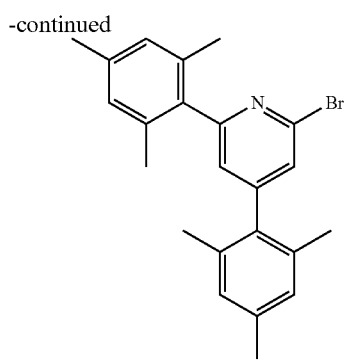

Preparation of 2-bromo-4,6-dimesitylpyridine: A 1 L round bottom flask is charged with dimethylaminoethanol (16.6 mL, 164.5 mmol) and hexanes (250 mL). The flask is purged with nitrogen then nBuLi (2.5 M in hexanes, 131.6 mL, 329.0 mmol) is added dropwise at 0° C. The reaction is stirred for 1 h then 2,4-dimesitylpyridine (in 130 mL of ether, 17.3 g, 54.8 mmol) is added dropwise. The solution turns to a dark brown and is stirred for 2 h. The solution is cooled to −77° C. then CBr$_4$ (63.7 g, 191.9 mmol) in ether (80 mL) is added dropwise. A precipitate forms and is stirred overnight at room temperature. Water is added to quench the reaction then ether is added and the organic layer extracted. All volatiles are removed then the crude product is passed through a silica gel plug (elute with hexanes to remove CBr$_4$, then CH$_2$Cl$_2$ to obtain product). The crude product is purified by column chromatography (gradient 100% hexanes to 70:30 hexanes:EtOAc). Yield: 14.0 g, 65%. $^1$H NMR (400 MHz, CDCl$_3$) δ 7.28-7.22 (m, 1H), 7.01-6.97 (m, 1H), 6.94 (s, 3H), 6.91 (s, 3H), 2.32 (s, 3H), 2.30 (s, 3H), 2.08 (s, 6H), 2.05 (s, 6H). $^{13}$C NMR (101 MHz, CDCl$_3$) δ 161.08, 152.53, 142.01, 137.91, 137.86, 136.30, 135.54, 134.93, 134.85, 128.43, 128.36, 126.57, 125.05, 21.07, 21.02, 20.53, 20.20.

Inside a glove box, a 20 mL vial was charged with 2,4-dimesityl-6-bromo-pyridine (0.500 g, 1.27 mmol), NaO$^t$Bu (0.270 g, 2.81 mmol), Pd$_2$dba$_3$ (0.058 g, 0.06 mmol), BINAP (0.039 g, 0.06 mmol), neopentylamine (0.188 g, 2.16 mmol), and toluene (8 mL). The reaction mixture was heated to 100° C. for 3 h, then removed from the glove box. Silica gel was added and all volatiles were removed. The solid was purified by column chromatography (hexanes:EtOAc 85:15). Yield: 0.415 g, 82%. $^1$H NMR (400 MHz, CDCl$_3$) δ 7.03 (s, 2H), 7.00 (s, 2H), 6.39 (d, J=1.2 Hz, 1H), 6.27 (d, J=1.1 Hz, 1H), 4.95 (t, J=6.2 Hz, 1H), 3.14 (d, J=6.2 Hz, 2H), 2.42 (s, 3H), 2.40 (s, 3H), 2.25 (s, 6H), 2.22 (s, 6H), 1.09 (s, 9H). $^{13}$C NMR (101 MHz, CDCl$_3$) δ 159.88, 158.71, 151.28, 138.42, 137.83, 136.88, 136.86, 135.55, 135.14, 128.29, 128.21, 114.63, 103.60, 54.35, 32.33, 27.62, 21.17, 21.12, 20.50, 20.19.

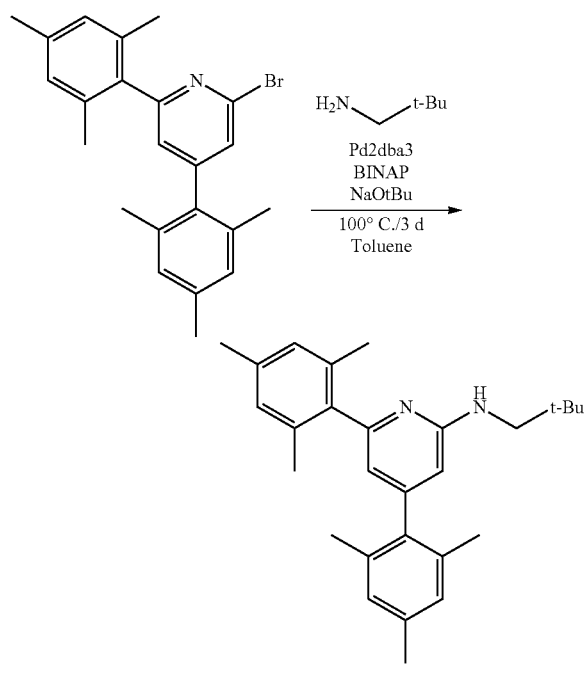

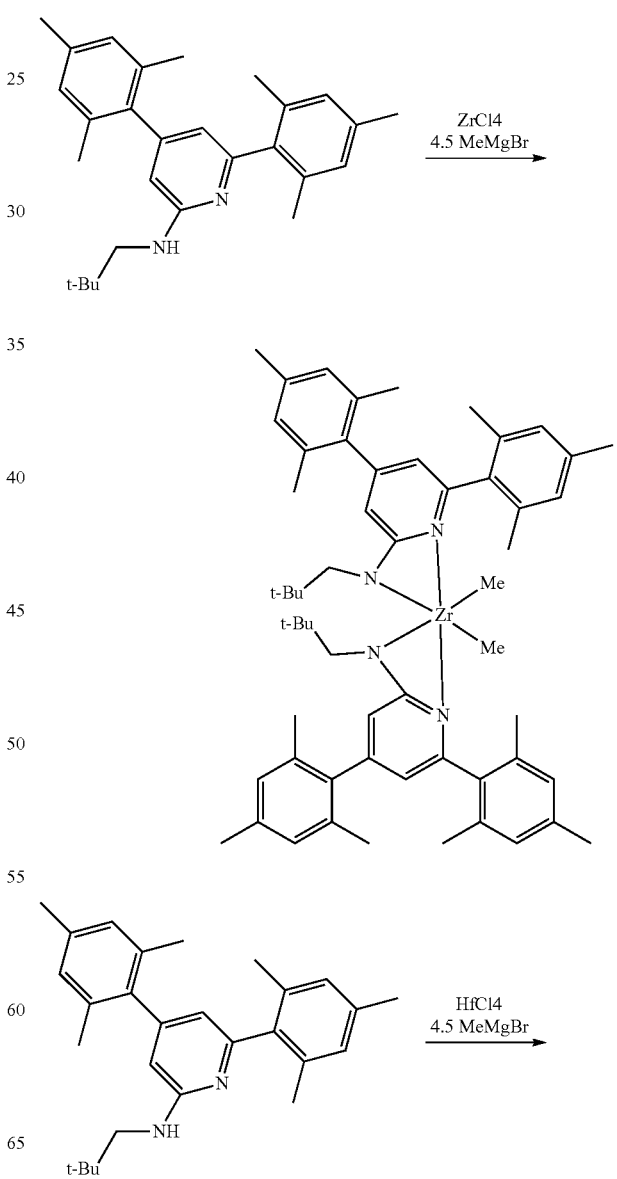

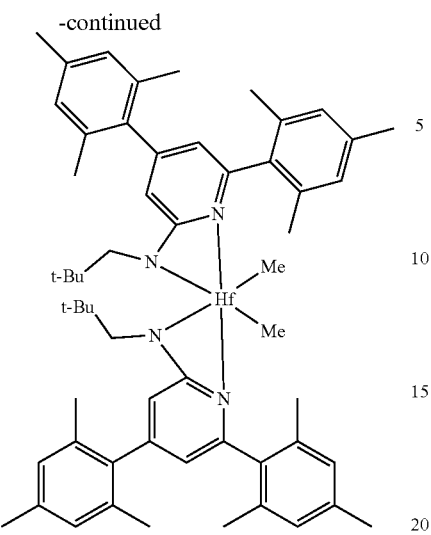

Procatalyst (B14) is then prepared following the General Procedure for metallation of 2-aminopyridine ligands described above using HfCl$_4$. Yield: 87%. $^1$H NMR (400 MHz, C$_6$D$_6$) δ 6.78 (d, J=7.6 Hz, 4H), 6.70 (d, J=13.1 Hz, 4H), 5.99 (s, 2H), 2.54 (d, J=13.5 Hz, 2H), 2.23 (m, 2H), 2.18 (s, 4H), 2.16 (s, 6H), 2.14 (s, 6H), 2.11 (d, J=11.4 Hz, 6H), 2.07-2.02 (m, 6H), 1.97 (s, 6H), 0.93 (s, 18H), 0.47 (s, 6H).
$^{13}$C NMR (101 MHz, C$_6$D$_6$) δ 172.73, 156.01, 154.68, 138.17, 137.17, 137.06, 136.80, 136.13, 135.45, 135.25, 134.46, 128.72, 128.47, 111.23, 104.42, 58.20, 55.16, 34.49, 31.93, 28.88, 25.61, 21.12, 21.08, 20.50, 20.19.

Synthesis of Procatalyst (A1)

Procatalyst (A1) is synthesized in accordance with the procedures described in U.S. Pat. No. 6,953,764 B2, which is incorporated herein by reference in its entirety.

Synthesis of Procatalyst (R)

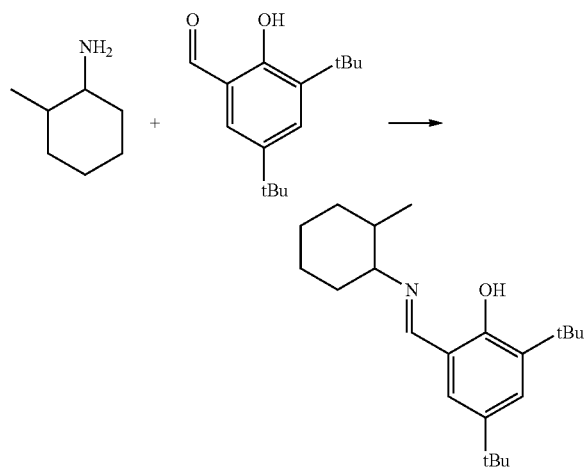

A 20 L carboy is charged with salicylaldehyde (2503.0 g, 10.68 mol) and methanol (12 L), and the slurry is tumbled for 20 minutes. The temperature decreases to about 16° C. as the solid dissolves. The amine (1313 g, 11.60 mol) is added in three portions over a period of two hours. The reaction is left to tumble overnight. The bright yellow solid product is collected by filtration and then dried in vacuo in a 12 L glass round bottom flask. $^1$H NMR shows the product is a mixture of ~3:1 trans:cis ratio with about 2.4 mole percent residual MeOH. Yield=3141 g (89.2%).

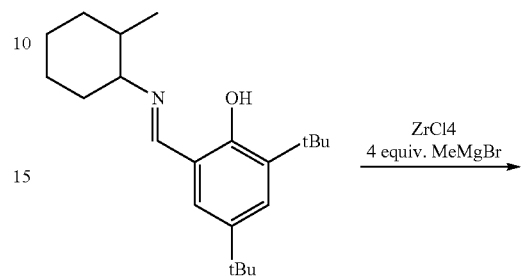

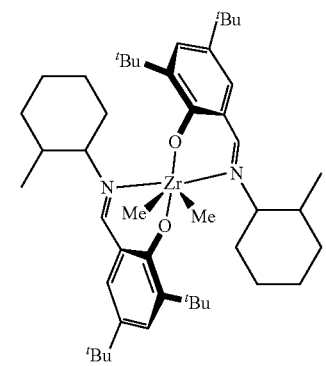

A 5-L three-neck round bottom flask is fitted with an overhead stirrer in a drybox under N$_2$ atmosphere and charged with ligand (393 g, 1.19 mol), zirconium tetrachloride (139 g, 0.597 mmol) and dry toluene (3.5 L). The bright yellow slurry is stirred and 3.0 M methylmagnesium bromide in ether (800 mL, 2400 mmol) is added dropwise over 1 hr. Temperature and methane evolution are monitored carefully during addition of the first two equivalents of the Grignard reagent. After stirring for an additional hour, the ether and toluene are removed under vacuum. The solids are slurried with toluene (4 L) and the magnesium salts are removed on a fritted funnel. The salts are washed with an additional 4 L toluene and the filtrates are combined in a B-5 cylinder. The cylinder is sampled for gravimetric analysis and batch reactor evaluation. Typical concentrations are near 5.4 wt. %, equivalent to ~370 g complex (80% yield).

Synthesis of Procatalyst (AB)

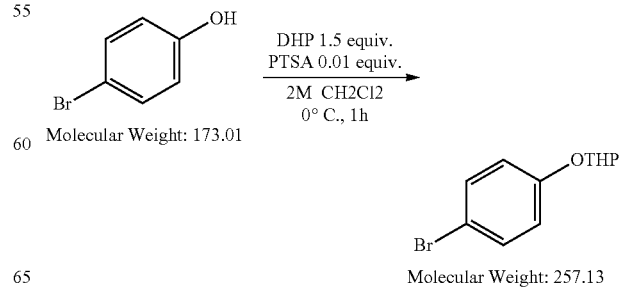

The 4-bromophenol (15.0 g, 86.7 mmol, 1.0 equiv.) and p-toluenesulfonic acid hydrate (165 mg, 0.867 mmol, 0.01 equiv.) are dissolved in 35 mL $CH_2Cl_2$ and cooled to 0° C. The 3,4-dihydro-2H-pyran (11.9 mL, 130 mmol, 1.5 equiv.) is added dropwise with stirring and the following actions are taken. Stirred 1 h at 0° C. Quenched with 100 mL 1N NaOH, diluted with 100 mL $Et_2O$. Separated organic layer, extracted aqueous layer with additional 50 mL $Et_2O$. Filtered combined organic extracts through a silica plug, rinsed with $Et_2O$, concentrated. Purified by column chromatography, eluting with 0→10% acetone/hexane gradient. Collected 18.73 g product, 84.0% yield as a clear oil which solidified to a white solid in the freezer. $^1H$ NMR (400 MHz, $CDCl_3$) δ 7.41-7.33 (m, 2H), 6.98-6.89 (m, 2H), 5.37 (t, J=3.3 Hz, 1H), 3.87 (ddd, J=11.4, 9.6, 3.2 Hz, 1H), 3.59 (dtd, J=11.4, 4.1, 1.4 Hz, 1H), 2.05-1.91 (m, 1H), 1.94-1.79 (m, 2H), 1.78-1.52 (m, 3H). $^{13}C$ NMR (101 MHz, $CDC)_3$) δ 156.17, 132.19, 118.31, 113.83, 96.51, 62.00, 30.26, 25.13, 18.65.

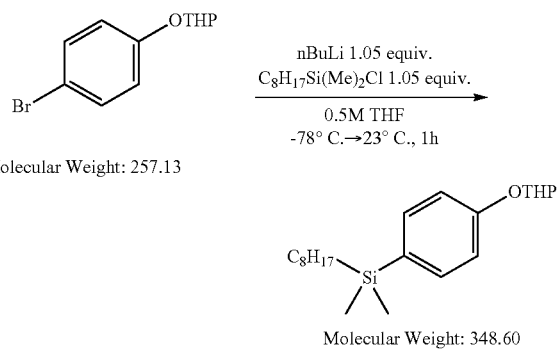

In a 500 mL oven dried flask under $N_2$ dissolved aryl bromide (18.7 g, 72.8 mmol, 1.0 equiv.) in 146 mL dry THF. Cooled to –78° C., added n-butyllithium (2.43 M in hexanes, 31.5 mL, 76.5 mmol, 1.05 equiv.) slowly with stirring. Stirred at –78° C. for 30 min, then added chloro(dimethyl)octylsilane (18.1 mL, 76.5 mmol, 1.05 equiv.) slowly. Stirred overnight, allowing to warm gradually to room temperature. Quenched with 100 mL sat. aq. $NH_4Cl$. Added 100 mL $Et_2O$, separated layers. Extracted aqueous layer with additional 100 mL $Et_2O$. Dried combined organic layers over $MgSO_4$, filtered and concentrated. The crude purity is very good, however a small silane-derived byproduct was observed by $^1H$ NMR (ca. 0.1 equiv). This impurity could be removed by reverse phase column chromatography, eluting with 0→30% THF/MeCN gradient. Alternatively the product could be carried forward crude with the separation performed following a subsequent step. Recovery of product was quantitative. $^1H$ NMR (400 MHz, Chloroform-d) δ 7.42 (d, J=8.6 Hz, 2H), 7.04 (d, J=8.6 Hz, 2H), 5.45 (s, 1H), 3.91 (ddd, J=11.4, 9.6, 3.1 Hz, 1H), 3.60 (dtd, J=11.3, 4.1, 1.5 Hz, 1H), 2.07-1.93 (m, 1H), 1.90-1.80 (m, 2H), 1.73-1.58 (m, 3H), 1.26 (m, 12H), 0.87 (t, J=6.5 Hz, 3H), 0.70 (m, 2H), 0.22 (s, 6H).

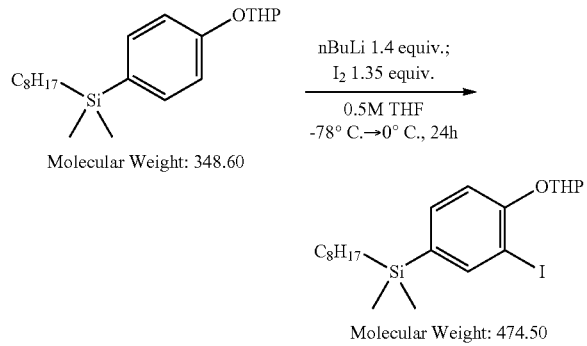

In an oven dried 500 mL flask dissolved substrate (25.4 g, 72.8 mmol, 1.0 equiv.) in 146 mL THF under $N_2$, cooled to –78° C. Added n-butyllithium (2.43 M solution in hexanes, 42.0 mL, 102 mmol, 1.4 equiv.) dropwise with stirring. Solution was stirred at –78° C. for 30 min, then warmed to 0° C. and stirred an additional 3 h. Separately, the $I_2$ (25.0 g, 98.3 mmol, 1.35 equiv.) was dissolved in 58 mL THF. The reaction flask was cooled to –78° C. and the $I_2$ solution was added dropwise via syringe. The mixture was stirred overnight, gradually warming to room temperature in the process. Quenched with 100 mL sat. aq. $Na_2S_2O_3$ and 100 mL $H_2O$. Stirred 30 min. Diluted with 100 mL $Et_2O$, separated organic layer. Extracted aqueous phase with additional 100 mL $Et_2O$. Dried combined organic fractions over $MgSO_4$, filtered and concentrated. The crude material was filtered through a short silica plug, eluting with hexane. The crude purity was excellent and the recovery was quantitative. However the silane-derived impurity present from the preceding step was still present. The impurity could be removed by reverse phase chromatography, eluting with 0→30% THF/MeCN gradient. $^1H$ NMR (400 MHz, Chloroform-d) δ 7.85 (d, J=1.5 Hz, 1H), 7.37 (dd, J=8.1, 1.5 Hz, 1H), 7.05 (d, J=8.1 Hz, 1H), 5.56 (t, J=2.9 Hz, 1H), 3.86 (td, J=11.1, 2.9 Hz, 1H), 3.64-3.53 (m, 1H), 2.21-2.08 (m, 1H), 2.01-1.94 (m, 1H), 1.91-1.82 (m, 1H), 1.77-1.60 (m, 3H), 1.26 (m, 12H), 0.87 (t, J=6.9 Hz, 3H). 0.70 (m, 2H), 0.21 (s, 6H).

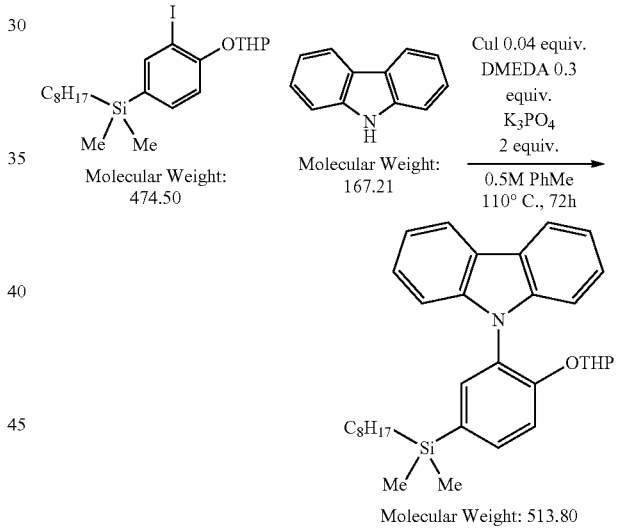

In an oven dried 100 mL flask dissolved aryl iodide (10.0 g, 21.1 mmol, 1.0 equiv.) in 42 mL toluene under $N_2$. Added carbazole (4.93 g, 29.5 mmol, 1.4 equiv.), CuI (161 mg, 0.84 mmol, 0.04 equiv.), N,N'-dimethylethylenediamine (0.63 mL, 6.32 mmol, 0.3 equiv.) and $K_3PO_4$ (8.95 g, 42.1 mmol, 2.0 equiv.). Solution was stirred at 110° C. for 72 h. Cooled to room temperature, filtered through a silica plug, eluting with $Et_2O$. Concentrated eluent, then triturated with hexane to remove insoluble carbazole. Filtered mixture, rinsing with 2×25 mL hexane. Concentrated filtrate. Purified by reverse phase column chromatography, eluting with 30→0% $H_2O$/MeCN gradient followed by 0→35% THF/MeCN gradient. Collected 8.66 g product, 80.0% yield as a light yellow oil. $^1H$ NMR (400 MHz, Chloroform-d) δ 8.14 (d, J=7.7 Hz, 2H), 7.60 (d, J=1.6 Hz, 1H), 7.56 (dd, J=8.1, 1.6 Hz, 1H), 7.43-7.33 (m, 3H), 7.28-7.22 (m, 3H), 7.16 (d, J=8.2 Hz, 1H), 5.34 (t, J=2.9 Hz, 1H), 3.61 (td, J=11.2, 2.9 Hz, 1H), 3.50-3.42 (m, 1H), 1.50-1.38 (m, 1H), 1.36-1.21 (m, 14H), 1.18-1.10 (m, 1H), 1.08-0.98 (m, 1H), 0.87 (t, J=6.9 Hz, 3H), 0.79-0.69 (m, 2H), 0.26 (s, 3H), 0.26 (s, 3H).

In an oven dried 250 mL flask under $N_2$ dissolved substrate (8.66 g, 16.9 mmol, 1.0 equiv.) in 84 mL anhydrous THF, cooled to −78° C. Added n-butyllithium (2.50 M solution in hexanes, 8.8 mL, 21.9 mmol, 1.3 equiv.) dropwise via syringe, stirred 15 min. Transferred reaction to a 0° C. bath, stirred 4 h. Reaction turned yellow then dark green. Added isopropoxy(pinacolborane) (4.8 mL, 23.6 mmol, 1.4 equiv.) via syringe and stirred overnight at room temperature, allowing to warm gradually to room temperature. Color lightened to light yellow-green. Quenched reaction with 50 mL sat. aq. $NaHCO_3$, diluted with 50 mL $Et_2O$ and separated layers. Extracted aqueous phase with additional 50 mL $Et_2O$. Washed combined organics with 100 mL brine. Dried organic layer over $MgSO_4$, filtered and concentrated to collect a viscous oil. Triturated with MeCN, cooled mixture to 0° C. and filtered to collect product as a white powder. Collected 9.01 g product, 83.5% yield. $^1$H NMR (400 MHz, Chloroform-d) δ 8.13-8.09 (m, 2H), 7.95 (d, J=1.7 Hz, 1H), 7.60 (d, J=1.7 Hz, 1H), 7.43-7.34 (m, 2H), 7.29-7.22 (m, 4H), 4.93 (t, J=2.9 Hz, 1H), 2.67-2.54 (m, 2H), 1.70-1.62 (m, 1H), 1.39 (s, 6H), 1.38 (s, 6H), 1.33-1.21 (m, 14H), 1.20-1.06 (m, 3H), 0.97-0.90 (m, 1H), 0.87 (t, J=6.8 Hz, 3H), 0.76-0.70 (m, 2H), 0.25 (s, 3H), 0.24 (s, 3H).

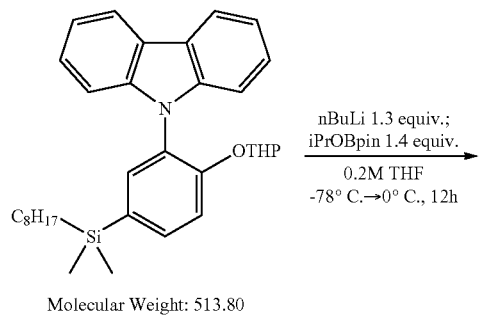

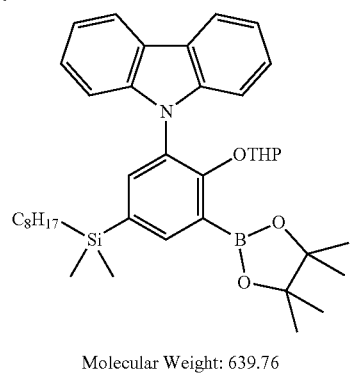

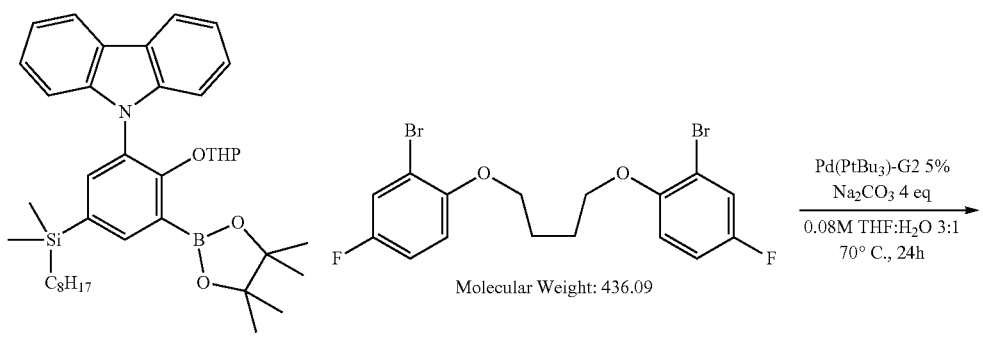

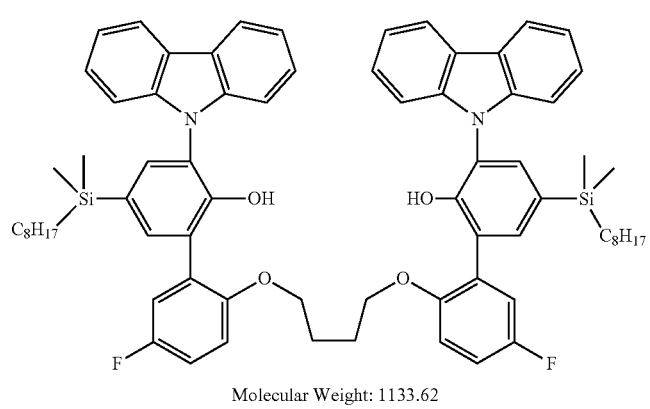

To a 20 mL vial under $N_2$ was added the bis(aryl bromide) bridge (0.300 g, 0.688 mmol, 1.0 equiv.), boronate ester (0.946 g, 1.48 mmol, 2.15 equiv.), chloro[(tri-tert-butylphosphine)-2-(2-aminobiphenyl)]palladium(II) (0.018 g, 0.034 mmol, 0.05 equiv.) $Na_2CO_3$ (0.292 g, 2.75 mmol, 4.0 equiv.), 6.4 mL of degassed THF and 2.1 mL of degassed water. The system was sparged with $N_2$. The reaction was heated to 70° C. for 24 hours, and conversion was monitored by HPLC. The reaction was cooled and the volatiles were removed by rotary evaporation. The residue was taken up in $Et_2O$, washed with brine, dried over anhydrous magnesium sulfate, filtered through a pad of silica gel then concentrated to give protected ligand. Dissolved in 1:1 THF:MeOH, added 1 drop HCl, stirred 2 h at room temperature. Concentrated solution to a yellow oil. Purified by reverse phase column chromatography, eluting with 0→40% THF/MeCN. Collected product in two fractions. The later eluting fraction contained significant amounts of an unidentified impurity and was discarded. The remaining fraction was resubjected to column chromatography under identical conditions. Collected 0.416 g product as a white powder, 53.3% yield. $^1$H NMR (400 MHz, Chloroform-d) δ 8.14 (d, J=7.7 Hz, 4H), 7.54 (m, 2H), 7.46 (m, 2H), 7.32 (ddt, J=8.2, 7.1, 1.1 Hz, 4H), 7.23 (m, 4H), 7.16 (m, 6H), 7.01 (ddd, J=10.3, 5.4, 2.8 Hz, 2H), 6.72 (dd, J=9.0, 4.4 Hz, 2H), 6.20 (s, 2H), 3.71 (m, 4H), 1.62 (m, 4H), 1.39-1.16 (m, 24H), 0.84 (t, J=7.2 Hz, 6H), 0.78-0.69 (m, 4H), 0.24 (s, 12H). $^{19}$F NMR (376 MHz, $CDCl_3$) δ 121.74.

In a glovebox, in an oven dried 4 oz jar with a stir bar suspended $HfCl_4$ (0.515 g, 1.61 mmol, 1.0 equiv.) in 40 mL toluene (anhydrous). Cooled to −30° C. in freezer. Removed from freezer, added MeMgBr (3.0 M in $Et_2O$, 2.25 mL, 6.76 mmol, 4.2 equiv.) with stirring. Stirred 10 min, solution darkened. Added ligand (1.82 g, 1.61 mmol, 1.0 equiv.), allowed to warm to room temperature with stirring overnight. Removed solvent under vacuum to yield brown solids. Extracted solids with ca. 150 mL hexane. Concentrated extract to obtain 1.30 g product, 60.4% yield as a white powder.
$^1$H NMR (400 MHz, Benzene-$d_6$) δ 8.13 (dd, J=7.6, 0.9 Hz, 2H), 8.05 (d, J=6.9 Hz, 2H), 7.83 (d, J=1.7 Hz, 2H), 7.60-7.53 (m, 4H), 7.46-7.36 (m, 4H), 7.27-7.17 (m, 6H), 6.97 (dd, J=9.0, 3.2 Hz, 2H), 6.59 (ddd, J=9.0, 7.2, 3.2 Hz, 2H), 4.64 (dd, J=9.1, 4.9 Hz, 2H), 3.85 (t, J=10.4 Hz, 2H), 3.28 (dd, J=11.8, 3.6 Hz, 2H), 1.40-1.23 (m, 24H), 0.90-0.85 (m, 6H), 0.76-0.69 (m, 4H), 0.69-0.61 (m, 2H), 0.55-0.45 (m, 2H), 0.24 (s, 6H), 0.23 (s, 6H), −1.12 (s, 6H). $^{13}$C NMR (101 MHz, $C_6D_6$) δ 161.53, 159.09, 157.27, 151.47, 151.44, 141.59, 141.15, 135.85, 135.02, 134.39, 134.31, 130.69, 130.35, 127.59, 127.08, 125.58, 125.49, 125.44, 125.26, 122.91, 121.08, 120.56, 120.49, 120.05, 118.50, 118.26, 116.65, 116.42, 112.78, 109.10, 80.66, 49.97, 33.94, 32.35, 29.82, 29.73, 26.23, 24.51, 23.09, 16.26, 14.36, −2.58, −2.76. $^{19}$F NMR (376 MHz, $C_6D_6$) δ−115.86.

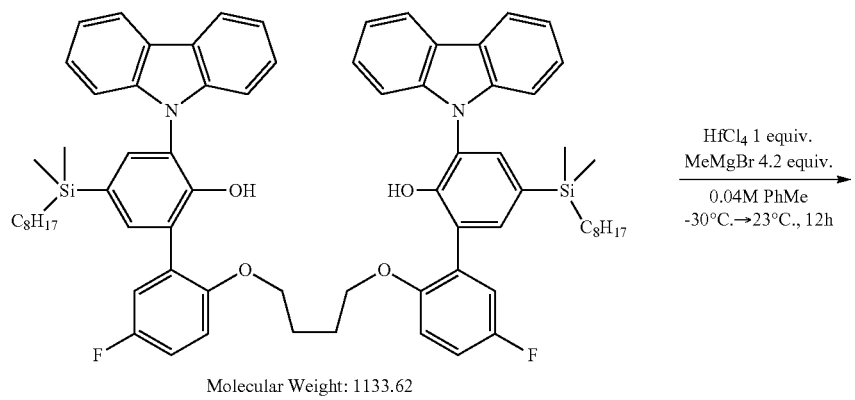

Molecular Weight: 1133.62

$HfCl_4$ 1 equiv.
MeMgBr 4.2 equiv.
───────────────
0.04M PhMe
−30° C.→23° C., 12h

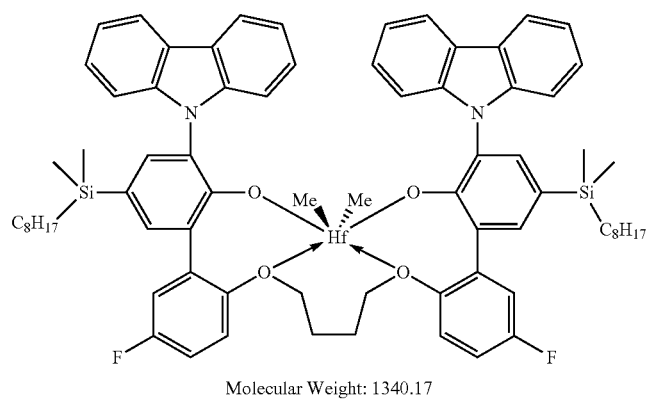

Molecular Weight: 1340.17

Synthesis of Procatalyst (AA1)

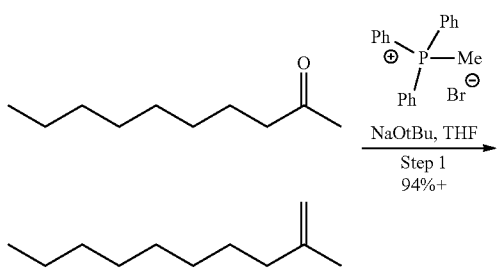

Step 1: Preparation of 2-methyldecene: A 2 L 3-neck flask equipped with a mechanical stirrer, thermocouple, and a nitrogen pad, was charged with methyltriphenylphosphonium bromide (297.18 g, 831.9 mmol, 1.3 equiv.) and 850 mL tetrahydrofuran (THF, anhydrous, 1 mL/mmol, via cannula). The white suspension was cooled to 0° C. in an ice bath and NaOtBu (79.95 g, 831.9 mmol, 1.3 equiv.) was added (slight exotherm observed, ~2° C. increase upon addition). The resulting reaction mixture (yellow slurry) was stirred at 0° C. for 45 minutes. To this suspension a solution of 2-decanone (100 g, 639.9 mmol, 1 equiv.) in 150 mL THF (anhydrous, 0.23 mL/mmol) was added slowly over 10 minutes (added at a rate that the temperature was maintained at <10° C.). The resulting reaction mixture was allowed to warm to ambient temperature overnight. After stirring overnight (22 h), a sample of the reaction mixture (yellow slurry) was taken and analyzed by $^1$H NMR spectroscopy. The $^1$H NMR spectrum showed full consumption of the starting material. The reaction mixture was filtered through a pad of celite and the filter cake was rinsed with methylene chloride. The filtrate was concentrated via rotary evaporation to give a yellow oil. The yellow oil was dissolved in pentane and filtered through a pad of silica gel. The filtrate was concentrated via rotary evaporation and the process was repeated until all solids were removed. The product was obtained as a colorless liquid (95 g, pure by $^1$H NMR, 96% yield).

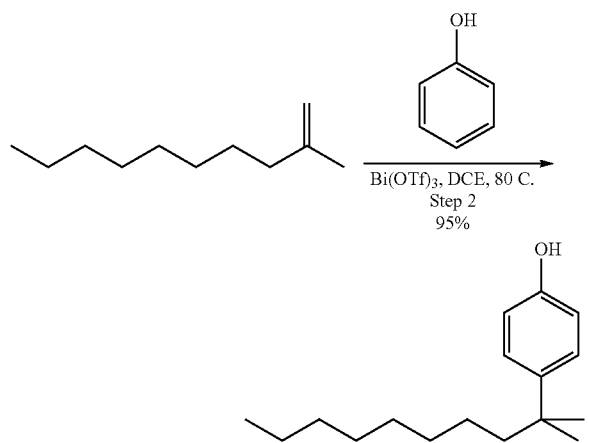

Step 2: Preparation of 4-(2-methyldecan-2-yl)phenol: A 2 L 4-neck flask equipped with a magnetic stirrer, thermocouple, water condenser, and nitrogen pad was charged with phenol (133.5 g, 1418 mmol, 2 equiv.), 2-methyldecene (109.4 g, 709 mmol, 1 equiv.), and 709 mL 1,2-dichloroethane (DCE). The reaction mixture was sparged with nitrogen for 30 minutes. Bi(OTf)$_3$ (4.65 g, 7.09 mmol, 0.01 equiv.) was then added and the resulting reaction mixture (yellow solution with white solids) was heated to 80° C. (set temperature to 45° C. and observed a strong exotherm; temperature reached ~70° C.). Once the temperature stabilized, the temperature was set to 80° C. and the reaction mixture was stirred overnight. After stirring overnight (15 h), a sample of the reaction mixture (orange solution) was taken and analyzed by GC. The GC trace showed full consumption of the alkene. The reaction mixture was cooled to ambient temperature and filtered through a short pad of silica gel and diluted with ethyl acetate (EtOAc, 500 mL). The organic layer was washed with 2 N NaOH (300 mL×2), water (300 mL), brine (300 mL), and passed through a plug of silica gel topped with Na$_2$SO$_4$. The plug was rinsed with hexanes and the filtrate was concentrated via rotary evaporation to give the crude product as a light brown oil. The crude product was dissolved in hexanes and concentrated (repeated 3 times) to remove residual EtOAc. The crude product was obtained as a light brown oil (175 g, 95.8% purity by GC analysis, 95% isolated yield). $^1$H NMR (400 MHz, CDCl$_3$) δ 7.18 (d, J=8.8 Hz, 2H), 6.76 (d, J=8.8 Hz, 2H), 4.70 (s, 1H), 1.54 (m, 2H), 1.25 (s, 6H), 1.19 (m, 10H), 1.03 (m, 2H), 0.86 (t, J=7.0 Hz, 3H).

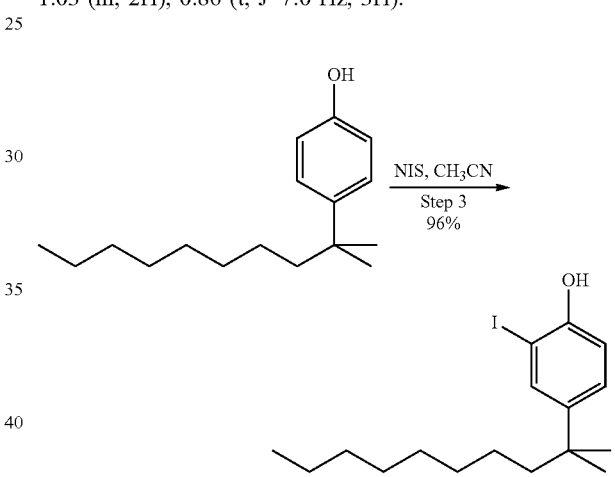

Step 3: Preparation of 2-iodo-4-(2-methyldecan-2-yl)phenol: A 3 L 4-neck flask equipped with a mechanical stirrer, a thermocouple, and nitrogen pad was charged with 4-(2-methyldecan-2-yl)phenol (176 g, 678 mmol, 1 equiv.), p-toluenesulfonic acid monohydrate (pTSA H$_2$O, 12.9 g, 67.4 mmol, 0.1 equiv.), and 1000 mL acetonitrile. The resulting reaction mixture (pink solution) was stirred at ambient temperature for 30 minutes. The reaction mixture was then cooled to 3-4° C. with an ice-water bath and N-iodosuccinimide (NIS, 160 g, 1.05 equiv.) was added in portions (~15 g each, 4-5° C.). After addition of NIS, the reaction mixture was stirred for 1 hour at 5° C., then the ice bath was removed, the flask was covered in foil, and the reaction mixture (orange solution) was stirred at ambient temperature. After stirring for 50 h, a sample of the reaction mixture was quenched with Na$_2$SO$_3$ (20% aq) and analyzed by GC. The GC trace showed full consumption of the starting material. The reaction mixture was quenched with Na$_2$SO$_3$ (20% aq., ~150 mL), diluted with water (1500 mL), and stirred at ambient temperature for 1 h. A brown oil settled to the bottom of the flask after stirring was ceased. The solution was decanted away from the oil and additional water (1500 mL) was added. The resulting mixture was stirred at ambient temperature for 1 h and the solution was decanted away from the oil (repeated one more time). The crude product was dissolved in 1 L of hexanes, washed with water (500 mL×2), brine (500 mL), and passed through a plug of silica gel topped with $Na_2SO_4$. The filtrate was concentrated via rotary evaporation and dried in a vacuum oven at 40° C. (20 Torr) to give the crude product as a brown oil (254 g, ~96% purity by GC, 96% yield). $^1$H NMR (400 MHz, $CDCl_3$) δ 7.55 (s, 1H), 7.19 (d, J=8.5 Hz, 1H), 6.91 (d, J=8.5 Hz, 1H), 5.13 (s, 1H), 1.52 (m, 2H), 1.23 (s, 6H), 1.20 (m, 10H), 1.03 (m, 2H), 0.86 (t, J=7.0 Hz, 3H).

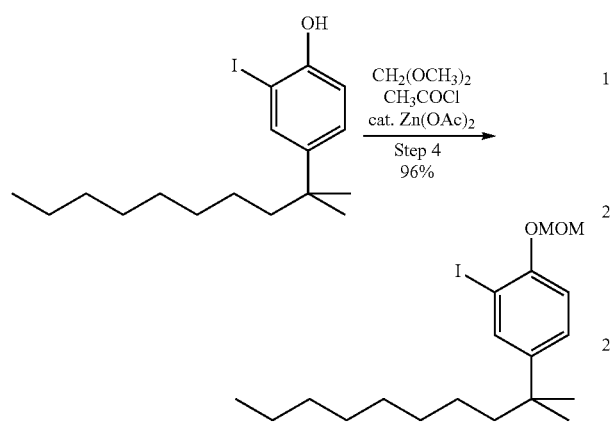

Step 4: Preparation of 2-iodo-1-(methoxymethoxy)-4-(2-methyldecan-2-yl)benzene: A 1 L 3-neck flask equipped with a mechanical stirrer, reflux condenser, and nitrogen pad was charged with dimethoxymethane (59 mL, 664.0 mmol, 1.3 equiv. relative to ArOH), anhydrous toluene (250 mL), and $Zn(OAc)_2$ (20 mg, 0.02 mol %). Acetyl chloride (47 mL, 664.0 mmol, 1.3 equiv.) was added via addition funnel over 45 minutes. An exothermic reaction was observed, the temperature gradually rose to 29° C. over the first 15 minutes at which point a cold water bath was applied to cool the reaction. When the acetyl chloride addition was complete the cold water bath was removed and the reaction mixture was allowed to stir at ambient temperature for 4 hours. 2-iodo-4-(2-methyldecan-2-yl)phenol (191.2 g, 510.5 mmol, 1 equiv.) was added in one portion (used 30 mL anhydrous toluene rinse) followed by addition of $iPr_2NEt$ (134 mL, 766.2 mmol, 1.5 equiv.) over 53 min via addition funnel (a slightly exothermic reaction was observed at the beginning with about a 2° C. temperature increase). The resulting reaction mixture was stirred at ambient temperature for 1 hour then heated to 60° C. overnight (15 hours). After the reaction was deemed complete by GC analysis, the reaction mixture was allowed to cool to ambient temperature then cooled in an ice-water bath. Saturated $NH_4Cl$ solution (500 mL) was added at such a rate to maintain the temperature below 30° C. (an exothermic reaction was observed, used an ice water bath to control the temperature). The biphasic reaction mixture was stirred for 2 hours then diluted with toluene (500 mL) and water (500 mL). The two phases were separated and the aqueous layer was washed with toluene (500 mL×2). The combined organic phases were washed with brine (500 mL×3), filtered through a plug of anhydrous $MgSO_4$ and concentrated to dryness under reduced pressure using rotary evaporation, which gave the desired product as a colorless oil (212.5 g, 95.5% yield). The crude product was used in the next step without further purification. $^1$H NMR (400 MHz, $CDCl_3$) δ 7.69 (d, J=2.3 Hz, 1H), 7.24-7.19 (m, 1H), 6.98 (d, J=8.6 Hz, 1H), 5.20 (s, 2H), 3.52 (s, 3H), 1.58-1.48 (m, 2H), 1.31-1.13 (m, 16H), 1.10-0.98 (m, 2H), 0.86 (t, J=7.0 Hz, 3H).

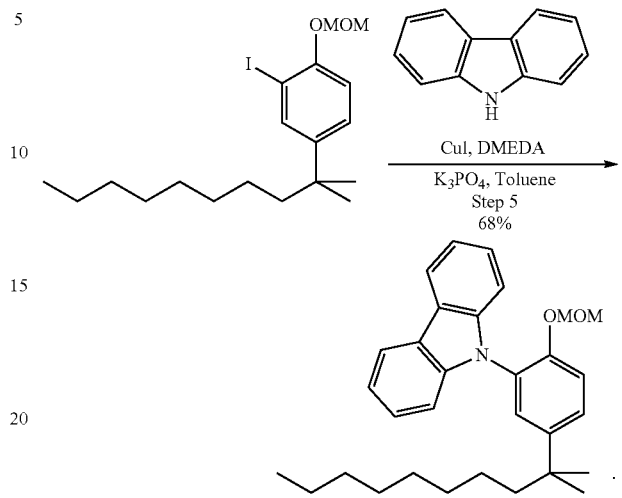

Step 5: A 2 L 3-neck flask equipped with a mechanical stirrer, reflux condenser, and nitrogen pad was charged with 2-iodo-1-(methoxymethoxy)-4-(2-methyldecan-2-yl)benzene (323.0 g, 710.3 mmol, 1 equiv.) and anhydrous toluene (890 mL). The solution was sparged with nitrogen for 30 minutes. To this solution was added carbazole (124.7 g, 745.8 mmol, 1.05 equiv.), anhydrous potassium phosphate (powder form, 301.5 g, 1421 mmol, 2.0 equiv.), copper iodide (CuI, 6.8 g, 35.5 mmol, 0.05 equiv.), and dimethylethylenediamine (DMEDA, 23 mL, 213.1 mmol, 0.30 equiv.). The resulting reaction mixture was heated to 110° C. for 21 hours at which time additional CuI (6.8 g, 35.5 mmol, 0.05 equiv.) and DMEDA (23 mL, 213.1 mmol, 0.30 equiv.) were added. After 43 hours total reaction time GC analysis indicated complete consumption of the starting MOM compound and the reaction was cooled to ambient temperature. Once cooled, the solids were removed by filtering through a medium frit funnel and the filtrate was passed through a pad of silica gel. The filtrate (approximately 2 L) was split into two ~1 L portions and each portion was concentrated. To each flask containing brown solid was added acetonitrile (1500 mL). The resulting slurry was stirred for 15 minutes and the light brown solids were collected via filtration. The collected solids were re-triturated with acetonitrile (1000 mL for each batch of solids) for 15 minutes. The solids were collected via filtration and then dried in a vacuum oven (35° C.) to afford a combined lot of product (192.9 g, 99.8% pure). The trituration filtrates were combined and concentrated to afford 174 g of crude, which was then absorbed onto silica gel (330 g). The crude on silica was split into 4 even portions and purified via flash chromatography using a CombiFlash Torrent purification system (2% ethyl acetate in hexane for 5 minutes then gradient to 5% ethyl acetate over 12 minutes). The relatively clean fractions were concentrated to afford 44.6 g of slightly pink solid which was triturated with acetonitrile (400 mL) for 15 minutes, filtered, then dried in a vacuum oven (35° C.) to afford an additional 27.6 g of white solid (99.0% pure). Total yield was 220.5 g (67.8%).

$^1$H NMR (400 MHz, $CDCl_3$) δ 8.14 (ddd, J=7.8, 1.3, 0.7 Hz, 2H), 7.42-7.35 (m, 4H), 7.34-7.30 (m, 1H), 7.26 (ddd, J=8.1, 7.2, 1.0 Hz, 2H), 7.17 (dt, J=8.2, 0.9 Hz, 2H), 4.93 (s, 2H), 3.16 (s, 3H), 1.60-1.56 (m, 2H), 1.26 (d, J=27.1 Hz, 16H), 1.13 (s, 2H), 0.91-0.80 (m, 3H).

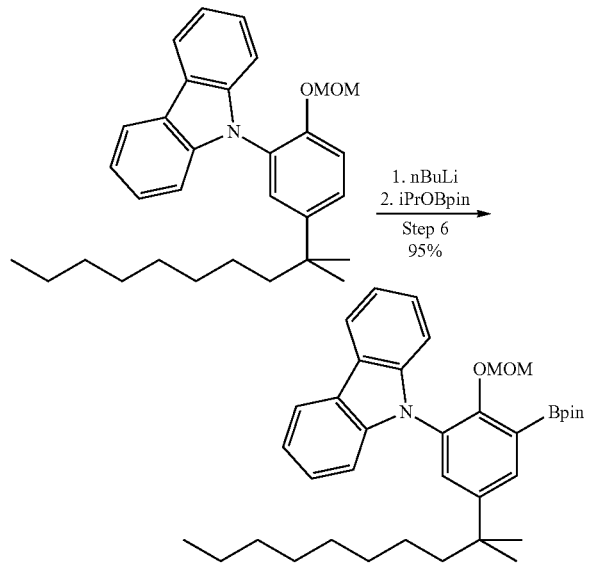

Step 6: A 3-neck 1 L round bottom flask equipped with a magnetic stirrer, thermowell with thermoprobe, and nitrogen purge was charged with DOC-61128 top group (81.0 g, 177 mmol, 1 equiv.) and anhydrous THF (366 g, via cannula, 18.1 wt % solution) under a nitrogen atmosphere. The mixture was cooled to −20 to −15° C. in a dry-ice acetonitrile bath. While keeping the internal temperature between −20 and −15° C., 2.5 M n-butyl lithium in hexanes (88.5 mL, 221.3 mmol, 1.25 equiv.) was added with a syringe pump (3 mL/min). The resulting dark brown solution was stirred and allowed to warm to 10° C. over 1.5 hours. A sample of the reaction mixture (0.1 mL) was removed and quenched with $D_2O$, extracted with $CDCl_3$, and analyzed by $^1H$ NMR spectroscopy, which showed completely deuterated starting material (confirmed completion of lithiation step). The reaction mixture was re-cooled to between −20 and −15° C., and 2-isopropoxy-4,4,5,5,-tetramethyl-1,3,2-dioxaborolane (iPrOBPin, 49 mL, 239 mmol, 1.35 equiv.) was added via syringe pump at 1 mL/min. After the addition was complete, the reaction mixture was stirred for 40 minutes and allowed to warm to 0° C. A sample was taken, quenched into saturated $NH_4Cl$, extracted with hexanes, diluted with THF, and analyzed by HPLC. The HPLC trace showed 95.6% BPin+boronic acid and 1.5% protodeborylated byproduct.

About 1 hour after the end of iPrOBPin addition, the reaction mixture had warmed to 4° C. The light brown slurry reaction mixture was re-cooled in the dry-ice bath to 0-5° C., diluted with hexanes (200 mL), and ice water (115 mL) was slowly added keeping the temperature below 5° C. The mixture was transferred to a 1 L separatory funnel and the bottom aqueous layer was removed. The aqueous layer was extracted with hexanes (60 mL×2). The combined organics were washed with saturated $NH_4Cl$ (115 mL), water (115 mL), and saturated NaCl (60 mL), and vacuum filtered through a pad of anhydrous $MgSO_4$. The filtrate was concentrated via rotary evaporation (20 torr, 50° C.) to yield crude product as a viscous yellow oil (96% purity, 103.7 g, theoretical=103.3 g). The crude product was used in the next step without further purification. $^1H$ NMR (400 MHz, $CDCl_3$) δ 8.11 (d, J=7.7 Hz, 2H), 7.83 (s, 1H), 7.46 (s, 1H), 7.39 (t, J=7.7 Hz, 2H), 7.27 (d, J=1.0 Hz, 1H), 7.21 (d, J=8.2 Hz, 3H), 4.66 (s, 2H), 2.32 (s, 3H), 1.58 (d, J=7.6 Hz, 2H), 1.38 (s, 12H), 1.26 (d, J=31.9 Hz, 26H), 0.86 (t, J=6.9 Hz, 3H).

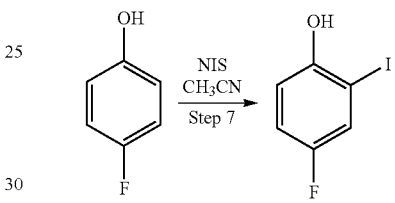

Step 7: Preparation of 2-iodo-4-fluorophenol: This step is performed as seen in the synthesis of procatalyst (A4).

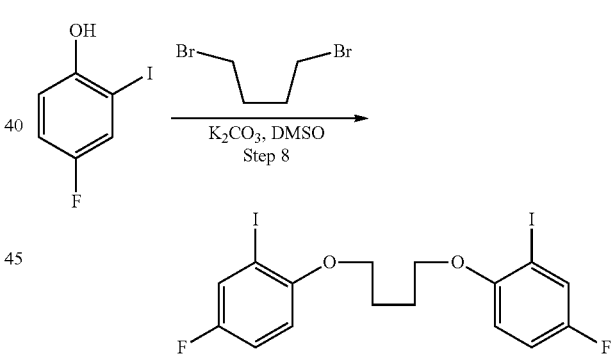

Step 8: This step is performed as seen in the synthesis of procatalyst (A4).

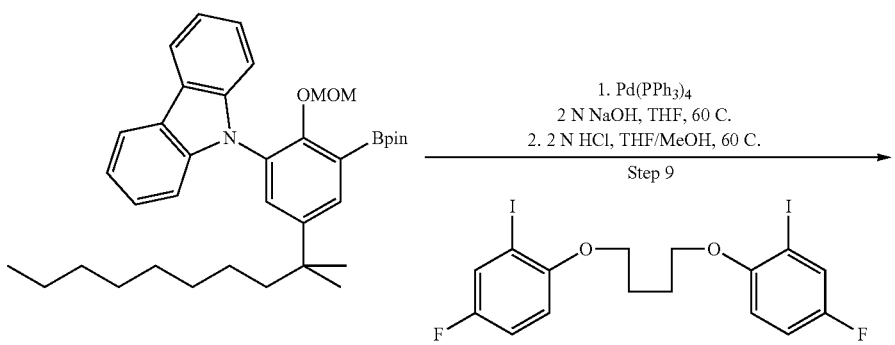

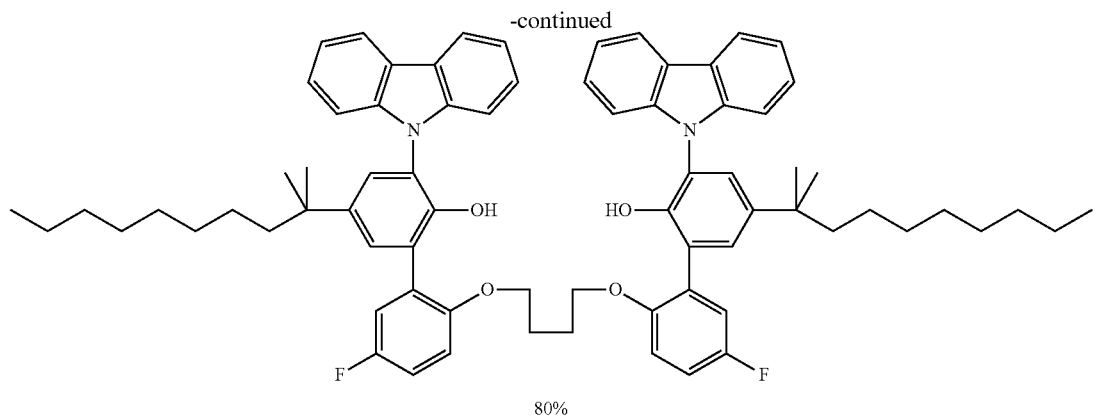

80%

Step 9: A 1 L 4-neck flask equipped with an overhead stirrer, thermocouple, water condenser, and a nitrogen pad was charged with DOC-61128 iodo-bottom group (32 g, 60.4 mmol, 1 equiv.), DOC-61128 top group BPin (87 g, 126.8 mmol, 2.1 equiv.), and THF (300 mL). The reaction mixture was degassed for 1 hour. Degassed 2 N NaOH (181 mL, 362 mmol, 6 equiv., via cannula) and (Pd(PPh$_3$)$_4$), 2.09 g, 1.8 mmol, 3 mol %) were then added to the flask. The resulting reaction mixture (brown biphasic solution) was stirred at 50° C. After stirring for 6 h, additional DOC-61128 top group BPin (20.7 g, 35.8 wt % soln, 0.2 equiv., degassed) and Pd(PPh$_3$)$_4$ (0.7 g, 1 mol %) were added and the reaction mixture was stirred at 50° C. overnight. After stirring overnight (15 h), a sample of the reaction mixture (brown solution) was taken and analyzed by HPLC. The HPLC trace showed full consumption of the monocoupled intermediate. The reaction mixture was cooled to ambient temperature and the layers were separated. The aqueous layer was extracted with THF (160 mL×2). The combined organic layers were passed through a filter then washed with brine (500 mL total, 5 portions) and placed into a 2 L 4-neck flask.

Deprotection step: A 2 L 4-neck flask equipped with a magnetic stirrer, water condenser, thermocouple, and nitrogen pad was charged with the crude protected product in THF. Methanol (MeOH, 370 mL) and concentrated HCl (31 mL, 362 mmol, 6 equiv.) were added and the reaction mixture (clear-red solution) was stirred at 60° C. After stirring for 5 h, a sample of the reaction mixture was taken and analyzed by $^{19}$F NMR spectroscopy. The $^{19}$F NMR spectrum showed that the deprotection was almost complete. Water (35 mL) was added and the reaction mixture was stirred at 60° C. until the reaction was deemed complete by $^{19}$F NMR spectroscopy. After the reaction was deemed complete (~12 h), the reaction mixture was allowed to cool to ambient temperature with stirring. Precipitate was observed upon cooling. The resulting precipitate was collected via filtration and rinsed with acetonitrile (500 mL). The off-white solids collected were dried under vacuum at 50° C. (30 Torr) to give the final product as off-white solids (53.68 g, 98% pure by HPLC, 79% isolated yield). $^1$H NMR (400 MHz, CDCl$_3$) δ 8.14 (d, J=7.7 Hz, 4H), 7.40-7.28 (m, 8H), 7.26 (s, 1H), 7.23 (d, J=7.6 Hz, 3H), 7.15 (d, J=7.8 Hz, 6H), 6.99 (td, J=8.4, 7.8, 3.1 Hz, 2H), 6.72 (dd, J=9.0, 4.5 Hz, 2H), 6.03 (s, 2H), 3.73 (s, 4H), 1.60 (d, J=22.6 Hz, 8H), 1.25 (d, J=30.7 Hz, 36H), 0.84 (t, J=6.8 Hz, 6H). $^{19}$F NMR (400 MHz, CDCl$_3$) δ −121.77 (s, 2F).

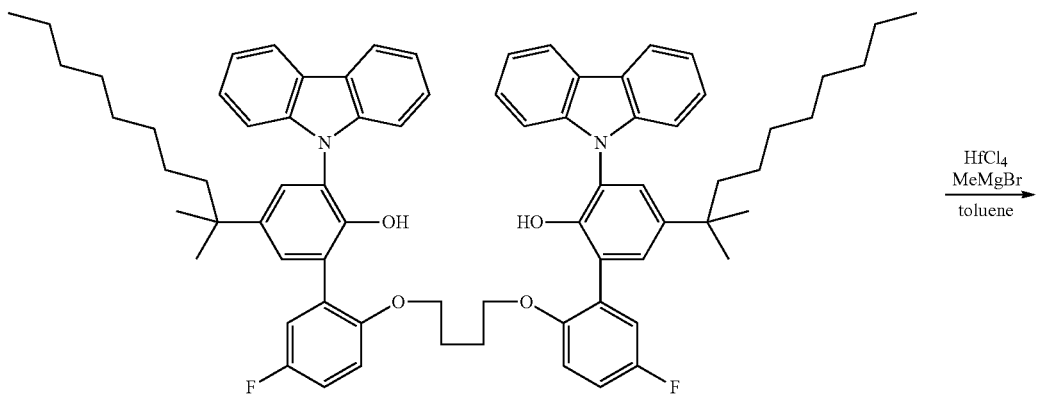

Chemical Formula: C$_{74}$H$_{82}$F$_2$N$_2$O$_4$
Molecular Weight: 1101.48

HfCl$_4$
MeMgBr
toluene

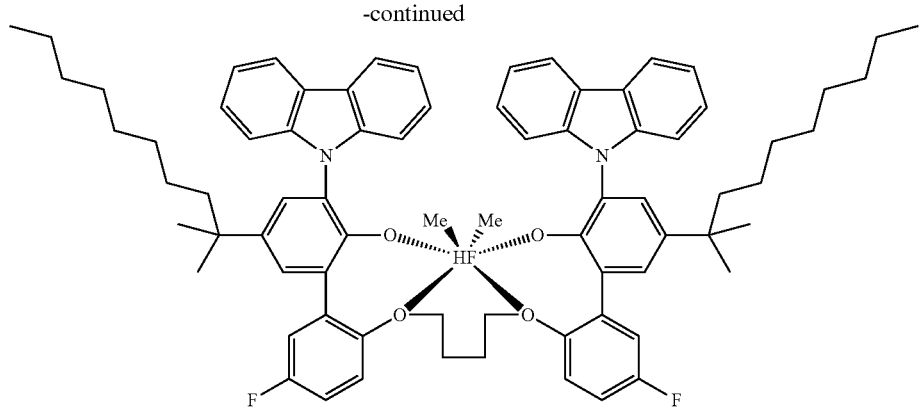

Chemical Formula: $C_{78}H_{86}F_2HfN_2O_4$
Molecular Weight: 1308.02

Step 10: In a glove box, a glass reactor was charged with $HfCl_4$ (39.428 g, 123.10 mmol) and 5.4 L toluene (anhydrous). The mixture was cooled to −20° C. and then MeMgBr (172 mL, 517.01 mmol) was added with stirring. After stirring for 8 minutes, the DOC-61128 ligand (135.59 g, 123.10 mmol) was added, and the resulting mixture was allowed to warm to room temperature over 20 minutes. Once at room temperature, the reaction mixture was stirred for 4.5 hours. When the reaction completion was confirmed by NMR, the crude mixture was filtered, and the solids were rinsed with additional toluene (0.4 L). The filtrate was dried under vacuum to obtain a brown solid. The solids were taken up in anhydrous methylcyclohexane (4.5 L), stirred for 2 hours and then filtered through a pad of Celite. The solids were rinsed with additional methylcyclohexane (0.5 L) and the filtrate was dried under vacuum to obtain 145.666 g, 90.5% yield of the desired metal complex. $^1$H NMR (400 MHz, Benzene-$d_6$) δ 8.15 (d, J=7.6 Hz, 2H), 8.05 (d, J=7.0 Hz 2H), 7.60 (d, J=2.5 Hz, 2H), 7.55 (d, J=8.1 Hz, 2H), 7.47 (d, J=8.2 Hz, 2H), 7.40 (ddd, J=8.2, 7.1, 1.2 Hz, 2H), 7.30 (d, J=2.5 Hz, 2H), 7.27-7.18 (m, 6H), 6.96 (dd, J=9.0, 3.2 Hz, 2H), 6.59 (ddd, J=9.0, 7.2, 3.2 Hz, 2H), 4.68 (dd, J=9.1, 5.0 Hz, 2H), 3.92 (t, J=10.3 Hz, 2H), 3.35 (d, J=11.5 Hz, 2H), 1.57-1.46 (m, 4H), 1.25 (m, 24H), 1.22 (s, 6H), 1.19 (s, 6H), 0.90 (t, J=6.5 Hz, 6H), 0.84 (m, 2H), 0.75 (m, 2H), −1.11 (s, 6H). $^{19}$F NMR (376 MHz, $C_6D_6$) δ−116.02.

Synthesis of Procatalyst (BB)

Step 1: Preparation of 2-mesityl-6-bromopyridine as seen in the synthesis of B10

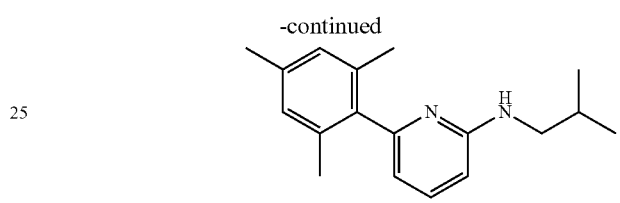

Step 2: Preparation of N-isobutyl-6-mesitylpyridin-2-amine: A 500 mL round bottom flask was charged with 2-bromo-6-mesitylpyridine (20.0 g, 72.4 mmol), NaOtBu (20.9 g, 217.3 mmol), $Pd_2dba_3$ (0.33 g, 0.36 mmol), rac-BINAP (0.45 g, 0.72 mmol), isobutylamine (10.8 mL, 109 mmol), and toluene (200 mL, anhydrous). The reaction mixture was heated to 100° C. for 15 h, then all volatiles were removed. The crude product was washed with water and extracted with EtOAc. The organic layer was collected and all volatiles were removed. The crude brown product was purified by column chromatography to give the pure product (Hexanes:EtOAc 85:15). Yield: 19.4 g, 62%. $^1$H NMR (400 MHz, $CDCl_3$) δ 7.47 (ddd, J=8.4, 7.1, 1.2 Hz, 1H), 6.88 (s, 2H), 6.46 (dq, J=7.2, 0.8 Hz, 1H), 6.30 (d, J=8.3 Hz, 1H), 4.74 (s, 1H), 3.04 (ddd, J=7.0, 5.9, 1.2 Hz, 2H), 2.28 (s, 3H), 2.03 (s, 6H), 1.88 (dpd, J=13.3, 6.7, 1.3 Hz, 1H), 0.97 (dd, J=6.6, 1.2 Hz, 6H). $^{13}$C NMR (101 MHz, $CDCl_3$) δ 158.90, 137.75, 136.92, 135.57, 128.14, 113.36, 103.01, 50.27, 28.33, 21.03, 20.37, 20.04.

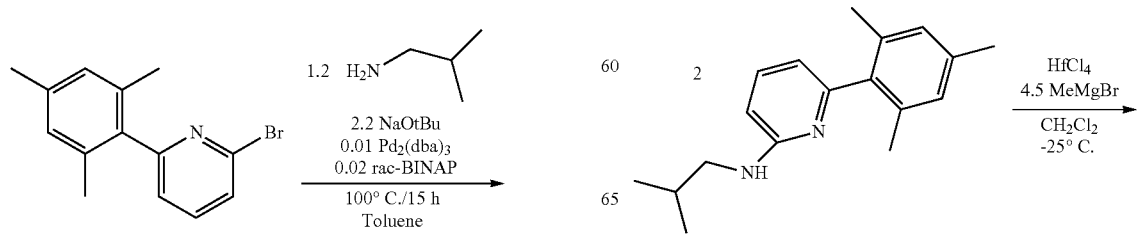

-continued

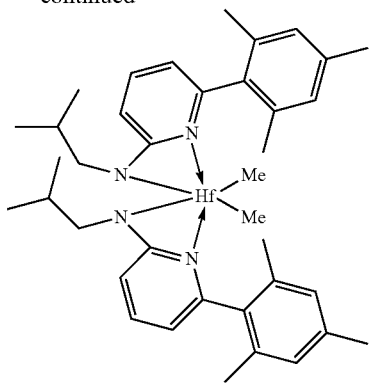

Step 3: Inside a glovebox a 200 mL jar was charged with HfCl₄ (8.11 g, 25.3 mmol) and CH₂Cl₂ (100 mL). The suspension was cooled to -25° C. then MeMgBr (3 M in ether, 38.0 mL, 114.0 mmol) was added. The solution was allowed to stir for 2 min then a cold CH₂Cl₂ (50 mL) solution of 2-mesityl-N-neopentylpyridin-2-amine (13.6 g, 50.7 mmol) was added. The solution quickly changed to a yellow color and was allowed to stir at room temperature for 3 h. All volatiles were removed and the residue was taken up in hexanes and filtered through a disposable frit. The yellow solution was evacuated to dryness, then taken up in hexanes again and filtered through a 0.2 micron syringe filter. Note: it may be necessary to dissolve in hexanes and filter more than two times to remove all the salts (the salts proved to be problematic and had a detrimental effect on the efficiency of the catalyst). The yellow solution was evacuated to dryness and used without further purification (14.5 g, 93%). This compound readily crystallizes nicely as a yellow solid. $^1$H NMR (400 MHz, $C_6D_6$) δ 6.96 (dd, J=8.7, 7.2 Hz, 2H), 6.70 (s, 4H), 5.88 (dd, J=7.2, 0.8 Hz, 2H), 5.75 (dd, J=8.7, 0.8 Hz, 2H), 2.40 (d, J=7.1 Hz, 4H), 2.16 (s, 6H), 1.86 (s, 12H), 1.74 (dq, J=13.6, 6.9 Hz, 2H), 0.93 (h, J=6.6 Hz, 12H), 0.50 (s, 6H). $^{13}$C NMR (101 MHz, $C_6D_6$) δ 171.26, 155.90, 140.68, 136.79, 136.40, 135.46, 109.42, 102.34, 54.83, 53.74, 28.45, 20.65, 20.59, 19.93.

Polymerization Examples

Continuous Solution Polymerization Procedure

The exemplary, non-limiting procatalysts described above are used to polymerize olefin block copolymers in continuous mixed polymerizations. The continuous mixed polymerizations are carried out in either a 5 L or a 3.8 L continuously stirred-tank reactor (CSTR) or a 114 L loop reactor in accordance with the following, non-limiting procedures and with the process conditions of Tables 1-3. The properties of the olefin block copolymers polymerized with the exemplary, non-limiting procatalysts of the present disclosure are presented in Table 4.

With reference to the tables, "Cat1" refers to a first olefin polymerization procatalyst (A), "Cat2" refers to a second olefin polymerization procatalyst (B), "CoCat 1" refers to [HNMe(C18H37)2][B(C6F5)4], an exemplary cocatalyst, "CoCat2" refers to TEA, an exemplary cocatalyst, and "CSA" refers to DEZ, an exemplary chain shuttling agent. "(A1)," "(A4)," "(B10)," "(B14), and "(R)" refer to Procatalyst (A1), Procatalyst (A4), Procatalyst (B10), Procatalyst (B14), and Procatalyst (R), respectively.

Raw materials (ethylene, 1-octene, butene) and the process solvents (SBP100/140, commercially available from Shell, or a narrow boiling range high-purity isoparaffinic solvent trademarked as Isopar-E available from Exxon Mobil Corp.) are purified with molecular sieves before introduction into the reaction environment. Hydrogen is supplied in pressurized cylinders as a high purity gas. Triethylaluminum (TEA), commercially available from Akzo Nobel, is used as an impurity scavenger. Diethylzinc (DEZ), commercially available from Akzo Nobel, is used as a chain shuttling agent. The individual catalyst components (procatalysts, cocatalyst) are manually batch diluted to specified component concentrations with purified solvent and are added to the reactor under a positive nitrogen pressure. The cocatalyst is [HNMe(C18H37)2][B(C6F5)4], commercially available from Boulder Scientific. All reaction feed flows are controlled with mass flow meters.

The combined solvent, monomer, comonomer and hydrogen are fed to the reactor at a controlled temperatures between 5° C. and 30° C. The reactor runs liquid full with the reactor feed (ethylene, 1-octene hydrogen and process solvent) entering the reactor from the bottom and exiting at the top. The reactor is heated with hot oil and normal process pressure is 28 bar. The catalyst is fed to the reactor to reach a specified conversion of ethylene. The cocatalyst is fed separately based on a calculated specified molar ratio (1.2 molar equivalents) to the catalyst component. The TEA and DEZ share the same line as the cocatalyst. TEA flow is based on either an Al concentration in the reactor or a specified molar ratio to the catalyst component. DEZ flow is based on a Zn concentration in the polymer. The effluent from the polymerization reactor (containing solvent, monomer, comonomer, hydrogen, catalyst components, and molten polymer) exits the reactor and water is injected into the stream to terminate polymerization. In addition, various stabilizers or additives such as antioxidants are added at this point. The stream then goes through a static mixer to evenly disperse the catalyst kill and additives. Upon exiting the static mixer, the molten polymer is preheated before it enters the first devolatilizer, where majority of the solvent and non-converted feeds are removed via a flash. The solvent rich polymer is transported through a second preheater in a vacuum devolatilizer where the remaining solvent is removed. The final polymer is pumped through a static mixer to a pelletizer.

TABLE 1

| Ex. | Reactor Temp. (° C.) | Solvent (kg/hr) | C2 (kg/hr) | H2 (mL/min) | H2 mol % | C8 (kg/hr) | C8/olefin (wt%) | Feed Temp (° C.) | S/E (kg/kg) |
|---|---|---|---|---|---|---|---|---|---|
| A | 155 | 17.28 | 2.28 | 0 | 0 | 3.50 | 0.606 | 5.3 | 9.1 |
| B | 150 | 17.05 | 2.28 | 8.4 | 0.028 | 3.96 | 0.63 | 8.2 | 9.2 |
| 1 | 150 | 16.88 | 2.28 | 16.5 | 0.054 | 4.10 | 0.64 | 8 | 9.2 |
| 2 | 170 | 16.73 | 2.28 | 1.0 | 0.003 | 4.25 | 0.65 | 10 | 9.2 |
| 3 | 150 | 16.88 | 2.28 | 0 | 0 | 4.10 | 0.64 | 8 | 9.2 |
| 4 | 150 | 16.5 | 2.28 | 14.4 | 0.047 | 4.47 | 0.66 | 10 | 9.2 |
| 5 | 149.9 | 16.75 | 2.28 | 0 | 0 | 4.25 | 0.65 | 10.2 | 9.2 |
| 6 | 150 | 13.1 | 2.28 | 0 | 0 | 4.05 | 0.64 | 10 | 7.5 |
| 7 | 150 | 16.88 | 2.28 | 17.0 | 0.056 | 4.10 | 0.64 | 10.0 | 9.20 |

TABLE 2

| Ex. | Cat1 Type | Cat1 Conc. (mmol/kg) | Cat1 Flow (g/hr) | Cat1 Eff. (kg/mg) | Cat2 Type | Cat2 Conc. (mmol/kg) | Cat2 Flow (g/hr) | Cat2 Eff. (kg/mg) | Combined Cat. Eff. (kg/mg) |
|---|---|---|---|---|---|---|---|---|---|
| A | (A1) | 1 | 358 | 0.051 | (R) | 0.4 | 349 | 0.017 | 0.046 |
| B | (A4) | 0.2 | 79 | 0.910 | (R) | 0.8 | 374 | 0.034 | 0.116 |

TABLE 2-continued

| Ex. | Cat1 Type | Cat1 Conc. (mmol/ kg) | Cat1 Flow (g/hr) | Cat1 Eff. (kg/ mg) | Cat2 Type | Cat2 Conc. (mmol/ kg) | Cat2 Flow (g/ hr) | Cat2 Eff. (kg /mg) | Combined Cat. Eff. (kg/ mg) |
|---|---|---|---|---|---|---|---|---|---|
| 1 | (A4) | 0.3 | 24 | 1.934 | (B14) | 0.2 | 75 | 0.379 | 0.883 |
| 2 | (A4) | 0.3 | 97 | 0.498 | (B14) | 0.2 | 237 | 0.108 | 0.256 |
| 3 | (A4) | 0.3 | 25 | 1.796 | (B10) | 0.2 | 75 | 0.409 | 0.872 |
| 4 | (A4) | 0.3 | 42 | 1.320 | (B14) | 0.2 | 75 | 0.199 | 0.710 |
| 5 | (A4) | 0.3 | 36 | 1.324 | (B14) | 0.2 | 150 | 0.177 | 0.481 |
| 6 | (A4) | 0.3 | 42 | 1.172 | (B14) | 0.2 | 94 | 0.258 | 0.624 |
| 7 | (A4) | 0.200 | 22.0 | 3.235 | (B10) | 0.2 | 70 | 0.384 | 1.066 |

TABLE 3

| Ex. | Catalyst ratio | CoCat1 Conc. (mmol/ kg) | CoCat 1 Flow (g/hr) | CoCat2 Conc. (mmol/ kg) | CoCat 2 Flow (g/hr) | CSA Conc. (mmol/ kg) | CSA Flow (g/hr) |
|---|---|---|---|---|---|---|---|
| A | 0.4 | 1.2 | 172 | 6 | 160 | 50 | 160 |
| B | 0.945 | 1.2 | 160 | 6 | 160 | 50 | 160 |
| 1 | 0.676 | 0.44 | 54 | 6 | 160 | 50 | 160 |
| 2 | 0.71 | 0.44 | 182 | 6 | 160 | 50 | 160 |
| 3 | 0.667 | 0.44 | 41 | 6 | 280 | 50 | 280 |
| 4 | 0.54 | 0.44 | 75 | 6 | 160 | 50 | 160 |
| 5 | 0.735 | 0.44 | 110 | 6 | 270 | 50 | 270 |
| 6 | 0.60 | 0.44 | 86.00 | 6 | 270 | 50 | 270 |
| 7 | 0.762 | 0.44 | 50.7 | 6 | 160 | 50 | 160 | molecular weight (e.g., 0.5 I2) and combined catalyst efficiency at elevated temperatures. As seen in Comparative Ex. B, replacing only Procatalyst (A1) with exemplary Procatalyst (A4) produces the desired melt index and adequate efficiency but produces undesirably broad polydispersity. In contrast, as seen in inventive Examples 1-7, the inventive CSA and dual catalyst combinations are able to produce olefin block copolymer resins having desirable properties (e.g., desirable melt index, relatively low I10/I2, and narrow PDI) with good combined catalyst efficiency at elevated reactor temperatures as high as 170° C. Such elevated reactor temperatures increase production rate and decrease energy consumption. This is surprising and unexpected, as the state of the art has not demonstrated a CSA and dual catalyst combination capable of producing olefin block copolymers having desirable properties with commerically acceptable catalyst efficiency and process control at such an elevated reactor temperature.

In addition, at similar density, the thermo-mechanical properties as measured by TMA are improved for the inventive examples. Comparing Inventive Example 4 and Comparative A, with the inventive procatalyst pairs, the OBC resin has higher thermo-mechanical resistance as measured by TMA, along with narrow PDI and acceptable Mw. As compared to Comparative B, Inventive Examples 1-3 and 5-7 also have a combination of slightly higher thermo-mechanical resistance, narrow PDI, and higher catalyst efficiency.

Figure 2:
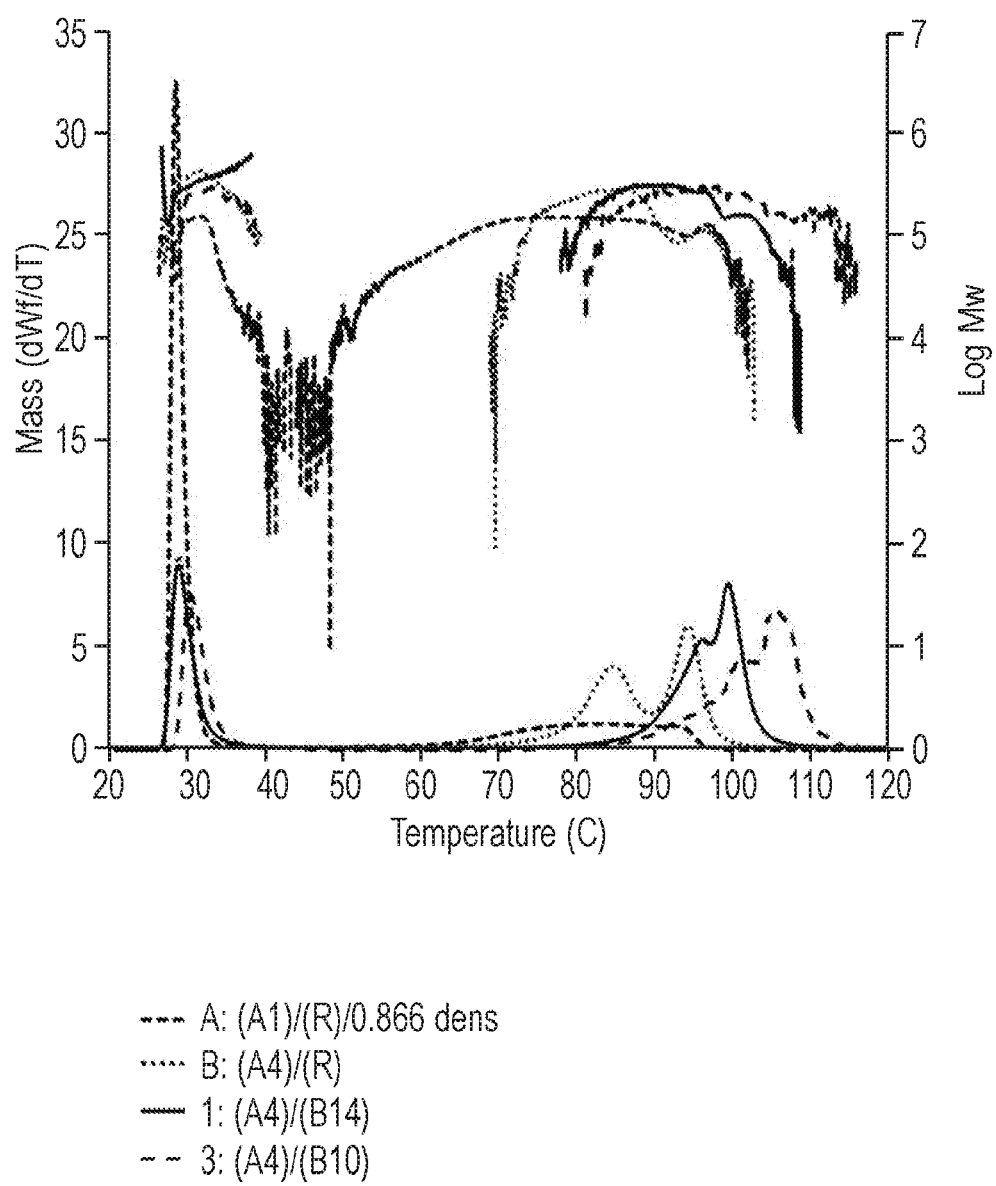
FIGS. 2-4 provide CEF graphs demonstrating that olefin block copolymers are made in the examples of the present disclosure.
Figure 3:
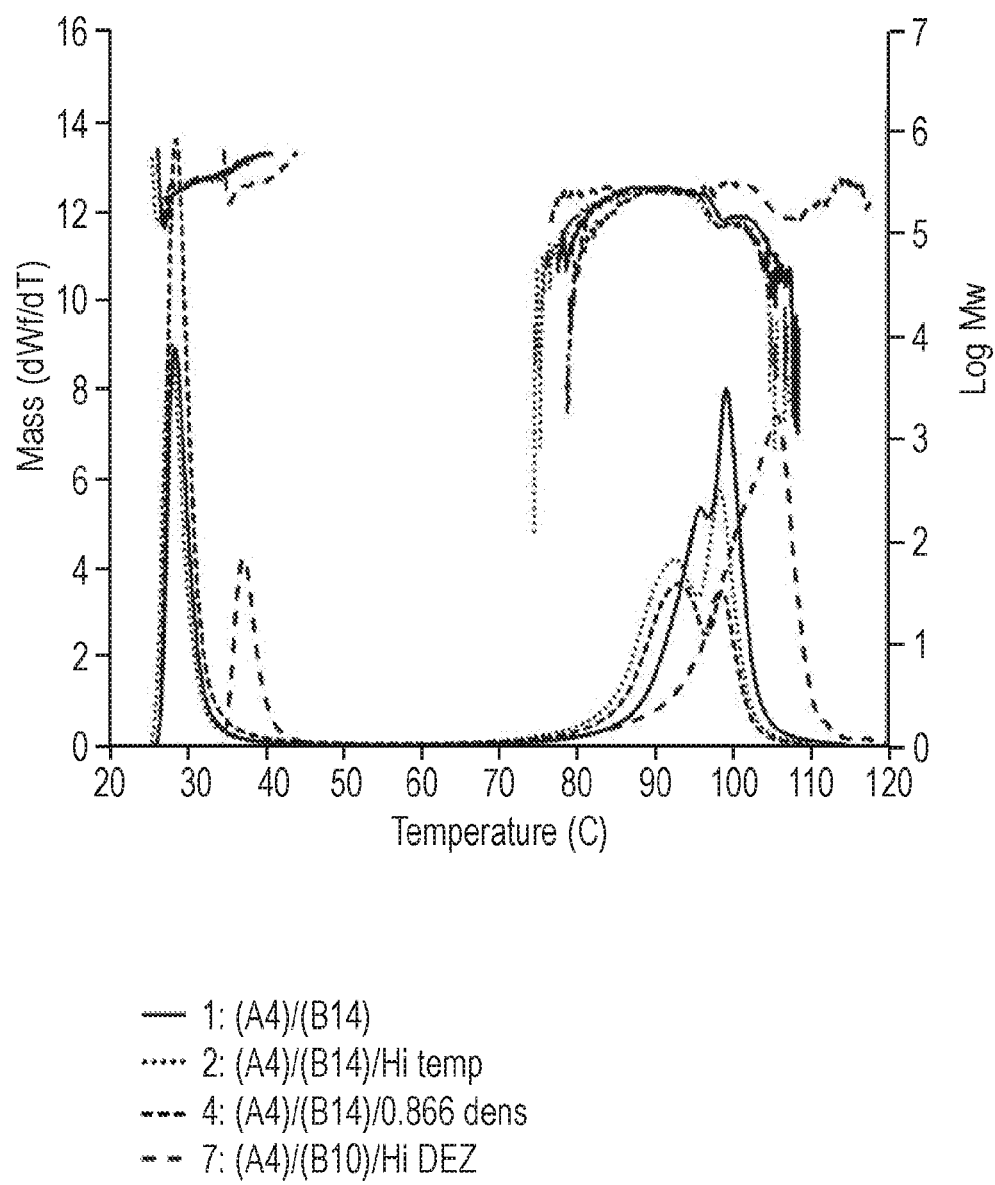
Figure 4:
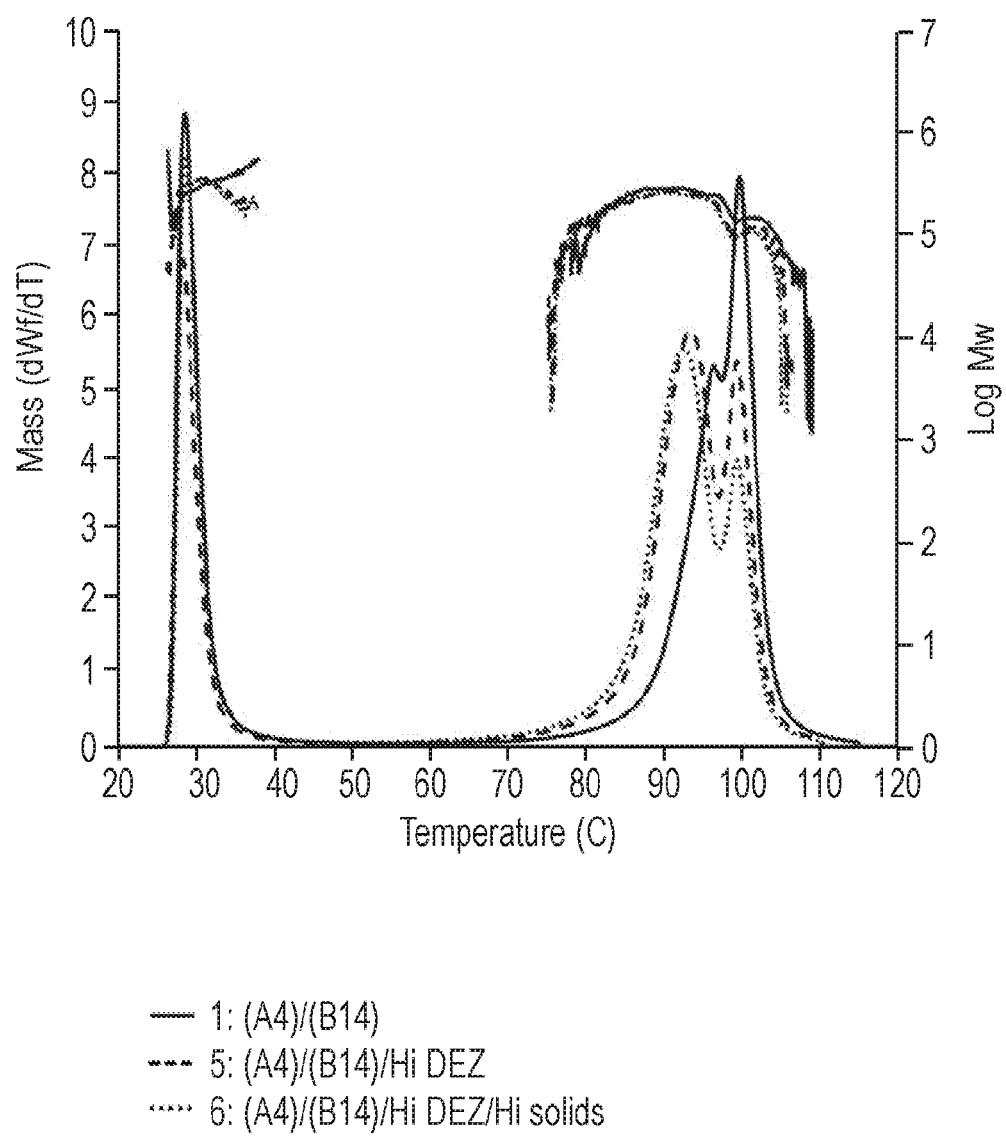

Further support that olefin block copolymers are made in the present examples is provided in the CEF graphs seen in FIGS. 2-4. As seen in FIGS. 2-4, two peaks are observed in the CEF trace of each polymer sample, the high temperature peak often being bimodal. The material which elutes first at

TABLE 4

| Ex. | A | B | 1 | 2 | 3 | 4 | 5 | 6 | 7 |
|---|---|---|---|---|---|---|---|---|---|
| Reactor Temp. (° C.) | 155 | 150 | 150 | 170 | 150 | 150 | 150 | 150 | 150 |
| C2 conversion (%) | 89.6 | 88.8 | 89.0 | 88.9 | 89.0 | 88.8 | 89.0 | 90.9 | 88.9 |
| Combined cat. efficiency ($kg_{poly}$/g $_{metal}$) | 73 | 116 | 883 | 256 | 872 | 710 | 481 | 624 | 1066 |
| Catalyst molar ratio (Cat1:Cat2) | 60:40 | 5:95 | 32:68 | 29:71 | 33:67 | 46:54 | 26:74 | 40:60 | 24:76 |
| C8/Olefin (mol %) | 67 | 71 | 73 | 72 | 73 | 73 | 73 | 74 | 73 |
| H2 (mol %) | 0 | 0.03 | 0.05 | 0.003 | 0 | 0.05 | 0 | 0 | 0.06 |
| I2 (g/10 min) | 5.12 | 0.54 | 0.52 | 0.42 | 0.50 | 0.53 | 0.52 | 0.58 | 0.50 |
| I10/I2 | 8.39 | 11.20 | 8.96 | 11.95 | 9.04 | 8.68 | 8.96 | 9.34 | 9.16 |
| Mw (g/mol) | 83,443 | 145,692 | 137,641 | 144,135 | 141,180 | 155,650 | 147,085 | 146,630 | 149,296 |
| PDI | 3.70 | 3.27 | 2.42 | 2.79 | 2.44 | 2.41 | 2.58 | 2.61 | 2.44 |
| Density (g/cc) | 0.8640 | 0.8787 | 0.8780 | 0.8777 | 0.8804 | 0.8674 | 0.8771 | 0.8765 | 0.8782 |
| Tm by DSC, (° C.) | 118.8 | 122.2 | 127.0 | 126.3 | 126.5 | 125.5 | 126.3 | 125.5 | 126.3 |
| TMA, 1 mm penetration, ° C. | 62 | 114 | 118 | 118 | 119 | 110 | 120 | 119 | 118 |

As seen in Comparative Ex. A, a comparative CSA and dual catalyst combination representative of the state of the art is unable to meet desirable product specifications for low temperature (ca. 30° C.) is composed of polymer high in comonomer content that does not crystallize from dilute solution under the conditions of the CEF analysis. This fraction contains primarily polymer produced by the soft block catalyst (A1, A4). The material which elutes at high temperature (ca. 60-115° C.) is composed of polymers with semi-crystalline segments. This fraction contains polymer with a significant fraction of segments produced by the hard block catalyst (R, B10, or B14). The bimodality of the peak is due to the distribution of block segment lengths and number of blocks per polymer chain. Polymer chains with a higher fraction of "hard" blocks or longer average "hard" block lengths elute at the higher temperature. As compared to random copolymers with the same CEF elution temperatures in the range of 60-115° C., all of the examples shown in FIGS. 2-4 have higher comonomer content for the same elution temperature, indicating the presence of "hard" semi-crystalline blocks and "soft" high-comonomer content blocks in the same polymer chain (as demonstrated by ATREF analysis in WO 2006/101966 A1). An unshuttled blend produced by Cat1 and Cat2 would separate into two CEF peaks, one which elutes ca. 30° C. and one which elutes ca. 100° C., with the peak areas corresponding to the mass fraction produced by each catalyst. The examples shown have approximately 75-90 wt % segments produced by the "soft" block catalyst, Cat1. Yet, the majority of the resin elutes in the high-temperature region, indicating the presences of olefin block copolymer in all of the examples shown.

Figure 5:
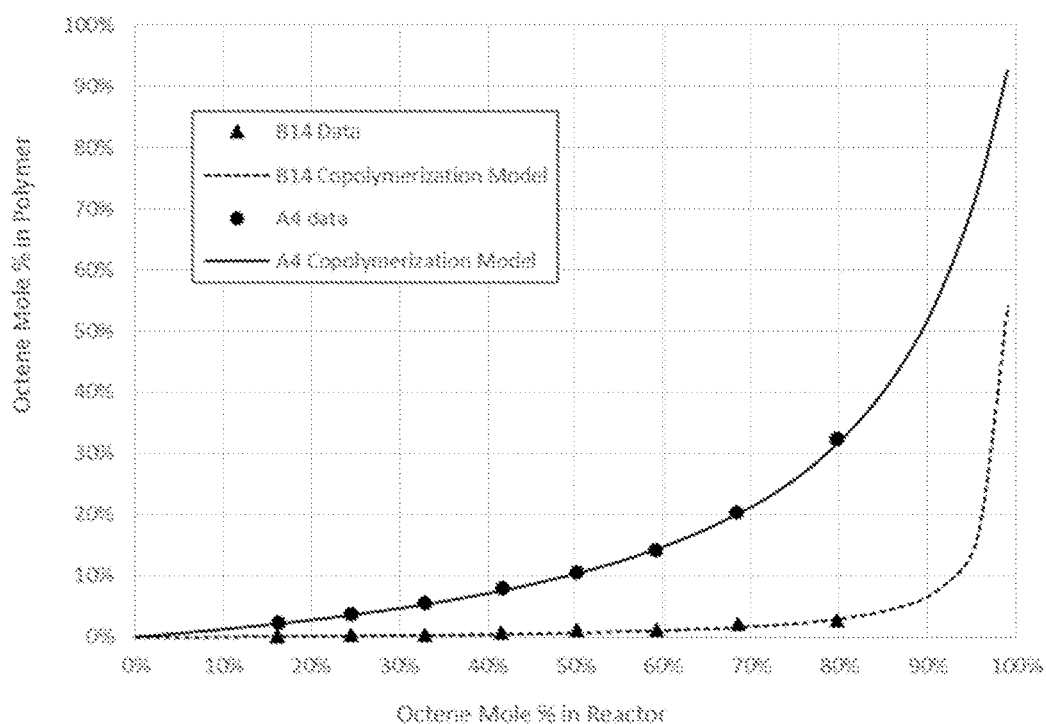
FIG. 5 provides incorporation ratios for exemplary procatalysts of the present disclosure.

In addition, the reactivity ratio ($r_{1A}$) of procatalyst (A4) was determined to be 8.83, while the reactivity ratio ($r_{1B}$) of procatalyst (B14) was determined to be 133.46. Accordingly, the ratio of $r_{1A}$ to $r_{1B}$ of an inventive dual catalyst combination of procatalysts (A4) and (B14) is less than 0.5. Furthermore, FIG. 5 provides the incorporation data of an inventive dual catalyst combination of procatalysts (A4) and (B14) by plotting the mole percentage of comonomer in the prepared olefin block copolymer versus the mole percentage of comonomer in the reactor.

Further inventive Examples 8-24 provides similar results as inventive Examples 1-7, as seen below in Tables 5-12:

TABLE 5

| Ex: | Reactor Volume (L) | Reactor Temp (° C.) | Solvent (kg/hr) | C2 (kg/hr) | H2 (mL/min) | H2 mol % | C8 kg/hr | C8/olefin (wt %) | Feed Temp (° C.) | S/E (kg/kg) |
|---|---|---|---|---|---|---|---|---|---|---|
| 8  | 5   | 150.0 | 17.65 | 2.31 | 16.5 | 0.054 | 3.6  | 0.61 | 10 | 9.2 |
| 9  | 5   | 150.0 | 17.75 | 2.3  | 21   | 0.069 | 3.45 | 0.60 | 10 | 9.2 |
| 10 | 5   | 150.0 | 17.65 | 2.31 | 18.2 | 0.059 | 3.6  | 0.61 | 10 | 9.2 |
| 11 | 5   | 150.0 | 17.5  | 2.31 | 9.5  | 0.031 | 3.75 | 0.62 | 10 | 9.2 |
| 12 | 5   | 150.0 | 17.6  | 2.31 | 10   | 0.033 | 3.65 | 0.61 | 10 | 9.2 |
| 13 | 114 | 164.4 | 108   | 22.7 | 215  | 0.067 | 37.3 | 0.62 | 30 | 5.6 |
| 14 | 114 | 139.9 | 108   | 22.7 | 91   | 0.040 | 37.4 | 0.62 | 30 | 5.6 |
| 15 | 114 | 139.6 | 134   | 22.8 | 83   | 0.026 | 41.2 | 0.64 | 30 | 6.7 |
| 16 | 114 | 139.9 | 132   | 25.5 | 215  | 0.060 | 37.2 | 0.59 | 30 | 5.7 |
| 17 | 114 | 140.3 | 192   | 25.5 | 35   | 0.010 | 58.2 | 0.70 | 30 | 8.2 |
| 18 | 114 | 140.3 | 188   | 31.2 | 295  | 0.068 | 37.2 | 0.54 | 30 | 6.5 |
| 19 | 114 | 139.7 | 123   | 29.2 | 608  | 0.149 | 40.8 | 0.58 | 30 | 4.9 |
| 20 | 114 | 150.0 | 133   | 18.5 | 38   | 0.014 | 40.3 | 0.69 | 30 | 7.2 |

TABLE 6

| Ex | Reactor Volume (L) | Reactor Temp (° C.) | Solvent (kg/hr) | C2 (kg/hr) | H2 (mL/min) | H2 mol % | C4 kg/hr | C4/olefin (wt %) | Feed Temp (° C.) | S/E (kg/kg) |
|---|---|---|---|---|---|---|---|---|---|---|
| 21 | 3.8 | 150.0 | 9.4 | 0.77 | 2.0  | 0.019 | 0.75 | 0.49 | 17 | 12.2 |
| 22 | 3.8 | 150.0 | 9.4 | 0.77 | 66.8 | 0.646 | 0.75 | 0.49 | 16 | 12.2 |
| 23 | 3.8 | 150.0 | 8.1 | 0.66 | 0    | 0     | 1.44 | 0.69 | 17 | 12.3 |
| 24 | 3.8 | 149.9 | 9.1 | 0.68 | 2.0  | 0.022 | 1.15 | 0.63 | 18 | 13.4 |

TABLE 7

| Ex | Cat1 Type | Cat1 Conc. (mmol/kg) | Cat1 Flow (g/hr) | Cat1 Eff. (kg/mg) | Cat2 Type | Cat2 Conc. (mmol/kg) | Cat2 Flow (g/hr) | Cat2 Eff. (kg/mg) | Combined Cat. Eff. (kg/mg) |
|---|---|---|---|---|---|---|---|---|---|
| 8  | (A4) | 0.3  | 90  | 0.529 | (B14) | 0.4  | 47   | 0.283 | 0.428 |
| 9  | (AB) | 0.2  | 274 | 0.274 | (B14) | 0.4  | 38   | 0.302 | 0.280 |
| 10 | (A4) | 0.3  | 113 | 0.443 | (BB)  | 0.2  | 253  | 0.091 | 0.232 |
| 11 | (A4) | 0.3  | 63  | 0.902 | (B14) | 0.4  | 37.5 | 0.171 | 0.580 |
| 12 | (A4) | 0.3  | 54  | 1.106 | (BB)  | 0.4  | 26.9 | 0.157 | 0.727 |
| 13 | (A4) | 0.84 | 523 | 0.430 | (B14) | 1.68 | 426  | 0.039 | 0.189 |
| 14 | (A4) | 0.19 | 328 | 2.186 | (B14) | 0.19 | 417  | 0.335 | 1.529 |
| 15 | (A4) | 0.19 | 383 | 1.909 | (B14) | 0.19 | 415  | 0.450 | 1.482 |

TABLE 7-continued

| Ex | Cat1 Type | Cat1 Conc. (mmol/kg) | Cat1 Flow (g/hr) | Cat1 Eff. (kg/mg) | Cat2 Type | Cat2 Conc. (mmol/kg) | Cat2 Flow (g/hr) | Cat2 Eff. (kg/mg) | Combined Cat. Eff. (kg/mg) |
|----|-----------|----------------------|------------------|-------------------|-----------|----------------------|------------------|-------------------|----------------------------|
| 16 | (A4)  | 0.23 | 221 | 1.613 | (B14) | 0.23 | 829 | 0.393 | 0.882 |
| 17 | (A4)  | 0.14 | 724 | 2.083 | (B14) | 0.28 | 981 | 0.211 | 0.641 |
| 18 | (A4)  | 0.13 | 599 | 2.404 | (B14) | 0.28 | 557 | 0.314 | 1.058 |
| 19 | (A4)  | 0.13 | 726 | 1.972 | (B14) | 0.28 | 541 | 0.414 | 1.041 |
| 20 | (AA1) | 0.28 | 418 | 1.153 | (BB)  | 0.70 | 297 | 0.167 | 0.526 |

TABLE 8

| Ex | Cat1 Type | Cat1 Conc. (mmol/kg) | Cat1 Flow (g/hr) | Cat1 Eff. (kg/mg) | Cat2 Type | Cat2 Conc. (mmol/kg) | Cat2 Flow (g/hr) | Cat2 Eff. (kg/mg) | Combined Cat. Eff. (kg/mg) |
|----|-----------|----------------------|------------------|-------------------|-----------|----------------------|------------------|-------------------|----------------------------|
| 21 | (A4) | 0.04 | 74 | 1.347 | (BB) | 0.03 | 275 | 0.041 | 0.468 |
| 22 | (A4) | 0.04 | 73 | 1.316 | (BB) | 0.09 | 157 | 0.031 | 0.276 |
| 23 | (A4) | 0.04 | 93 | 0.993 | (BB) | 0.21 | 42  | 0.139 | 0.413 |
| 24 | (A4) | 0.04 | 90 | 1.189 | (BB) | 0.04 | 143 | 0.097 | 0.519 |

TABLE 9

| Ex | Catalyst Ratio | CoCat1 Conc. (mmol/kg) | CoCat1 Flow (g/hr) | CoCat2 Conc. (mmol/kg) | CoCat2 Flow (g/hr) | CSA Conc. (mmol/kg) | CSA Flow (g/hr) |
|----|----------------|------------------------|--------------------|------------------------|--------------------|---------------------|-----------------|
| 8  | 0.41 | 0.5 | 110 | 6  | 160 | 50  | 160 |
| 9  | 0.22 | 0.5 | 166 | 6  | 160 | 50  | 160 |
| 10 | 0.6  | 0.5 | 200 | 6  | 160 | 50  | 160 |
| 11 | 0.44 | 0.5 | 81  | 6  | 125 | 50  | 214 |
| 12 | 0.4  | 0.5 | 64  | 6  | 125 | 50  | 214 |
| 13 | 0.62 | 6.6 | 295 | 44 | 499 | 243 | 323 |
| 14 | 0.56 | 1.6 | 147 | 61 | 521 | 243 | 508 |
| 15 | 0.52 | 1.6 | 153 | 61 | 341 | 243 | 302 |
| 16 | 0.79 | 1.6 | 248 | 61 | 342 | 243 | 303 |
| 17 | 0.73 | 1.6 | 382 | 61 | 570 | 243 | 227 |
| 18 | 0.65 | 1.6 | 243 | 61 | 568 | 243 | 304 |
| 19 | 0.60 | 1.6 | 257 | 61 | 414 | 243 | 680 |
| 20 | 0.64 | 1.6 | 389 | 17 | 166 | 243 | 263 |

TABLE 10

| Ex | Catalyst Ratio | CoCat1 Conc. (mmol/kg) | CoCat1 Flow (g/hr) | CoCat2 Conc. (mmol/kg) | CoCat2 Flow (g/hr) | CSA Conc. (mmol/kg) | CSA Flow (g/hr) |
|----|----------------|------------------------|--------------------|------------------------|--------------------|---------------------|-----------------|
| 21 | 0.67 | 0.06 | 215 | 0.9 | 113 | 19.0 | 173 |
| 22 | 0.81 | 0.10 | 196 | 0.9 | 192 | 18.9 | 317 |
| 23 | 0.69 | 0.26 | 60  | 2.2 | 58  | 18.7 | 75  |
| 24 | 0.61 | 0.10 | 119 | 1.1 | 95  | 9.4  | 108 |

TABLE 11

| Ex | C2 Conversion (%) | Catalyst molar ratio (Cat1:Cat2) | C8/olefin (mol %) | H2 (mol %) | I2 (g/10 min) | I10/I2 | Mw (g/mol) | PDI | Density, g/cc | Tm by DSC, (° C.) | TMA, 1 mm penetration, ° C. |
|----|-------------------|----------------------------------|-------------------|------------|---------------|--------|------------|-----|---------------|-------------------|------------------------------|
| 8  | 88.8 | 59:41 | 68 | 0.054 | 0.50  | 8.8   | 146,198 | 2.24 | 0.8780 | 126.5 | 119 |
| 9  | 87.5 | 78:22 | 65 | 0.069 | 0.59  | 8.9   | 141,453 | 2.25 | 0.8748 | 125.7 | 115 |
| 10 | 88.8 | 40:60 | 68 | 0.059 | 0.44  | 9.1   | 156,391 | 2.56 | 0.8763 | 119.8 | 116 |
| 11 | 88.8 | 56:44 | 67 | 0.031 | 0.49  | 8.5   | 156,866 | 2.27 | 0.8670 | 124.3 | 113 |
| 12 | 88.9 | 60:40 | 66 | 0.033 | 0.47  | 7.4   | 160,351 | 2.26 | 0.8650 | 120.5 | 110 |
| 13 | 92.4 | 38:62 | 71 | 0.067 | 5.03  | 11.0  | 89,076  | 2.78 | 0.8659 | 124.4 | 104 |
| 14 | 92.9 | 44:56 | 74 | 0.040 | 5.11  | 8.4   | 91,720  | 2.40 | 0.8666 | 124.8 | 102 |
| 15 | 91.5 | 48:52 | 74 | 0.026 | 1.14  | 9.3   | 137,405 | 2.45 | 0.8670 | 125.0 | 114 |
| 16 | 92.7 | 21:79 | 75 | 0.060 | 1.48  | 8.7   | 112,749 | 2.35 | 0.8861 | 127.4 | 124 |
| 17 | 90.2 | 27:73 | 77 | 0.010 | 0.49  | 11.9  | 175,057 | 2.61 | 0.8693 | 125.4 | 120 |
| 18 | 91.6 | 35:65 | 66 | 0.068 | 0.58  | 8.3   | 133,466 | 2.37 | 0.8771 | 124.2 | 120 |
| 19 | 93.7 | 40:60 | 74 | 0.149 | 15.60 | 7.4   | 62,060  | 2.15 | 0.8759 | 125.6 | 116 |
| 20 | 87.3 | 36:64 | 71 | 0.014 | 0.97  | 10.99 | 137,615 | 2.84 | 0.8670 | 117.3 | 109 |

TABLE 12

| Ex | C2 Conversion (%) | Catalyst molar ratio (Cat1:Cat2) | C4/ olefin (mol %) | H2 (mol %) | I2 (g/10 min) | I10 /I2 | Mw (g/ mol) | PDI | Dens., g/cc | Tm by DSC, (° C.) | TMA, 1 mm penetration, ° C. |
|---|---|---|---|---|---|---|---|---|---|---|---|
| 21 | 81.2 | 33:67 | 58 | 0.019 | 1.23 | 9.26 | 88,030 | 2.53 | 0.8754 | 112.2 | 97 |
| 22 | 81.5 | 19:81 | 58 | 0.646 | 33.90 | 6.73 | 41,697 | 2.21 | 0.8775 | 110.3 | 79 |
| 23 | 76.2 | 31:69 | 77 | 0.000 | 2.38 | 8.43 | 87,876 | 2.33 | 0.8774 | 118.2 | 114 |
| 24 | 78.0 | 39:61 | 81 | 0.022 | 1.47 | 9.97 | 94,803 | 2.84 | 0.8691 | 117.7 | 92 |

Specific Embodiments

The following are exemplary, non-limiting embodiments of the present disclosure and combinations thereof.

1. A composition comprising an admixture or reaction product resulting from combining:
    (A) a first olefin polymerization procatalyst,
    (B) a second olefin polymerization procatalyst, and
    (C) a chain shuttling agent,
wherein the second olefin polymerization procatalyst comprises a metal-ligand complex of Formula (I):

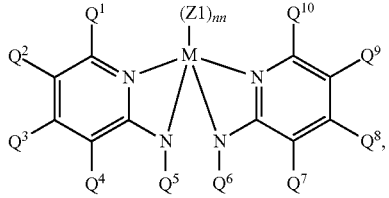

(I)

wherein M is titanium, zirconium, or hafnium;

wherein each Z1 is independently a monodentate or polydentate ligand that is neutral, monoanionic, or dianionic, wherein nn is an integer, and wherein Z1 and nn are chosen in such a way that the metal-ligand complex of Formula (I) is overall neutral;

wherein each $Q^1$ and $Q^{10}$ independently is selected from the group consisting of $(C_6-C_{40})$aryl, substituted $(C_6-C_{40})$aryl, $(C_3-C_{40})$heteroaryl, and substituted $(C_3-C_{40})$heteroaryl;

wherein each $Q^2$, $Q^3$, $Q^4$, $Q^7$, $Q^8$, and $Q^9$ independently is selected from a group consisting of hydrogen, $(C_1-C_{40})$hydrocarbyl, substituted $(C_1-C_{40})$hydrocarbyl, $(C_1-C_{40})$heterohydrocarbyl, substituted $(C_1-C_{40})$heterohydrocarbyl, halogen, and nitro $(NO_2)$;

wherein each $Q^5$ and $Q^6$ independently is selected from the group consisting of a $(C_1-C_{40})$alkyl, substituted $(C_1-C_{40})$alkyl, and $[(Si)_1-(C+Si)_{40}]$ substituted organosilyl;

wherein each N independently is nitrogen;

optionally, two or more of the $Q^{1-5}$ groups can combine together to form a ring structure, with such ring structure having from 5 to 16 atoms in the ring excluding any hydrogen atoms; and optionally, two or more of the $Q^{6-10}$ groups can combine together to form a ring structure, with such ring structure having from 5 to 16 atoms in the ring excluding any hydrogen atoms.

2. The composition of embodiment 1, further comprising (D) an activator.

3. The composition of any of the preceding embodiments, wherein each Z1 independently is Me, Bn, or Cl.

4. The composition of any of the preceding embodiments, wherein $Q^1$ and $Q^{10}$ are substituted phenyl groups, as shown in Formula (II):

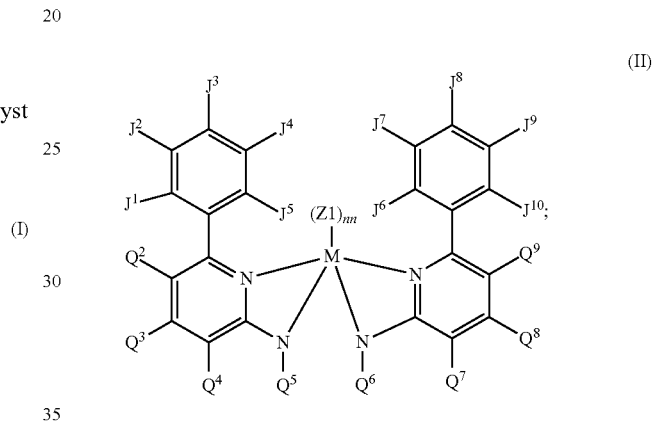

(II)

wherein $J^1$-$J^{10}$ are each independently selected from the group consisting of $R^S$ substituents and hydrogen; and wherein each $R^S$ independently is a halogen atom, polyfluoro substitution, perfluoro substitution, unsubstituted $(C_1-C_{18})$alkyl, $(C_6-C_{18})$aryl, $F_3C$, $FCH_2O$, $F_2HCO$, $F_3CO$, $(R^{C1})_3Si$, $(R^{C1})_3Ge$, $(R^{C1})O$, $(R^{C1})S$, $(R^{C1})S(O)$, $(R^{C1})S(O)_2$, $(R^{C1})_2P$, $(R^{C1})_2N$, $(R^{C1})_2C{=}N$, NC, $NO_2$, $(R^{C1})C(O)O$, $(R^{C1})OC(O)$, $(R^{C1})C(O)N(R^{C1})$, or $(R^{C1})_2NC(O)$, or two of the $R^S$ are taken together to form an unsubstituted $(C_1-C_{18})$alkylene where each $R^S$ independently is an unsubstituted $(C_1-C_{18})$alkyl, and wherein independently each $R^{C1}$ is hydrogen, unsubstituted $(C_1-C_{18})$hydrocarbyl or an unsubstituted $(C_1-C_{18})$heterohydrocarbyl, or absent (e.g., absent when N comprises —N=).

5. The composition of embodiment 4, wherein $J^1$, $J^5$, $J^6$ and $J^{10}$ are each independently selected from the group consisting of halogen atoms, $(C_1-C_8)$alkyl groups, and $(C_1-C_8)$alkoxyl groups.

6. The composition of embodiment 4, wherein $J^1$, $J^5$, $J^6$ and $J^{10}$ are each independently methyl; ethyl or isopropyl.

7. The composition of any of the preceding embodiments, wherein $Q^5$ and $Q^6$ are each independently $(C_1-C_{40})$ primary or secondary alkyl groups.

8. The composition of any of the preceding embodiments, wherein $Q^5$ and $Q^1$ are each independently propyl, isopropyl, neopentyl, hexyl, and benzyl.

9. The composition of any of the preceding embodiments, wherein said metal-ligand complex of Formula (I) is selected from the group consisting of:

129
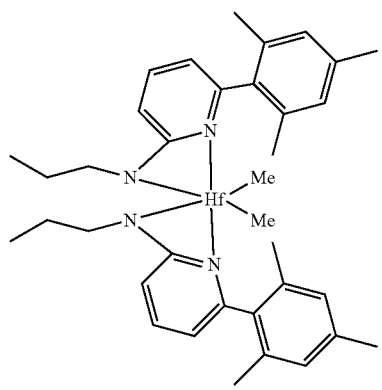
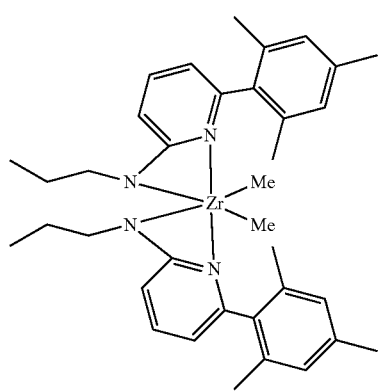
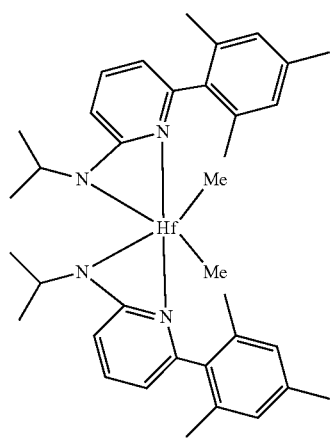
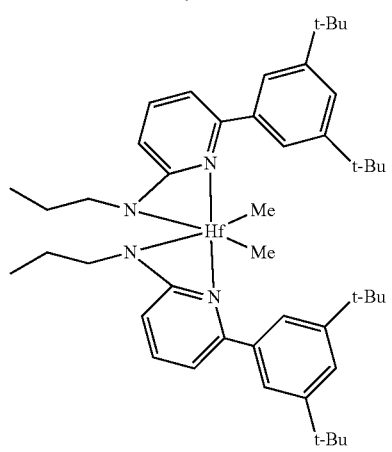
130
-continued
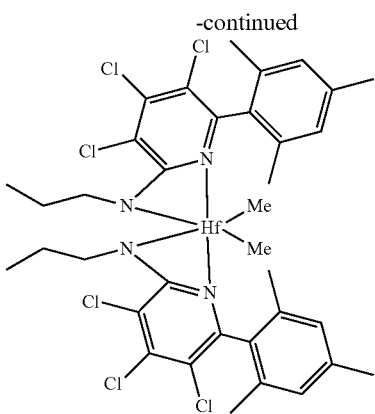
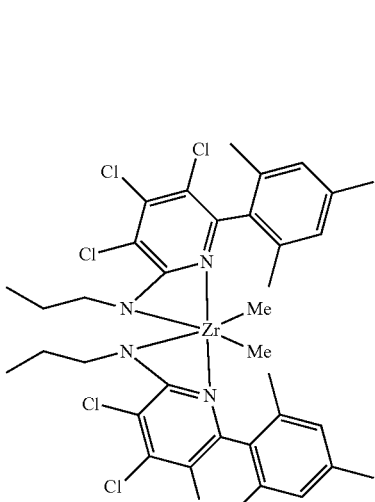
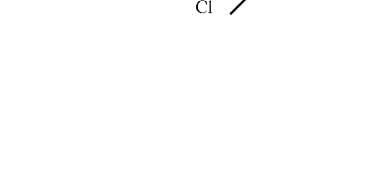
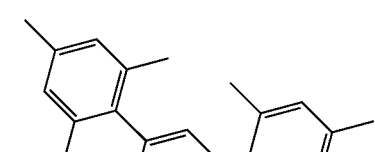
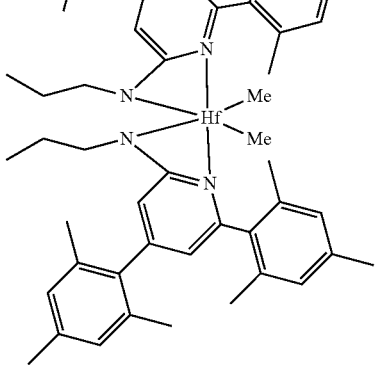

131
-continued
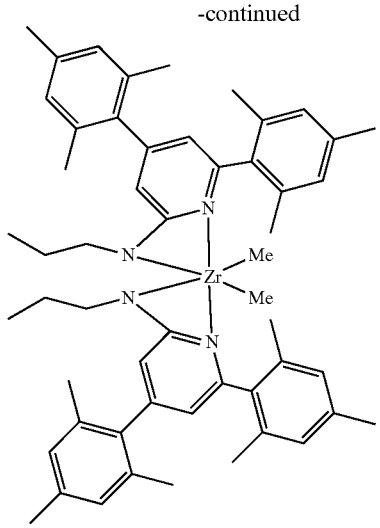
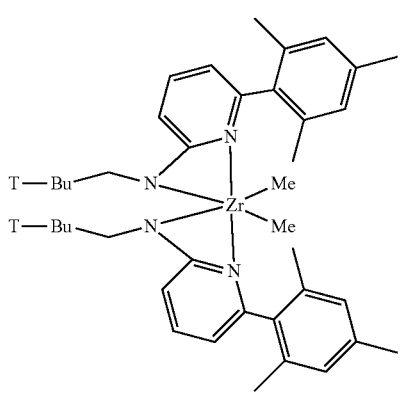
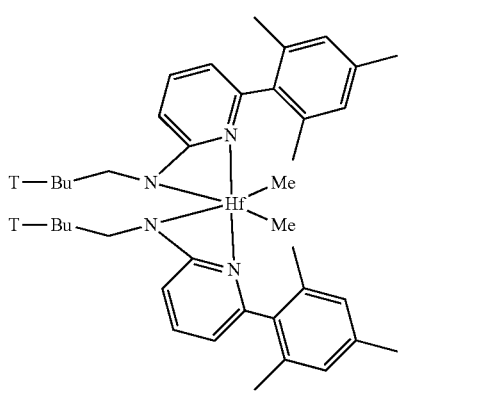
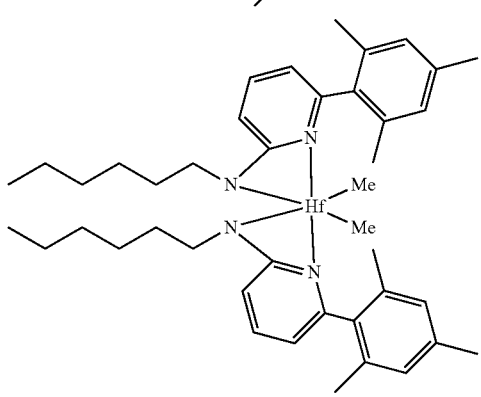
132
-continued
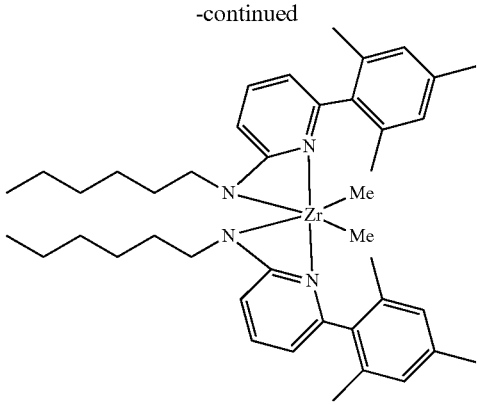
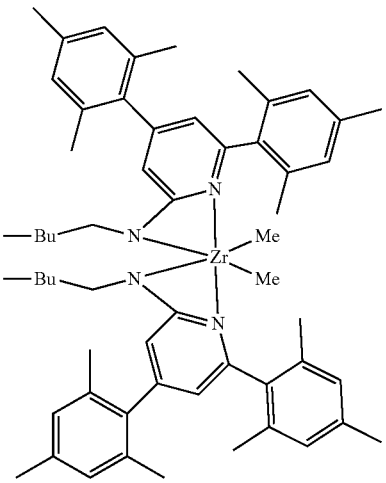
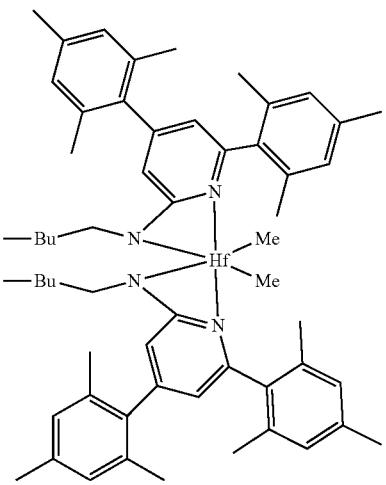

-continued
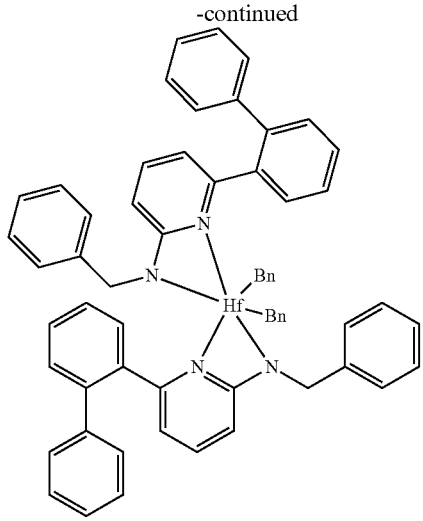
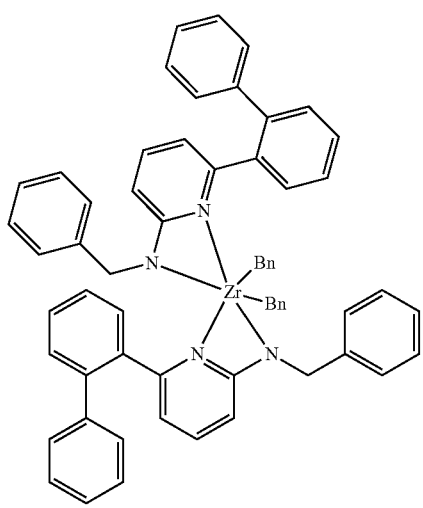
10. The composition of any of the preceding embodiments, wherein said metal-ligand complex of Formula (I) is selected from the group consisting of:
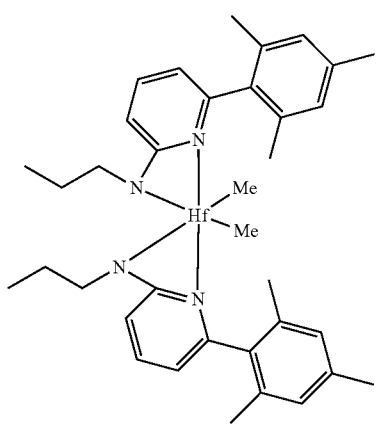
-continued
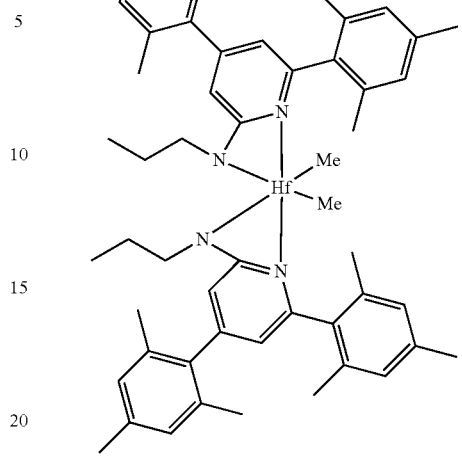
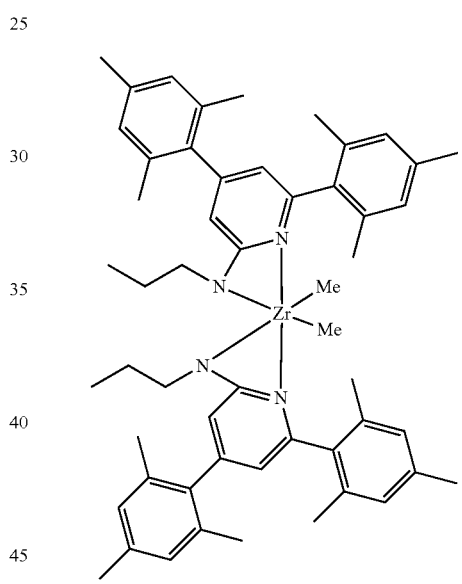
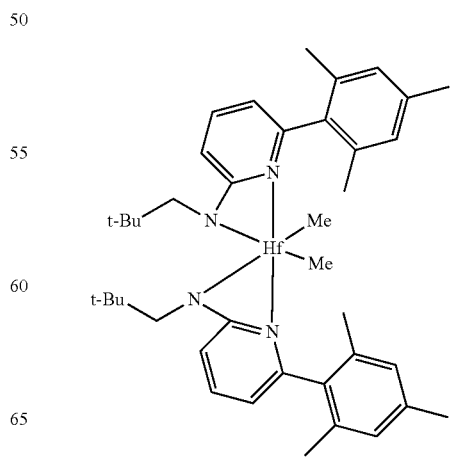

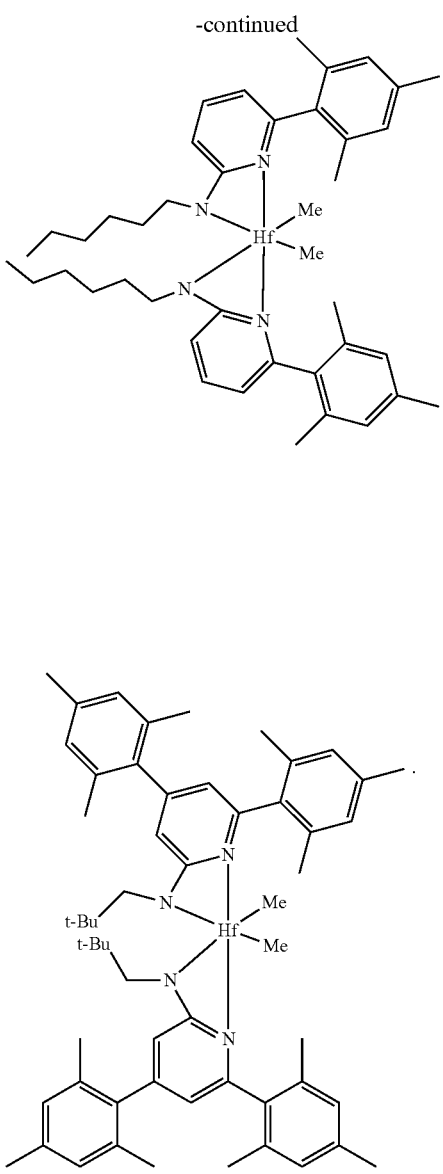

11. The composition of any of the preceding embodiments, wherein said metal-ligand complex of Formula (I) is selected from the group consisting of:

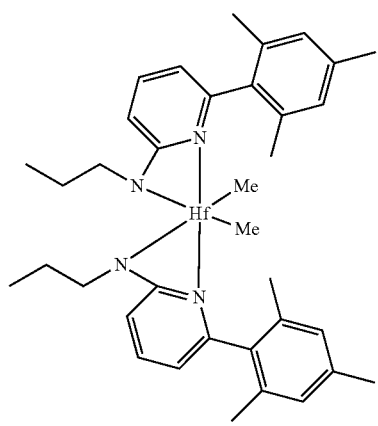

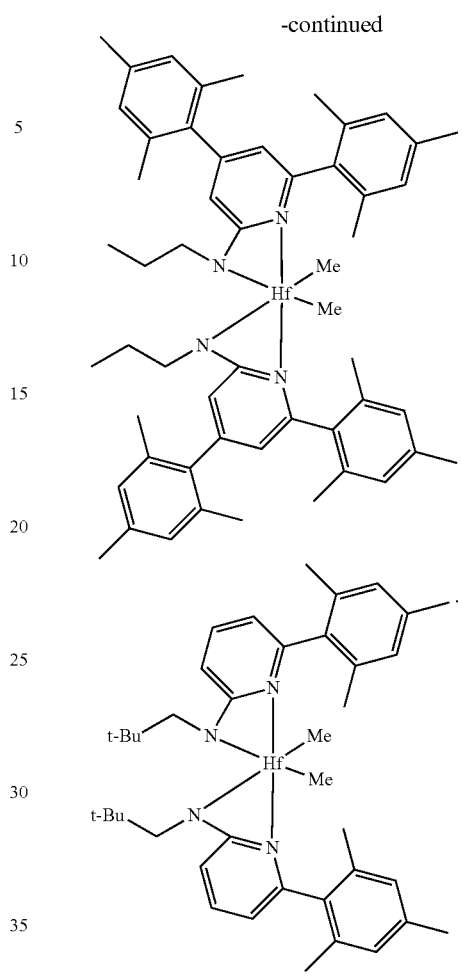

12. The composition of any of the preceding embodiments, wherein M is zirconium or hafnium.

13. The composition of any of the preceding embodiments, wherein the first olefin polymerization procatalyst (A) and the second olefin polymerization procatalyst (B) have respective reactivity ratios $r_{1A}$ and $r_{1B}$, such that the ratio $(r_{1A}/r_{1B})$ under polymerization conditions is 0.5 or less.

14. The composition of any of the preceding embodiments, wherein the first olefin polymerization procatalyst (A) comprises a metal-ligand complex of Formula (III):

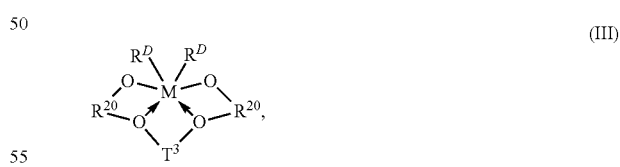

M is zirconium or hafnium;

$R^{20}$ independently at each occurrence is a divalent aromatic or inertly substituted aromatic group containing from 5 to 20 atoms not counting hydrogen;

$T^3$ is a divalent hydrocarbon or silane group having from 3 to 20 atoms not counting hydrogen, or an inertly substituted derivative thereof; and $R^D$ independently at each occurrence is a monovalent ligand group of from 1 to 20 atoms, not counting hydrogen, or two $R^D$ groups together are a divalent ligand group of from 1 to 20 atoms, not counting hydrogen.

15. The composition of embodiment 13, wherein said metal-ligand complex of Formula (III) has the following structure:

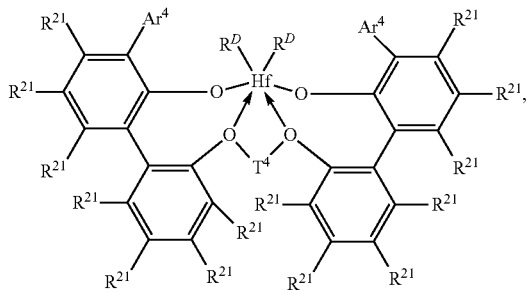

wherein:

$Ar^4$ independently at each occurrence is $C_{6-20}$ aryl or inertly substituted derivatives thereof, especially 3,5-di(isopropyl)phenyl, 3,5-di(isobutyl)phenyl, dibenzo-1H-pyrrole-1-yl, naphthyl, anthracen-5-yl, 1,2,3,4,6,7,8,9-octahydroanthracen-5-yl;

$T^4$ independently at each occurrence is a propylene-1,3-diyl group, a bis(alkylene)cyclohexan-1,2-diyl group, or an inertly substituted derivative thereof substituted with from 1 to 5 alkyl, aryl or aralkyl substituents having up to 20 carbons each;

$R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen; and $R^D$, independently at each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

16. The composition of embodiment 13, wherein said metal-ligand complex of Formula (III) has the following structure:

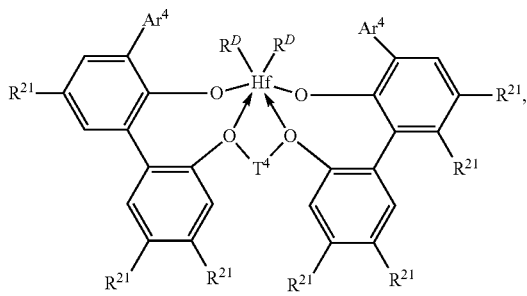

wherein, $Ar^4$ independently at each occurrence, is 3,5-di(isopropyl)phenyl, 3,5-di(isobutyl)phenyl, dibenzo-1H-pyrrole-1-yl, or anthracen-5-yl, $R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen;

$T^4$ is propan-1,3-diyl or bis(methylene)cyclohexan-1,2-diyl; and $R^D$, independently at each occurrence is halo or a hydrocarbyl or trihydrocarbylsilyl group of up to 20 atoms not counting hydrogen, or 2 $R^D$ groups together are a hydrocarbylene, hydrocarbadiyl or hydrocarbylsilanediyl group of up to 40 atoms not counting hydrogen.

17. The composition of embodiment 13, wherein said metal-ligand complex of Formula (III) is selected from the group consisting of:

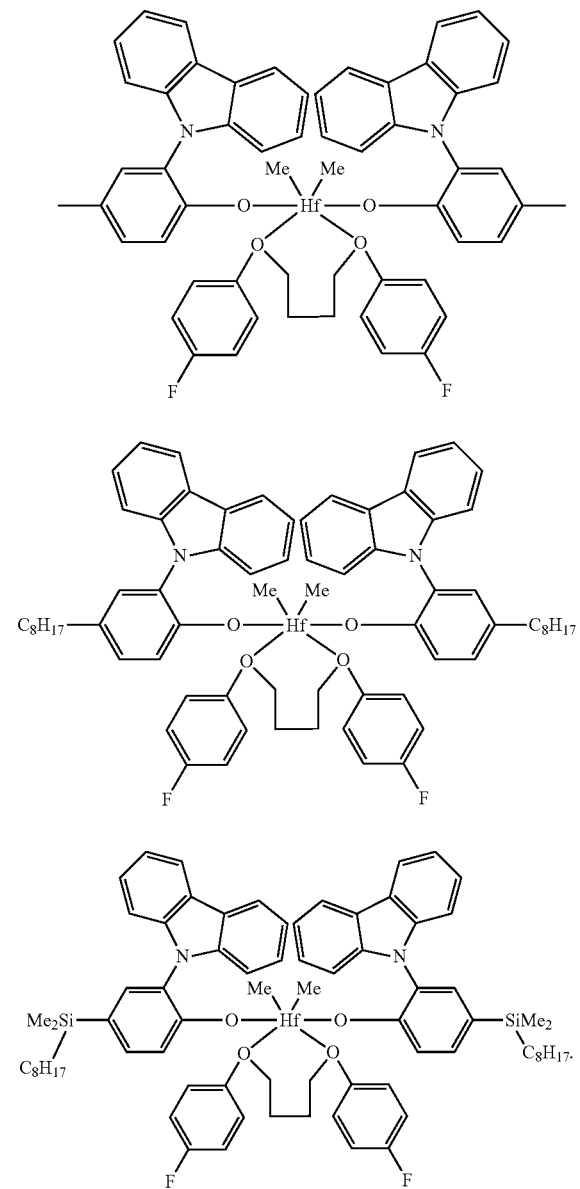

18. The composition of any of the preceding embodiments, wherein the chain shuttling agent is an aluminum, zinc, or gallium compound containing at least one hydrocarbyl substituent having from 1 to 12 carbons.

19. An olefin polymerization catalyst system comprising:

(A) a first olefin polymerization procatalyst, (B) a second olefin polymerization procatalyst, and (C) a chain shuttling agent, wherein the second olefin polymerization procatalyst comprises a metal-ligand complex of Formula (I):

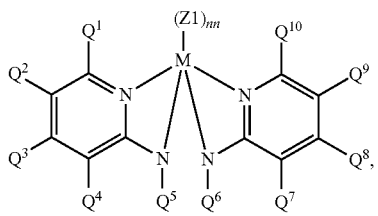

(I)

wherein M is titanium, zirconium, or hafnium;

wherein each Z1 is independently a monodentate or polydentate ligand that is neutral, monoanionic, or dianionic, wherein nn is an integer, and wherein Z1 and nn are chosen in such a way that the metal-ligand complex of Formula (I) is overall neutral;

wherein each $Q^1$ and $Q^{10}$ independently is selected from the group consisting of $(C_6-C_{40})$aryl, substituted $(C_6-C_{40})$aryl, $(C_3-C_{40})$heteroaryl, and substituted $(C_3-C_{40})$heteroaryl;

wherein each $Q^2$, $Q^3$, $Q^4$, $Q^7$, $Q^8$, and $Q^9$ independently is selected from a group consisting of hydrogen, $(C_1-C_{40})$ hydrocarbyl, substituted $(C_1-C_{40})$hydrocarbyl, $(C_1-C_{40})$heterohydrocarbyl, substituted $(C_1-C_{40})$heterohydrocarbyl, halogen, and nitro ($NO_2$);

wherein each $Q^5$ and $Q^6$ independently is selected from the group consisting of a $(C_1-C_{40})$alkyl, substituted $(C_1-C_{40})$ alkyl, and $[(Si)_1—(C+Si)_{40}]$ substituted organosilyl;

wherein each N independently is nitrogen;

optionally, two or more of the $Q^{1-5}$ groups can combine together to form a ring structure, with such ring structure having from 5 to 16 atoms in the ring excluding any hydrogen atoms; and optionally, two or more of the $Q^{6-10}$ groups can combine together to form a ring structure, with such ring structure having from 5 to 16 atoms in the ring excluding any hydrogen atoms.

20. The olefin polymerization catalyst system of embodiment 19, further comprising (D) an activator.

21. The olefin polymerization catalyst system of embodiment 19 or 20, wherein each Z1 independently is Me, Bn, or Cl.

22. The olefin polymerization catalyst system of any of embodiments 19-21, wherein $Q^1$ and $Q^{10}$ are substituted phenyl groups, as shown in Formula (II):

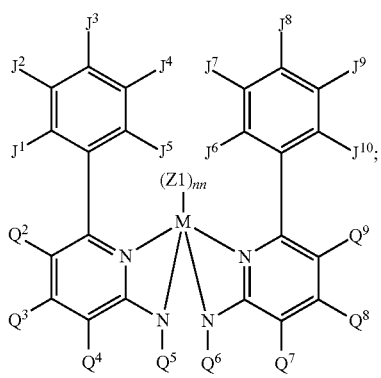

(II)

wherein $J^1$-$J^{10}$ are each independently selected from the group consisting of $R^S$ substituents and hydrogen; and wherein each $R^S$ independently is a halogen atom, polyfluoro substitution, perfluoro substitution, unsubstituted $(C_1-C_{18})$alkyl, $(C_6-C_{18})$aryl, $F_3C$, $FCH_2O$, $F_2HCO$, $F_3CO$, $(R^{C1})_3Si$, $(R^{C1})_3Ge$, $(R^{C1})O$, $(R^{C1})S$, $(R^{C1})S(O)$, $(R^{C1})S(O)_2$, $(R^{C1})_2P$, $(R^{C1})_2N$, $(R^{C1})_2C=N$, NC, $NO_2$, $(R^{C1})C(O)O$, $(R^{C1})OC(O)$, $(R^{C1})C(O)N(R^{C1})$, or $(R^{C1})_2NC(O)$, or two of the $R^S$ are taken together to form an unsubstituted $(C_1-C_{18})$alkylene where each $R^S$ independently is an unsubstituted $(C_1-C_{18})$alkyl, and wherein independently each $R^{C1}$ is hydrogen, unsubstituted $(C_1-C_{18})$hydrocarbyl or an unsubstituted $(C_1-C_{18})$heterohydrocarbyl, or absent (e.g., absent when N comprises —N=).

23. The olefin polymerization catalyst system of embodiment 22, wherein $J^1$, $J^5$, $J^6$ and $J^{10}$ are each independently selected from the group consisting of halogen atoms, $(C_1-C_8)$alkyl groups, and $(C_1-C_8)$alkoxyl groups.

24. The olefin polymerization catalyst system of embodiment 22, wherein $J^1$, $J^5$, $J^6$ and $J^{10}$ are each independently methyl; ethyl or isopropyl.

25. The olefin polymerization catalyst system of any of embodiments 19-24, wherein $Q^5$ and $Q^6$ are each independently $(C_1-C_{40})$ primary or secondary alkyl groups.

26. The olefin polymerization catalyst system of any of embodiments 19-25, wherein $Q^5$ and $Q^6$ are each independently propyl, isopropyl, neopentyl, hexyl, and benzyl.

27. The olefin polymerization catalyst system of any of embodiments 19-26, wherein said metal-ligand complex of Formula (I) is selected from the group consisting of:

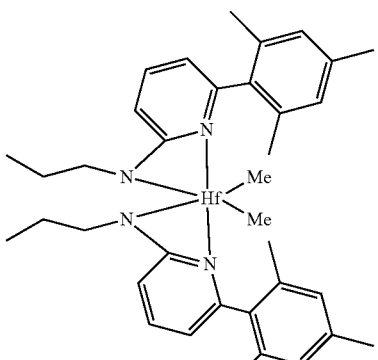

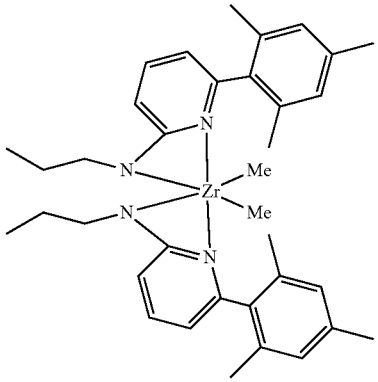

-continued
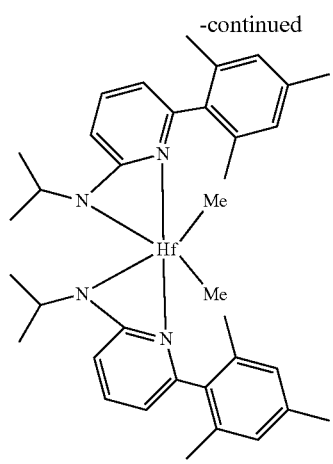
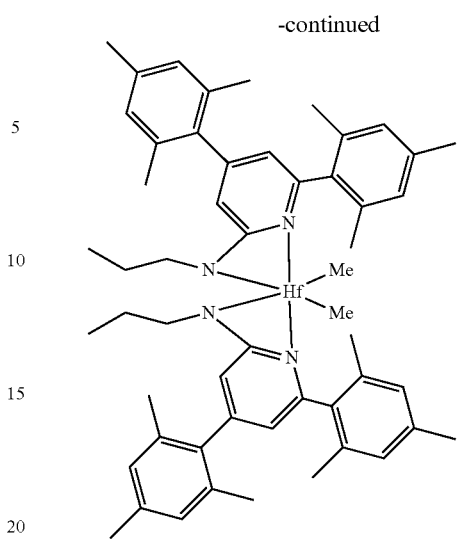
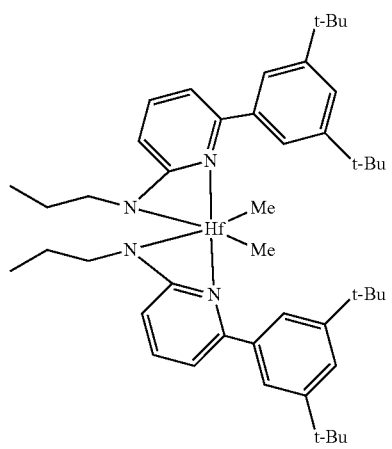
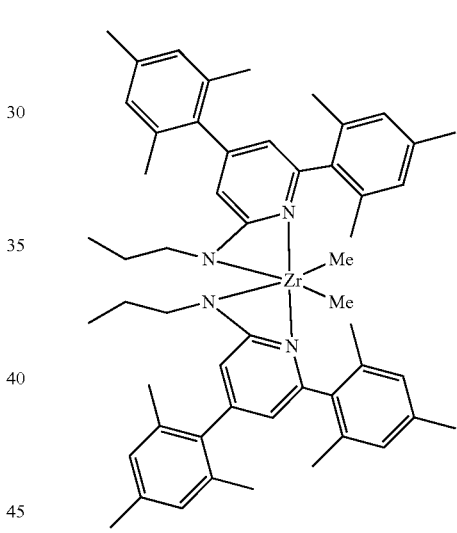
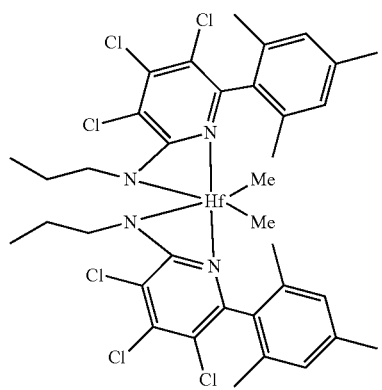
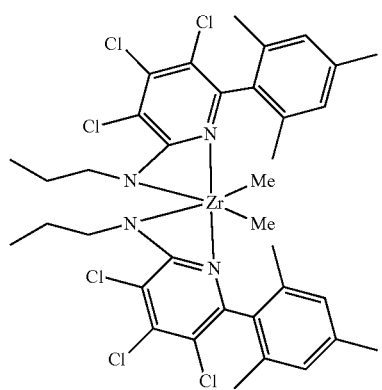
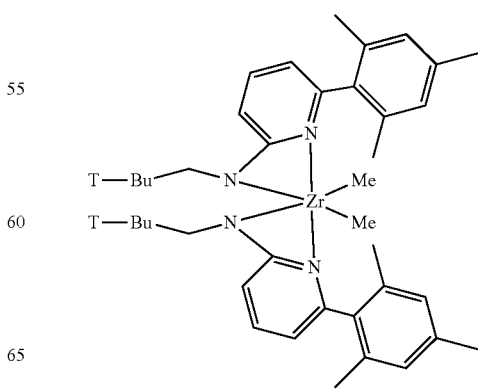

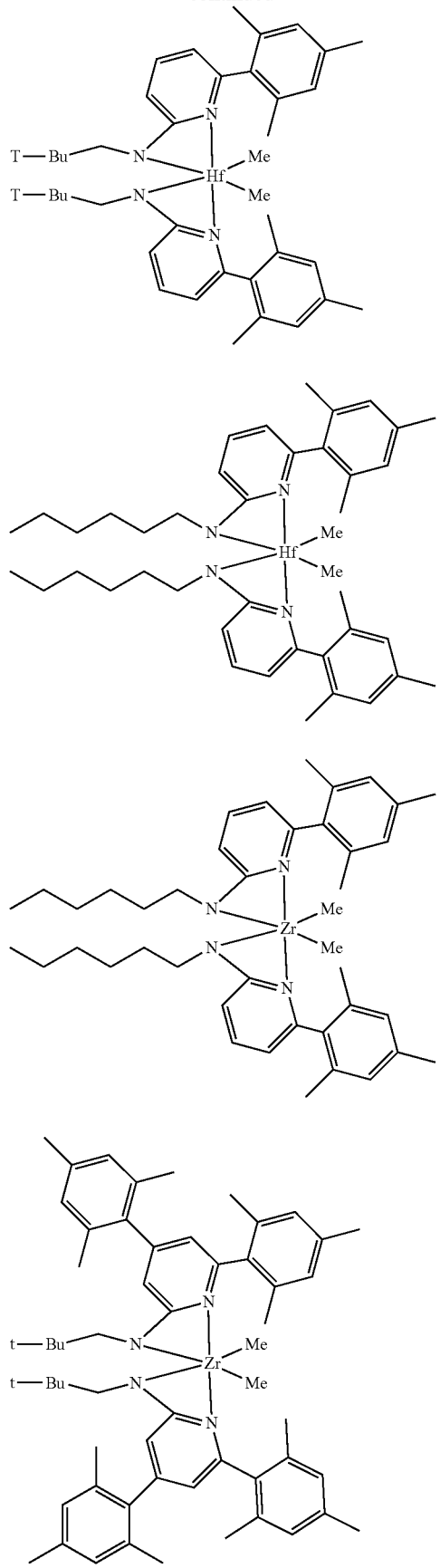
28. The olefin polymerization catalyst system of any of embodiments 19-27, wherein said metal-ligand complex of Formula (I) is selected from the group consisting of:

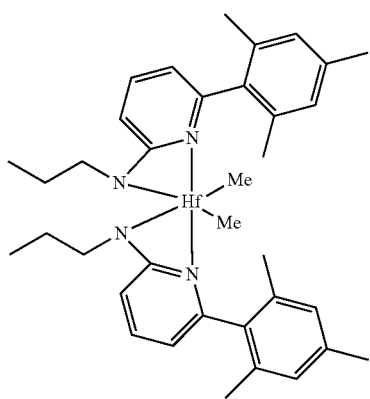
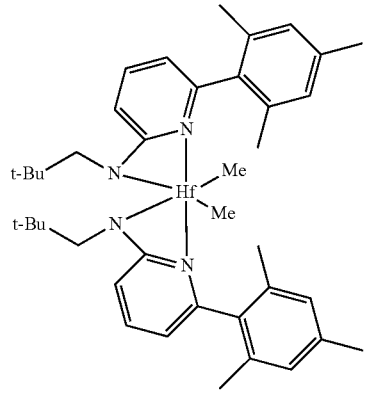
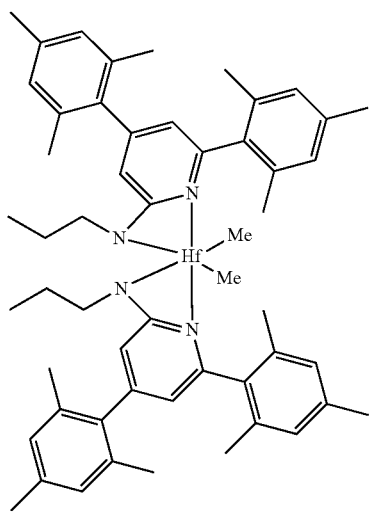
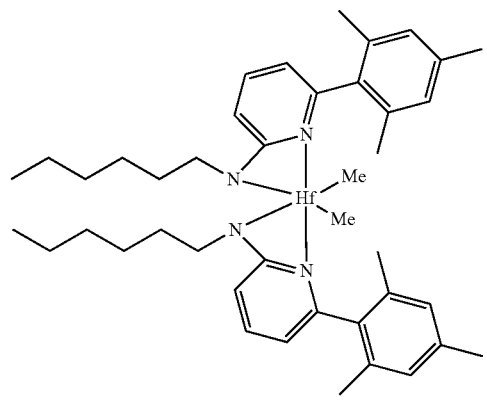
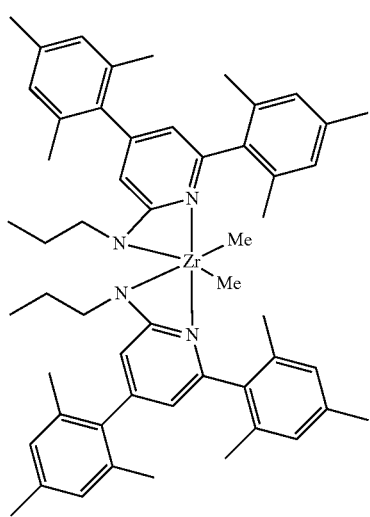
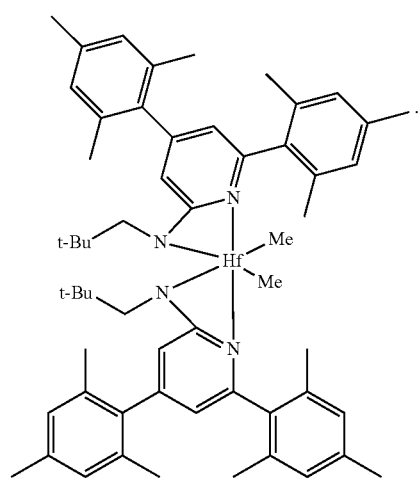
29. The olefin polymerization catalyst system of any of embodiments 19-28, wherein said metal-ligand complex of Formula (I) is selected from the group consisting of:

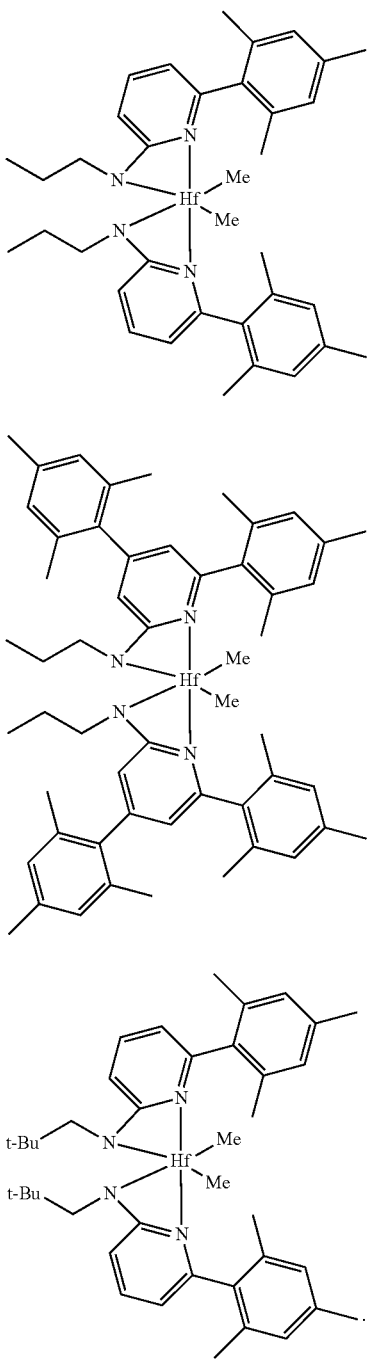

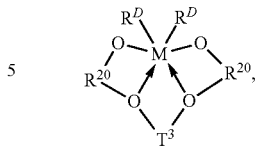
(III)

wherein:

M is zirconium or hafnium;

$R^{20}$ independently at each occurrence is a divalent aromatic or inertly substituted aromatic group containing from 5 to 20 atoms not counting hydrogen;

$T^3$ is a divalent hydrocarbon or silane group having from 3 to 20 atoms not counting hydrogen, or an inertly substituted derivative thereof; and $R^D$ independently at each occurrence is a monovalent ligand group of from 1 to 20 atoms, not counting hydrogen, or two $R^D$ groups together are a divalent ligand group of from 1 to 20 atoms, not counting hydrogen.

33. The olefin polymerization catalyst system of embodiment 32, wherein said metal-ligand complex of Formula (III) has the following structure:

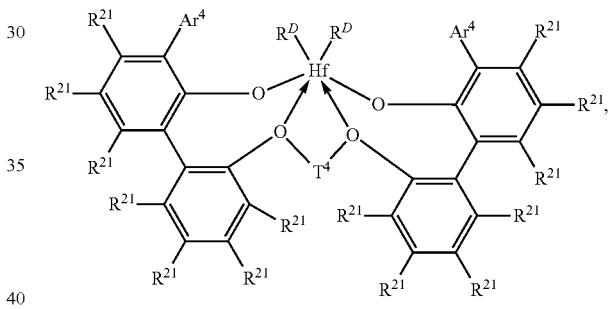

wherein:

$Ar^4$ independently at each occurrence is $C_{6-20}$ aryl or inertly substituted derivatives thereof, especially 3,5-di(isopropyl)phenyl, 3,5-di(isobutyl)phenyl, dibenzo-1H-pyrrole-1-yl, naphthyl, anthracen-5-yl, 1,2,3,4,6,7,8,9-octahydroanthracen-5-yl;

$T^4$ independently at each occurrence is a propylene-1,3-diyl group, a bis(alkylene)cyclohexan-1,2-diyl group, or an inertly substituted derivative thereof substituted with from 1 to 5 alkyl, aryl or aralkyl substituents having up to 20 carbons each;

$R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen; and $R^D$, independently at each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

30. The olefin polymerization catalyst system of any of embodiments 19-29, wherein M is zirconium or hafnium.

31. The olefin polymerization catalyst system of any of embodiments 19-30, wherein the first olefin polymerization procatalyst (A) and the second olefin polymerization procatalyst (B) have respective reactivity ratios $r_{1A}$ and $r_{1B}$, such that the ratio ($r_{1A}/r_{1B}$) under polymerization conditions is 0.5 or less.

32. The olefin polymerization catalyst system of any of embodiments 19-31, wherein the first olefin polymerization procatalyst (A) comprises a metal-ligand complex of Formula (III):

34. The olefin polymerization catalyst system of embodiment 32, wherein said metal-ligand complex of Formula (III) has the following structure:

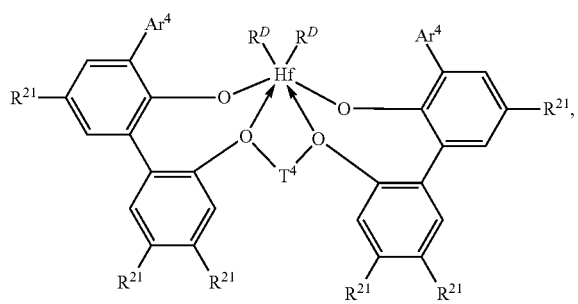

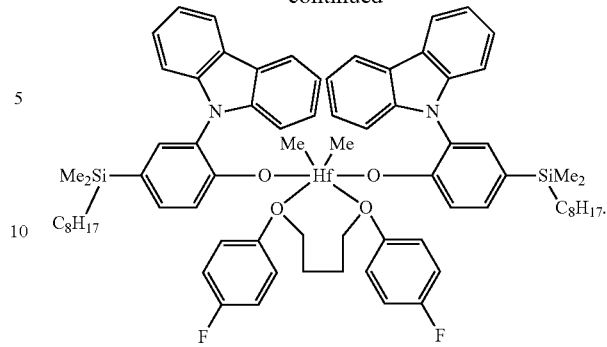

wherein,

Ar⁴ independently at each occurrence, is 3,5-di(isopropyl)phenyl, 3,5-di(isobutyl)phenyl, dibenzo-1H-pyrrole-1-yl, or anthracen-5-yl, $R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen;

$T^4$ is propan-1,3-diyl or bis(methylene)cyclohexan-1,2-diyl; and $R^D$, independently at each occurrence is halo or a hydrocarbyl or trihydrocarbylsilyl group of up to 20 atoms not counting hydrogen, or 2 $R^D$ groups together are a hydrocarbylene, hydrocarbadiyl or hydrocarbylsilanediyl group of up to 40 atoms not counting hydrogen.

35. The olefin polymerization catalyst system of embodiment 32, wherein said metal-ligand complex of Formula (III) is selected from the group consisting of:

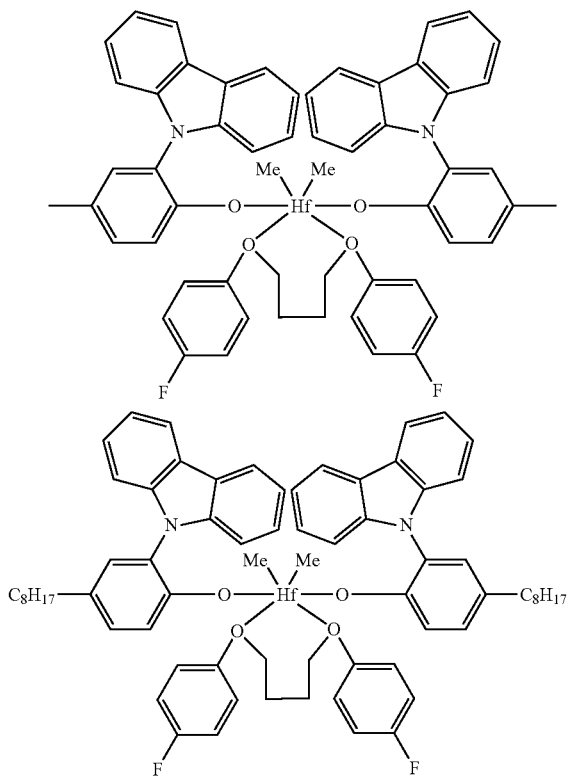

36. The olefin polymerization catalyst system of any of embodiments 19-35, wherein the chain shuttling agent is an aluminum, zinc, or gallium compound containing at least one hydrocarbyl substituent having from 1 to 12 carbons.

37. A process for preparing a multi-block copolymer comprising contacting one or more addition polymerizable monomers under addition polymerization conditions with a composition according to any of embodiments 1-18 or an olefin polymerization catalyst system of embodiments 19-36.

38. A process for preparing a multi-block copolymer comprising contacting ethylene and at least one copolymerizable comonomer other than ethylene under addition polymerization conditions with a composition according to any of embodiments 1-18 or an olefin polymerization catalyst system of embodiments 19-36.

39. A process for preparing a multi-block copolymer comprising contacting ethylene and a C3-8 alpha-olefin under addition polymerization conditions with a composition according to any of embodiments 1-18 or an olefin polymerization catalyst system of embodiments 19-36.

40. The process according to any of embodiments 37-39, wherein the process is a continuous solution process.

41. The process of embodiment 40, wherein the process is carried out at a temperature of greater than 125° C.

42. The process of embodiment 41, wherein the process is carried out at a temperature of about 150° C. and comprises a combined catalyst efficiency of above 400 $kg_{polymer}/g_{metal}$.

43. The process of embodiment 41, wherein the process is carried out at a temperature from about 150° C. to about 170° C. and comprises a combined catalyst efficiency of above 200 $kg_{polymer}/g_{metal}$.

44. A multi-block copolymer prepared by the process according to any of embodiments 37-43, wherein the multi-block copolymer comprises, in polymerized form, one or more addition polymerizable monomers, said copolymer containing therein two or more segments or blocks differing in comonomer content, crystallinity, tacticity, homogeneity, density, melting point or glass transition temperature.

45. The multi-block copolymer of embodiment 44, wherein the multi-block copolymer comprises, in polymerized form, ethylene and one or more copolymerizable comonomers, said copolymer containing therein two or more segments or blocks differing in comonomer content, crystallinity, tacticity, homogeneity, density, melting point or glass transition temperature.

46. The multi-block copolymer of embodiment 44, wherein the multi-block copolymer comprises a molecular weight distribution, Mw/Mn, of less than 3.0.

47. The multi-block copolymer of embodiment 44, wherein the multi-block copolymer comprises a melt index of less than 1.0 (ASTM D 1238 (190° C./2.16 kg)).

48. The multi-block copolymer of embodiment 44, wherein the multi-block copolymer comprises a thermomechanical resistance of greater than 100° C.

49. A functionalized derivative of the multi-block copolymer of embodiment 44.

50. A multi-block copolymer of embodiment 44 comprising the same in the form of a film, at least one layer of a multilayer film, at least one layer of a laminated article, a foamed article, a fiber, a nonwoven fabric, an injection molded article, a blow molded article, a roto-molded article, or an adhesive.

What is claimed is:

1. An olefin polymerization catalyst system comprising:
(A) a first olefin polymerization procatalyst,
(B) a second olefin polymerization procatalyst, and
(C) a chain shuttling agent,
wherein the second olefin polymerization procatalyst comprises a metal-ligand complex of Formula (I):

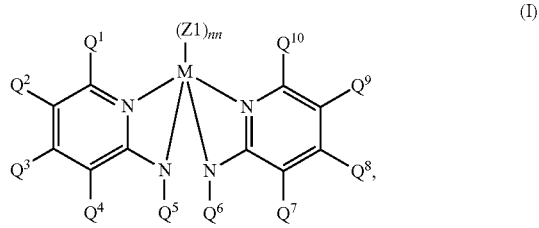

wherein M is titanium, zirconium, or hafnium;
wherein each Z1 is independently a monodentate or polydentate ligand that is neutral, monoanionic, or dianionic, wherein nn is an integer, and wherein Z1 and nn are chosen in such a way that the metal-ligand complex of Formula (I) is overall neutral;
wherein each $Q^1$ and $Q^{10}$ independently is selected from the group consisting of ($C_6$-$C_{40}$)aryl, substituted ($C_6$-$C_{40}$)aryl, ($C_3$-$C_{40}$)heteroaryl, and substituted ($C_3$-$C_{40}$) heteroaryl;
wherein each $Q^2$, $Q^3$, $Q^4$, $Q^7$, $Q^8$, and $Q^9$ independently is selected from a group consisting of hydrogen, ($C_1$-$C_{40}$) hydrocarbyl, substituted ($C_1$-$C_{40}$)hydrocarbyl, ($C_1$-$C_{40}$)heterohydrocarbyl, substituted ($C_1$-$C_{40}$)heterohydrocarbyl, halogen, and nitro ($NO_2$);
wherein each $Q^5$ and $Q^6$ independently is selected from the group consisting of a ($C_1$-$C_{40}$)alkyl, substituted ($C_1$-$C_{40}$)alkyl, and [$(Si)_1$—$(C+Si)_{40}$] substituted organosilyl;
wherein each N independently is nitrogen;
optionally, two or more of the $Q^{1-5}$ groups can combine together to form a ring structure, with such ring structure having from 5 to 16 atoms in the ring excluding any hydrogen atoms; and
optionally, two or more of the $Q^{6-10}$ groups can combine together to form a ring structure, with such ring structure having from 5 to 16 atoms in the ring excluding any hydrogen atoms.

2. The catalyst system of claim 1, further comprising (D) an activator.

3. The catalyst system of claim 1, wherein each Z1 independently is Me, Bn, or Cl.

4. The catalyst system of claim 1, wherein $Q^1$ and $Q^{10}$ are substituted phenyl groups, as shown in Formula (II):

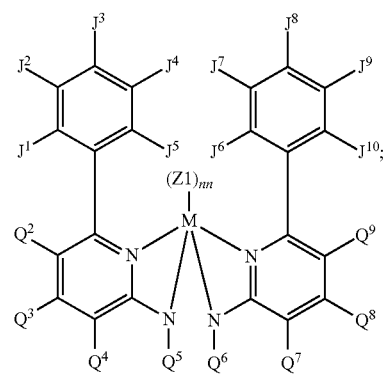

wherein $J^1$-$J^{10}$ are each independently selected from the group consisting of $R^S$ substituents and hydrogen; and wherein each $R^S$ independently is a halogen atom, polyfluoro substitution, perfluoro substitution, unsubstituted ($C_1$-$C_{18}$)alkyl, ($C_6$-$C_{18}$)aryl, $F_3C$, $FCH_2O$, $F_2HCO$, $F_3CO$, $(R^{C1})_3Si$, $(R^{C1})_3Ge$, $(R^{C1})O$, $(R^{C1})S$, $(R^{C1})S(O)$, $(R^{C1})S(O)_2$, $(R^{C1})_2P$, $(R^{C1})_2N$, $(R^{C1})_2C=N$, NC, $NO_2$, $(R^{C1})C(O)O$, $(R^{C1})OC(O)$, $(R^{C1})C(O)N(R^{C1})$, or $(R^{C1})_2NC(O)$, or two of the $R^S$ are taken together to form an unsubstituted ($C_1$-$C_{18}$)alkylene where each $R^S$ independently is an unsubstituted ($C_1$-$C_{18}$)alkyl, and
wherein independently each $R^{C1}$ is hydrogen, unsubstituted ($C_1$-$C_{18}$)hydrocarbyl or an unsubstituted ($C_1$-$C_{18}$) heterohydrocarbyl, or absent (e.g., absent when N comprises —N=).

5. The catalyst system of claim 4, wherein $J^1$, $J^5$, $J^6$ and $J^{10}$ are each independently selected from the group consisting of halogen atoms, ($C_1$-$C_8$)alkyl groups, and ($C_1$-$C_8$) alkoxyl groups.

6. The catalyst system of claim 1, wherein $Q^5$ and $Q^6$ are each independently ($C_1$-$C_{40}$) primary or secondary alkyl groups.

7. The catalyst system of claim 1, wherein $Q^5$ and $Q^6$ are each independently propyl, isopropyl, neopentyl, hexyl, and benzyl.

8. The catalyst system of claim 1, wherein said metal-ligand complex of Formula (I) is selected from the group consisting of:

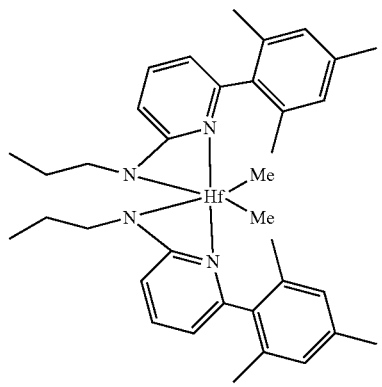

153
-continued
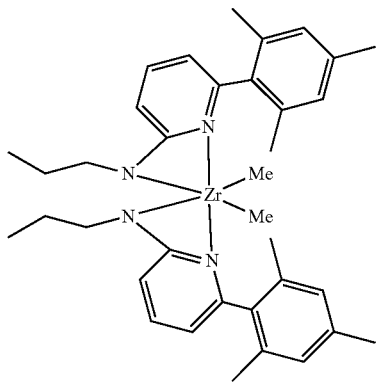
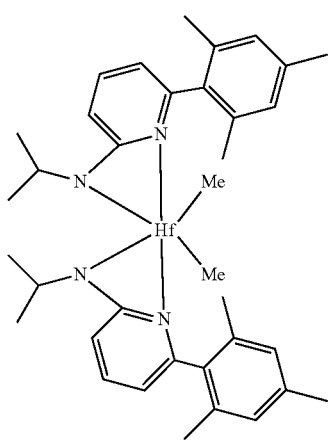
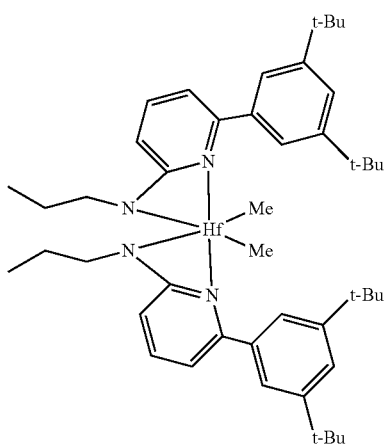
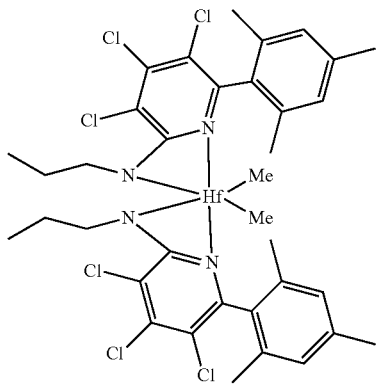
154
-continued
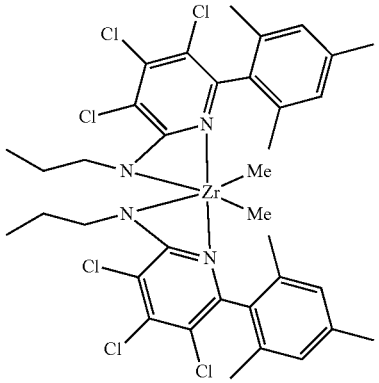
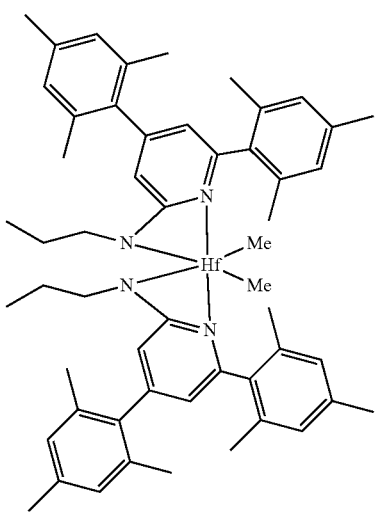
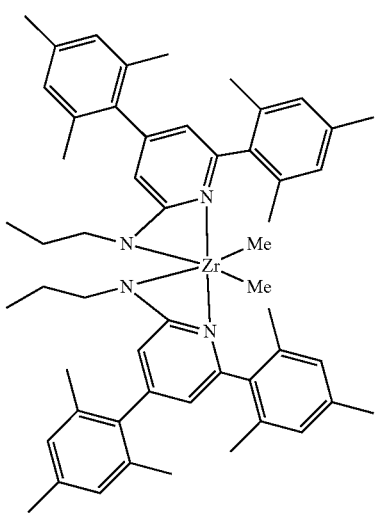

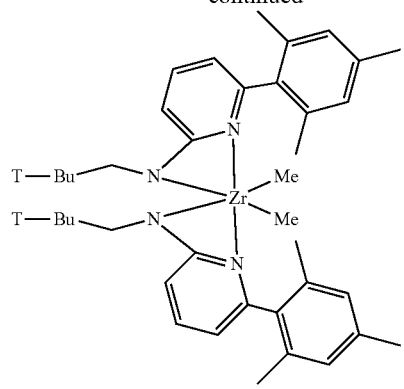
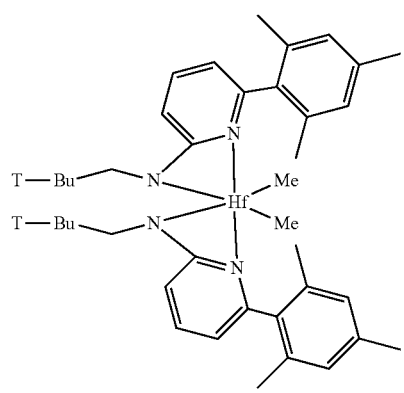
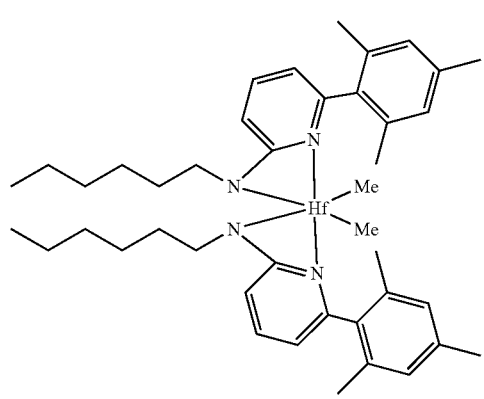
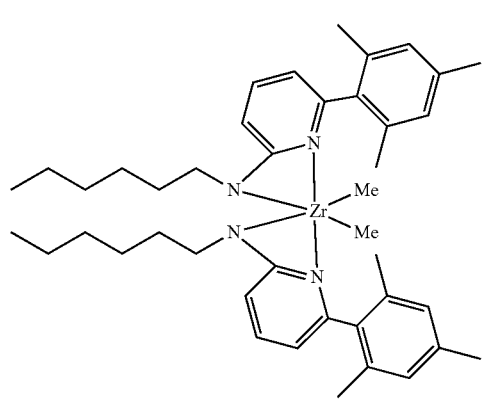
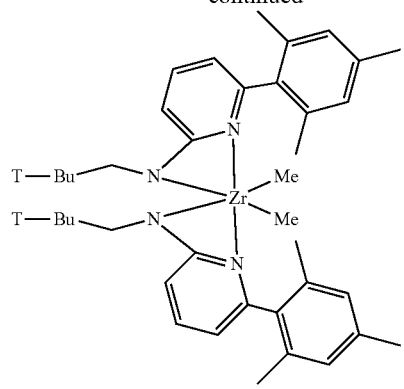
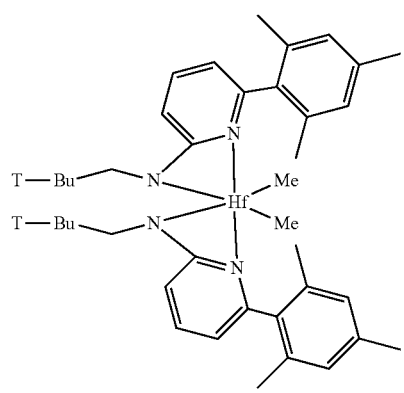
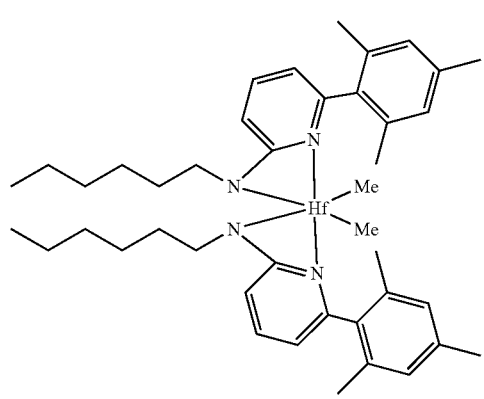
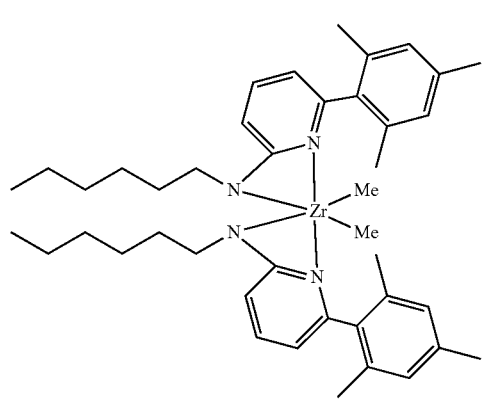

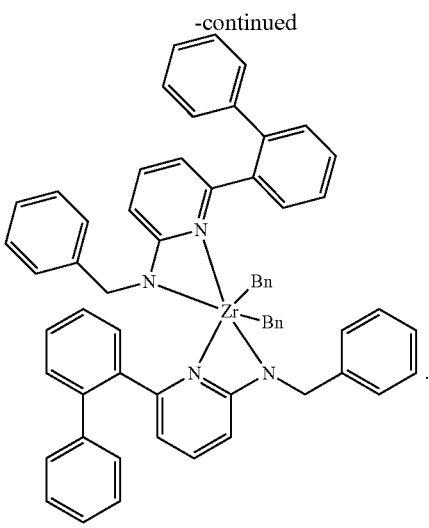

9. The catalyst system of claim 1, wherein M is zirconium or hafnium.

10. The catalyst system of claim 1, wherein the first olefin polymerization procatalyst (A) and the second olefin polymerization procatalyst (B) have respective reactivity ratios $r_{1A}$ and $r_{1B}$, such that the ratio ($r_{1A}/r_{1B}$) under polymerization conditions is 0.5 or less.

11. A process for preparing a multi-block copolymer comprising contacting one or more addition polymerizable monomers under addition polymerization conditions with a catalyst system according to claim 1, wherein the process is a continuous solution process carried out at a temperature of greater than 125° C.

12. The process of claim 11, wherein the process is carried out at a temperature of about 150° C. and comprises a combined catalyst efficiency of above 400 $kg_{polymer}/g_{metal}$.

13. The process of claim 11, wherein the process is carried out at a temperature from about 150° C. to about 170° C. and comprises a combined catalyst efficiency of above 200 $kg_{polymer}/g_{metal}$.

14. The catalyst system of claim 1, wherein the first olefin polymerization procatalyst (A) comprises a metal-ligand complex of the following formula:

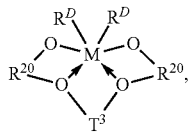

wherein:
M is zirconium or hafnium;
$R^{20}$ independently at each occurrence is a divalent aromatic or inertly substituted aromatic group containing from 5 to 20 atoms not counting hydrogen;
$T^3$ is a divalent hydrocarbon or silane group having from 3 to 20 atoms not counting hydrogen, or an inertly substituted derivative thereof; and
$R^D$ independently at each occurrence is a monovalent ligand group of from 1 to 20 atoms, not counting hydrogen, or two $R^D$ groups together are a divalent ligand group of from 1 to 20 atoms, not counting hydrogen.

15. The catalyst system of claim 14, wherein the first olefin polymerization procatalyst (A) comprises a metal-ligand complex of Formula (III):

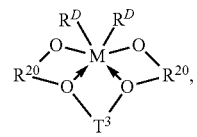

wherein:
$R^{20}$ independently at each occurrence is a divalent aromatic or inertly substituted aromatic group containing from 5 to 20 atoms not counting hydrogen;
$T^3$ is a divalent hydrocarbon or silane group having from 3 to 20 atoms not counting hydrogen, or an inertly substituted derivative thereof; and
$R^D$ independently at each occurrence is a monovalent ligand group of from 1 to 20 atoms, not counting hydrogen, or two $R^D$ groups together are a divalent ligand group of from 1 to 20 atoms, not counting hydrogen.

16. The catalyst system of claim 15, wherein said metal-ligand complex of Formula (III) has the following structure:

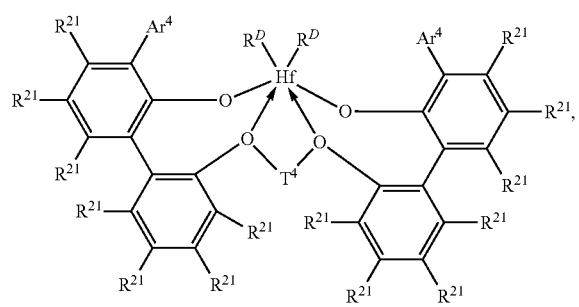

wherein:
$Ar^4$ independently at each occurrence is $C_{6-20}$ aryl or inertly substituted derivatives thereof, especially 3,5-di(isopropyl)phenyl, 3,5-di(isobutyl)phenyl, dibenzo-1H-pyrrole-1-yl, naphthyl, anthracen-5-yl, 1,2,3,4,6,7,8,9-octahydroanthracen-5-yl;
$T^4$ independently at each occurrence is a propylene-1,3-diyl group, a bis(alkylene)cyclohexan-1,2-diyl group, or an inertly substituted derivative thereof substituted with from 1 to 5 alkyl, aryl or aralkyl substituents having up to 20 carbons each;
$R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen; and
$R^D$, independently at each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

17. The catalyst system of claim 15, wherein said metal-ligand complex of Formula (III) has the following structure:

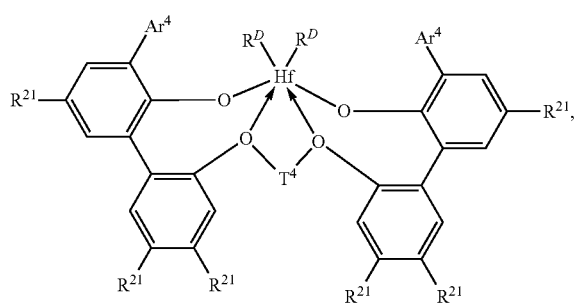

wherein,

Ar⁴ independently at each occurrence, is 3,5-di(isopropyl)phenyl, 3,5-di(isobutyl)phenyl, dibenzo-1H-pyrrole-1-yl, or anthracen-5-yl, $R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen;

$T^4$ is propan-1,3-diyl or bis(methylene)cyclohexan-1,2-diyl; and $R^D$, independently at each occurrence is halo or a hydrocarbyl or trihydrocarbylsilyl group of up to 20 atoms not counting hydrogen, or 2 $R^D$ groups together are a hydrocarbylene, hydrocarbadiyl or hydrocarbylsilanediyl group of up to 40 atoms not counting hydrogen.

18. The catalyst system of claim 15, wherein said metal-ligand complex of Formula (III) is selected from the group consisting of:

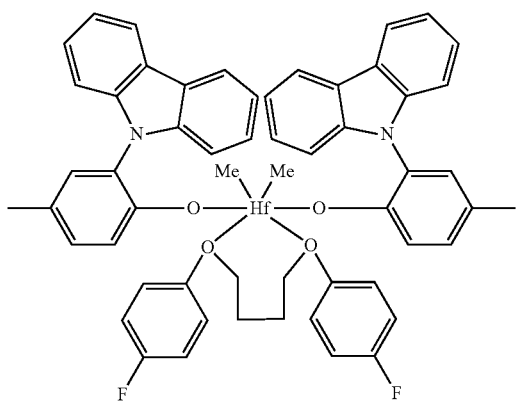

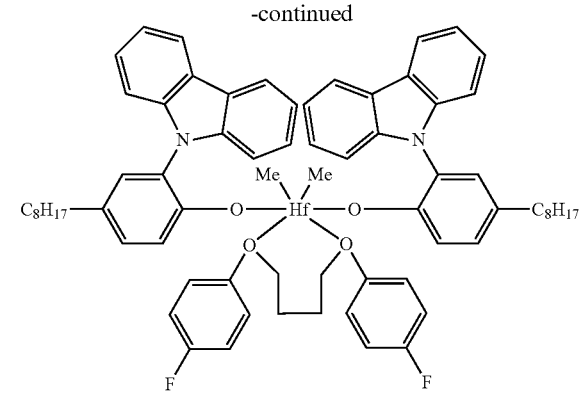

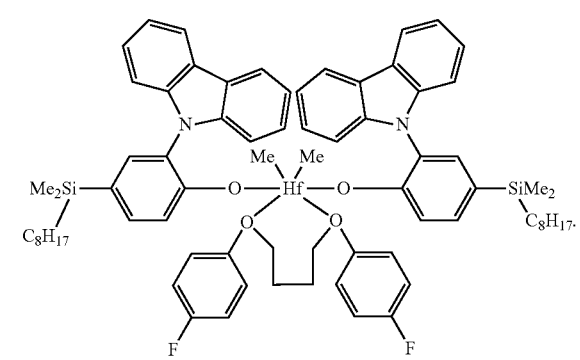

19. A process for preparing a multi-block copolymer comprising contacting one or more addition polymerizable monomers under addition polymerization conditions with a catalyst system according to claim 14, wherein the process is a continuous solution process carried out at a temperature of greater than 125° C.

20. The process of claim 19, wherein the process is carried out at a temperature of about 150° C. and comprises a combined catalyst efficiency of above 400 $kg_{polymer}/g_{metal}$.

* * * * *